(12) United States Patent
Hyman

(10) Patent No.: US 8,921,473 B1
(45) Date of Patent: *Dec. 30, 2014

(54) IMAGE MAKING MEDIUM

(76) Inventor: Sydney Hyman, New York, NY (US)

( * ) Notice: Subject to any disclaimer, the term of this patent is extended or adjusted under 35 U.S.C. 154(b) by 1975 days.

This patent is subject to a terminal disclaimer.

(21) Appl. No.: 11/118,975

(22) Filed: Apr. 28, 2005

Related U.S. Application Data

(60) Provisional application No. 60/567,022, filed on Apr. 30, 2004.

(51) Int. Cl.
*C08K 3/34* (2006.01)

(52) U.S. Cl.
USPC ......... 524/445; 423/445 R; 524/495; 524/496

(58) Field of Classification Search
USPC ........ 423/445 R, DIG. 39, DIG. 40; 524/445, 524/495, 496
See application file for complete search history.

(56) References Cited

U.S. PATENT DOCUMENTS

| | | | |
|---|---|---|---|
| 3,700,754 A | 10/1972 | Schmitt et al. | 260/878 R |
| 4,320,174 A | 3/1982 | Rabinovitch et al. | 428/518 |
| 4,551,493 A | 11/1985 | Blinne et al. | 524/89 |
| 4,578,294 A | 3/1986 | Ouchi et al. | 428/35 |
| 4,935,275 A | 6/1990 | Ushida et al. | 428/31 |
| 5,102,597 A | 4/1992 | Roe et al. | 264/126 |
| 5,241,006 A | 8/1993 | Iqbal et al. | 525/196 |
| 5,512,620 A | 4/1996 | van Hout et al. | 524/84 |
| 5,523,167 A | 6/1996 | Hunt et al. | 428/484 |
| 5,532,053 A | 7/1996 | Mueller | 428/287 |
| 5,674,579 A | 10/1997 | Ladouce et al. | 428/35.7 |
| 5,725,990 A | 3/1998 | Hirai et al. | 430/203 |
| 6,248,457 B1 | 6/2001 | Chen et al. | 428/690 |
| 6,949,237 B2 * | 9/2005 | Smalley et al. | 423/447.3 |
| 8,669,325 B1 * | 3/2014 | Hyman | 524/106 |
| 2003/0008135 A1 * | 1/2003 | Kawamura et al. | 428/336 |
| 2004/0217332 A1 * | 11/2004 | Wagener et al. | 252/500 |

FOREIGN PATENT DOCUMENTS

| | | |
|---|---|---|
| EP | 0 120 296 B1 | 6/1986 |
| EP | 0 827 981 A2 | 3/1998 |
| EP | 0 921 160 A1 | 6/1999 |
| GB | 974 111 | 11/1964 |
| WO | WO 91/16143 | 10/1991 |

* cited by examiner

*Primary Examiner* — Edward Cain
(74) *Attorney, Agent, or Firm* — Winston & Strawn LLP

(57) ABSTRACT

The invention relates to an image support medium for creation of an aesthetic image that is a work or object for display. This support medium is made from a smart or intelligent material so that the medium provides or enables formation of an image having at least one aesthetic element that can be responsive, interactive, controlled, changed, programmed, and/or modulated. The support medium can further comprise stimuli, triggers or influences that cause the smart or intelligent material to respond to change shape, size, volume, density, light properties, color, appearance, and/or another physical property of the aesthetic element. In a preferred embodiment, the smart or intelligent material is reversibly responsive to the stimuli, triggers or influences.

293 Claims, No Drawings

IMAGE MAKING MEDIUM

This application claims the benefit of provisional application 60/567,022 filed Apr. 30, 2004, the entire content of which is expressly incorporated herein by reference thereto.

FIELD OF INVENTION

The present invention relates to a medium for making images, a process for making the medium, and methods for using the medium to make images. More specifically, the present invention relates to a medium-containing polymer that is useful for making images.

BACKGROUND OF THE INVENTION

New mediums and new processes, and modifications of conventional mediums and processes often expand the use of formal elements thereby making the creation of new images possible, and enabling ideas to be realized in images that previously could not be achieved. Consequently, for thousands of years those making images of art, design, and architecture and those working with them have focused an enormous amount of work on image making mediums and processes, particularly on mediums and processes that were unconventional at the time. Science and cutting edge science has played a major role in this endeavor. Image makers are today deeply involved in exploring all kinds of areas of science in order to develop art, design and architecture; in order to use the formal elements in new ways; in order to realize their ideas e.g., without compromising; and in order to expand and innovate art, design and architecture. The present invention is part of this mainstream current of image making that is tied to science.

The present invention combines art, design and architecture with science as never before. Prior to this invention, the use of polymers in images was limited and problematic, (e.g., refer to U.S. Patent Application 20030035917-A1). By taking advantage of a wide range of polymers, and using them with a wide range of other, unconventional and novel materials, processes, and advances on the frontiers of science, the present invention expands the formal elements available for making images considerably. This invention offers very desirable new mediums and processes for making images as well as novel variations of conventional image making mediums and processes, both of which have many variations. Examples are new polymeric compositions; polymers that change in response to stimulants like electricity or light; smart materials; e-materials like electronic paper; processes for these; as well as nanomaterials and nanotechnology which can enhance and impart remarkable properties or formal elements to inventive images. These can expand the use of light, space, transparency, form, structure, strength, conductivity, devices, visual effects, interactivity, and/or permanence of inventive images to such an extent that a wide range of new images can be created, some of which will be strikingly different from art, design and architecture made prior to this invention. By opening the horizon for image making, this invention will expand the variety of new images that will exist. Refer to further description in U.S. Patent Application 20030035917-A1

SUMMARY OF THE INVENTION

The present invention relates to novel fine-art, image-making support mediums for creation of aesthetic images that are works or objects for display, and the present invention relates to novel aesthetic images. These mediums are made from unconventional art materials, therefore they enable the artist to use formal elements as never before, creating works that show new ideas and have previously unachievable impact, impression and aesthetic.

In one embodiment, these mediums are made from a) a polymeric solution, optionally including at least one of an oil, acrylic or alkyd ingredient, b) an adhesive product, optionally including at least one of an oil, acrylic or alkyd ingredient or c) a combination or mixture of a) and b) so that the medium provides or enables formation of an image having at least one aesthetic element. Preferably, these mediums are made from a combination of the polymeric solution and the adhesive product and are translucent or transparent. If desired, the polymeric solution or adhesive product can include a stabilizer or a support. Also, these mediums may be cleaned or treated to enhance the visual effect of the aesthetic element, to enhance permanence, to enhance or enable bonding to at least one superimposition, or for a combination of these purposes. For this, cleaning with a) cleaned with an acid, base, or surfactant, b) treated with an acid, a solvent, a mixture of at least one solvent and at least one non-solvent, a plasma treatment, a corona treatment, discharge or an anti-static material treatment, or a combination of these, or c) both a) and b) achieves highly desirable results.

Another embodiment of the invention relates to a fine-art, image-making support medium made from a smart or intelligent material so that the medium provides or enables formation of an image having at least one aesthetic element that can be responsive, interactive, controlled, changed, programmed, and/or modulated. The support medium can further comprise comprising one or more stimuli, triggers or influences or at least one part that is responsive to one or more external stimuli, triggers or influences, that cause the smart or intelligent material to respond to change shape, size, volume, density, light properties, color, appearance, and/or another physical property of the aesthetic element. Often such stimuli, triggers or influences are external (e.g., the sound of a viewer, a change in light or temperature, etc.). These images typically have some kind of sensor, touch control, or other part that detects or is sensitive to the stimuli, trigger or influence. In a preferred embodiment, the smart or intelligent material is reversibly responsive to the stimuli, triggers or influences.

A wide variety of different materials and combinations can be used in accordance with the invention. The smart or intelligent material may be a synthetic opal, optionally containing silica spheres or imbibed with liquid crystal, polymerized crystalline colloidal arrays (PCCA), gel particles embedded in crystalline colloidal arrays, or a photonic colorant that change in color, light properties, and/or volume, and a change in the material can be obtained by electricity, electrodes, a solvent, environmental changes, temperature changes, changes in light or sound, pH changes, or a combination of these produces a change in the material. The smart or intelligent material can be a photochromic, thermochromatic, electroactive or phase change material that responds to light, heat, electric or ionic energy.

More preferably, the smart or intelligent material comprises a nanomaterial, a conductive, semi-conductive or holographic pigment, or a liquid crystal elastomer, and changes in the material can be made by heat, electrical current, solar power, an electrode, a battery, a circuit, a transistor or another power source, or a combination of these produces a change in the material. The form of these materials can include a metal coated polymer, a polymer coated metal, a semiconductor, a transistor, a light-emitting material, a holographic material, or a electroluminescent material. Also, the material can be made responsive by at least one touch activated control or touch activated command device. The smart or intelligent material can also be a polymer electronic material, a polymer backplane material, or a flexible active matrix backplane material.

DETAILED DESCRIPTION OF THE PREFERRED EMBODIMENTS

This application expressly incorporates herein by reference thereto the entire disclosure of U.S. non-provisional application Ser. No. 10/170,503, filed Jun. 14, 2002, and published as 20030035917-A1 on Feb. 20, 2003. In particular, all of the drawing figures described herein are inventive images based on the drawings of that incorporated application. Despite that they form part of the present application, the drawings are omitted here for convenience, because they are available from public sources such as the PTO website (www.USPTO.gov) in published and downloadable documents.

As discussed in that application and as applicable here, the term "image" is used to me a work of art or design intended for visual observation. An image can be a work in progress or it can be complete. An image may be realistic, symbolic, abstract, narrative and/or utilitarian. Examples of images are paintings, sculptures, collages, constructions, installations, Computer Art, Video Art, Light Art, Light and Perceptual Art, stage sets, architectural design, furniture design, fashion design, graphic design, crafts, jewelry design, product design, interior design, lighting design, costume design, an edition of ten partitions dividing a room with a jungle printed in and on them, an edition of five tables bearing geometric drawing in graphite and pastel, and an edition of a hundred windows with real organic forms (such as flowers) embedded in them and colorful depictions of similar organic forms painted on them. In general, the term "images" refers to the group of all images, however, the context may further define the group as appropriate.

As used herein, "design" refers to images of utilitarian art which are for visual observation, but which are not decoration. Unlike decoration, design inventive images are an end in and of themselves. That is, they do not function as part of something else. They do not merely embellish, ornament, enhance, or beautify something else. As used herein, the term "design" is synonymous with applied art, but it does not include decoration.

Accordingly, Inventive images are works in progress and images of art and design and include:

a) Images that are recognizable as one or more known forms of art or design, such as realistic, photorealist, abstract, geometric abstraction, surrealist, expressionist, minimalist, graffiti art, still life, figurative, portrait, landscape, modernist, folk art, primitive art, kitsch, shaped painting, installation, construction, painting, sculpture, mobile, print, photography, drawing, collage, assemblage, graphic art, architecture, furniture design, jewelry design, interior design, fashion design, product design, craft, set design, costume design, or a combination thereof.

b) Images that are recognized as art or design by a curator with proven expertise in contemporary art at an American museum of art which is accredited by the American Association of Museums or by an art scholar or an art critic with proven expertise in contemporary art.

c) Images that are original art or design.

d) Images that are interpretations, statements, expressions, or combinations of these.

e) Images that have an aesthetic that is at least minimally apparent.

f) Images that function as one or more known forms of art or design.

g) Images that are recognizable as creations by a specific individual, such as images recognizable as creations made in a specific circumstance or condition which are not ordinary circumstances or conditions.

h) Images made in limited editions, e.g., in an edition of one, preferably during their first 75 years of existence, in an edition of less than about 1500, more preferably less than about 500.

The term "smart or intelligent material" is used to mean materials that have an ability or an extraordinary ability to change or to enhance other materials and due to the novel and unusual properties they offer. Smart materials may be capable of relatively complex or unusual behavior, e.g., enabled by electronics. Smart materials would also include a device or a composition made of more than one different kind of material.

The term "image support medium" or "image support" is used to mean a medium that is not in final artistic form and instead is used to create or support images or other items or articles that are added thereto to form final works of art, design or architecture for display or appreciation. These mediums are typically intended to be starting materials or supportive materials for creation of an artistic work of art, design or architecture. This term does not include functional or utilitarian products such as machines or appliances (unless they are nanomaterials, nanoscale, and/or further processed into different forms or structures). Additionally, the term "image support medium" or "image support" does not include other products that are already made into art, such as video or computer art generated on video monitors, images made with conventional mechanical devices, or conventional light or sound, or other items that are intended to be a final artistic work or other finished image.

Whereas the term "polymer" in U.S. Patent Application No. 20030035917-A1 might typically or preferably refer to synthetic or non-natural polymers, the use of the term "polymer" with smart materials that are natural polymers or that have them, and the use of the term "polymer" with nanomaterials and/or nanotechnology are exceptions. Used with smart materials, nanomaterials and/or nanotechnology polymer of the present invention might be synthetic and/or natural (e.g., cellulose paper and/or PMMA), though it is most often synthetic or non-natural.

The term "e-material" is used to mean: (a) electronic paper; (b) electro-optic displays or mediums that might be bistable, flexible, paper-like and/or non-light-emissive; (c) technologies used to make these, and/or (d) similar technologies. (Note: electronic papers and/or the technologies used to make them might also be called reflective displays; electro-optic displays; electrochromic systems, electrophoretic coloration or mediums, electrophoretic displays or EPD, electrophoretic information display or EPID, electrophoretic ink, electrophoretic film or EPF, e-paper, epaper, eSign, ebooks, electronic books, e-maps, electronic newspapers, e-newspapers, organic electronic paper, smart paper, smart sign, SmartSign, SyncroSign, smart billboards, electronic ink, e-ink, eink, digital ink, digital paper, flexible displays, paper-like displays, paper quality displays, radio paper, updateable radio paper, electronic reusable paper, electrochromatic display, NanoChromics, BiNem, Microcup EPD, iMoD, Ink-in-Motion, Gyricon, other brand names, other variations of any of these, similar names, etc.)

The term "bistable" means having two or more (multiple) stable or resting states during which the e-material, the electro-optic material, the material or the display preferable does not use any energy or electricity (though it may use low energy or it may be stable or resting at its lowest energy state). Activation, a trigger, stimulant or influence such as energy or electricity is preferably only needed to transition from one stable or resting state to another, to change the formal elements, the coloration and/or the display. As used herein the term bistable which conventionally refers two stable or resting states, may mean "multi-stable" referring to more than two stable or resting states.

The term "electro-optic display or medium" refers to a material that has two or more display states differing in at least one optical property, that is capable of being changed one display state to another by an electric field, an electromagnetic field, electricity, light, and/or radio wave. An electro-optic display or medium may or may not be an electrochromic system.

The term "electrochromic system" refers to materials that change color and/or transparency upon application of an electrical potential, when voltage is applied, or by the use of electricity. An electrochromic system is a kind of electro-optic medium or display.

Smart Materials for Making Smart Inventive Images

In embodiments, smart materials, also called intelligent materials, are used to make inventive images that might be called smart or intelligent images. Examples are provided herein and in U.S. Patent Application No. 20030035917-A1.

One of the important groups of smart materials are smart materials that enable inventive images to be responsive, to be interactive, to be controlled, to change, to be programmed, and/or to be modulated. Among examples are smart materials that respond to stimuli, triggers or influences. Stimuli, triggers and influences that enable or cause smart inventive images to change are typically stabilizers, there are examples herein. Examples of smart materials and smart images self-actuate. Their self-actuation might be instantaneous, very quick, fairly quick, or not slow and this might be the image maker's choice. In preferred examples, the relationships between smart materials in an inventive image, their stimuli, triggers and influences, and the response(s) apparent in the inventive image may be designed and/or controlled as desired, (e.g., inventive images can be made so that they have desired visible and/or audible responses).

In preferred embodiments, smart materials used to make inventive images respond by changing shape, size, volume, density, viscosity, light properties, color (e.g., hue, value and/or intensity), appearance, and/or another physical property. As examples, some smart materials have optical properties and/or light properties that change in response to heat, light, electricity, or other forms of energy (e.g., the structure, the form or the orientation of molecules in a smart material may change altering its optical and light properties). This might change the material's absorbance, scattering and/or reflectance of light, changing its color. The change might be reversible. There are photochromic, electrochromic and thermochromic smart materials that serve as examples.

In preferred embodiments, the shape, size, volume, density, viscosity, light properties, color, appearance and/or other physical property of polymer smart material(s) used in inventive images can be changed using one or more stimuli, triggers or influences which are typically stabilizers. These stabilizers might for example, be ingredients in the polymer material or in the inventive image, they might be other inventive image parts and/or elements, or they might be external stimulants or influences which are not tangible parts of the inventive image. In typical examples, the change(s) in the polymer or polymer material of these embodiments are reversible and then if desired, they can be repeated, e.g., with the deactivation and then if desired, the reactivation of the stabilizer(s). Also, in typical examples, the change(s) in the polymer or polymer material of these embodiments can be modulated or tuned, for example, in a controllable way, e.g., by controlling or adjusting the stabilizer(s). It is preferable that the change in the polymer smart material of these embodiments and/or its effect(s) on its inventive image are visible or apparent.

In a number of these preferred embodiments, the smart material, the responsive polymer, polymer mixture or polymeric material is a polymer gel, a hydrogel, an absorbent polymer, a conductive polymer, a redox polymer, or it contains one or more of these. (Refer to the description of absorbent polymers and conductive polymers in U.S. Patent Application No. 20030035917-A1.) Responsive polymers, polymer mixtures or polymeric materials in these embodiments might also be called Stimuli Sensitive Materials or SSMs. Examples of stabilizers for use in these embodiments are: light, heat, radiation, chemicals, solvents, photochemicals, electricity, changes in the environment, in temperature, in acidity or pH; the presence of toxins or drugs, magnetic fields, ionic energy, salt, stress, pressure, switches, dials, wires, electrodes, and other electrical parts that assist the change in the polymer. Stimuli, triggers, or influences such as electricity, electrodes and other electrical parts that conventionally modulate or change conventional liquid crystal materials in liquid crystal displays (LCDs) and light switches (such as nematic liquid crystal materials, as in conventional LCDs) are not stabilizers. Also, stimuli, triggers, or influences such as light, heat, electricity, electrodes and other electrical parts that conventionally modulate or change conventional polymeric layers on windows or skylights, such as those in architecture or design (sometimes called shutters, optical shutters, or smart windows) are typically only stabilizers when used to make inventive image works of fine art (though fine art might function as windows or skylights), or when they are used to make inventive image works of design which do not function as windows, or as skylights.

These embodiments enable aesthetic and/or utilitarian properties of inventive images to be changed, switched or modulated using a variety of stimuli, triggers and influences. Moreover in examples, these changes might occur quickly, very quickly or with video speed. For example the polymer in an inventive image or part thereof might change in shape, size, volume, density, light properties, color (e.g., hue, value and/or intensity), appearance and/or another physical property as the inventive image's environment changes, as viewers initiate a trigger, or both, such as by turning a dial which modulates the polymer's change. Thus, for example, in response to intentional initiation (such as with a flick of a switch or with a voice command), or in response inadvertent stimulation (such as in response to sound like the voices and footsteps of viewers) the color, light, shape and/or other properties of an inventive image might change or modulate.

Polymers of these embodiments might be used throughout an inventive image, or they might be used in one or more parts, for example, as: colorants, light effects, layers, surface layers, other inventive image parts, to enable the inventive image or part thereof to move or to change its dimensions which may also change other formal elements (such as its color, subject matter, its light or its function), as another kind of compositional element, or a combination of these. Polymeric materials used in these embodiments, are not limited by restrictions that limit their composition and design in the formation of products that are not images (like coatings, sensors, products for medical use, display devices, toys, actuators, optical shutters, layers for use on windows, etc.).

For example, specifications which restrict the uniformity or irregularities, the thickness and evenness, the shape (e.g., rectilinear); the viscosity, the solidity of the form or the firmness of the gel; the texture or pattern, the response to the stimuli, the rate and consistency of its response, the further processing or the lack thereof, the aesthetic variation, the interactivity, and other elements of stimuli responsive polymeric materials in products that are not images, may or may not be used as specifications for inventive images using the same or similar stimuli responsive polymeric materials. If desired, in making inventive images, such decisions may for example be made primarily or entirely for aesthetic rather than utilitarian purposes. As another example, polymers of these embodiments might be further processed as desired, e.g., using additive and/or subtractive processes, such as superimposed applications, added parts, or other variations described herein or in U.S. Patent Application No. 20030035917-A1. Thus, polymers of these embodiments might serve as underlayers, e.g., with changing or tunable formal elements such as changing color and/or light.

Polymer materials for use in these embodiments, might be specially formulated or designed for use in particular kinds of inventive images, e.g., their compositions might be designed so that they change in a desired way to specific stimuli, though their change may or may not be completely predetermined or controlled. Examples of polymers, monomers and other ingredients for use in these embodiments are: N-isopropylacrylamide or NIPAM; poly (N-isopropyl acrylamide) or PNIPAM; N-isopropylacrylamide (NIPA); polyisopropylacrylamide; polyacrylamide gel; NIPA crosslinked with N,N'-methylene bis(acrylamide); polyacrylic acid and poly (N,N-methylene bisacrylamide); polymer/montmorillonite composites; a composite prepared by intercalating a monomer into the interlayer space of sheet silicates; chitosan; n-vinyl pyrrolidone; polyacrylic acid; heteropolymer gels consisting of NIPA and methacrylic acid; poly(acrylic acid) or PAA; copolymer gels of NIPAM and acidic or basic comonomers; copolymers of PNIPA and poly(acrylic acid); graft copolymers of poly(methacrylic acid) (PMMA) and poly (ethylene glycol) (PEG); copolymer made from methacrylic acid and N,N'-methylenebisacrylamide (a crosslinking agent); polyelectrolyte gels; a hydrogel swollen with an electrolyte; acrylamide hydrogels; hydrophilic polymers such as poly(vinyl alcohol), poly(ethylene glycol), chitosan, and poly (acrylic acid); polyaniline, polypyrrole, polythiophene and their derivatives; hydrogels combined with redox polymers; hydrogel-conducting polymer composites; poly (acrylonitrile) (PAN) fibers (Mitsubishi Rayon Co., Ltd. of Osaka Japan, refer to www.mrc.co.jp/english/); N-vinyl pyrrolidone (NVP); polyacrylonitrile-polypyrrole (PAN-PPY) and poly-vinylalcohol (PVA) gel fibers; crosslinked wet spun polyelectrolyte filaments; N-alkyl acrylamides; methacrylamides; a gel made by infusing an elastic poly(dimethylsiloxane) with an electrorheological fluid, a suspension of crosslinked poly (ethylene oxide) particles in silicone oil containing salt and other additives; a gel with a ferromagnetic "seed" embedded inside it which responds to a magnetic field with a temperature change that stimulates change in the gel; ionic polymers with weak acid groups such as carboxyls; carboxylmethacrylate; Ebacryl-acrylated urethane (crosslinking agent); cationic polymers; polyelectrolyte gels; self oscillating gels for instance made by copolymerizing three monomers: NIPA, a derivative of tris(2,2'-bipyridyl)ruthenium (II)[Ru(bpy)3] that has a polymerizable vinyl group, and the crosslinking agent N,N'-methylenebisacrylamide; a triblock copolymer containing poly(propylene oxide) PPO and poly(ethylene oxide) PEO; SMART HYDROGEL by Gel Sciences or Gel Sciences/Gel Med of Bedford Mass.; Poly(N-isopropylacrylamide) gels; copolymers of PNIPAM with acrylamide; 2-hydroxyethyl methacrylate (HEMA); a mixture of HEMA and acrylic acid; N-isopropylacrylamide copolymerized with acrylic acid or 2-hydroxyethyl acrylate; rutheniumtris (2,2'-bipyridine)/N-isopropylacrylamide hydrogel; magnetic particles (magnetite) containing polyvinyl alcohol (crosslinked with glutaraldehyde) gel; acrylamides; poly(sodium acrylate) gel; polymerized colloidal crystal hydrogels such as a crystalline colloidal array of polymer spheres polymerized within a hydrogel; CdS-nanoparticle/acrylamide hydrogels; Au nanoparticle polyacrylamide composite materials; polyferrocenylsilane (PFS); clay/polyacrylamide composites; poly (acrylamide)-bentonite composite; MAPTAC; crosslinked copolymers of acrylates and acrylic acid, and grafted starch-acrylic acid polymer; dimethylacrylamide; methacrylic acid; nematic elastomers; AMPS; copolymers of (meth)acrylic acid, acrylamide and N-isopropyl acrylamide and their derivatives; crosslinked water soluble synthetic polymers; diblock copolypeptide amphiphile; ionic polymer gels (such as polyacrylonitrile materials); products by Gel Sciences Inc. or by Gel Sciences/Gel Med; CLOUD GEL by Suntek of Albuquerque, N.M.; hydrogel opals; inverse opals; and materials comprised of polymerized crystalline colloidal arrays (PCCA) or gel particles embedded in crystalline colloidal arrays (refer to J. M. Weissman, H. B. Sunkara, A. S. Tse, and S. A. Asher, Science 1996, 274, 959). Further examples of polymers, monomers and other ingredients for use in these embodiments are provided in U.S. Patent Application No. 20030035917-A1. In examples, the swelling ratio of polymer gels used in these embodiments might be controlled or optimized, for example, by controlling aspects of their polymerization (such as the concentration of monomers, the amount of cross-linkers, etc.), or by controlling a polymer gel's composition (e.g., as by the use of additional ingredients). (See absorbent polymers in U.S. Patent Application No. 20030035917-A1.)

In response to a stimuli, trigger or influence, polymer gels, absorbent polymers or other polymer materials used in these embodiments might change in shape, size, volume, density, light properties, color, appearance and/or another physical property. They are smart materials. As an example, the transition in volume that polymer gels might undergo when stimulated, triggered or influenced may be discontinuous or continuous. Shapes, forms or patterns which occur in the polymer gels from its swelling and/or shrinking differ in their appearance and in their physical mechanisms. In example, polymers materials might be designed to respond to a particular stimulus by changing into a predetermined shape, form or pattern. Whether controlled or not, such shapes, forms or patterns may be desirable in inventive images. Refer to "Patterns in Shrinking Gels," E. S. Matsuo and T. Tanaka, Nature 358, 482-485 (1992). Also see "Development of smart variable stiffness actuators using polymer hydrogels" by C. Santulli, S. I. Patel, G. Jeronimidis, F. J. Davis, and G. R. Mitchell, in the journal, "Smart Materials and Structures" 14 (2005) 434-440, Institute of Physics Publishing, UK.

In another example, the absorption and/or bonding of absorbent polymer compositions to superimposed applications or colorants (such as paints, dyes, photographic emulsions, surface preparations, underlayers and glues) might be changed or modulated with one or more stabilizers of these embodiments. In addition or instead, such a stabilizer may change or modulate the same absorbent polymer composition in another way, e.g., altering its light properties and/or its shape.

In examples, the stimuli, trigger, or influence used might affect a delicate balance of forces between molecules in the polymer gel. Removing or deactivating this stimuli, trigger or influence may reverse the change in the polymer gel, and its reactivation may repeat the change. For instance, a stimuli, trigger or influence that strengthens repulsive forces within polymer gels (which are typically electrostatic or hydrophobic in nature) may make polymer gels expand, and anything that builds attraction within polymer gels may make them shrink, such as influences building attraction mediated by hydrogen bonding or van der Waals interactions. Thus, when exposed to a change in temperature and/or acidity (that may even be minimal), polymer gels may, for example, change in appearance and/or size and their change may be dramatic. Such effects may be desirable in inventive images.

In an illustration, the change in dimensions of polymer material(s) might change the amount of light being emitted by the inventive image, it might change the light reflected off of the image or part thereof, and/or it might change the light passing through the image's transparency, translucency and/or negative spaces. In addition or instead, it might change other elements in the inventive image, such as its color, composition, shape and/or form. For instance, an opaque layer that changes in form might cover and block the emission and/or transmission of light in an inventive image or part thereof, and simultaneously it may change the composition, color, shape and/or form. These changes may be reversible and repeatable.

In one of these embodiments, a smart material, a polymer gel, hydrogel or absorbent polymer used to make inventive images switches between a colored state and a translucent or a transparent state in response to a stabilizer, and/or it changes in size, shape and/or volume in response to a stabilizer (such as radiation, heat and/or other examples named above). In a more specific example, gel particles dispersed in a solvent at room temperature are swollen and the liquid appears dark, but when the liquid is stimulated for example, by heat (e.g., brought to about 40° C., the heat is a stabilizer), its particles shrink and the liquid turns clear. Such a liquid might for example, be used to make an inventive image or part thereof, thus, a stabilizer (like a form of heat) might be used to change the inventive image or the part thereof, such as to modulate its color and light, going from an opaque to translucent or transparent. Inventive images with this effect and other such effects might be further processed, as desired. For example, this effect might be used as an underlayer (e.g., as underpainting or underdrawing, it might switch from being a ground to being an imprimatura, or it might be another kind of compositional element). The gel particles in the dispersion of this example might, for instance be tiny, contractible polymer bags containing a colorant like a pigment of any color such as, polymer bags made of N-isopropylacrylamide (or NIPAM), which has long chainlike molecules that can be crosslinked to form a soft gel. The volume of the polymer bags might be controlled by temperature. When expanded, the particles comprised of pigment-containing polymer bags might, for example, only be about 20-200 thousandths of a millimeter across. Pigment loaded into these polymer bags may not significantly affect their ability to shrink when stimulated by temperature change, e.g., carbon black might be used in these polymer bags. When exposed to about 34° C., the polymer molecules contract and the gel changes to about 10% or less of its original volume, turning the liquid clear. Refer to "Polymer gel light modulation materials imitating pigment cells" by R. Akashi, H. Tsutsui and A. Komura in Advanced Materials, 14, 1808-1811 (2002).

In other embodiments, polymer smart materials used to make inventive images change in the degree of their transparency or translucency, or between a transparent and a translucent state with the use of a stimulant, trigger or influence (a stabilizer). The color of these polymers may change as well. These changes may be reversible, repeatable, controllable, and it might be possible to modulate or tune them. Examples of these are polymer materials conventionally used on windows, e.g., for smart windows, optical shutters or elecrochromic systems or effects.

In embodiments, inventive images or parts thereof can change or be changed from a transparent or translucent state to a reflective or mirrored state, by the use of a smart material. A trigger, stimulant or influence might bring about such change in the formal elements of these inventive images, such as the use of a touch control, an electric switch, electricity, an electric field (electrochromic switching) or by exposure to dilute hydrogen gas (gasochromic switching). Examples are made with transition metals that might be called transition-metal switchable mirrors might be used in inventive images, such as those developed by Thomas Richardson of Berkeley Lab's Environmental Energy Technologies Division. These may for example be made using an alloy of magnesium and one or more transition-metals. Although this technology was developed for conventional windows, it might be used in any way desired in inventive images. For instance, this technology does not have to be applied as thin films, though it may if desired. It might be applied evenly or unevenly on part(s) or on entire surfaces of inventive images or parts thereof such as image supports, or it may be throughout an inventive image or part thereof such as an image support. Refer to work at U.S. Department of Energy's Lawrence Berkely National Laboratory in Berkely, Calif.; refer to their online publication "Science Beat" Apr. 30, 2004 at www.lbl.gov/Science-Articles/Archive/sb-Apr-04-EETD-switchable-mirror.html; and refer to U.S. Pat. No. 6,647,166. Use of this technology on windows for architecture and in cars is preferably not basis for designating an inventive image. Technology conventionally used in smart windows might be used in these embodiments, such as materials and/or processes used or similar to those used in smart windows that might be called reversible electrochemical mirrors (REM) by Rockwell Scientific Co. of Thousand Oaks, Calif. (see www.rockwellscientific.com).

In embodiments, photonic materials might be used to make inventive images. In embodiments, inventive images are made with smart materials that are synthetic opals (e.g., hydrogel opals, inverse opals, and opals made with silica spheres and imbibed with liquid crystal, artificial opals); polymerized crystalline colloidal arrays (PCCA); colloidal crystals; and/or gel particles embedded in crystalline colloidal arrays that change in color, light properties, and/or volume in response to stabilizers (such as: changes in temperature, light, electric field, other examples listed above, and combinations of these). These changes might for example, be tunable and reversible. Synthetic, artificial or plastic opals belong to a class of photonic materials that use light (or photons) to carry or process information. Synthetic opals might for example, dramatically change colors in the presence of a chemical agent. Refer to the very shiny tungsten inverse opal in "Tungsten Inverse Opal" *Physics News Update* No. 685 #3, May 12, 2004, by Phil Schewe and Ben Stein at www.aip.org/pnu/2004/split/685-3.html. Synthetic opals may be hexagonally packed arrays of silica. Colloidal crystals may be latex microspheres. Inverse opals may be fabricated from metals, oxides, various forms of carbon, polymers, semiconductors, etc. As an illustration, the color and volume of the hydrogel opal in water can respond to changes in temperature and electric field. Such effects may be desirable in making inventive images. Different degrees of opalescence may be observed at varying viewing angles. (Refer to: "Hydrogel Opals" Z. Hu, X. Lu, J. Gao, Advanced Materials, 2001, 13, 1708; and "Optical Properties of N-isopropylacrylamide microgel spheres in water" J. Gao and Z. B. Hu, Langmuir 18, 1360-1367, 2002). As another illustration, a polymeric gel material may be synthesized with the inclusion of pigments, which imitate pigment cells in the natural world. A device can be constructed by dispersing the polymer gel particles containing a high concentration of pigments in an aqueous solution within a transparent structure or encasement. An external stimuli is then applied. Refer to "Polymer Gel Light-Modulation Materials Imitating Pigment Cells" by Ryojiro Akashi, Hiroaki Tsutsui, and Akinori Komura, in *Advanced Materials*, 2002, 14, No. 24, December 17.

In embodiments, inventive images or parts thereof are made with photonic crystals which are smart materials, such as photonic crystal nanomaterials. Photonic crystal may be desirable for use in inventive images for efficient photoluminescence at room-temperature, and/or to store light or light pulses, e.g., under ordinary conditions. Examples are photonic crystals formed with nanomaterials like carbon nanotubes or CNTs. These might be grown from catalytic nickel nanoparticles or nanodots, for instance, laid in the interstices of a two dimensional colloidal crystal, an array of nanoscale polystyrene spheres that form a hexagonally close packed monolayer spontaneously on an image support, such as a silicon substrate. Photonic crystals might be fabricated using printing or lithography, e.g., like computer chips.

Photonic crystals, inverse opals, synthetic opals, colloidal crystals, photonic bad gap materials or structures, and other photonic materials might be used in embodiments as desired. Among examples of their uses in inventive images are in optoelectronics, optical computing, waveguides, optical integrated circuits, filters, polarizers, antennae, lasers, transistors, sensors, fiber, fabrics, etc. for various formal elements as desired. Refer to the work at Stanford University. Refer to M. F. Yanik, S. Fan, "Stopping light all-optically", Physical Review Letters, vol. 92, art. No. 083901 (2004). Also, refer to "Photonic crystals based on periodic arrays of aligned carbon nanotubes" by K. Kempa et al., Nano Letters, 3, 13-18, January 2003. Refer to these three U.S. Patent Applications: No. 20040170352 "Photonic crystals" filed Aug. 19, 2003; No. 20030148088 "Light emitting photonic crystals" filed Feb. 7, 2002; and No. 20030012657 "Devices employing colloidal-sized particles" filed May 3, 2002. Refer to the information at the website for the Nanophotonics Group at the Universite Montpellier II Groupe D'Etude des Semiconducteurs, http://w3.ges.univ-montp2.fr/cassagne/pbg_en.html. Also refer to U.S. Pat. No. 6,813,064 "Electro-actively tunable photonic bandgap materials;" U.S. Pat. No. 6,671,097 "Polymeric photonic band gap materials;" and U.S. Pat. No. 6,433,931 "Polymeric photonic band gap materials."

In an embodiment, a photonic colorant smart material is used to make inventive images or part thereof the color and/or light properties of which can be tuned or changed using one or more stabilizers. A photonic colorant might be tunable to one or more different colors or to any color desired, such as by the use of one or more stabilizers. Moreover, a photonic colorant might be retunable, as desired. A photonic colorant might also be referred to as a photonic ink, p-ink or as photonic paper. It might be used to make inventive images in ways that are like or related to the ways a conventional colorant or ink, or as a conventional paper might be used, e.g., a photonic colorant might be applied on inventive image surfaces like an ink. Photonic colorants are not limited in the ways they can be used to make inventive images as conventional inks and papers are. A photonic ink or colorant might contribute to an inventive image's form as well as its coloration. For example, a photonic colorant might be used to make the surface of an inventive image, a surface preparation stabilizer, an underlayer, a major or a minor part of an inventive image's form, a combination of these, or even an entire inventive image (e.g., an inventive image that is a photonic "paper" or form).

In examples, such a photonic colorant might be a colloidal crystal or an artificial opal. It might be made with a polymer gel, the volume of which is changeable. For instance, the use of one or more stabilizers may cause, accelerate and/or contribute to a change in the volume of the photonic colorant's polymer gel, which may change the photonic colorant in such a way that it reflects a different wavelength of light and appears a different color. Examples of stabilizers that might be used to tune or retune such a photonic colorant in an inventive image are: electricity, electrodes, a solvent, environmental changes, temperature changes, pH changes, and combinations of these. As an illustration, a photonic colorant may be a colloidal crystal material that swells and shrinks reversibly, due for example, to the response of a polymer gel ingredient to a solvent or redox change. Such a photonic colorant might consist of a polymer gel between arrays of nanospheres, e.g., between silica microspheres or spheres of silicon dioxide that might be about 300 millionths of a millimeter across or it may consist of an aqueous monodispersion of spherical hydrogel colloidal nanospheres. The polymer gel may for example be polyferrocenylsilane (PFS). A solvent may make the polymer gel swell, and as it dries, it may shrink. Change in the volume of the polymer gel, may change the spacing of the nanospheres in the photonic colorant. The nanospheres' spacing determines the wavelength of light reflected, and thus, the photonic colorant's color. Thus the photonic colorant may be a metallopolymer-silica colloidal crystal nanocomposite film, the lattice dimensions of which may be effectively tuned to any color by the use of one or more stabilizers that control the swelling and shrinkage of the photonic colorant's polymer gel. Since the polymer gel conducts electricity, voltage (a stabilizer) might be used to make it increasingly positively charged, thereby controlling the amount of solvent it soaks up. Thus the use of voltage might smoothly tune the photonic colorant's color through the entire visible spectrum and if desired, this tuning can be changed. Refer to "A polychromic, fast response metallopolymer gel photonic crystal with solvent and redox tunability: a step towards photonic ink" by A. C. Arsenault, H. Miguez, V. Kitaev, G. A. Ozin and I. Manners, Advanced Materials, Mar. 17, 2003; and refer to "Photonic Papers & Inks: Color Writing with Colorless Materials" H. Fudouzi, Y. Xia; Advanced Materials, 15, No. 11, 892-896 Jun. 5, 2003. Photonic colorants such as those in these illustrations may be very desirable in inventive images. Photonic colorants in inventive images might be tuned and/or retuned by the image maker, by viewers, or both, e.g., the color might be changed by turning a dial or flicking a switch, or it may be set up to work with movement or gesture recognition technology or other methods described herein. Electrodes, photosensors, wires, dials, switches and other electrical parts that enable photonic colorants in inventive images to be tuned or retuned are stabilizers. Pixels may be made in inventive images using photonic colorants, which might be controlled as desired, for example, to present a display that might change over time as desired. Photonic colorants offer another way that inventive images can be interactive and smart.

In embodiments, inventive images are made with photochromic smart materials. It may be preferable that these inventive images do not function as windows or skylights in architecture, or as sunglasses or other eyeglasses as fashion design, particularly if their coloration or lack thereof is uniform and even. In an example, a photochromic inventive image (which may be colored, colorless, transparent, translucent and/or opaque) darkens with exposure to sunlight or ultraviolet (UV) light. This color change may be controllable, tunable, reversible (with the removal of the sunlight or the UV light), and this color change may be repeatable. In embodiments, polymers or responsive polymers used to make inventive images or part thereof are photochromic. They respond to changes in light or UV light with a change in color, optical properties, and/or light properties that may be controllable or tunable, reversible and/or repeatable. Light, UV light, and ingredients added into these inventive images to enable them to respond to light (such as photosensors, silver chloride, silver halide, etc.) are stabilizers, typically when used to make inventive image works of fine art or when used to make inventive image works of architecture and design that do not function as windows, skylights or glasses. As examples, refer to previous descriptions of photochromic effects in inventive images in U.S. Patent Application No. 20030035917-A1. In further examples, photochromic effects are created in inventive images using compounds or molecules of silver and halogens, such a silver iodide, silver chloride, silver halide, etc. In an example, such ingredients may be transparent and colorless in visible light until they are triggered or stimulated to change by UV light or sunlight. For instance, molecules of substances such as silver chloride or silver halide (e.g., embedded in polymer and/or coated on it), may undergo a chemical process (typically quickly) with exposure to UV light or sunlight which changes their shape so that they absorb visible light and thus appear darkened (typically quickly). The number of molecules that change shape varies with their use in inventive images and with their exposure to the sunlight or UV light. These photochromic effects may be reversible— with the removal of the trigger or stimulant, the sunlight or UV light, the molecules return to their original shape and thus appear transparent and colorless again.

In another example, exposure to UV light, (e.g., in sunlight) might enable electrons in halogen ions to move around and these electrons may combine with silver ions to make neutral atoms of metallic silver which may aggregate into tiny particles, scattering light and changing the color until a little while after exposure to the UV light ends or until heat is applied, which may cause the electrons go away from the silver atoms, so that the particles break apart into silver ions again, changing the color back. In other examples, a similar means of creating photochromic effects in inventive images is used that substitutes a different material for the halogens, e.g., silver ions in the form of silver nitrate is used instead of halogens thus for instance, upon exposure to UV light, the color might change, for example to yellow. Refer to "A silver-containing halogen-free inorganic photochromic glass" Chemical Communications, 2001 p. 2090-2091. In a further example, photochromic effects conventionally used for windows and those used in the optical industry (such as on eyeglasses and lenses) are used to make inventive images, such as photochromic layers used on or in windows, smart windows and for optical shutters. Refer to description of polymer used in inventive images that changes in color according to the light that hits it in U.S. Patent Application No. 20030035917-A1, such as the description of photochromic effects like that in TRANSITIONS lenses by Transitions Optical Inc. In another example, diarylethene crystals are used to give inventive images photochromic effects. These photochromic diarylethene crystals might be thermally irreversible and fatigue resistant, such as those developed by Masahiro hie of Kyushu University, Fukuoka, Japan.

In embodiments, responsive polymers are used to make inventive images or part thereof which are thermochromatic smart materials. These polymers they respond to changes in temperature with a change in color and/or light properties that may be controllable or tunable, reversible and/or repeatable. In these embodiments, the temperature change and elements which assist in changing these polymers in response to the temperature change (e.g., electricity, electrical conductors, photosensors, temperature sensors, etc.), are stabilizers typically when these polymers are used to make inventive images works of fine art or when they are used to make inventive image works of architecture or design which do not function as windows, skylights or architectural glass. In one of these embodiments, a polymer or a polymeric composition is engineered so that it changes to the color desired at the temperature desired. Such a color change is preferably reversible when or as the temperature changes back. This color change may occur as abruptly or as gradually as desired over the temperature range desired. Such a polymer or polymeric composition might be designed to change when the temperature changes such that the size or kind of lightwave(s) it reflects changes. Refer to work at Helsinki University of Technology, the University of Helsinki in Finland, the Technical Research Centre of Finland, and the University of Groningen in the Netherlands, such as that in the Nov. 28, 2004 issue of Nature Materials and online in Technology Research Magazine, "Plastic Changes Color with Heat," Feb. 23/Mar. 2, 2005 at www.trnmag.com/Stories/2005/022305/Plastic_changes_color_in_heat_Brief_022305.html and reported. Additional examples of these embodiments are in U.S. Patent Application No. 20030035917-A1. Also, thermochromatic polymeric layers made for windows and skylights such as optical shutters might be used to make inventive images, e.g., products by Ron Chahroudi or Suntek, Inc. (both of Albuquerque, N. Mex.), such as CLOUD GEL. In embodiments, inventive images are made using thermochromatic colorants or ingredients for them from Thermographic Measurements of Glenview, Ill. (refer to www.t-m-c.com), or from Thermax Canada Inc. of Beaconsfield Quebec.

In embodiments, thermochromatic pigments are used in smart materials in inventive images. Such pigments might for example, change in color in response to temperature change, e.g., their use in inventive images might be purely for color and aesthetic purposes, or it might also be utilitarian such as for a means of regulating temperature, for instance in the area around the inventive image such as in an inventive image that is a mural, a wall, a ceiling, a table, etc. Refer to the work of Dr. Yiping Ma at Tongji University in China.

In embodiments, one or more thermochromic colorants are smart materials used to make inventive images, the color or colors of which change in response to heat produced using conductive polymer. Such a thermochromic colorant might for example, overlap the conductive polymer, and/or it might be superimposed upon the conductive polymer. For instance, the conductive polymer might be an underlayer, e.g., on an image support of any kind, that is superimposed by the thermochromic colorant or colorants. Or, conductive polymer might be within the form and/or layer with the thermochromic colorant(s), such as conductive polymer embedded within a form or layer that has a thermochromic colorant, or a thermochromic colorant coated over a conductive polymer. In examples of inventive images made using this embodiment, electricity might be used to change the color of the thermochromic colorant by producing heat with the conductive polymer. Refer to the work of Richard V. Gregory at the School of Materials Science and Engineering at Clemson University, Clemson, S.C., and at Old Dominion University in Norfolk, Va. In embodiments, smart inventive images may be made with fiber or fibers made as those or made similar to those in "Progress toward Dynamic Color-Responsive 'Chameleon' Fiber Systems" by Stephen S. Hardaker and Richard V. Gregory in Materials Research Society (MRS) Bulletin Volume 28, No. 8 Aug. 2003.

A thermochromatic polymer or other material made for use in contact with the human body in an image which changes in color in response to body heat, preferably will not be classified as a smart material of the present invention unless there is another, different basis for such a designation, e.g., it could be classified as a smart material of the present invention if it contains a nanomaterial, conductive polymer, etc. Also, thermochromatic architectural materials would not be included as smart materials for the same reason, again unless there is another, different basis for such a designation. For example, the material known as "T-OPAL" from Fraunhofer—Institute for Building Physics in Germany (http://www.ibp.thg.de/gips/baustoff/index_topal_e.html) is such a material that would be excluded, as would be other known thermotropic shading and/or window materials.

In embodiments, inventive images are made with smart materials that make piezorochromic, piezochromic, solvatechromic and/or carsolchromic effects. Piezorochromic or piezochromic materials in inventive images might create color change triggered or stimulated by pressure. For example, stepping on part of an inventive image, pressing it, or sitting on it may result in a visible color change in the image. Thus such inventive images could be interactive. Alternately, such inventive images could have one or more moving parts that trigger or stimulate color change. Solvatechromic materials might trigger or stimulate color change in inventive images using one or more liquids. These inventive images may self actuate and/or they may be interactive. Carsolchromic materials trigger or stimulate color change in inventive images using electron beam. These inventive images may also self actuate or be interactive. Materials for use in these embodiments may be nanomaterials or they may have nanomaterials.

In embodiments, other special effect pigments are used to make inventive images. There are examples herein such as the photochromatic one above, smart pigments, pigments made with nanomaterials, conductive or semi conductive pigments and holographic pigments.

It is generally preferable that the use of photochromic, thermochromic, piezorochromic, piezochromic, solvatechromic, carsolchromic, other such effects and special effect pigments in inventive images be as stabile and as permanent as possible unless this conflicts with another of the image maker's priorities. If such effects are unstable or if they stop working, it is preferable that they be restored or replaced as desired.

In an embodiment, polymer liquid crystal elastomer is a smart material used to make inventive images or part thereof. Among examples are those polymer liquid crystal elastomers used in inventive images or part thereof that: (a) respond to light (a stabilizer) by altering their mechanical properties such as their size and/or their shape; (b) change color in response to a change in their dimensions such as by stretching or deforming them (an effect that might be enhanced by the use of a colorant such as dye molecules); (c) respond to a change in temperature or a change in voltage by changing shape or dimension; (d) were developed by Heino Finkelmann in Germany and Mark Warner in England; (e) a combination of these.

In embodiments, inventive images are made with fibers, fabrics and/or textiles that are made with or coated with one or more absorbent polymers, responsive polymers, Stimuli Sensitive Materials (SSM), conductive polymers or semi conductive polymers. These may be smart materials used to make inventive images that may be smart. Examples are described herein and/or in U.S. Patent Application No. 20030035917-A1. Such fibers, fabrics or textiles might be flexible, and/or rigid. They might be coated with a non-conductive or insulating polymer, and/or with another material. In addition or instead, they might be made with nanomaterials or nanotechnology (see description below), they might be photochromic, thermochromic (e.g., made with conductive polymer as in the description above), electrochromic (e.g., made with conductive polymer), or a combination of these. Fibers, fabrics, and textiles of these embodiments might be made using any process or processes.

Such fibers, fabrics or textiles might impart inventive images with or enable them to have desirable aesthetic elements and/or functionality or intelligence. Examples are: color and/or light properties, the ability to conduct electricity, sensors, electronics, computer functionality, OLEDs, other light sources, photovoltaics or solar cells, batteries, devices that play sound, e-materials, reflective coloration; coloration and/or light that changes or that can be changed; circuits, computers, interactive and responsive features; the ability to monitor the wearer, the viewer, and/or the environment; the ability to respond or to respond selectively, the ability to heat, to cool or to enhance either or both of these (e.g., refer to PCMs and to nanomaterials herein), the ability to communicate (e.g., with other computers, other devices and/or other people), etc. (refer to examples herein and in U.S. Patent Application No. 20030035917-A1). In making inventive images, fibers, fabrics and textiles of these embodiments might be further processed in any way desired, refer to examples herein and in U.S. Patent Application No. 20030035917-A1. They might for example, be woven, sewn, cut, chopped, embedded, tied, superimposed, macraméd, knotted, stranded, coated, layered, attached, etc. Examples of fibers, fabrics and textiles of these embodiment might be smart, smart fabrics, smart textiles, smart clothes, wearable displays, wearable computers, smart fashion, or they might be made using the technology for one or more of these. Examples might be made with materials or technology by Microvision Inc. of Bothell, Wash., or by Infineon Technologies of Munich, Germany or of Muenchen, Germany (refer to www.infineon.com or www.wearable-electronics.de). Examples require low power.

In embodiments, the absorbent polymer(s) in inventive images is called "super absorbent." Further examples are FAVOR absorbent polymers by Degussa of Krefeld Germany, Greensboro, N.C. and Garyville, La. (refer to www.superabsorber.com/notesData/absorber.nsf/englisch); absorbent polymers made using acrylic acid or sodium polyacrylate; and DRYTECH Superabsorbent polymers by Dow Chemical Co. of Midland, Mich. and Rheinmunster, Germany (refer to www.dow.com).

In embodiments, inventive images are made using electroactive polymers (EAP) that respond to electric or ionic energy. EAPs are smart materials and inventive images made with them may be smart images. Electric or ionic energy used to activate these EAPs is a stabilizer, as are inventive image parts that assist in using this energy. In addition to examples in U.S. Patent Application No. 20030035917-A1, these are further examples: (a) ferroelectric polymers such as Poly (vinylidene fluoride) and its copolymers and gels thereof, called ferrogels; (b) dielectric EAPs such as acrylic elastomer products; (c) electrostrictive graft elastomers such as a combination of an electrostrictive-grafted elastomer with a piezoelectric poly(vinylidene fluoride-trifluoro-ethylene) copolymer; (d) electrostatic paper such as silver laminated paper (with silver electrodes); (e) electro-viscoelastic elastomers (which are composites of silicone elastomer and a polar phase); (f) liquid crystal elastomer materials (which are composite materials comprised of monodomain nematic liquid crystal elastomers and conductive polymers distributed within a network structure); (g) ionomeric polymer-metal composites or fluoropolymers (such as NAFION which is perfluorosulphonate by DuPont, or FLEMION which is perfluorocarboxylate by Asahi Glass, Japan); (h) ionic polymer gel (IPG) such as materials made from polyacryonitrile; or (i) conductive polymers such as polypyrrole and its derivatives or polyaniline doped with hydrochloric acid or material combinations including polypyrrole, polyethylenedioxythiophene, poly(p-phenylene vinylene)s, polyaniline and polythiphenes. Refer to "Electroactive Polymers as Artificial Muscles-Reality and Challenges" by Yoseph Bar-Cohen *Proceedings of the* 42*nd AIAA Structures, Structural Dynamics, and Materials Conference (SDM), Gossamer Spacecraft Forum (GSF)*, held in Seattle Wash., Apr. 16-19, 2001 www.aiaa.org/calendar/gsf01cfp.html. Refer also to "Electroactive Polymers" by George Jeronimidis at the Center for Biomimetics, The University of Reading, UK www.smartextiles.co.uk/_f_1_12.htm.

In some embodiments, EAPs change in shape, size, volume, density, light properties, color, appearance and/or another physical property in response to electrical stimulation (a stabilizer). The polymer deformations may or may not be selectable. The change in the EAP might be modulated, tuned and/or reversible. EAP may, for example, be polymers with one or more added stabilizers that increase their dielectric constants, preferably without decreasing the mechanical properties of the polymer or of the composite. The polymer might for example be poly(vinylidene fluoride-trifluoroethylene) P(VDF-TrFE). Stabilizer materials used might for example have high dielectric constants like the metallophthalocyanine (MtPc) oligomer (e.g., used at about 40-55% by weight in a polymer composite), and/or copper-phthalocyanine (CuPc, an organic molecule that is also used as a dye and as an ingredient in organic transistors, OLEDs and chemical sensors). Refer to "An all-organic composite actuator material with a high dielectric constant" by Q. M. Zhang, H. Li, M. Poh, F. Xia, Z.-Y. Cheng. H. Xu, and C. Huang, in Nature, Vol. 419, Sep. 19, 2002, 284-287. Also, refer to the article "Small Jolts Move Artificial Muscle" by Kimberly Patch, Technology Research News on the Internet at www.trnmag.com.

In an example, inventive images might be made using ionomeric polymer-metal composites (IPMCs) constructed (as they are typically in their conventional uses) as a thin polymer membrane of thickness of 200 microns with metal electrodes such as gold or platinum or silver on both faces with thicknesses between 5 to 10 microns. Deformation occurs when the anions and counter-ions diffuse toward the electrodes when subjected to an electric field. The nature of the deformation is dependent on the composition of the ionomer backbone and the nature of the counter-ion. Typically, an electric potential between 1 to 3 volts imposed on a thin IPMC membrane in the solvated state will cause it to bend towards the anode. Nafion-based IMPCs neutralized with alkali metals typically bend towards the cathode. Refer to "Controlled actuation of Nafion-based Ionic Polymer-metal Composites (PMCs) with Ethylene Glycol as Solvent" by S. Nemat-Nasser and S. Zamani, Smart Structures and Materials 2004, Proceedings of SPIE Press, Vol. 5385 [159] 2004. IPMC materials can be fabricated using ionomer membranes such as Nafion (DuPont), Flemion (Asahi Glass), Aciplex (Asahi Chemical), and others. Nafion is a perfluorinated copolymer of polytetrafluoroethylene (PTFE) and a perfluorinated vinyl ether sulfonate. Varying the nature of the vinyl ether side chain gives routes to alternative species, usually through the addition of single CF2 groups (Aciplex) or modification of the length of the side chain (Flemion). Within a limited range, the ratio of monomers can be used to tailor the polymer equivalent weight (grams dry polymer per mole of ion), although large variation can significantly influence the strength, flexibility, and stability of the resulting membranes. Refer to "Ionomeric Polymer-Metal Composites" by S. Nemat-Nasser and C. Thoomas, *Electroactive Polymer (EAP) Actuators as Artificial Muscles—Reality, Potential and Challenges*, edited by Bar-Cohen, SPIE, Chap. 6 2001 (http://www-ceam.ucsd.edu/papers/ipmc/ch6.pdf).

Similarly, inventive images might be made using electroactive paper constructed by depositing electrodes such as gold or platinum on both sides of the paper, and the paper is deformed upon application of an electric potential. The paper can be constructed of fibers including hardwood, softwood, bacteria cellulose, cellophane, carbon mixture paper, electrolyte containing paper, Korean traditional paper, and others. Refer to "Electro-active paper actuators" by J. Kim and Y. B. Seo, in *Smart Materials and Structures*, Vol. 11, pp. 355-360, 2002.

In an example, Metal Rubber™ materials manufactured by NanoSonic (www.nanosonic.com) are nanocomposite materials that incorporate approximately 1% metal ions with elastomers to create a conductive elastic polymer. Such a material can have a maximum elongation of 200% and can be used to create electroactive components in inventive images. Refer to "Testing their Metal" by Karen Epper Hoffman in TechnologyReview.com (http://www.techreview.com/articles/04/12/wo_hoffman122004.asp?p=0), Dec. 20, 2004. Metal Rubber™ materials may for example, be useful in inventive images for their conductivity as well as their ability to absorb vibration, jolts and/or shocks, e.g., for use in mounts.

In embodiments, inventive images or parts thereof are made using one or more polymers, polymer mixtures, or polymeric materials that have shape memory and/or that can change in size, shape and/or volume in response to stimuli, triggers or influences which are stabilizers. Such polymers may be smart materials and they may make inventive images smart. The change in the materials of these embodiments might be modulated, tuned and/or reversible. Examples of stabilizers for these embodiments are light, heat or electricity, ionic energy, chemical, pneumatic, optical, magnetic, pH, and other examples named above, as well as ingredients used in the polymer to assist in the process of changing in size, shape and/or volume. However it may be preferred that these are only considered stabilizers in inventive images that do not function as clothing and/or as textiles. Changes in the balance between repulsive intermolecular forces and attractive forces act may also act to expand or shrink the polymer network. Repulsive forces are usually electrostatic or hydrophobic forces and attractive forces are usually controlled by hydrogen bonding or van der Waals interactions. The above mentioned stabilizers can act to control the changes in these attractive or repulsive forces. In addition, it may be preferred that the designation of images of these embodiments that function as clothing, fashion design and/or as textiles as inventive images does not rely on these embodiments or on the use of the polymers of these embodiments. Polymers used in these embodiments might for example be nematic elastomers that can change their shape in response to stimuli. Polymer materials used in these embodiments, may for example, be the same or similar to those used to make artificial muscles. In an example, the polymers used in these embodiments are electroactive. In another example, polymers, polymer mixtures or polymer materials of these embodiments might contain photosensitive molecules such as in the cross linking bridges that hold polymer chains together. For instance, when they absorb a photon or photons of light, photosensitive molecules (stabilizers) in the polymer material may reposition chemical bonds, thereby making a kink or kinks the polymer chain(s). Such kinks can control and change a polymer's shape, size, and/or volume. Moreover, these changes might be reversed. Refer to "A new opto-mechanical effect in solids" by H. Finkelmann and E. Nishikawa, in Physical Review Letters, Vol. 87, No. 1, Jul. 2, 2001. In a further illustration, shape memory polymeric materials respond to a stimuli or trigger such as a change in temperature. Examples of such polymers are polyurethanes and elastomers, e.g., Diaplex is a segmented polyurethane based fabric (by Mitsubishi of NY, N.Y.) conventionally used for clothing, the nanoporous structure of which opens allowing passage of heat and humidity with a rise in temperature, refer to www.diaplex.com. In an example, heat is used to change the shape of an inventive image or part thereof made of a polyurethane shape memory polymer such as that described in Applied Physics Letters Mar. 14, 2005. The new shape might remain when the polymer cools to a normal or room temperature. However, when immersed in room temperature water the polymer inventive image or part thereof might return to its original shape. These embodiments might for example, be desirable for enhancing the stability and/or the permanence of inventive images, for interactive inventive images, for other smart inventive images, and/or for creating or enhancing the formal element(s) of movement, the function(s) and/or the use of real time in inventive images. As an illustration, polymers of these embodiments might stabilize or assist in stabilizing the temperature and/or humidity of inventive images, such as inventive images with parts that produce heat (such as light sources, computers, other devices and/or machines), inventive images that may or will be in environments where they may be harmed by the temperature and/or humidity, and inventive images with areas or parts that may be vulnerable to damage from temperature and/or humidity (such as inventive images with oil paint on them, inventive images with devices that may not work as long, as well or at all in certain temperature or humidity conditions, etc.).

In embodiments, inventive images are made with or of e-materials; reflective displays or mediums; electro-optic displays or mediums, and/or electrochromic systems. These materials may for example, be bistable, and they might change in at least one optical property (a formal element such as color) in response to energy, an electric field, an electro-magnetic field, electricity, light, and/or radio wave. Such materials may have nanomaterials or smart materials, or they may be nanomaterials (e.g., hybrid nanomaterials) or smart materials. Examples often preferred might be: flexible, thin or very thin, reflective or non-light-emissive, paper-like, made in a roll to roll process, made with polymer electronics or conductive polymer electronics, made by printing process(es) and/or made to be as lasting and as permanent as possible. E-materials typically have changeable or rewritable coloration. This coloration is typically changed or rewritten using a trigger, stimulant or influence that is typically energy or electricity. E-materials are typically bistable, they typically only require energy or electricity to transition from one stable or resting state to another, to change their coloration or visual presentation. It is preferable that e-materials do not require any energy or electricity to display and maintain still or unchanging coloration, e.g., it is preferable that they do not need electricity, energy or refreshing to keep or maintain static coloration. If this is not possible, it is preferable that e-materials only require low or minimal power, energy or electricity to present and maintain still or unchanging coloration. E-materials may be made using any of a number of different technologies or combinations of them, e.g., electrophoretic technologies, cholesteric liquid crystal (CLC or ChLCD) technologies, etc. E-materials are typically light reflective, examples are designed to be read by reflective light like paper, books, newspapers, signs, printed materials, etc. Among the exceptions are e-materials that are illuminated, light emitting, and/or transparent, e.g., those that are illuminated for viewing in dark places; those that have OLEDs, PLEDs or other LEDs, those in European Patent EP1118039, transparent NanoChromics (see www.ntera.com and description below). Examples of e-materials are made with polymer or polymer image supports that may be stabilizers, e.g., they might be made with two or more different polymers; semi conductive or conductive polymer(s); an image support formed of two or more layers, etc. E-materials might be made with nanomaterials and/or nanotechnology (see description below). Nonpolymeric e-materials might also be used to make inventive images. E-materials in inventive images or parts thereof might be further processed as desired, e.g., using additive processes (like painting, printing, adding parts or layers, collage, adding polymer), and/or using subtractive processes (like cutting, perforating, sanding, etc.), refer to examples herein and in U.S. Patent Application No. 20030035917-A1. Further description and examples of e-materials follow, they are easily found on the Internet, and they are in U.S. Patent Application No. 20030035917-A1 (refer to examples using microcapsules and by E-Ink Corporation). More examples of e-materials will be developed in the future that may be used in inventive images.

Conventional e-materials typically are made to conform to limitations that do not exist in the use of e-materials in inventive images. Examples are limitations that facilitate the utilitarian uses of conventional e-materials, such as limitations pertaining to their portability, their legibility (e.g., the desire for high contrast and clarity in the coloration forming text and graphic elements), their permanence (e.g., making them tough, resistant or impermeable to elements that reduce their permanence, etc), making them practical (e.g., having a rectilinear shape, light weight, thin, easy to use, smooth consistent surfaces, keeping their cost as low as possible, etc.), making them resemble paper (e.g., making them easy to read (paper is often considered easier to read than a computer screen), making it easy for e-materials to take over uses of paper products, conventional signs and related products), etc. In contrast, the use of e-materials in inventive images is unlimited—it may or may not fall within some or all of the limitations restricting the use of e-materials in items and products that are not images. These are further examples. In inventive images, e-materials may or may not resemble paper or resemble paper well. They might not resemble paper at all. They may not function in a way that enables them to take over the uses of conventional paper, or to do so easily. In inventive images, e-materials or part thereof may or may not be viewed or viewed entirely by reflective light. They may emit light, they may be illuminated, they may transmit light, or they may be transparent. While it is typically desirable for the resolution of conventional e-materials to be very good or excellent, the resolution of e-materials in inventive images may be of any description desired. The coloration of e-materials used in non-images often resembles that of conventional text and/or graphic or design elements conventionally used with text (or it is made with this objective). It may for example be made to resemble conventional printed text, and/or conventional text on sheets of paper, books, newspapers or signs (e.g., text in one consistent color with one consistent contrasting color, usually white, in the background; text in black with a white or almost white background; blue text with a white or almost white background; white text with a blue background, etc.). In addition or instead, coloration in conventional e-materials might resemble graphics or design elements (that are not images), of a kind conventionally used with text, e.g., graphics for communication, information, education, marketing, promotion, illustration, or another utilitarian purpose. Inventive images have no such limitations, their use of the changing or rewritable coloration of e-materials is unlimited, it may be used as desired, e.g., they may use as few or as many colors as desired (for instance ranging from using just one color to using a full range of color), using contrasting and/or subtle coloration, using text and design elements that may or may not be clear or legible, using aesthetic elements that may or may not be utilitarian or understandable, they may use transparency, etc.

Whereas the conventional sizes, shapes and forms of e-materials used in non-images are typically made to resemble conventional forms presenting text for reading (such as: forms that are like paper, newspaper, books or signs; rectilinear shapes; forms that are thin, very thin, about 200 microns thick, about 100 microns thick, about 0.3 mm thick, or about 0.2 mm thick or less; forms that are light weight, with smooth consistent surfaces, etc.), inventive images or parts thereof made with or of e-materials, may have any size, shape or form desired, and these formal elements might change if desired. For example, in inventive images, e-materials may be thin, very thin, thick or very thick; they may be uniformly smooth, even, consistent throughout, irregular, textured, uneven, perforated, inconsistent in one or more ways; they may have irregular shapes and/or forms; they may be light weight, heavy or very heavy; they may be two or three dimensional; they may be on the surface of an inventive image or part thereof that is substantial in size or large, etc. Whereas the layer or layers of coloration in conventional e-materials is typically limited to even films or thin layers, the layer or layers of coloration in e-materials in inventive images may have any thickness and any level of smoothness, and any level or regularity desired, e.g., for aesthetic purposes. Also, many conventional e-materials are made to be portable or easily portable, often for utilitarian purposes (e.g., various forms of electronic paper made for non-images are made to be like paper, they are made to take over the functions of paper, they are made to be handled, read and carried easily, etc.). Some conventional e-materials are not portable or not easily portable often for utilitarian purposes (e.g., e-materials made for signs or large signs that need to stay where they for some time may not be portable or easily portable). The portability or the lack of portability of e-materials in inventive images and of these inventive images might or might not facilitate a utilitarian purpose, e.g., it may be the result of aesthetic choices. E-materials in inventive images and these inventive images may be portable, not portable or only portable with difficulties (e.g., they may be big, too heavy, too fragile for example they may have superimposed applications with surfaces that are fragile or vulnerable to damage; they may have irregular or protruding attachments or parts that make them difficult to handle or carry; and/or they may have too many parts to be easily portable, etc.) Also, whether they are conventional or they are in inventive images, e-materials may be rigid and/or flexible. They might for example, open like a book, a magazine, a newspaper, a notebook, a scroll, an architectural blueprint, etc., e.g., resembling conventional paper. They might be folded, and/or they might roll up (even tightly or very tightly, e.g., tightly enough to fit into a tube that may be about 7.5 mm in diameter, about 4 mm in diameter or less). Alternately unlike typical, conventional e-materials, e-materials in inventive images may be volumetric forms, objects, walls, ceilings, large structures, linear sculptures, or e-materials might just be on the surfaces of such forms, etc.

Inventive images or parts thereof made with or of e-materials might use electricity in any form and they may only require low power. They might for example run on batteries, on solar energy, photovoltaics, or a combination of these (e.g., forms of these that are thin, very thin, lightweight, small or a combination of these, like thin film batteries or slimline batteries, refer to batteries herein). Inventive images or parts thereof made with e-materials might be driven by polymer electronics, organic electronics, circuits made with organic or polymer semiconductor materials, or active matrix polymer electronics. They might use thin film transistors (TFT), polymeric transistors, flexible transistors, TFT arrays, active matrix backplanes, active matrix TFT backplanes, flexible backplanes, ink jet printed active matrix backplanes, direct drive polymer backplanes, low temperature polysilicon TFTs, flexible microprocessors, any of these examples or others on a polymer image support (that might be a sheet, a film, flexible, three dimensional, or of another description), or a combination of these. Refer to "Flexible active-matrix electronic ink display" by Chen, Y. et al. in Nature 423, 136, 2003. Examples of e-materials for in inventive images may have writing methods or methods to change their coloration that may be electric, magnetic, influenced by light (photochromic methods), thermomagnetic (e.g., using leuco dye, thermochromism), and/or other methods. Examples of e-materials from these embodiments are made by or made using technology by Seiko Epson; by Lucent Technologies, Murray Hill, N.J. (such as their flexible transistors, e.g., for e-materials by E-Ink); and/or by Plastic Logic, Cambridge UK (e.g., for e-materials by Gyricon Media of Ann Arbor, Mich.). In an illustration, the circuitry for e-materials may be made using an organic material that can function as a semiconductor (e.g. pentacene), on an image support that may be polymer and/or flexible. For examples refer to Philips and Polymer Vision in Eindhoven, the Netherlands and "Flexible active-matrix displays and shift registers based on solution-processed organic transistors" Gelinck, G. H., et al., online in Nature Materials, Jan. 25, 2004 (see http://dx.doi.org/10.1038/nmat1061) and in Nature Materials Feb. 1, 2004.

E-materials in inventive images or parts thereof may have preprogrammed displays, they may store information or images (e.g., even in large quantities); they may download from the Internet or provide Internet access; they may be controlled or operated by viewers; they may be self actuating, self writing or changing their coloration themselves; they may have a unit or part that rewrites or changes the coloration (it may or may not be physically separate from the rest of the inventive image); they may be controlled or operated using a stylus or wand device, by touch controls, by movement, gesture, sound or voice recognition technology, by a printer-like device that they pass through, and/or remotely controlled, e.g., receiving broadcasts, information over a network, via wireless communication and/or from the Internet. Thus, for example, inventive images with e-materials might have graphics, text, other images, coloration, aesthetic elements like lines or circular forms, or a combination of these that change as desired e.g., in a design, randomly, in a manner that is organized, orderly or logical; they may change uniformly (such as a uniform color change or a change from one subject or abstract element to show another), etc. The coloration or display of e-materials might change at any rate, for example, ranging from changing from one still presentation to another when triggered (such as when a viewer presses a touch control), to changing very quickly or at video speed (such as to show movies). Process(es) such as electrowetting processes might be used in making e-materials that may enable faster, quick or very quick switching, e.g., in about 10 milliseconds or about 100 frames per second (which is about four times the switching rate of the average VCR). Refer to "Video-speed electronic paper based on electrowetting" by Hayes, R. A. and Feenstra, B. J. in Nature 425, 383-385. Refer to electrowetting processes by Royal Philips Electronics.

In embodiments, electrical current, solar power, photovoltaics or another form of energy, an electrode, a battery, a circuit, a transistor, a TFT, a backplane, a TFT backplane, or another power source or carrier may be stabilizers when used to control and/or change the color visible in e-materials in inventive images. For instance, by attracting or repelling the negative or positive charge of particles (e.g., beads, capsules, spheres, microcapsules, pigment particles, colored liquids, etc.), or by attracting or repelling the negative or positive charge of a colored area of particles (e.g., a colored hemisphere or side of such particles). Other stabilizers are other ingredient(s) in an inventive image that assist or enable the visibility of coloration in a process, in a matrix or in a system relying on attracting or repelling the negative or positive charge of that coloration. Examples are fluids, oils, etc. used in e-materials. Materials and/or processes that alter the rate that e-materials change are also stabilizers, (e.g., electrowetting processes)

In an example, an inventive image might be made with multiple sheets of e-materials bound together or connected in another way. The binding or spine, a backing, another layer, and/or a frame might house the device(s) (e.g., electronics, the computer, the power source, etc.) that controls, updates or changes the display on each page or the device(s) that assist in any of these processes. The inventive images shown in Figure 77 are illustrations. In another example, an inventive image might be comprised of a single sheet of e-materials and the device(s) that controls it, updates it and/or changes its display or the device(s) that assist in any of these processes might be in a backing, in another layer and/or in a frame or rim. For example, each of the inventive images shown in Figure 7 might be made of a sheet of e-materials with at least one part (shown in gray) which might be the device(s) that controls, updates and/or changes its display or the device(s) that assist in any of these processes. In another illustration, an inventive image might be comprised of one or more sheets of e-materials and the device(s) that control it, update it and/or change its display or the device(s) that assist in these processes might be in another part of the inventive image. In an illustration, e-materials is incorporated into or onto fabric, textiles, and clothing in inventive images or parts thereof. These might be flexible. In further examples, e-materials is in rigid inventive images or parts thereof.

Examples of e-materials, EPF or EPD for use in inventive images or part thereof is made with an inner layer of pockets (chambers, connected cells or a honeycomb-like structure) that may be structural in inventive images. The pockets and the design of such an inner layer of pockets may or may not be uniform in shape or size. These pockets may be any shape or size. The inner layer of pockets may be an image support, an image support stabilizer, a strengthening stabilizer, etc. The walls, dividers or partitions between these pockets might be part of the display's inner structure. Each pocket may contain fluid and/or particles (preferably both), the coloration of which is visible depending on the use of an electrical charge or other trigger or influence. Examples are displays by Sipix Imaging Inc. of Milpitas, Calif. and Fremont, Calif. (refer to www.sipix.com, e.g., to the technical information online). Sipix displays, Sipix Microcup technology or EPF, or related technology or products may be used in inventive images. For example, inventive images might be made with Sipix's Microcup EPFs that have flexible, TFT backplanes from Polymer Vision.

In an inventive image, the inner layer of pockets in such an display might initially be made using a layer that has negative spaces or cavities, e.g., microscopically small, uniform, regularly placed cavities, such as in a grid configuration or a variation of a grid, for instance, like the microcups in Sipix's EPDs, or an irregular grid-like formation. Each cavity in this inner layer might be filled with liquid that may be clear or colored, with charged particles of one or more colors in it, e.g., $TiO_2$. The cavities may or may not be filled with liquid and/or with particles of the same color, of the same amount, of the same kind (or specification), etc. This filling might, for example, be a dielectric solvent. If desired, all of the cavities may not be filled, cavities may be left unfilled or partially filled. The particles may have an electrical charge, e.g., they may be. A superimposed layer might seal the open side of the cavities. Electrodes might be layered on. Combined, all of the pockets (or Sipix microcups) of such an display might form a desired visual effect or image in an inventive image and using electricity or another trigger or influence, this visual effect or image might change over time as desired, e.g., each pocket might function as a pixel or as a sub pixel in the inventive image. If desired, one or more color filters might also be added to create the desired visual effect or image. Refer to patents assigned to Sipix such as U.S. Pat. No. 6,545,797 and 20020176963. The imaging mediums described in U.S. Patent No. 20020155372 might also be used to make inventive images. Also refer to publications available from Sipix such as these four. "20.1: Microcup Active and Passive Matrix Electrophoretic Displays by Roll-to-Roll Manufacturing Processes"; R. C. Liang, Jack Hou, Jerry Chung, Xiaojia Wang, Cheri Pereira and Yajuan Chen, Sipix Imaging, Inc.; SID Digest 2003 (SID is the Society for Information Display); ISSN/0003-0966X/03/3403-0694. "Microcup Electrophoretic Display by Roll-to-Roll Manufacturing Processes", R. C. Liang, Jack Hou and Hong Mei Zang, Sipix Imaging, Inc., IDW 2002, Japan. "Microcup LCD, A New Type of Dispersed LCD by A Roll-to-Roll Manufacturing Process" R. C. Liang and Scott Tseng, Sipix Imaging, Inc. IDMC 2003, Taipei. "Passive Matrix Microcup Electrophoretic Displays" R. C. Liang, Jack Hou, Hong Mei Zang, and Jerry Chung; Sipix Imaging, Inc., IDMC 2003.351.

In embodiments, inventive images or part thereof are made with reflective displays, EPDs, and/or technology by Gyricon LLC of Ann Arbor, Mich. (refer to www.gyricon.com) and/or PARC (Palo Alto Research Center, now a Xerox subsidiary). Examples are inventive images or parts thereof made using e-materials with an internal layer of bichromal beads that can be rotated by voltage, inventive images or parts thereof made using Gyricon, made using SmartPaper or made using SyncroSign, or the technology for these. Such e-material might have backplanes that are active matrix, made of polymer, printed, ink jet printed, flexible, very thin, or a combination of these, e.g., backplanes made by Plastic Logic or by using their technology. In an illustration, such inventive images might be made of or with a flexible electronic display that has two layers or sheets of thin polymer (which are image supports e.g., stabilizers) with many tiny bichromal beads (e.g., millions of beads measuring about 100 microns in diameter or smaller) embedded in a cavity, internal layer or central layer between the two polymer layers or image supports, e.g. in a cavity filled with liquid, polymer and/or oil. These beads have a different color and a different electrical charge on each of their halves, hemispheres or sides (e.g., with contrasting colors on the two hemispheres of the beads like black and white, or red and white). Using voltage, the beads can be made to rotate within the cavity, inner layer or central layer of the e-material's form, changing the color viewers see, e.g., each bead serves as a pixel in a larger image, picture or display. Without voltage the image, picture or display remains unchanged. The use of voltage again causes the beads to rotate changing the coloration they display and thus the image presented. Such e-materials may be bistable. It is notable that their color may be from pigments rather than dyes because as much permanence as possible may be desirable. Such e-materials might be produced in a roll, or in a roll to roll process, and/or it might be controlled remotely, e.g., via wireless network such as that by Wagner Zip-Change Inc. of Melrose Park, Ill. the producer of ZipVision eSignage using Gyricon technology.

In embodiments, inventive images or part thereof are made with e-materials by Canon (refer to www.canon.com), and/or E-Ink Corp (see www.eink.com, particularly for technical and updated information). Refer to patents assigned to E-Ink Corp (such as U.S. Pat. Nos. 6,392,785; 6,422,687; 6,518,949 and 6,445,489). Refer to Royal Philips Electronics in Amsterdam and Eindhoven, the Netherlands, www.Philips.com, Polymer Vision in Eindhoven, in the Netherlands, www.polymervision.com, and http://polymervision.nl/. In embodiments, inventive images or part thereof have e-materials made by Aveso Inc of Fridley Minn., see www.avesodisplays.com for further information. In an embodiment, inventive images are made using compositions, methods and/or systems described in U.S. Patent Application No. 20050079386 A1, Brown, R. Malcolm Jr., et al., Apr. 14, 2005, "Compositions, methods and systems for making and using electronic paper" or inventive images are made using similar technology. Such inventive images may be made using a fibrous organic image support such as one made of cellulose. They may have nanomaterials or they may be nanomaterials. In embodiments, inventive images or part thereof have e-materials made with liquid crystal. An example is that developed at Tokai University, refer to H. Yoshikawa et al. "Digital Paper with Guest-Host-Type Liquid-Crystal Medium," J. Imaging Science and Technology, 47, No. 4 304-308 (2003). In embodiments, inventive images or part thereof have e-materials made with conventional paper and polymer electronics, e.g., the electronics might be coated on the conventional paper, forming an image support. In another example, inventive images are made using e-materials that are bistable and made with liquid crystal, and/or this technology. For instance, these might be nematic LCDs, the technology for these, or both, such as that by Nemoptic of Magny les Hameaux, France, which may be called BiNem (refer to detailed information at www.nemoptic.com). In embodiments, inventive images are made using e-materials that has bistable, grating-aligned zenithal liquid crystal displays, or zenithal bistable displays that employ a simple micro-structured grating surface to control the alignment of liquid crystal molecules, such as those by ZBD Displays, Ltd. of Worcester UK and Windsor UK, refer to details at www.zbddisplays.com. As a further example, refer to work done by Korea Electronics Technology Institute (KETI) in Korea. In embodiments, inventive images are made using e-materials based on MEMS (Micro-Electro-Mechanical-System) such as the Interferometric Modulator (iMoD) Matrix component, which is a bistable, reflective display by Iridigm Display Corp. (www.iridigm.com), a subsidiary of Qualcomm of San Diego Calif. (refer to www.qualcomm.com). Such e-materials made using MEMS might be further processed, e.g., using additive processes such as adding polymeric compositions.

In embodiments, inventive images or parts thereof are made using e-materials or technology from the Flexible Display Center at Arizona State University in Tempe, Ariz., such as electrophoretic ink or EPD technology, cholesteric liquid crystal technology (CLC or cholesteric liquid crystal display ChLCD), and integrated subsystems technology. See information at http://flexdisplay.asu.edu/ or http://flexdisplay.asu.edu/index.htm. In an embodiment, inventive images or parts thereof are made using e-materials from Kent Displays, Inc. of Kent, Ohio. Examples of these use CLC or ChLCD technology. Refer to www.kentdisplays.com and in their U.S. and foreign patents, especially for technical information. In embodiments, inventive images or parts thereof are made using e-materials or technology from The Liquid Crystal Institute at Kent State University in Kent Ohio (refer to www.lci.kent.edu), and/or from its Center for Advanced Liquid Crystalline Optical Materials (refer to www.lci.kent.edu/ALCOM/alcom.html). In an embodiment, inventive images are made with e-materials, CLC displays, technology and/or similar technology by Magink or Magink Display Technologies Inc. of NY, N.Y., of Middlesex, UK and Israel (formerly E-Magin Ltd, see www.magink.com and their parent company, Sixeye Ltd.). These may have full color if desired, e.g., as many as 4096 colors or perhaps more. Examples are inventive images made with CLC displays and/or CLC technology by Magink that may be partially or entirely made by Mitsubishi Electric of Japan. In embodiments, inventive images are made with e-materials and/or technology from Eastman Kodak, such as their flexible, bistable, polymer-dispersed CLC display made using roll to roll processing and/or technology for this.

In embodiments, inventive images or part thereof are made using CLC, as desired. These may be e-materials, they may be bistable, flexible, made in a roll to roll process, reflective, non-light-emitting, and/or made with polymer or organic electronics. In examples, inventive images are made using CLC technology developed for products that are not images (such as information displays and devices, video devices, communication displays and devices, smart windows, decoration, e-materials, colorants, devices that download from the Internet, continuously changing store banners, information storage devices, camouflaged products like vehicles and tents, and the like). In an inventive image, the CLC material might for instance, be a layer or a film of any thickness, e.g., thin or very thin, for instance, about a few millimeters or less, about 1 mm or less, about 0.5 mm or less, or only about ten thousandths of a millimeter. The use of CLC and other liquid crystal materials in inventive images is not limited to films or thin layers.

CLC may be used in inventive images for the color, colors and/or light properties it shows in reflected light. This color may be iridescent, it might appear intense, and it might change as the viewer moves in relation to the image, or as the image moves in relation to the viewer. In further examples, CLC might be used in inventive images as flakes, paint, ink, pigment, and/or another kind of colorant. For instance, CLC pigments may be used in inventive images, such as Helicone pigments from Wacker-Chemie GmbH of Muenchen, Germany (www.wacker.com). Examples of other CLC colorants for use in inventive images are by Sadeg M. Faris of Pleasantville, N.Y., e.g., as described in U.S. Pat. No. 5,599,412 "Method and apparatus for producing aligned cholesteric liquid crystal inks;" in U.S. Pat. No. 6,338,807 "Cholesteric liquid crystal (CLC)-based coloring mediums for producing color effects having improved brightness and color characteristics," and in U.S. Patent 20020020829 "Aligned cholesteric liquid crystal inks." CLC from Reveo Inc. of Elmsford, N.Y. may also be used in inventive images.

In preferred examples of these embodiments, the color and/or light properties of CLC in a smart inventive image are changed or modulated using one or more stabilizers, and this change or modulation may be reversible and repeatable. Examples of such stabilizers are: electricity, electric fields, temperature, light, radiation, dopants, photo sensing materials, and/or impurities. Other inventive image parts that stimulate, influence or trigger such a change in color and/or light properties, or which assist in this process are also stabilizers, such as electrical parts and chemicals. The color and light of CLC in inventive images might be controlled, modulated or changed uniformly, more or less uniformly, or differently in different areas, such as to form a varied design, pattern or display and/or to form text in inventive images. The response rate of CLC to the stabilizer might be at any rate, it may be good, very good or quick.

In a preferred example, one or more stabilizers might be used to rotate, flip, move, reposition and/or switch the CLC molecules and/or the particles or flakes comprised of them, changing their angle and/or alignment and thus changing or modulating their color and light properties. As a more specific illustration, CLC flakes or particles in a binder, coating, host fluid or other material, might change, rotate or completely disappear from visibility in response to an electric field (stabilizer), changing or modulating the color of the light they reflect. These might be polymer CLC flakes (also called pCLC flakes). Specifications such as the size and shapes of the CLC flakes, the composition of the material they are in, the type of electric field, and the strength of the current might influence how the flakes respond to the stabilizer stimulating them, e.g., how the flakes move or rotate and thus how the color changes or modulates. For example, CLC flakes might be less than about 150 microns across, preferably less than about 100 microns across, more preferably less than about 50 microns across, and most preferably about 40 microns across. The flakes' rate of response to the stabilizer might depend on specifications (such as that of the CLC material and of the stabilizer). The flakes might respond to the stabilizer almost instantaneously and change back when the stabilizer is removed, e.g., the response rate may be about 80-500 milliseconds, which is comparable to conventional liquid crystal displays. CLC flakes of different colors in the same host material might respond differently to the stabilizer (e.g., the electric field). The binder, coating, host fluid or material that such CLC flakes are in might be polymeric, and it might be conductive or semi conductive. In inventive images, pixels might be made using such CLC flakes. Refer to "Flipping flakes change color" by Chhavi Sachdev in Technology Research News, Nov. 14, 2001, www.trnmag.com. Refer to the work of Kenneth L. Marshall at the University of Rochester in NY, such as "Electric-field-induced motion of polymer cholesteric liquid crystal flakes in a moderately conductive fluid," by T. Kosc, K. Marshall, S. Jacobs, J. Lambropoulos, and S. Faris, in "Applied Optics-OT, Vol. 41, Issue 25, 5362-5366, September 2002 (also at http://aoot.osa.org).

In another example, the repeat distance (also called pitch) of the spiral shaped CLC molecules may be controlled, modulated, and/or changed using one or more stabilizers, thereby controlling, modulating and/or changing the color of the light reflected. (The CLC molecules twist in their alignment in spirals or regularly repeating helixes like screw threads, scattering light, the wavelength and color of which is determined by the spirals' repeat distance.) For instance, a stabilizer may be added to the CLC material that responds to a second stabilizer or stimulant in a way that changes the CLC spirals' repeat distance so they reflect a different color light.

In an illustration, a dopant (stabilizer) might be added to the CLC material, the molecules of which change shape when stimulated, influenced or triggered by a second stabilizer, e.g., the dopant molecules that change from straight to kinked with exposure to UV light (the second stabilizer). As the form of the dopant molecules' changes, the repeat distance of the spirals of the CLC molecules changes, causing the color of the light reflected to modulate or change. Thus, if desired, stabilizers might be used and controlled to control, modulate and/or change light and color of the CLC material in inventive images. The longer the dopant molecules are exposed to UV light, the more kinky they become, and the more the CLC molecules spiral repeat distance changes turning the color of the light reflected from red through yellow and green to blue. Also in examples, the color or colors of such CLC materials might be fixed in exposed and unexposed areas. Note, that this process may be dependent on temperature. It may only take place in the liquid crystal state above 87° C. Below this temperature, the structure of the liquid crystal molecules may be fixed. Such fixing may be desired in inventive images to maintain the color or colors of reflected light, e.g., to fix the design, pattern or display created for a year or longer. Also, above 120° C., the twisted structure of the CLC molecules may break and the kinked dopant molecules straighten, in effect erasing the arrangement of color and light created, (e.g., erasing the design, pattern or display created). The CLC material might be used and reused repeatedly, as desired. Refer to "Rewritable Full-Color Recording in a Photon Mode" by N. Tomaoki, S. Song, M. Moriyama and H. Matsuda in the Journal of Advanced Materials 12, 94-97 (2000). Also refer to "Patterned Multicolor Switchable Cholesteric Liquid Crystal Gels" by R. A. M. Hikmet and R. Polesso, Advanced Materials, 14, No. 7, Apr. 4, 2002, 502-504.

CLC materials might for example be used on image supports that may be polymeric, that may be stabilizers, and that may be flexible and/or rigid. CLC materials in inventive images might be superimposed by polymer, such as by a polymer image support, e.g., stabilizer. For instance, CLC might be on an ITO (indium tin oxide) coated, flexible polyester image support (e.g., stabilizer), and it might be superimposed by a transparent polymer layer. In inventive images CLC may or may not be backlit or illuminated (e.g., by OLEDs or other light sources), and CLC might not be used with polarizers. In preferred examples, CLC is used in inventive images without any backlight, other illumination, or polarizers, thus they could be thinner and they could use less voltage than other displays like conventional liquid crystal displays. CLC might be used in inventive images to make reflective displays that are rewritable, with full color or any color desired. Effects of light and color using CLC and the ability to modulate, erase and recreate them (as in these examples), may be very desirable in inventive images. If desired, CLC used in inventive images might be further processed, such as by additive and/or subtractive processes.

In embodiments, bistable flexible CLC e-materials, or full polymer bistable cholesteric displays are used in inventive images. An example is the reversible display(s) made using organic materials like plastic substrates, PEDOT, polymer spacers and liquid crystal, by J. Specht and N. Fruehauf in Display Technology Allmandring 3B, Stuttgart, Germany, and J.-P. Tahon of Agfa-Gevaert N.V. Mortsel, Belgium.

As further examples, e-material or EPD technology described in these articles might be used as or in inventive images. E. Nakamura, H. Kawai, N. Kanae, and H. Yamamoto; SID '98 Digest, p. 1014 (1998). J. Jacobson, B. Comiskey and J. Albert; U.S. Pat. No. 5,961,804 (1999). P. Kazlas, J. Au, K. Geramita, M. Steiner, C. Honeyman, P. Drzaic, K. Scheleupen, B. Wishnieff, R. Horton, and R. John; SID '01 Digest, p. 153 (2001). E. Kishi, et al; SID 00' Digest, p. 24 (2000). S. A. Swanson, M. W. Hart, and J. G. Gordan, II; SID '00 Digest, p. 29 (2000). M. Bryning, R. Cromer; SID '98 Digest, p. 1018 (1998). In another example, inventive images may be made using materials, processes, or technology from a "Smart Paper" Conference, e.g., from the exhibitors, from the presentations, from conference publications, etc. An example is the "Smart Paper" Conference, by Pira of Surry UK (www.piranet.com) to be at the Radisson Royal Park Hotel, Stockholm Sweden, June 2005; and past and other future "Smart Paper" conferences.

In embodiments, liquid crystal is painted, applied by hand, printed, sprayed, coated or applied in another way that a paint might be applied onto inventive images or part thereof such as image supports (e.g., stabilizers), to form a liquid crystal display or LCD. Such a LCD is a smart material in inventive images that may make these images smart too. LCD of these embodiments might be cured after they are applied, e.g., using radiation or UV light, such as by exposing once or twice to UV light. This capability might be useful in a roll to roll, or reel to reel process, and it might be applied on image supports that are large, irregularly shaped, planar, non planar, curved, two or three dimensional, textured, flexible, etc., such as a wall, a three dimensional object, furniture, fabric, a handbag, a window shade, a flexible polymer image support, an image support that can be rolled up tightly (e.g., to less than one cm. in diameter), an image support that can be folded, etc.

In an example, a blend or mixture of liquid crystal and at least one other ingredient, preferably one or more polymer precursors or monomers, is applied on an inventive image or part thereof, such as an image support or image support stabilizer. The liquid crystal mixture used might for example be comprised of: (1). a blend of low molar mass, rod shaped molecules, such as a blend of a cyanoterphenyl and several cyanobiphenyl molecules (called E7 from Merck); (2). a monomer which dissolves in the liquid crystal, phase separates in a stratified way during polymerization, and forms a hard or rigid polymer like Isobornyl methacrylate, and (3). a monomer which will help control the process and/or help form the qualities desired in the polymer such as a stilbene-functionalized dimethacrylate monomer (such an ingredient functions as a stabilizer). Or the liquid crystal mixture might be made of a similar or related composition. An application of a liquid crystal mixture of these embodiments (such as the example above) is preferably photopolymerized, at least once, twice using some variations of the process, or another number of times, e.g., by the use of stabilizers such as one or more of ultra violet light, a UV light absorbing dye in the liquid crystal mixture, and a mask. Making the applied liquid crystal mixture into a display might also involve the use of conventional practices such as practices used in painting and for coatings. It may for instance, be a process with a stage in which the applied liquid crystal mixture is partially polymerized by selective exposure to UV light through the pattern or design of a mask to form a grid, network or design of polymer cell walls within the applied liquid crystal mixture. The polymerization is preferably inhomogenous so that the surface nearest the UV light source polymerizes first. Then there may be a stage in which the gridded or partially polymerized application is exposed to UV light again (preferably without a mask) to form a polymer cover over the grid or network (or over its open areas) so that its cells are closed with liquid crystal inside. The use of a UV light absorbing dye stabilizer in the liquid crystal mixture may enable or help the polymer cover to form over the cells (at the surface of the application) leaving the liquid crystal below inside the cell walls. The use of an adhesion promoter and/or a printing or offset printing process in the formation of such LCDs may be desirable, such as that developed by Philips. Refer to Royal Philips Electronics in Eindhoven, The Netherlands, and to www.Philips.com. Also refer to "Single-substrate liquid-crystal displays by photo-enforced stratification" by Roel Penterman, Stephen I. Klink, Henk de Koning, Giovanni Nisato and Dirk J. Broer, in Nature Vol. 417, May 2, 2002, pages 55-58.

In such liquid crystal mixtures used to form LCDs in inventive images, the polymer precursor, precursors, or monomer or monomers that forms the grid or cell walls, and that forms the cover or lid closing the cells are stabilizers. Electrodes used in such LCDs in inventive images are stabilizers, as are other electrical parts and the electrical current used to run them. Radiation or UV light used to make such LCDs is also a stabilizer.

In inventive images, the aesthetics of liquid crystal materials in inventive images such as those described above (their color, light etc.) may be constant or they may change over time, e.g., even changing very rapidly such as with video speed or instantaneously. Inventive images with liquid crystal materials may be interactive, or smart. Moreover, as noted in U.S. Patent Application No. 20030035917-A1, inventive images are not restricted by the design constraints that typically determine aesthetic properties in conventional products that are not images. Thus, for example, liquid crystal materials in inventive images may or may not have rectangular, rectilinear or geometric shapes; they may be thick, thin or their thickness may not be consistent, etc. For instance, liquid crystal materials painted or otherwise applied onto an inventive image or part thereof, might be irregular or very irregular, for instance it might be applied on an image support (e.g., stabilizer) as one or more brushstrokes or in a random arrangement of irregular shapes. As a further example, in inventive images, liquid crystal materials such as those examples described above, might be made with cell structures unlike those described in the example in the Nature article cited above and unlike pixels, grids and cell structures in other conventional displays. For instance the cell structures used to make liquid crystal materials (such as LCDs) in inventive images may not be rectilinear, geometric or uniform, they may be irregular, they may be larger than those in conventional liquid crystal materials or larger than those in the Nature article cited above, or they may be a combination of these, e.g., for aesthetic purposes. Also, in inventive images, liquid crystal materials might be further processed, such as for aesthetic and/or utilitarian purposes. For instance, a liquid crystal material might function as underlayer in an inventive image, an underlayer that stays constant or that changes over time, e.g., this underlayer may be superimposed, refer to examples in U.S. Patent Application No. 20030035917-A1. In an example, a liquid crystal material might be superimposed by a layer which might be aesthetic and/or utilitarian, such as a layer that is transparent, translucent and/or colored with one or more colors; a layer that decreases or eliminates the ingress of oxygen, water, moisture and/or other subjects that may cause or accelerate impermanence in the liquid crystal material; a layer that protects the liquid crystal material in another way; or a layer that is a combination of these. Inventive images with liquid crystal materials such as those described herein may be rigid and/or flexible, and they may be paintings, sculpture, furniture, screens, walls, clothing, or another type of image.

In an embodiment, a polymer that is re-mendable, self healing, or regenerative is a smart material used to make inventive images or part thereof. This polymer might be a nanomaterial or nanomaterials might be used with it. Such a polymer might for example be used to make all or part of the form and/or structure of an inventive image or part thereof. Or such a polymer might for example be used as or in a surface, a coating, a layer, a colorant or a paint, e.g., a paint that mends its own cracks. Refer to the work of Scott White at the University of Illinois at Urbana-Champaign, and the work of Prof. Dr. Ilhan A. Aksay, Princeton University, NJ.

In an example, a thermally re-mendable polymer might be used in this embodiment, thus heat used to mend it is a stabilizer, as is anything that produces the heat, the cooling or the temperature change. When heated and then cooled (such as cooled back to room temperature), polymers of this embodiment might mend themselves, without requiring additional ingredients (such as without requiring added catalyst or monomer, and without requiring surface treatment of the fracture or crack being mended). Moreover, polymers of this embodiment might mend themselves by such a heating process multiple times or repeatedly. For example the polymer used in this embodiment might be transparent or translucent, and it might be a hard polymer, e.g., with mechanical properties like epoxy. It might mend itself when heated to about 240-250° Fahrenheit or about 120° Celsius and then cooled, e.g., the heat might break bonds within the polymer, and bonds might reform when the polymer cools, for instance, about 30% of inter-monomer linkages might disconnect when heated and then reconnect when cooled. In this process, fractures or cracks in the polymer may repair themselves, though evidence of these fractures or cracks may remain in the cooled polymer, but the cooled polymer may not have the strength or toughness that it had before the heating process. Examples of such polymers are Pentacrythritol, tetrakis(2-carboxylethyl)ether, tetrafurfurul ester, copolymer with tris (2-maleimidoethyl)amine, and similar polymers. (Note, such polymers might be used in other embodiments also if desired.) Refer to "A Thermally Re-mendable Cross-Linked Polymeric Material" by X. Chen, M. A. Dam, K. Ono, A. Mal, H. Shen, S. R. Nutt, K. Sheran, and F. Wudl, in Science, Vol. 295, Mar. 1, 2002, pages 1698-1702. Refer to the polymer called Automend developed by F. Wuld et. al. at University of CA. in Los Angeles. Also refer to S. R. White et. al. in Nature 409, 794 (2001), and refer to "A thermally re-mendable cross-linked polymeric material" by X. Chen et. al. in Science, 295, 1698-1702 (2002).

Materials, products and/or technology (compositions and/or processes) for use in inventive images might be obtained from Viztec Inc. of Cleveland or Twinsberg Ohio, such as those for the creation of liquid crystal displays, plastic pixels technology, nanotechnology, and/or nanomaterials.

In another example, a re-mendable polymer is made using nanomaterials such as carbon nanotubes (CNTs). As a further example, a polymer material used in an inventive image is made containing tiny capsules containing a liquid healing material. The progression of a crack ruptures these capsules releasing their liquid healing material into the crack, filling it. There might be a catalyst in the polymer material that polymerizes the healing material filling the old crack. Such a healing material in a polymer might lessen problems associated with fatigue. Refer to "Autonomic healing of polymer composites" by S. R. White et al. in Nature 409, 2001. Also refer to C. Dry and N. Sottos "Passive smart self-repair in polymer matrix composite materials" in Smart Structures and Materials 1993: Smart Materials (ed. V. K. Varadan), p. 438, Proceedings of 1993 N. American SPIE Conference on Smart Structures and Material Vol. 1916 in SPIE Proceedings (SPIE, Bellingham Wash. 1993), and refer to C. Dry "Procedures developed for self-repair of polymeric matrix composite materials," in Composite Structures 35, 1996.

In embodiments, conductive polymer is used to produce heat in inventive images. The heat produced might for example, trigger another formal element in the same image, for example a thermochromic effect such as by the use of a thermochromic colorant or paint. The heat might also effect the area and/or the people near these inventive images as desired.

In embodiments, inventive images or parts thereof that might be called smart are made with smart materials that are phase change materials (PCMs). PCMs moderate, modify or control temperature in inventive images or part thereof, and/or they absorb, store, and/or release heat in inventive images or part thereof, typically transitioning from solids to liquids and/or visa versa. In addition to those materials conventionally considered PCMs, the term PCM herein also includes plastic crystalline materials like polyhydric alcohol, (refer to the list of examples below). The specific compositions of PCMs, and processes used to make them might be selected so that the resultant PCMs moderate, modify or control temperature, or so that they absorb, store, and/or release heat at or within a desired temperature range, e.g., PCMs can be made to transition from one state to another at or about a temperature that is optimal for the inventive image and/or its viewers. PCMs might, for example, be small or very small (e.g., they might measure only about a few micrometers, they might have diameters of about 1-10 microns, of about 1-30 microns, or of about 0.5-1,000 microns; they might be in particles that are between about 0.01 and 1.0 millimeter, they might be nanoscale, etc.).

PCMs might be in the form of mixtures or compositions that might contain one or more ingredients that actually moderate, modify or control temperature in inventive images or part thereof, and/or absorb, store, and/or release heat, and that might also contain one or more other ingredients that may for example be polymers, dispersing polymers, thermoplastic polymers, silica or other ingredients. PCMs, PCM mixtures or PCM compositions might for example, be made with wax, paraffin wax, paraffinic hydrocarbon, crystalline alkyl hydrocarbon, crystalline straight chained alkyl hydrocarbon, linear alkyl hydrocarbons, long alkyl hydrocarbon chain, n-Octacosane, n-Heptacosane, n-Hexacosane, n-Pentacosane, n-Tetracosane, n-Tricosane, n-Docosane, n-Heneicosane, n-Eicosane, n-Nonadecane, n-Octadecane, n-Heptadecane, n-Hexadecane, n-Pentadecane, n-Tetradecane, n-Tridecane, polymer compositions, polymer gels, polyurethane gels, polyolefins, polyolefin resin, cross linked or uncrosslinked polyolefins, ethylene copolymer, polyethylene, high density polyethylene, uncrosslinked high density polyethylene, polyethylene glycol, end capped polyethylene glycol, crosslinked polyethylene glycol, polyethylene oxide polymer; calcium chloride hexahydrate in admixture with strontium chloride hexahydrate, lithium nitrate trihydrate, and/or zinc nitrate hexahydrate; pentaerythritol, 2,2-dimethyl-1,3-propanediol, 2-hydroxymethyl-2-methyl-1,3-propanediol, and amino alcohols; polypropylene, uncrosslinked high density polypropylene, ethylene-vinyl acetate copolymer, ethylene-methyl acylate copolymer, ethylene-ethyl acrylate copolymer, fatty acids, fatty acid ester, crystalline fatty acids, crystalline fatty acid ester, fats, poly-alcohols, polyhydric alcohol, alcohols, esters, metals (such as gallium, cesium, rubidium, and the like), alloys (such as Bi/Pb/Sn/In and the like), eutectics, crystalline polymer, naphthalene, water, hydrated salt, inorganic hydrated salts, congruent inorganic salt hydrates, clathrates, water/urea clathrate, quaternary ammonium halide clathrates, glycerine, pentaerythritol, pentaglycerine, neopentylglycol, silica, a thermoplastic polymer, polyamides, polyamines, polyimides, polyacrylics, polycarbonates, polydienes, polyepoxides, polyesters, polyethers, polyflouocarbons, formaldehyde polymers, natural polymers, polyolefins, polyphenylenes, silicon containing polymers, polyurethanes, polyvinyls, polyacetals, polyarylates; homopolymers of polyethylene, polypropylene Nylon 12, polybutylene terephthalate; copolymers of polyethylene-co-vinyl acetate, polyethylene-co-acrylic acid, polybutylene terphthalate-co-polytetramethylene terephthalate and poly-lauryllactam-block polytetrahydrofuran; another polymer in U.S. Patent Application No. 20030035917-A1, two or more of any of these, or a combination or mixture of these. Examples of PCMs may also have other ingredients like fillers. For instance, refer to U.S. Patent No. 20020105108 entitled "Melt Spinable concentrate pellets having enhanced reversible thermal properties," and to U.S. Pat. No. 5,885,475 entitled "Phase change materials incorporated throughout the structure of polymer fibers."

Examples of PCMs might be in powder, pellet, or granule form. Preferred examples of PCMs are encapsulated or they are in another form of container (typically to prevent leakage into another part of the inventive image and/or to maintain the desired form as part of an inventive image). PCMs might for example be in shells, pellets, fibers, pouches, capsules, microspheres envelopes, or micro-capsules that may be made with polymer. Such PCM encapsulation or containers might for example, be made of polymer, polyolefins, polyethylene, polyethylene/ethylene vinyl acetate, polypropylene, polybutene, crystalline polystyrene, or any of the kinds of polymers in U.S. Patent Application No. 20030035917-A1.

Examples of PCMs (encapsulated, contained, unencapsulated or uncontained) might be used in inventive images in another different material that serves as a matrix, medium or form. Such a matrix, medium or form might for example, be made with cPRM, a polymeric composition, a porous polymeric composition, another porous material, an elastomer, rubber, latex; polymer made with acrylic, styrene, isoprene, acrylonitrile, butadiene, vinyl acetate, vinyl chloride, vinyldiene chloride, ethylene, butylene, propylene and/or chloroprene; silicone, epoxy, polyurethane, fluorocarbon, chlorosulfonated polyethylene, chlorinated polyethylene, or crystalline chlorinated polyethylene; polyethylene, polypropylene, polybutene, crystalline polystyrene, polyolefin, crystalline polyolefin, poly(4-methylpentene-1), crystalline ethylene copolymers, ethylene vinylacetate, ethylene vinylacetate copolymer, crystalline ethylene acrylate copolymers, polyvinyl acetate, vinylchloride/vinyl acetate copolymer, neoprene, butadiene/acrylonitrile copolymer, butadiene styrene copolymer, ionomers, crystalline ethylene-butene-1 copolymers, crystalline ethylene propylene copolymers, nylon, polycarbonate, polyester, acrylic, polyvinyl alcohols, a colorant, foam, paint, fiber, fabric and/or textile, polyalkylene oxide, polyalkylene ether, a board or image support, a fluid, cross linked polymers, a thermoplastic polymer, polyamides, polyamines, polyimides, polyacrylics, polycarbonates, polydienes, polyepoxides, polyesters, polyethers, polyflouocarbons, formaldehyde polymers, polyphenylenes, silicon containing polymers, polyurethanes, polyvinyls, polyacetals, polyarylates, any of the kinds of polymers in U.S. Patent Application No. 20030035917-A1, another material, or two or more of these.

Examples of PCMs in cPRM or polymer might be processed using known processes for making polymer forms that are not images, such as by extrusion, casting, and/or using any process(es) described in U.S. Patent Application No. 20030035917-A1. An inventive image or part thereof might for example, have a layer or a partial layer of PCMs or containing PCMs that might be thin or extremely thin. In making an inventive image, PCMs, the layer of PCMs or the partial layer of PCMs might be superimposed.

Polymer in PCMs, polymer that encapsulates or contains PCMs in inventive images, and polymer that is used as a matrix, medium or form for incorporating PCMs in inventive images are stabilizers, however it may be preferred that such polymer in PCMs that is in fabrics, textiles and/or fibers in inventive images works of design are not stabilizers (such as PCMs used in clothing design, fashion design, furniture design, seat design, and the like).

In examples, PCMs moderate or control the temperature of inventive images or part thereof, and/or they moderate or control the temperature of the surrounding area or room. PCMs might, for instance, moderate or control the temperature in and/or around an inventive image that is a mural, a painting, a mobile, a sculpture, a partition, a table, etc. Thus, examples of PCMs might enhance or maintain the stability or permanence of inventive images or parts thereof, thereby serving as stabilizers. However it may be preferred that those PCMs used in fabrics, textiles and/or fibers in inventive images works of design which enhance or maintain the stability or permanence of these inventive images are not stabilizers (e.g., it is preferred that PCMs in clothing design, fashion design, furniture design, seat design, and the like are not stabilizers). PCMs might keep or assist in keeping the temperature of inventive images optimal or almost optimal, despite temperature changes in other parts of these inventive images and/or despite temperature changes in the environment or area around them. (The temperature of conventional fine art that is valuable is commonly controlled, though not typically by the image itself.)

As another example, temperature change or modulation in inventive images that is caused by PCMs might stimulate change or assist changing other elements in these inventive images or parts thereof, such as their size, shape, color, light properties and/or appearance (refer to descriptions herein). Such PCMs and the temperature change and modulation they provide are stabilizers. In a further example, PCMs might moderate temperature in a way that is apparent in the space around the inventive image, in a way that viewers feel, and/or in a way that moderates ambient or room temperature. For example, PCMs in inventive images might effect heating and cooling, e.g., altering the room temperature viewer's feel desirably, and/or reducing or eliminating the need for other means of moderating room temperature.

PCMs might for example, serve as insulation, and thus function as a stabilizer. PCMs might be desirable in inventive images or parts thereof that have devices, systems, machines or components which heat up or which produce heat (such as electrical devices or photovoltaic devices, like light sources, computers, etc.). In these inventive images, the use of PCMs are stabilizers maintaining or assisting in maintaining stability or permanence (e.g., keeping devices in these inventive images working, maintaining the permanence of painted inventive image areas, etc.). Refer to examples of such devices, systems, machines and components herein and in U.S. Patent Application No. 20030035917-A1. In addition or instead, the area around such inventive images might be made more desirable by the PCMs. In a further example, PCMs are activated by solar heat.

Examples of PCMs and/or PCM technology for use in inventive images might be obtained from Outlast Technologies in Bolder Colo. (refer to www.outlast.com), from Frisby Technologies in Advance NC, such as Thermasorb® (refer to www.frisby.com), from Phase Change Laboratories of San Diego, Calif., from the University of Dayton Research Institute in Dayton Ohio, from Rubitherm GmbH of Hamburg and Fürstenwalde Germany, a subsidiary of Scümann SASOL (refer to www.Rubitherm.com) and from other sources. For example, Rubitherm GmbH offers narrow cut, highly crystalline, high n-paraffin content materials which have the capacity for high latent heat storage over a very narrow temperature range, and Rubitherm GmbH offers a complete array of PCMs based on paraffin waxes, normal-paraffins, and Fischer-Tropsch waxes, such as latent heat paraffins and waxes, and bound PCMs. PCMs from Rubitherm GmbH can be designed or fabricated to meet desired specifications as to their form and melting point (ranging from about 5° C. to about 110° C., or from about −3° C. to about 100° C.) for inventive images. Refer to Rubitherm.com for a fuller description.

In embodiments, inventive images are made with smart materials or smart fluids that are particle filled, oil based suspensions that change in viscosity reversibly, i.e. from liquid to solid, in response to a magnetic or electric field. Examples are electro-rheological (ER) and magneto-rheostatic (MR) fluids, the compositions of which vary widely. For example, a MR fluid consists of iron particles (micron scale) suspended in oil. As an illustration, a smart fluid embedded in an inventive image or part thereof may enable its flexibility, its firmness and/or its hardness to be controlled or adjusted, e.g., using electricity. Or a smart fluid in an inventive image or part thereof, or a smart fluid that is part of an inventive image may enable its texture, its shape, form and/or its dimensions to change, e.g., such a change could affect one or more other parts of the same image for instance, affecting the relationship between image parts, affecting the way the image is displayed or installed, etc.

In embodiments, a metal coated polymer is used to make inventive images or a metal coating is put on a polymer inventive image surface or part thereof, e.g., a metal coated polymer might be used as an image support (which may be a stabilizer). For example, in inventive images metal coated polymers might be any thickness (e.g., they might be films or sheets), they might be conductive, semi conductive or non conductive; they might be colored or colorless; they might be reflective or non reflective; and/or they might be transparent, translucent or opaque. In their use in the inventive image, preferred examples of these metal coated polymers are transparent or translucent; and they are either colorless or they are colored in an aesthetically desirable way. It is preferable for the metal coated polymer in these embodiments to be as permanent as possible, for instance so that their color and other properties do not change over time to the extent that such change can be prevented, e.g., it may be desirable for the metal coated polymer to have a UV stabilizer, a UV absorber or other stabilizer(s). The metal might for example be applied onto the polymer surface using conventional or unconventional processes, e.g., by painting, spin coating, spraying, vacuum sputter deposition, other sputter coating processes, other vacuum processes, using adhesive products or other bonding substances, thermal evaporation, vapor deposition, etc. In examples, these polymer surfaces have ITO (indium tin oxide), aluminum, copper silver, gold, or another metal oxide upon them. Such a polymer might, for instance, be ITO coated PET (polyethylene-terephthalate) or polyester, or it might be aluminum coated polycarbonate, polyethylene, PET, Polyethylene napthalate (PEN), etc. Examples of metal coated polymers for use in embodiments are available from CPFilms Inc. of Martinsville, Va. (a business unit of Solutia Inc in Saint Louis, Mo., refer to www.cpfilms.com), such as their OC product line.

The metal covered polymers of these embodiments might for example, be further processed using additive processes like: painting (using conventional art materials or using unconventional materials), drawing, printing, collage, by photographic processes, adding adhesive product(s) or other bonding substance(s), attachments or other parts; by the addition of another layer of polymer (such as a conductive or semi conductive polymer, another responsive polymer like polymer gel, polymer electronics; a CLC, a polymeric solution, emulsion, coating or colorant, etc.); by adding a surface preparation stabilizer, gesso, or a primer; by the addition of other part(s) and/or material(s) which form an OLED; by the addition of other part(s) or material(s) which form another kind of illumination (such as another kind of LED or an EL lamp); by the addition of other part(s) and/or material(s) that enable the inventive image to use the conductivity of the metal coated polymer (such as parts and/or materials that enable the use of electricity); by a combination of these, etc. In addition or instead, the metallized polymers of these embodiments might be further processed using subtractive processes, e.g., by incising and/or by cutting. In further examples, the metal on the polymer surfaces of these embodiments serves as a surface preparation stabilizer, enabling the polymer to bond to one or more superimpositions, such as, a primer, a coating or paints. Refer to the article "Effect of annealing of polythiophene derivative for polymer light-emitting diodes" by Ahn, Lee and Han published in Applied Physics Letters; Vol. 80, No. 3; Jan. 21, 2002.

In embodiments, polymer is layered on metal to make inventive images or parts thereof. For example, the polymer may or may not be conductive, polymer electronics and/or polymer e-materials might be used, and the metal may or may not be conductive. In other embodiments, conductive polymer is used in inventive images instead of metal coated polymer or ITO, it is used as an electrode, it is used as a conductor of electricity, it is used as a transparent or translucent conductor, or a combination of these. In comparison to metal coated polymer or ITO, conductive polymer may offer more durability, permanence, and easy fabrication (e.g., a non-vacuum process) and/or reduced cost.

In embodiments, interactive inventive images are made with at least one touch activated control or touch activated command device referred to herein as a touch control. Examples may or may not employ nanotechnology, they may or may not be nanomaterials and they may or may not have nanomaterials. Examples might be made using conductive polymer that might be transparent or translucent, (refer to examples made by Fujitsu Laboratories Ltd. of Tokyo, Japan). Such conductive polymer may for example, be used instead of ITO. Although touch controls may or may not be separate parts of inventive images, they are preferably integrated into the aesthetic or design of inventive images. Such touch controls and/or the inventive images made in these embodiments might be rigid and/or flexible, and they might have any dimensions, e.g., they might be self supporting, freestanding, rolled up, folded, thin, very thin, thick, a large as desired, designed ergonomically, etc. Preferred examples are two and three dimensional image supports that may be stabilizers, and two and three dimensional inventive images that have at least one but often multiple touch controls of any size desired integrated into their forms or their structures, as well as their aesthetic or design. These may for instance, be transparent, translucent and/or opaque image supports and/or inventive images. They may be partially colorless, they may have one or more colors, or they may be colorless. As examples, these image supports and/or inventive images might be partially or completely transparent or translucent, e.g., they might be planar also, such as inventive image walls, paintings, murals, etc. Refer to the description of transparent and translucent inventive images made with OLEDs such as TOLEDs below.

Touch controls on inventive images in these embodiments may for example be like one or more keys, buttons, or controls on a device, keyboard or keypad (for instance, they may comprise an entire keyboard, e.g., a computer controlled device). Touch controls on inventive images in these embodiments might also be integrated to any extent desired with the aesthetic and/or with the utilitarian elements of these images. For example, touch controls might be visually continuous with the rest of the images to any extent, e.g., even to the extent that viewers cannot readily find the touch controls on these inventive images, or that viewers have a hard time finding them. Touch controls might be transparent, translucent and/or opaque, they may have one or more colors and/or they may be colorless. As another example, the touch controls might be integrated with an inventive image's subject matter, and/or its color, e.g., all of the red leaves visible on an inventive image might be touch controls. Examples of touch controls have sensors, resistive sensors and/or capacitive sensors. Refer to examples by Gunze USA of Austin, Tex. at www.gunzeusa.com, and refer to examples by Eleksen of the United Kingdom, and of Tokyo Japan—see www.eleksen.com. Also refer to ElekTex at www.elektex.com, and www.elektex.com/home/index.htm.

Inventive image touch controls may enable viewers to interact with the Internet, to communicate, to use a wireless feature; to input, activate or use information and/or images that may be stored or programmed or sent to the inventive image; they may activate devices that emit or record images, text or sound such as camera(s), they may enable one or more other formal elements of the image support or the inventive image to be changed or modified (such as its coloration, its light properties, its shape, its display, its sound, its texture, its movement, etc.), they may stimulate, activate, trigger or influence another kind of change in the inventive images, etc. The interactive inventive images made using these embodiments might be paintings or sculptures or other works of fine art. They may have utilitarian functions. The examples of interactive features listed above suggest some of these, e.g., use as a communications device, use for recording, storing and displaying information and images, use as lighting that can be changed, use for presenting moving or video displays or images, etc. In addition or instead, the inventive images made in these embodiments might function as chairs, tables, walls, windows, partitions, books, floors, murals, etc. As a more specific example, an inventive image made in these embodiments might be a wall or a partition that is at least partially transparent but preferably largely or completely transparent. Its touch controls might be so integrated into the inventive image's form and design that they may appear to be continuous with the rest of the design such that they may or may not be readily noticed as touch controls, e.g., they may not look like buttons, keys or controls on a keyboard, keypad or other device. Inventive images in these embodiments might be enhanced with other features described herein and/or described in U.S. Patent Application No. 20030035917-A1 such as further processing with additive and/or subtractive processes, coloration, light sources like OLEDs, other LEDs or EL Lamps; batteries or thin film batteries, transistors or TFTs, nanomaterials, etc.

In other embodiments, inventive images have a smart material, one or more sensors and/or a fabric strain gauge that is sensitive to being bent or extended, and/or that measures the degree to which it is bent and/or extended. Such materials, sensors and/or fabric strain gauges might or might not employ nanotechnology and they might or might not be nanomaterials or have nanomaterials. Once bent and/or extended, the image might respond in a manner predetermined by the image maker, e.g., the image might play a sound, change its light properties, move, etc. Examples of this technology are made from conductive elastic by Eleksen at www.eleksen.com. The use of such technology might make inventive image interactive, and it might determine their forms or part of their forms, e.g., their forms might be made to interact with viewers, such as image parts made to be stepped on, sat on, pressed, pulled, twisted, etc. Piezoelectric, piezorochromic and/or piezochromism materials for use in embodiments might also respond to bending and/or extending. Refer to the descriptions herein.

In embodiments, inventive images are made with movement or gesture recognition technology, and/or with sound or speech recognition technology. This technology might for example, be made with sensor(s), camera(s), sound recording and/or playing devices, other sound technology, computer(s), computer part(s) or part(s) similar to those used in computers; it might be made with wireless systems or devices, other technologies, combinations of these, etc. This technology may or may not employ nanotechnology and it may or may not have nanomaterials, e.g., some or all of it might be a nanomaterial; it may have one or more sensors, cameras, computers, other devices or parts that are nanoscale or that are nanomaterials visible to the unaided human eye; it might have other kinds of nanomaterials, etc. Also, this technology might enable the inventive image to be responsive, and the response might be of any kind. Examples of this technology may or may not require viewers to touch or have physical contact with any part of the inventive image to activate the technology.

Movement or gesture recognition technology may enable a viewer or viewers to make one or more movements or gestures or certain kinds of movements or gestures, and have the inventive image detect or receive the gesture. Sound or speech recognition technology may detect or receive sound or speech or certain kinds of sound or speech from a viewer or viewers. Once either or both kinds of technologies are activated, the inventive image might then respond in any manner or manners the image maker has devised, provided the image maker has enabled this responsive feature. For example, the inventive image may record the gesture or sound, it may read sign language or interpret speech, it may respond with light, sound, information, speech, music, color, movement, it may change one or more of its aesthetic properties to any extent, it may convey the gesture and/or the sound or an interpretation of either or both of these to another location, it may respond using wireless communication or the Internet, it may respond in other ways, or in a combination of these ways.

Examples of movement or gesture recognition technology might be called capacitive sensing technology, 3D capacitive sensing technology, active capacitive sensing technology, gesture recognition technology, computer vision system, human hand gesture recognition, human body motion recognition, motion recognition, sign language recognition, facial gesture recognition, face recognition, pattern recognition, detection technology, sensing technology, etc. Refer to EtherTouch of Cranford, N.J. and South Africa at www.ethertouch.com.

In embodiments, at least one intangible holographic display or hologram comprised of light is part of inventive images. Because they have no tangible form, and because tangible form may not be physically connected to them or touching them, such holograms may appear to be floating, and they may dematerialize the space of an inventive image, an effect which may depend on the rest of the inventive image. The intangible holographic displays of these embodiments might appear two dimensional or three dimensional, they might appear to move, they might be displays that change over time, they might be accompanied by sound, they might be controlled by a computer, by sensors, they might be controlled remotely from one or more locations other than where the holographic display(s) appear, or a combination of these. The other part or parts of the inventive images in these embodiments (e.g., the tangible part, the part containing one or more polymers, or the part or parts that create the intangible holographic display), may or may not be visible to viewers, e.g., these image parts may be hidden from view, for instance, hidden in the wall, in the ceiling, in the image's mount or base, located in a remote place, etc. Polymer might be used in these embodiments for example, as one or more image supports, in the form of one or more photographic layers (e.g., with holograms recorded on them by lasers), as a colorant, as another image part, or a combination of these.

In some of these embodiments, the intangible holographic display or hologram (which may appear to be floating), is interactive and/or responsive. In these embodiments, light, sensors, computers or related materials, projector, other devices, movement or gesture recognition technology, touch controls, and other inventive image ingredients used to form or process the holograms and to enable them to function interactively and/or responsively are stabilizers. The holograms in these embodiments, might or might not require that the space they are viewed in be darkened or dark. In examples, the viewer may touch a part of the intangible two or three dimensional hologram and it may respond by changing its display (e.g., its light, its color, its rate of change, its subject matter, its sound, etc.). In addition or instead, the image may respond by activating a physically separate, tangible device and/or inventive image part (such as a computer, a device that creates other light effects, a device that provides sound, a device that causes an image part to move, an electrical device, a light emitting device such a LEDs or OLEDs, combinations of these, etc.). Such tangible devices or inventive image parts may or may not be visible or completely visible to viewers who perceive their effects (e.g., viewers may see or hear the light or sound that might emanate without seeing the device producing it).

As examples, inventive images might be made in these embodiments using technology by: (a) Robert Douglas McPheters such as that described in U.S. Pat. No. 6,377,238 entitled "Holographic control arrangement," (b) Holotouch Inc. of Darien, Conn. (refer to www.holotouch.com), (c) Atlantex Corp of Hillsdale, N.J., such as HoloTouch or HoloTouch user interfaces, and Beam One or BeamOne holographic user interface (see www.holodemo.com and the document that can be downloaded there: BeamOne-Datasheet.pdf), (d) HologramTV.com of Clearwater, Fla. (refer to www.3dtv.tv or www.hologramtv.com), (e) technology used by InfoPerks LLC an affiliate of Green Hills Ventures of NY, and/or (f) technology similar to these examples, (all of which are for making items other than images, such as information and communication devices, telephones, computer monitors, ATM machines, medical devices, information kiosks, instruments controlled with keypads and buttons, etc.).

In other embodiments, tangible holograms are used in inventive images. Examples are holograms that are printed onto inventive image surfaces (such as onto image supports). Other examples are holograms that are projected onto the inventive image or part thereof such as holograms made using materials and/or technology from G+B pronova GmbH of Bergisch Gladbach Germany at www.holopro.com like Holopro. Refer also to examples in U.S. Patent Application No. 20030035917-A1.

In embodiments, inventive images are made using holographic colorants. In addition to the examples already provided, inventive images might be made with holographic pigments such as Geometric Pigment from Silberline Manufacturing Co., Inc. of Tamaqua and Lansford, Pa. (refer to www.silberline.com), and Spectratek Technologies Inc. of Los Angeles, Calif. (refer to www.spectratek.net). Geometric Pigment is made from clear polyester that has been holographically embossed and vacuum metallized, then epoxy coated and specially micro-cut into different pigment flake sizes. In embodiments, other products from Silberline Manufacturing Co., Inc. and from Spectratek Technologies Inc. are used to make inventive images, e.g., for effects of light and color.

In embodiments, inventive images might be made using a conductive polymer or an electrically conductive polymer with a conductive center (e.g., made of PEDOT) and two non-conducting end pieces. Such a polymer might be able to dissolve or disperse in solvents, in organic solvents and/or in non corrosive chemicals. It might be able to attach new compounds and/or specialized molecules to its end pieces, thereby enabling new molecules to be synthesized and/or additional functionality to be added. Such a polymer might be able to be photo-crosslinked or cured with Ultraviolet (UV) light, or may be crosslinked or cured by adding heat. The degree of curing or crosslinking can be anywhere from about 5 to about 100%, and it might be determined by any test(s) or method(s). Such a polymer may not be conductive until after a dopant is added to make it conductive. It might be applied by printing, and/or other methods described herein and in U.S. Patent Application No. 20030035917-A1, e.g., to serve purposes described herein and in U.S. Patent Application No. 20030035917-A1, such as for displays, flexible displays, circuits, OLEDs, solar cells, other devices, conductive fabrics, etc. Refer to Oligotron by TDA Research Inc., Wheat Ridge, Colo. (see www.tda.com).

The polymers or the conductive polymers used in inventive images in embodiments may range in strength from quite weak and/or brittle to being as strong as steel or stronger than steel. As examples, conductive polymers used in many applications in inventive images such as OLEDs may be quite weak due to their own structure and/or due their extremely thin application, as are many absorbent polymers. Polymers and conductive polymers can be made, designed or engineered to be strong or extremely strong. For example polymers and conductive polymers with highly aligned polymer chains can be as strong as steel or stronger in inventive images. In addition or instead, the use of other ingredients in polymers, in conductive polymers, with polymers, and/or with conductive polymers can make them stronger or significantly stronger in inventive images. Examples of such strengthened polymers and conductive polymers are those with nanomaterials added into them such as CNTs, nanoparticles, nanowires, nanorods and/or nanocrystals. For instance, because of the extraordinary strength of CNTs, a CNT polymer composite can be as strong as steel or stronger. Refer to further description of nanotechnology in inventive images below. Also, the use of other ingredients with polymers and with conductive polymers in inventive images can make them as strong as desired, e.g., the use of strong image supports and/or strengthening stabilizers with polymers and with conductive polymers. Polymers and conductive polymers that are strong, that are about as strong as steel, or that are stronger than steel might be opaque, transparent and/or translucent. They may for example, be used as image supports (e.g., stabilizers), they might be used for part or for all of the structures and/or the forms of inventive images, and/or they might be used in inventive images which serve structural functions, e.g., they might be used in inventive images which support their own weight and/or the weight of other forms, they might be used in freestanding inventive images, and in addition or instead, they might be used in inventive images that function as walls, floors, chairs, tables, doors, partitions, etc.

Among further examples of materials for making inventive images that might be obtained from Sigma Aldrich of Milwaukee Wis., are examples listed in "New deposition substrates from Aldrich" describing single crystal substrates and ITO coated substrates online in SellSheet_deposition_materials.pdf at www.sigma-aldrich.com.

In embodiment, inventive images or parts thereof are made with transistors, which may or may not also serve as image supports that might be stabilizers. These may or may not be nanomaterials, and they may or may not be nanoscale, refer to further description below. These might or might not, be or have nanomaterials. TFTs, organic transistors, polymer transistors, conventional transistors, flexible transistors, organic or polymer TFTs that may or may not be flexible, or other transistors might be desirable in inventive images. Among examples are polymer transistors or conductive polymer transistors that are printed or ink jet printed on substrates or image supports (e.g., stabilizers) which might be rigid or flexible, such as those by The Palo Alto Research Center (PARC) in Palo Alto, Calif. (www.parc.com). Thus, the transistor can be rigid or flexible, it might also have light properties, such as light emission. Transistors that might be thin and/or flexible made with silicon might also be used in inventive images. Some examples of transistors are opaque, though the examples often preferred are transparent and/or translucent, e.g., they are particularly desirable for use in transparent or translucent inventive images or parts thereof, such as image supports (e.g., stabilizers). In inventive images, transparent and/or translucent transistors are preferably stabilizers, particularly in transparent and/or translucent polymer image supports and image support stabilizers.

As further examples, inventive images have transparent transistors that might be thin film and/or flexible, or even foldable, made using: a transparent amorphous oxide semiconductor, amorphous heavy-metal cation multicomponent oxides, zinc oxide, zinc tin oxide, indium gallium zinc oxide, an amorphous indium gallium zinc oxide compound, and/or a single-crystalline thin film of InGaO3(ZnO)5 (indium gallium oxide-zinc oxide) that might be combined with amorphous hafnium oxide as a gate insulator. These might for example, be made from the In—Ga—Zn—O system (a-IGZO) for the active channel in transparent TFTs. The image support or image support stabilizer used might be polymer or a polymeric composition, e.g., a polyethylene terephthalate. Fabrication might be done at, near or just above room temperature, thus transistors might be made on a polymer image support without it melting. Refer to transparent transistors made at Hewlett Packard and Oregon State University, both of Corvallis, Oreg. (see John Wagner's research at http://eecs.oregonstate.edu/research/members/wager/research.html and his publications at http://eecs.oregonstate.edu/research/members/wager/pubs.html), e.g., see Applied Physics Letters 2003, by Randy Hoffman, Ben Norris and others. Refer to "Room-temperature fabrication of transparent flexible thin-film transistors using amorphous oxide semiconductors" Nature 432, 488-492 (25 Nov. 2004) by K. Nomura, H. Ohta, A. Takag, T. Kamiya, M. Hirano and H. Hosono. Refer to Oregon State University news release, via EurekAlert, Dec. 28, 2004; Applied Physics Letters, Volume 86, Issue 1, Jan. 3, 2005; Journal of Physics D: Applied Physics, Volume 36, Number 20, Oct. 21, 2003; and Journal of Physics D: Applied Physics (37, 2810-2813). Refer to work done at Dupont of Wilmington, Del., at Tohoku University of Sendai, Japan, and at Tokoyo Institute of Technology in Yokohama, Japan. Refer to the work of Hideo Hosono and colleagues at the Tokoyo Institute of Technology such as "Thin-film transistor fabricated in single-crystalline transparent oxide semiconductor" H. Hosono et al. 2003, Science 300 (May 23), 1269-1272. Refer to U.S. Patent Application Nos. 20030218221 and 20030218222 both dated Nov. 27, 2003, both by John Wagner et al., and both titled "Transistor structures and methods for making the same." Refer to these U.S. Patent Applications: No. 20040127038, dated Jul. 1, 2004, Peter Francis Carcia, et al., "Transparent oxide semiconductor thin film transistors"; No. 20040155846, dated Aug. 12, 2004, Randy Hoffman et al. "Transparent active matrix display;" No. 20020105080 dated Aug. 8, 2002 by Stuart Speakman titled "Method of forming an electronic device;" No. 20030076649 dated Apr. 24, 2003 also by Stuart Speakman and also titled "Method of forming an electronic device;" and finally No. 20030111663 dated Jun. 19, 2003 by Shigeru Yagi titled "Thin film transistor and display device having the same". Also refer to three U.S. patents; U.S. Pat. No. 6,713,785 dated Mar. 30, 2004 by Shigeru Yagi titled "Thin film transistor and display device having the same;" U.S. Pat. No. 6,727,522 dated Apr. 27, 2004 by Masashi Kawasaki et al. titled "Transistor and semiconductor device;" and U.S. Pat. No. 6,503,831 dated Jan. 7, 2003 by Stuart Speakman titled "Method of forming an electronic device." Further examples of transistors might be made using other heavy metals such as gold, silver, mercury, arsenic or lead. As an illustration, transparent transistors might be used in a wide range of transparent and/or translucent inventive images and image supports (e.g., stabilizers), such as those used to make paintings, sculpture, murals, colored inventive images, partitions, walls, books, graphics, fashion design; for OLEDs, computers, displays, and electronics in inventive images, and for other formal elements in inventive images.

Other desirable transistors for use in inventive images are those or are similar to those described in "Fabrication of Arrays of Organic Polymer Thin-Film Transistors Using Self-Aligned Microfluidic Channels" Advanced Materials, Nov. 17, 2003; in the Oct. 2, 2003 issue of Advanced Materials; and in "Elastomeric Transistor Stamps: Reversible Probing of Charge Transport in Organic Crystals" Science, Mar. 12, 2004. Transistors might enable electronic devices and/or other devices, systems and/or structures to be built into inventive images, providing them with any of a wide range of functions, e.g., these transistors might be used in displays such as flat panel displays, in the transmission of visual information, in electronic devices that require control, logic, switching and other transistor functions, etc.

In embodiments, inventive images are made with semiconductors, integrated circuits, polysilicon TFTs (poly-Si TFT), and/or poly-Si TFT backplanes. These might be used on polymer image supports (e.g., stabilizers) that might be flexible. Nanotechnology and/or nanomaterials may be used to make these, see the description below. Examples are made by or made using technology by FlexICs Inc. of Milpitas, Calif.

In embodiments inventive images or parts thereof are made with polymer electronics, organic electronics, or organic inorganic hybrid electronics. Polymer electronics may or may not contain silicon. Such electronics might be partially or entirely made with one or more polymers, such as non conductive or insulating polymer(s), semi conductive polymer(s) and/or conductive polymer(s). They might contain nanomaterials, such as nanotubes, nanowires, nanocrystals, nanoparticles or semi conducting nanoparticles (refer to further description below). The use of nanomaterials in electronics in inventive images are stabilizers. Nanomaterials are also smart materials that enable inventive images to be smart. Examples of polymer electronics or part thereof might be produced by direct writing, printing process(es), ink jet printing, lithography, gravure, solution processing, spraying, spin coating, and/or by roll to roll process(es) on inventive images or image supports (e.g., stabilizers), and might be flexible, rigid, polymeric, non-polymeric, a combination of these, etc. Polymer electronics may for instance, be active or passive devices, semiconductors, circuits, integrated circuits, transistors, TFTs, TFT circuits or TFTC, optoelectronic devices, computer components, memory, computer chips, backplanes, active matrix backplanes, passive matrix backplanes, circuit components, connections (e.g., resistors, capacitors, diodes, inductors, sensors, transducers, polymer interconnects, and via-holes), etc., all made with conductive or semi conductive polymer. Polymer electronics might for example be used in inventive images for features described herein or in U.S. Patent Application No. 20030035917-A1, such as OLEDs, other light sources, reflective displays, e-materials, other effects of changing light and/or color, interactive features, responsive features, sensors, computers, wearable computers, etc. As an example, polymer active matrix backplanes and/or polymer semiconductor transistor arrays might be used in inventive images, partially or entirely made or patterned by ink jet printing, e.g., made by PARC or made using technology by PARC. For instance, inventive images might have printed semiconductor circuits by Lucent Technologies Inc.'s Bell Labs in Murray Hill, N.J. Another example is polymer memory such as that made with polyethylenedioxythiophene or PEDOT. Refer to "A polymer/semiconductor write-once read-many-times memory" by S. Moller, C. Perlov, W. Jackson, C. Taussig and S. Forrest in Nature 426, 166-169 (13 Nov. 2003). Also refer to Nature, Oct. 12, 2003. Further examples of polymer electronics for use in inventive images are made by or are made using technology by Plastic Logic of Cambridge, UK. Refer to www.plasticlogic.com. As an illustration, different polymers might be used in polymer electronic circuits for inventive images. Conventional insulating polymers might be used in transistor gate dielectric layers and interlayer dielectrics. Conjugated, semi conductive polymers might be used in the active switching layers, and highly doped conductive polymers might be used in the electrodes and interconnects. Polymer electronics conventionally used to make smart cards, smart labels, smart tags, smart packaging, electronic paper, radio frequency identification (RFID) and the like might be used as desired to make inventive images. Examples of these might be made with nanomaterials and/or nanotechnology. Also refer to examples of polymer electronics made by Polymer Vision in the Netherlands and at www.polymervision.com and http://polymervision.nl/. In an illustration, polymer backplanes, polymer active matrix backplanes, polymer passive matrix backplanes, TFT backplanes, flexible backplanes, flexible active matrix backplanes, and/or backplanes that are a combination of these, are used in inventive images. These might be very thin, lightweight, and/or rugged such as in OLEDs, organic electronics, or e-materials. Examples are polymer backplanes made by Plastic Logic, Ltd., Royal Phillips Electronics of Sunnyvale Calif. and Rolltronics of Corp of Menlo Park, Calif. Further examples are by E-Ink Corp., e.g., see U.S. Pat. Nos. 6,498,114; 6,422,687; and 6,413,790. Inventive images might be made using materials processes and/or other information from IDTechEx Ltd publications, IDTechEx Ltd conferences and from exhibitors (exhibiting companies) at these conferences, refer to IDTechEx Ltd of Cambridge UK at www.idtechex.com. Examples are publications from their conferences, e.g., on "Printed Electronics 2004", "Printed Electronics Europe 2005," "Printed Electronics," "Smart Label Europe 2005," "Smart Labels 2005," and publications from future versions of these conferences. Among other IDTechEx Ltd publications that might be useful for making inventive images are their reports, such as: "The A to Z of Printed and Disposable Electronics" By Glyn Holland, Dr Peter Harrop and Raghu Das (new in April 2005); "RFID Forecasts, Players and Opportunities" By Dr Peter Harrop and Raghu Das; "Smart Label Revolution" by Dr Peter Harrop and Raghu Das (2004 edition); "Future of Chipless Smart Labels" By Dr Peter Harrop and Raghu Das (2004 edition); "Smart Packaging" By Dr Paul Butler (2004); "Electronic Smart Packaging" By Raghu Das; "Active RFID and its Big Future" By Dr Peter Harrop; "Printed Electronics" By Dr Peter Harrop and Raghu Das; later editions of all of these, as well as regularly updated subscription publications by IDTechEx Ltd, such as: "Smart Labels Analyst"; "Smart Packaging Journal" and "RFID Knowledgebase Case Studies" by Dr Peter Harrop, Glyn Holland, Raghu Das, Mr Ning Xiao and Corinne Jennings.

In an embodiment, inventive images are made with RFID, they are made using RFID technology or systems, or they are made using similar technology. In inventive images RFID may be smart materials and inventive images that have them may be smart too. RFID offer inventive images another way to be responsive and/or interactive. RFID in inventive images might have antenna, sensors, batteries, chips, polymer electronics, e-materials, solar cells, photovoltaics, etc., and they may be small, thin, aesthetically desirable, not visible in the inventive images, etc. RFID in inventive images might be passive or without their own power supply. Such RFID may have a minute electrical current induced by the incoming radio-frequency in the antenna providing enough power for a brief response to be sent. In addition or instead, inventive images may have active RFID that have their own power source and that may have longer ranges and bigger memories, e.g., to store information.

In embodiments, conductive inks are used in inventive images or parts thereof such as polymer image supports that might be thin, very thin, films, thick, flexible, rigid, transparent, translucent and/or opaque, and that might be stabilizers. Examples of conductive inks are made using conductive (semi conductive) polymer. It is preferred that conductive ink that serves as a stabilizer and/or as a smart materials herein be made with (i). a conductive or semi conductive polymer, (ii). one or more nanomaterial(s), or (iii) a combination of (i) and (ii). It is preferred that nonpolymeric conductive ink not be the basis by which images made with it are designated inventive images, unless it contains nanomaterials, this might be called, nonpolymeric, non-nanotech conductive ink. and though it may be insulated with non-conductive polymer, this insulation would not be a stabilizer and it would not make the conductive ink a stabilizer. Examples are stabilizers in inventive images. Non conductive or insulating polymer and/or other ingredients might be used in and/or with conductive inks in inventive images as well. Conductive ink may for example be printed or patterned onto an image support (e.g., stabilizer) forming a design (e.g., a linear design) on it that may carry electricity and that may or may not be visible in the finished inventive image. Examples are semi conductive inks that might be printed or patterned onto a polymer sheet, layer or film or onto metal, any of which might be flexible or rigid. Examples are liquid processable materials. Processing of conductive inks might be able to be done at low temperatures, at room temperature and/or in open air. Examples are applied using ink jet printing, brushes, spin coating, screen or stencil printing processes, offset printing, other liquid deposition techniques, etc. These embodiments might for example, be used to make circuits, transistors, OLEDs, e-materials, backplanes, other electrically active forms, semi conductors, polymer electronics, etc. In some inventive images or parts thereof, transparent conductive inks or use of conductive inks in amounts that enable them to be transparent or minimally visible are preferable.

Some of the inks in these embodiments might contain nanomaterials (such as nanotubes, nanoparticles, etc.) making these inks nanomaterials and smart materials. Nanomaterials might enhance or provide their conductivity, self assembly capability, and/or other properties (refer to the examples below) e.g., nanotubes, nanoparticles, semi conducting nanomaterials, nanomaterials made with polythiophene, etc. in the inks. Refer to the conductive inks and related products by Xerox Corporation's Research Centre of Canada (see www.xerox.com), such as their semi conductive ink, their conductor and their dielectric, all of which might be ink jet printed (e.g., to form a polymer circuit or transistor), and such as the work by Beng Ong.

In embodiments, inventive images are made with one or more magnets comprised of polymer and/or of conductive polymer. Such magnets might have metal or they might be non-metallic. It is preferable that they function at room temperature or outdoors in normal weather conditions. Examples of such magnets are made with PANiCNQ which is a combination of the two compounds emeraldine based polyaniline (PANi) and tetracyanoquinodimethane (TCNQ), e.g., refer to polymer magnets developed by researchers at the University of Durham in England.

In embodiments one or more batteries, energy cells or thin film batteries are used in inventive images, referred to herein as batteries. These might for example be made of printed ink, conductive ink, insulating polymer, conductive polymer and/or semi conductive polymer. They might be made on or with an image support (e.g., stabilizer). Those batteries made with conductive and semi conductive polymer are stabilizers in inventive images. Batteries in these embodiments may be rechargeable, they may have a long life, and they may be considered dry and thus they may or may not have the metal casing common in other conventional batteries. Batteries in inventive images may be any shape or size (they do not have to be bulky) and they may be flexible or rigid. They might be custom made or designed for inventive images. For example, they might be thin and flat, with any shape desired. They might be made right on an inventive image or part thereof, such as on or in an image support and/or in or on a textile or fabric. For example, a battery might be made in or as part of the fibers of a textile in an inventive image, e.g., it might be made in layers on or in fibers which might be thin or very thin, for instance, the conventional anode, cathode and electrolyte might be on or in fibers. Thus a battery might for example be woven into a textile for an inventive image. Batteries used in inventive images might also be stand alone batteries, e.g., attached to inventive images or parts thereof. The size and shape of a battery might be incorporated into the design of an inventive image, e.g., so that they are visible and contribute to the aesthetic; so that they are hidden from view; or so that they are partially visible contributing to the aesthetic and partially hidden from view. For instance, an inventive image might have one or more of these batteries that is circular, that is in a recognizable shape (like that of a peanut or a half moon), or that forms a border around some or all of the inventive image's perimeter edge.

In one example, one or more batteries or products similar to these used in an inventive image are made with at least one semi conductive or conductive polymer, and/or with a conductive ink. These conductive polymer batteries might for instance be encased in polymer and/or glass. Refer to conductive polymers in U.S. Patent Application No. 20030035917-A1.

In another example, one or more batteries or products similar to these are used in an inventive image made by or made using technology by Power Paper (www.powerpaper.com) of Kibbutz Einat, Israel, or Thinergy in Hong Kong. For example, such a battery may be made with zinc and manganese dioxide (MnO2). They might be fabricated from inks. Such batteries might be made (e.g., printed or adhered), onto image support (e.g., stabilizers) of many kinds, and/or onto inventive images. They might be made without a metal casing or without another casing. Such batteries might be very thin, e.g., about 0.5 mm thick, and 1.5 volts. They might be flexible, e.g., they might be on polymer film image supports (that might be stabilizers). In addition, custom Power Paper batteries can be made for the specifications of specific inventive images.

In examples, one or more batteries, power cells or products similar to these are printed onto natural polymers (like paper), synthetic polymer or both in forming an inventive image.

In another example, batteries for use in inventive images are lithium cells made with polymer (or tiny carbon rods), or they are made with lithium and polymer. For instance, such batteries might be made using compositions and/or processes developed by Marc Madou of the University of California at Irvine and his colleagues. Refer to "Plastic heralds next-generation batteries" by Jim Giles, Feb. 17, 2004, in Nature (see www.nature.com or to www.nature.com/nsu/040216/040216-5.html, and to the American Association for the Advancement of Science Seattle, February 2004).

In a further example, batteries in inventive images are made by or made using technology by Cymbet Corp. of Elk River, Minn. (refer to www.cymbet.com). Examples of these are thin film based solid state lithium ion rechargeable batteries which might be made on or in an inventive image or part thereof, or as a stand alone batteries added to an inventive image. These Cymbet batteries might be microscopic or macroscopic. For example they might be as thin as about 5 to 25 microns, and they might have an area from about 0.1 square micron to about 10 square meters. Among the other features which might be obtained from Cymbet batteries are a very high energy density (up to 300 watt hours per kilogram and up to 900 watt hours per liter), a great many recharge cycles (70,000 demonstrated to date), fast recharging, etc., refer to the website, www.Cymbet.com. Batteries for use in inventive images may be made using nanotechnology, refer to the description below.

In another example, inventive images are made with one or more batteries, electrochemical cells, thin film batteries or rechargeable thin film batteries made by or made using technology by Infinite Power Solutions of Golden Colo. (refer to www.infinitepowersolutions.com), by B. J. Neudecker, by N.J. Dudney, and/or by J. B. Bates. Examples are LiTE*Star batteries, e.g., some of which are not flexible, they might be about 10 to 20 mil thick, and some of which are flexible and might be less than about 5 mil. thick. LiTE*Star batteries may be custom made to integrate into the inventive image as desired. In further examples, polymer electrochemical systems or batteries; or flexible and extremely thin lithium polymer batteries are used in inventive images by Solicore Inc. of Lakeland, Fla. (refer to www.solicore.com or to the Flexion brand, www.flexionbatteries.com). Examples of these are Flexion batteries which might be thin (e.g., as thin as about 0.3 mm), flexible, high energy, rechargeable, dry, safe, which might operate over a wide temperature range, and which might be made in any shape or form desired for inventive images. Further examples are thin batteries made by Thin Battery Technologies in Parma Ohio, who are developing a battery less than about 1 mm thick using technology from Eveready Battery Co.

Batteries might serve many purposes in inventive images. As examples, batteries might be used for many of the inventive image variations described herein which require energy. For instance, inventive images might have batteries, such as thin film batteries, for OLEDs, e-materials, reflective displays, E-Ink displays, Sipix technology, responsive polymers, EAPs, electrochromic systems or effects, other electroactive effects, paint-on LCDs, CLC, EL lamps, other smart features, holographic displays, projections, semi conductive polymers, sensors, other light sources, other interactive features (e.g., sound effects), energy storage, other variations described in U.S. Patent Application No. 20030035917-A1, a combination of these and/or other uses. Batteries and the energy they provide might be stabilizers in inventive images.

In embodiments, inventive images are made with photovoltaics such as solar cells or panels, and/or light detectors. Preferred examples are organic, polymeric, and/or made with conductive or semi conductive polymer. In other examples, inventive images might have thin film silicon solar cells; photovoltaics made with crystalline silicon (such as those by Solaicx of Los Gatos, Calif., refer to www.solaicx.com); and/or solar cells based on amorphous silicon solar technology that might be partially or entirely transparent or translucent, such as PV-TV by MSK Corporation of Tokoyo, Japan, refer to www.msk.ne.jp. Photovoltaics made with nanotechnology and/or nanomaterials are preferable for inventive images, e.g., solar cells made with polymer and nanomaterials or with polymer nanomaterials. Some preferred examples of solar cells for inventive images can convert both outdoor and indoor light into electricity. Photovoltaics might for example, be made or partially made by printing, ink jet printing, screen printing and/or a roll to roll process. They might be made on image supports that might be polymeric, e.g., stabilizers. Photovoltaics might flexible, rigid, opaque, translucent and/or transparent. If the are visible in inventive images, they are preferably aesthetically integrated and desirable.

Energy or electricity produced by solar cells might be used right away, or some or all of it might be stored and used as needed, e.g., in a battery that might be rechargeable and/or that might be a thin film battery, refer to examples herein. In examples, inventive images with solar cells may function as murals, paintings, drawings, prints, walls, windows, as other planar images, textiles, clothes, sculptures, ceilings, as inventive images with one or more sides outdoors, etc. Inventive images may use energy or electricity from solar cells for any purpose, examples are for other formal elements in the same inventive image, such as for variations described herein and in U.S. Patent Application No. 20030035917-A1, e.g., for emitting light (like OLEDs, other LEDs, other light sources, etc.), for sensors, for electroactive or electrochromic features and effects, for displays such as reflective displays, for use with conductive or semi conductive polymer, and/or for interactive features (like computers, displays, e-materials, sound, movement, etc.).

In illustrations, inventive images may be made with photovoltaics, solar cells or solar technology from Cambridge Display Technology in England (refer to www.cdtltd.co.uk), from MicroFab Technologies in Plano, Tex. (refer to www.microfab.com), and/or from Konarka, Technologies in Lowell Mass. (refer to www.konarkatech.com and to further description below). Also, refer to "Self-organized discotic liquid crystals for high-efficiency organic photovoltaics" by L. Scmidt-Mende et. al., in Science, 293, 1119-1122 (2001).

In embodiments, electroluminescent (EL) lamps for use in inventive images are in the form of fabrics or textiles. In embodiments, electroluminescent (EL) lamps are used in inventive images from these companies: MetroMark of Minnetonka, Minn. (see www.metromark.com); Gunze USA of Austin, Tex. (refer to www.gunzeusa.com); BKL Inc. of King of Prussia, Pa. (refer to www.eluminate.com); and Visson Enterprises of Israel (refer to www.visson.net). Another source for EL lamps as well as other inventive image ingredients and materials is Edmund Scientific Co. of Tonawanda, N.Y. (refer to www.scientificsonline.com and www.edmundoptics.com). Also refer to www.elwire.com.

In embodiments, inventive images are made using at least one light source or light effect from Color Kinetics Incorporated of Boston Mass. (refer to www.colorkinetics.com). For example, inventive images might be made with one or more LEDs, which may be intelligent from Color Kinetics, and/or they might be made using intelligent LED based illumination technology from Color Kinetics. For example, these inventive images might use Color Kinetics' Chromacore technology and have microprocessor controlled LEDs generating light effects and colors (e.g., up to millions of colors).

Smart Materials Made Using Nanotechnology—Further Description

In preferred embodiments, nanomaterials are used to make inventive images or part thereof. Inventive images may be made with at least one nanomaterial of any kind, using nanotechnology and/or any other process(es) or means desired, and inventive images might be nanomaterials. Nanomaterials are smart materials. Inventive images or parts thereof made with nanomaterials preferably have one or more properties (i.e., formal elements) that are enhanced, improved, new, different, and/or unique in comparison to images made without nanomaterials like conventional images. Inventive images made with nanomaterials and/or nanotechnology may be smart.

As used herein the term nanomaterial (which might also be called nanostructure) refers to materials with physical phenomena, structural features, and/or construct structures that typically have at least one dimension measuring in the range called nanoscale which is roughly from about 1.0 nm (nanometer) or more preferably about 0.1 nm, up to about 100 nm, up to about 130 nm, up to about 200 nm, desirably up to about 350 nm, more desirably up to about 500 nm, preferably up to about 600 nm, more preferably up to about 750 nm, most desirably up to about 850 nm, and most preferably up to about 1000 nm (1 micron). Nanomaterials may or may not be nanoscale. Nanomaterials are materials, structures, devices, machines or systems of any size that are partially or entirely fabricated, engineered, controlled, manipulated, or designed on an atomic or molecular scale, atom by atom, molecule by molecule, or with atomic or molecular scale precision, such as by process(es) which might be called nanotechnology, molecular nanotechnology, molecular manufacturing, nanomanipulation, nanofabrication, submicron manufacturing or sub-micron manufacturing, submicron technology or sub-micron technology, bottom-up manufacturing, positional assembly, chemical synthesis, self assembly, and/or top-down manufacturing. Nanomaterials typically have properties considered novel, unusual and even extraordinary today, that are often due or due in part to the nanoscale size of their physical phenomena, structural features, and/or construct structures. These properties might be most apparent when the nanoscale range is below or around about 100 nm, though they can be apparent in the nanoscale range above 100 nm. Because of their novel, unusual and extraordinary properties nanomaterials typically have an ability or an extraordinary ability to change or to enhance other materials. Examples of nanomaterials have one or more macroscopic properties (which are formal elements) determined or enhanced by their molecular properties. Nanomaterials might be organic and/or inorganic. A nanomaterial might be comprised of one or more ingredients or components from a vastly diverse range of materials, such as one or more nanomaterials, nanoparticles, nanotubes, nanocrystals, nanowires, nanorods, nanodevices, polymers, carbides, oxides, nitrides, metals, alloys, ceramics, molecules, chemicals, atoms, composites, biological materials, other examples provided herein, and/or other examples. Examples of nanomaterials that might be used to make inventive images have names that begin with the prefix "nano," and that fit a nano[x] pattern, in which [x]=anything, e.g., [x] might be a word describing the nanomaterial, such as nanocrystal, nanotube, nanowire, etc. There are plenty more examples herein, online and in publications, and many more examples will come into existence. Any of these may be used to make inventive images. In addition, several dictionaries of nanomaterials are currently being written, the entries of which might be used to make inventive images, e.g., ASTM International of West Conshohocken, Pa., (see www.astm.org) is writing a dictionary of nanomaterials with Professor Vicki Colvin of Rice University in Texas. Although materials made using bulk technology and not nanotechnology, that have nanoscale physical phenomena, structural features, and/or construct structures (such as conventional cellulose paper, and conventional metal) may be used in inventive images as desired, it is highly preferred that they are not considered nanomaterials. In bulk technology, atoms and molecules are manipulated in bulk, (rather than individually or one by one). It is also highly preferred that natural materials of a size in the nanoscale range, and natural materials with nanoscale features, structures, and/or physical phenomena that have not been made, fabricated, engineered, controlled or designed by man using nanotechnology, are not considered nanomaterials. Among examples of these are bacteria, soot, and natural nanoscale materials in their natural material hosts, e.g., natural, unaltered rocks, plants, clay, shells, and minerals that naturally have unaltered nanoscale features, structures, and/or physical phenomena, such as nanocrystals or nanoparticles.

It is preferable that inventive images are macroscopic or visible to the human eye without unusual or extraordinary assistance, e.g., without a microscope. In preferred embodiments, at least two nanomaterials but typically many nanomaterials that may be nanoscale and/or macroscopic, the same and/or different, are used to make a material for an inventive image or part thereof that may or may not be nanoscale, such as a material made of CNTs, or a material made of CNTs and polymer. In preferred embodiments inventive images or parts thereof are made using a material that has at least one nanomaterial but typically many nanomaterials, and at least one other, larger, non-nanoscale, conventional, or macroscopic material or one material made using bulk technology, such as one or more polymers, metals, ceramics, glass, conventional image making mediums, and/or inorganic materials. These materials may be nanocomposites or hybrid nanomaterials. As examples, nanomaterials, like nanoparticles, nanostructured carbon, nanotubes, nanocrystals, nanofibers, clay nanomaterials, and/or nanostructures, might be added into polymer to form a nanocomposite, or they might be used with polymer (e.g., in layers) to form a hybrid nanomaterial for inventive images. The use of nanomaterials preferably improves and/or imparts one or more desirable formal elements to nanocomposites, hybrid nanomaterials, and inventive images. Nanomaterials, such as nanocomposites and hybrid nanomaterials might, for example, be used as image supports that may be stabilizers, they may be image parts, devices (like OLEDs or solar cells), coatings, layers, colorants, fibers, textiles, underlayers, interactive or responsive, and/or as other forms in inventive images. Detailed examples are forthcoming.

Nanomaterials for use in inventive images are preferably made, engineered, manipulated, or used for the properties (i.e. formal elements) they bring to, enhance in and/or enable in inventive images. Other factors may effect these decisions also such as: ease of use, cost, availability, technical and/or scientific issues, etc. It is preferable that nanomaterials enhance, enable or give inventive images: one or more desirable properties; one or more properties that they would not have otherwise; one or more properties that are novel and/or unique; that nanomaterials are the basis for or a contributor to the novelty and/or uniqueness of inventive images; or a combination of these. Moreover, it is preferable that nanomaterials have these effects on inventive images in a way that is aesthetically desirable, or at least in a way that is not aesthetically undesirable. In embodiments, it is often desirable that nanomaterials be used in a percentage or an amount that is at least sufficient enough to enhance, enable, create, modify or change one or more formal elements in the inventive image formed (in comparison to a comparable conventional image made without the nanomaterials, if one could be made). This may be done as desired. In some examples (such as some herein), it is reversible. Nanomaterials may for example, change, enhance and/or modify in response to viewers, e.g., interactively or not, using touch controls, gesture or movement recognition, sensors, etc. In an example, nanomaterials might self actuate, e.g., responding to an internal and/or external trigger or stimulant, such as programming, electricity, a change in light or temperature, or other examples herein.

In embodiments, inventive images are made with nanomaterials that enhance or impart improved or novel properties to inventive images in their use with other ingredients in these inventive images, such as polymers. An inventive image may for example, have new or improved properties from nanoscale structures, from the manipulation or development of nanoscale structures, and/or from the use or integration of nanomaterials with other materials such as larger materials, components, systems, architectures, nanocomposites, or hybrid nanomaterials where the improved or novel properties may be nanoscale, they may be at a smaller scale, and/or they may be at larger scale. For example, the improved or novel properties may be from the manipulation of atoms that might be under about 1 nm. or at about 0.1 nm, the improved or novel properties may be from may be from CNTs or nanoparticles under about 100 nm., or the improved or novel properties may be from the bonds or local bridges between the nanomaterials or nanoparticles and polymer that might be at about 200-300 nm. These are not limiting examples, the enhanced or new properties may also be present in other ways.

Nanoscale nanomaterials are so small that they are often invisible to the normal eye in inventive images, and often they need not be visible in inventive images to enhance them or to give desirable properties to them. Nanoscale nanomaterials may for example, not be visible in an inventive image or part thereof that is transparent and colorless, such as a transparent colorless polymer inventive image or part thereof, like a clear layer on an inventive image, or a clear image support that might be a stabilizer, e.g., CNTs may not be visible in a clear polymer nanocomposite or hybrid inventive image support. Alternately, nanoscale nanomaterials may be visible in inventive images and some may be desirable for the visual and/or optical properties they enhance or impart, e.g., effects of color and/or light. For example, they might be visible in inventive images when used in high percentages, in high concentrations and/or very close to one another, e.g., on inventive image surfaces, in transparent or translucent inventive images or parts thereof, or in inventive images or parts thereof made largely or entirely of nanomaterials. It is generally preferable that nanomaterials are not visible in inventive images or that their visibility is aesthetically desirable or at least not aesthetically undesirable. In embodiments, the use of some nanomaterials in inventive images may rely on their having at least one dimension that measures less than a wavelength of visible light. For example, nanomaterials used in embodiments (such as nanoparticles, nanowires, nanofibers, nanothreads, nanocables, and fiber optic nanomaterials), may have diameters that are less than wavelengths of visible light or substantially less than wavelengths of visible light. Examples might be made of silica. Light might be guided by such nanomaterials, light waves may flow around them.

In preferred embodiments, inventive images are made using nanomaterials that are not the same as, not similar to, and/or not comparable to: (a) conventional image making materials, or (b) materials that are not made on an atomic or molecular scale, or using nanotechnology. In other embodiments, inventive images are made using nanomaterials that are similar to or comparable to materials in (a) and/or (b) above. In preferred embodiments inventive images are made with nanomaterials enhance or give one or more properties in inventive images that are enhanced or new in comparison to (a) and/or (b), or different from similar or comparable materials in (a) and/or (b). In preferred embodiments, nanomaterials enhance or give inventive images one or more properties not similar to or not comparable to those of conventional images.

It is very desirable to make inventive images that use and/or exploit the enhanced, different, new and extraordinary features that can be achieved using the vast range of nanomaterials. Nanomaterials may for example, enhance, enable or give inventive images one or more improved, new and/or different structural, electrical, light, optical, temperature control, surface, physical, mechanical and/or bonding properties that might not be able to be comparably created using a conventional image making material. CNTs and nanocrystals have unusual electrical, mechanical, thermal, and light properties that might be desirable and useful in inventive images.

The use of nanomaterials and the use of nanotechnology in inventive images and/or in making inventive images are typically highly preferred stabilizers. Nanomaterials may be used as stabilizers at any percentage in inventive images. Energy used in conjunction with nanomaterials in inventive images is a stabilizer as are the means or devices that carry it (e.g., solar or electric energy used with CNTs, conducting nanowires, sensors, integrated circuits, other electronics, and devices made using nanotechnology, etc.).

The large surface area of nanoscale nanomaterials and of the nanoscale features that larger nanomaterials have in comparison to conventional materials, may be useful in embodiments. It may contribute to or enable desirable properties in inventive images that might be improved and/or new. For instance, the larger surface area of nanomaterials might enable interactions, properties, behaviors and effects in inventive images that are different from conventional materials that might enhance inventive images, such as increased chemical activity, greater solubility (e.g., in water or PRM), more durable surfaces, more uniform surfaces, more consistent coloration (e.g., better color mixtures, more subtle color gradations, etc.), enhanced bonding, enhanced performance (e.g., of devices), enhanced reactions, and/or enhanced interactions (e.g., between nanomaterials and other materials in nanocomposites, in mixtures, in the use of catalysts, etc). See other examples herein.

In preferred embodiments, nanomaterials are used to make image supports that might be polymeric (e.g., stabilizers), or that might be non polymeric (e.g., metal, glass, ceramic, stone, canvas, etc.). It is desirable that these nanomaterials enhance one or more properties in the image support; that they give it one or more properties that it would not otherwise have; that they give it one or more properties that are novel and/or unique; that they are the basis for or they contribute to the novelty and/or uniqueness of the image support; or a combination of these.

In an example, image supports that might be stabilizers for inventive images are made of polymer nanocomposites. These might for example be made of one or more polymers and one or more of: CNTs, SWNT (single-walled carbon nanotubes, or single wall carbon nanotubes); MWNTs (multi-walled carbon nanotubes or multi wall carbon nanotubes); C60 molecules or carbon 60; nanofibers; nanocrystals; nanoclusters; buckminsterfullerene; fullerenes; nanowires; nanorods; nanoparticles; buckypapers or other nanostructure(s). Such an image support might be transparent, translucent colorless, opaque and/or colored. Preferred examples of these image supports are made of light stabile polymer(s) (e.g., acrylic, PMMA) and/or polymer(s) made with UV light stabilizers and/or UV light absorbers. Inventive image supports might also be made using nanomaterials with paper and/or acid free paper (natural polymers). Such image supports might be made with any aesthetic variations (e.g., with other added ingredients). The nanomaterials might for example, strengthen an image support that might otherwise sag, bend, crack, tear, buckle (e.g., paper buckles) or be fragile or impermanent in other ways. In addition or instead, the nanomaterials might enable the image support to be electrically conductive, light emissive; thinner, less bulky, lighter in weight, and/or tougher or more resilient than it might otherwise be; interactive, responsive to viewers, and/or smart in other ways.

In a related example, a transparent or translucent polymer nanocomposite or hybrid image support made with nanomaterials might have enhanced or new properties. It might have enhanced tensile strength and rigidity which might enable its structure and/or its form to be more slight, thinner and/or lighter in weight than might be possible without nanomaterials unless strength, permanence and/or the aesthetic are compromised. Thus, using such an image support made with nanomaterials might enable the design of the inventive image's form to be determined more by aesthetics and less by structural concerns than might otherwise be possible, e.g., its form might be developed on a minimal yet strong image support by adding one or more materials that are not strong or not especially strong. The inventive image formed might have more of a sense of lightness and/or an aesthetic of light and space than might be possible without nanomaterials. In addition or instead, nanomaterials may enable this image support to produce, conduct, and/or store electricity (e.g., it may have photovoltaics made using nanomaterials, nanomaterials like nanotubes or nanowires functioning as conductive wires, an electrically active layer, film or coating, and/or it may have batteries or thin film batteries made using nanomaterials). In addition or instead, nanomaterials may enable this image support to emit light (e.g., it may have nanomaterials in OLEDs and/or other light sources). Refer to "Experimental trends in polymer nanocomposites—a review" by J. Jorda, K. I. Jacob, R. Tannenbaum, M. A. Sharaf and I. Jasiuk, in *Materials Science and Engineering A*, Vol. 393, Issues 1-2, 25 Feb. 2005, Pages 1-11.

In another illustration, nanomaterials can change or even transform otherwise conventional paper or canvas (e.g., cotton or linen) image supports (such as the kind of image supports conventionally used for drawing, painting, collage, cut-outs, sculpture, design, printing, etc.). These novel image supports might for example be nanomaterial paper composites or hybrid materials, and nanomaterial canvas composites or hybrid materials. Such nanomaterial paper or canvas image supports might not need additional reinforcement, e.g., they may not need a backing, a stretcher, a matt, a frame, etc. In addition, such novel image supports may offer new and desirable properties, for example, light properties, conductivity, the ability to be carved, enhanced rigidity, the ability to be self supporting, new and different reactions to superimposed applications (e.g., an enhanced ability to bond, not buckling, less expansion and contraction when applications are made, allowing more reworking of applications, more durability, etc.), electroactive features, interactive features, responsive features and/or other enhanced properties (see examples herein). Nanomaterials can enable conventional materials like paper, canvas or fabric, etc., to have new functions. As examples, paper or canvas inventive images or parts thereof made with nanomaterials may serve as lights, they may have structural functions (e.g., as doors, walls, partitions, etc.), they may provide information or enable communication, and/or offer other enhanced or new properties.

Further processing might be done as desired on the image supports in these embodiments, as well as on inventive images and other parts thereof made with nanomaterials or nanotechnology. As examples, applications or a surface preparation may be superimposed, such as colorants (like painting, drawing or printing), parts added like electrodes, sensors, touch control(s), button(s) switch(es), electronic devices, mount(s), and the like. Further processing might involve subtractive processes like carving, or incising. Refer to examples of further processing herein and/or in U.S. Patent Application No. 20030035917-A1.

Nanotechnology and nanomaterials enable the formation of novel and improved materials such as re-engineered conventional materials, completely novel materials, as well as materials that combine desirable properties of different materials that might not have ever been combined naturally and that may not have ever been combined before. Among these are nanomaterials, hybrid nanomaterials and nanocomposites, and inventive images with properties that are new or improved in comparison to conventional materials, that might be unlike any ever made in images before. As further examples, nanotechnology might be used to make nanocomposite or hybrid nanomaterials which are: combinations of organic and inorganic nanomaterials and/or materials; combinations of soft and hard nanomaterials and/or materials; combinations of glass and/or crystal with softer, stronger, less brittle inorganic nanomaterials and/or materials; combinations of ceramics and more flexible nanomaterials and/or materials; combinations of conductive and non conductive or insulating nanomaterials and/or materials; combinations of nanomaterials and/or materials with different visual or optical properties (such as different coloration and/or light properties); combinations of biological and non biological nanomaterials and/or materials (e.g., to make sensors, systems, processors, computer parts, memory, batteries, devices, or other materials that may or may not be nanoscale), etc. In another example, a nanomaterial made entirely of nanoscale components might be used to make an inventive image. As another example, nanorods of semi conductor materials may be soluble in liquids. If the density of such liquid containing semi conductor nanorods is high, it may be a novel liquid crystal.

Nanotechnology enables inventive images to be made using nanomaterials in the form of clusters of atoms (such as quantum dots, nanodots, and inorganic macromolecules); nanoscale grains (such as nanocrystalline, nanophase and nanostructured materials); nanoscale fibers (such as nanorods, nanotubes, nanofibrils, and quantum wires); nanoscale films; buckypaper, and combinations of these. Nanomaterials might for example be made of one or more: carbides, nitrides, oxides, borides, selenides, tellurides, sulphides, halides, alloys, intermetallics, metals, organic polymers, as well as composites and hybrid materials. Among the most preferred examples of nanomaterials and nanotechnology for use in making inventive images are: nanotubes; nanostructured carbon or nanocarbons; CNTs; SWNT; armchair nanotubes; zig-zag nanotubes; chiral nanotubes; MWNTs; vapor grown carbon fibers or vapor grown carbon nanofibers; continuous polymer nanofibers; C60, C60 molecules or carbon 60; graphite; nanofibers; nanomachines; nanocrystals; nanoclusters; nanocrystal clusters; nanoscale semi conductor crystals; nanofilms; buckminsterfullerene; fullerene or fullerenes; buckyball; quantum dots; quantum dots that generate light; emissive nanomaterials; OLEDs and other light sources made with nanomaterials; nanodevices; photovoltaics and solar cells made with nanomaterials; devices, machines and systems that are nanomaterials with improved and/or new properties from nanomaterials and/or nanotechnology (see examples herein); e-materials or reflective displays made with nanomaterials; nanoelectronics; nanocomputers; nanochips; nanosensors or sensors made with nanomaterials; smart materials or responsive materials made using nanomaterials; nanowires; conductive or semi conductive nanowires and CNTs; nanowires made using conductive polymers such as poly(3,4-ethylenedioxythiophene) doped with poly(4-styrenesulfonate) (PEDOT-PSS), POMeOPT, conductive polymer nanomaterials, etc.; polymer nanocomposites; hybrid nanomaterials made of nanomaterials with other materials; nanotube polymer composites; controlled crystallization processes and the nanomaterials made using these processes; heterogeneous and inhomogeneous nanomaterials, nanostructures and nanocomposites; homogeneous nanomaterials, nanostructures and nanocomposites; DNA controlled, altered, or engineered by man, artificial DNA; viruses; buckypaper; nanoparticles; and other nanostructures. In the context of this invention, it is preferred that CNTs, DWNT and SWNT are not classified as polymers, e.g., they are preferably not new kinds or new classes of polymers, of conductive polymers, or of block- and/or graft co-polymers.

Additional preferred examples of nanocomposites for use in inventive images are: CNT polymer composites; CNT polycarbonate composites; other polycarbonate nanocomposites; polyester nanocomposites; polystyrene nanocomposites; polyethylene nanocomposites; SWNT PMMA composites; MWNT PMMA composites; polyacrylic nanocomposites; other PMMA nanocomposites; MMA nanocomposites; absorbent polymer nanocomposites; smart polymer nanocomposites; quantum dot polymer composites; quantum confined atom polymer composites; nanotube polymer composites; conductive polymer CNT composites; other conductive polymer nanocomposites; nanomaterial silicon composites; polyaniline-SWNT composites; polymer SWNT composites; SWNT polymer fiber composites; polymer MWNT composites; nanofiber polymer composites; nanocrystal polymer composites; clay polymer nanocomposites; clay mineral polymer nanocomposites; nanocrystalline metal polymer composites; nanocrystalline steel polymer composites; nanometal polymer composites; hydrogel nanocomposites; nanoshell polymer composites; nanoshell hydrogel composites; nanotube polymer composite fibers, yarns, threads, ropes, wires, cables, textiles, fabrics, cords, meshes, and the like; etc. Further examples are the use of ceramic nanoparticles in polymer to form nanocomposites for use in inventive images (the ceramic nanoparticles may improve the polymer's mechanical properties). In addition, ITO nanocomposites made using ITO nanomaterials might be desirable for use in inventive images, e.g., for conductivity. For example ITO nanocomposites might be used in inventive images, such as in transparent or translucent inventive images parts like coatings, films, layers, or image supports, e.g., for antistatic purposes or for electrical image parts such as examples provided herein. ITO nanocomposites might be made using ITO nanopowders by Nanogate Technologies GmbH, Germany. In addition, any of these ingredient combinations might be used to make hybrid nanomaterials for inventive images rather than nanocomposites.

In preferred embodiments, inventive images are made with one or more layers, sheets, films, thin films, or buckypapers of CNTs, or of graphene. These might for example be made with CNTs, SWNT and/or DWNT. These inventive images may or may not have additional ingredients, e.g, they may or may not have polymer. They might be as thin or as thick as desired, and strong, rigid, flexible foldable, able to be rolled up, or a combination of these, they might be transparent, translucent or opaque, and they may have any of the properties described herein that their nanotubes offer, e.g., conductivity, electrical conductivity, excellent mechanical properties, thermal conductivity, etc. Refer to examples herein and refer to Science Aug. 27, 2004 pp 1273-1276, and to "Nanotube Films Suggest Alternative to ITO" in Photonics Spectra, page 28-29, November 2004. The nanomaterials of these embodiments, may for example, be image supports in inventive images. Whether they are image supports or not, such nanomaterials might be further processed in forming inventive images in any way desired, e.g., by additive and/or subtractive processes.

Nanomaterials for use in inventive images may be fabricated, engineered, manipulated, controlled, designed and/or further processed in any process(es). The already wide range of such process(es) is continuously expanding, there are examples herein and in the cited references. For instance, various kinds of nanomaterials might be grown, such as CNTs. Examples of CNTs might be made through methods such as arc discharge, laser ablation, chemical vapor deposition, a fast heating chemical vapor deposition process, ball milling, hydrothermal pressure, decomposition of buckyballs, annealing of soot, thermal plasma technology, striking a metal-impregnated carbon target with free-electron laser light, using catalysts (such as metal catalysts, metal nanoparticle catalysts, or particulate seeds of an iron and molybdenum catalyst), processes using ultrasound effects, in a carbon arc method, in a gas phase method, in a supported catalytic method, in a laser oven method, in an all gas phase process, and/or in a HiPco process, and other examples herein, etc. Refer to work done at Rice University and at Carbon Nanotechnologies Inc. both of Houston, Tex. Sol-gel processing might be used to develop CNTs in various ways, e.g., refer to NanoDynamics of Buffalo, N.Y. Examples of SWNT made using plasma-enhanced chemical vapor deposition (PECVD) may be high quality, produced at low growth temperatures, and a high percentage of them may be semiconductive, e.g., almost about 90%. There are many varieties of CNT which differ from one another and offer inventive images different properties, e.g., varieties of SWNT differ electrically, optically and chemically. Examples of nanowire for inventive images may be made in suspension or deposition processes. Suspended nanowires might be made in a vacuum chamber, such as by holding one or both extremities of the nanowire as it forms. Deposited nanowires might be deposited on a substrate of a different composition, such as metal atoms deposited on a nonconducting surface, or nanowires grown between electrodes (that might be metal) on silicon wafers. As an example, refer to Applied Physics Letters Feb. 23, 2004.

Nanoparticles might be made for inventive images by processes such as condensation from a vapor, plasma synthesis, chemical synthesis, solid state processes such as mechanical alloying, milling, ball milling or grinding, electrodeposition processes, sol-gel synthesis, biological processes, etc. Nanoparticles might be coated, typically to make them more useful in inventive images, (such as with hydrophilic or hydrophobic coating substances). Nanocrystalline materials for use in inventive images might be made and further processed using any methods, e.g., using pulsed laser deposition, electrodeposition, various kinds of chemical vapor deposition techniques, thermal spraying nanopowders into nanocrystalline coatings, powder compaction processes, crystallization of an initially amorphous material, severe plastic deformation processing techniques, etc. In an example, nanocrystals used in inventive images are made by introducing very large strains into a material, such as a conventional material or a material made with bulk technology. For instance, nanocrystals might be formed by strains caused by cutting tools and other machining tools, e.g., metal nanocrystals (like steel, tungsten, titanium, titanium alloys, copper, nickel alloys, other metals or a combination of metals), might be chips from machining, such as metal machining scraps or shavings from machining metal or from lathe machining. Metal nanocrystals like these may, for example, be added into polymer(s), ceramic(s), metal(s), other material(s), LEDs, other devices, etc., forming nanocomposites or hybrid nanomaterials for inventive images, that may have enhanced and/or new properties.

Nanomaterials used in embodiments may have a wide variety of compositions, sizes, forms, surfaces and/or structures, and these specifications may effect or determine their properties, and/or the properties or formal elements they might enhance or impart to inventive images. For example, when nanoscale, the fundamental properties of matter might be size dependant, e.g., nanomaterials of the same composition in different sizes may have different colors. In preferred embodiments nanomaterials are selected, made, grown, designed, engineered and/or controlled to optimize the properties they may enhance or impart to inventive images. Such processes expands the diversity of nanomaterials, the processes of their use, the properties they offer inventive images, the use of the formal elements in inventive images, the kinds of images that can be made, and probably the range of existent images as new properties from nanomaterials are most likely to enable new images to be made. It may for example, be desirable to control nanomaterials', composition, crystalline structure, orientation, particle morphology, surface, interface chemistry, chemical characteristics, host material, application or processing method, shape, size, length, geometry, conductivity, color, light properties, strength, defects or flaws, position in relation to another material or nanomaterial, thermal properties, other properties, and/or combinations of these. Nanotechnology and nanomaterials enable inventive images or parts thereof to be made, designed or engineered on an atomic or molecular scale and/or from the bottom up, to the extent desired, if desired. The materials made in these embodiments might for example, be made, grown, designed or engineered using molecular nanotechnology, molecular manufacturing, nanomanipulation, nanofabrication and/or self assembly process(es). Nanomaterials may for instance, be made of at least one but typically many component nanomaterials, each of which might be controlled or engineered to the extent desired, if desired. Nanomaterials can also be made, grown, engineered or designed for their use or incorporation with other ingredients, such as to form nanocomposite or hybrid nanomaterials for inventive images, e.g., nonattracting compounds might be bonded to the walls of nanotubes to separate them, or nanotubes might be modified so that they dissolve as desired. Among examples of nanomaterials made in these embodiments are new materials, as well as nano-engineered conventional materials like nano-engineered metals or polymer composites.

In an embodiment, the composition, the form and/or the structure of nanoscale nanomaterials are made, grown, engineered, manipulated, designed or modified for use in inventive images. CNTs, for example, might be made with geometry and/or other specifications that are preplanned and controlled so that they serve their intended purpose as effectively as possible, e.g, CNTs might intentionally be made bent at preplanned angles (refer to Journal of Physical Chemistry, Apr. 7, 2005). In a further example, the positively charged ions or cations in nanocrystals might be swapped with those of another material in a process that might be reversible. This exchange of cations might transform the nanocrystals into another material with different physical and chemical properties (refer to work by Paul Alivisatos and others of Lawrence Berkeley National Laboratory and UC Berkeley). In other examples, branches might be grown, engineered or formed on semiconducting nanowires. Then, if desired, secondary branches might be grown, engineered or formed on the first branches. Such tree-like branched nanowires might be called nanotrees. If desired, different branches might be made of compositions that are the same and/or different from one another, e.g., different branches or different generations of branches might be made of different types of semiconductors, and for example, the junctions of branches might function as diodes. Such branched nanomaterials or nanotrees might be used to make electronic devices, circuits, computers, etc. for inventive images. (Refer to Wang D., Qian F., Yang C., Zhong Z., and Lieber C. M., "Rational growth of branched and hyperbranched nanowire structures." Nano Letters, 2004. In another example, branching nanomaterials are made, grown or engineered using quantum dots of different materials that sprout four arms (tetrapods). The arms of these nanomaterials might be lengthened into nanorods containing different compounds, resulting in nanomaterials with different properties (such as different electrical properties) for use in inventive images. Such nanomaterials might for example, be useful in electronics and in computers in inventive images. Tuning individual branches of nanoscale nanomaterials (independent of one another) might enable the formation of highly accurate electronic devices.

In an embodiment, it is preferable to make inventive images or part thereof using nanomaterials, nanoscale nanomaterials, or CNTs that are high in quality, pure, defect free, clean and/or free of byproducts (e.g., from their fabrication process). Or it is desirable to use nanomaterials or CNTs with qualities close to this or as close as possible, e.g., for electronics.

These and other embodiments enable the formal elements of inventive images or parts thereof to be designed, engineered, controlled or optimized as never before. Inventive images may be more efficient or as efficient as possible in their use of the formal elements and/or in realizing desired aesthetic and/or utilitarian goals. Using such processes, inventive images or parts thereof might for example, be made using only what is necessary or exactly what is necessary to the extent desired or completely, inventive images might be made with fewer or with no defects, byproducts or problems, and inventive images might be made with desired properties or formal elements. Using nanotechnology, an inventive image or part thereof might be made with the formal elements desired and/or without undesirable properties or formal elements, completely or to a greater extent than ever before. An inventive image may for instance, be as strong, as slight in its form, as light weight, as conductive as desired, with the light properties desired, etc.

As another example, nanomaterials, nanomachines, nanodevices, nanoelectronics, and/or nanosystems which are nanoscale or macroscopic (such as examples herein) in inventive images might be made on an atomic or molecular scale and/or from the bottom up to the extent desired. Thus nanomaterials might for instance, be only as small, as large, as thick, as strong, as efficient, as fast and as visible in inventive images, as desired and as needed, while enhancing or imparting desired formal elements or properties to the images. Nanomaterials might enable images or parts thereof to be made smaller and/or thinner. Nanomaterials might enable images to be made without parts that may be necessary if conventional practices were used instead. Nanomaterials might be as strong, efficient and fast as such items can be or as desired, e.g., they may be super strong. In addition or instead, nanomaterials might have other desired properties. In a further example, nanotechnology might be used to make a nanomaterial in an inventive image or part thereof in which most atoms, every atom or every atom serving a particular function, is located or positioned where it should be or where it will be the most effective in the inventive image. Such nanomaterials might be called nano-pure or super materials.

In a further example, nanocrystals might be desirable as building blocks because they may have few defects. The properties of nanocrystals can vary significantly, for example, according to their size. Thus, by precisely controlling a nanocrystal's size and its surface, its properties might be designed or tuned, e.g., its bandgap, its conductivity, its crystal structure and its melting temperature might be changed, tuned or designed. In an illustration, the shape or architecture of nanocrystals might be controlled using electricity or applied voltage, e.g., refer to the "Journal of the American Chemical Society" Mar. 3, 2004. In another example, nanoparticles made of a variety of materials can be used in inventive images, and their sizes, shapes and surfaces might be varied, e.g., for the purpose and effects desired. Shape and geometry may also be important factors in determining or forming the properties of nanoparticles, quantum dots, and quantum rods whose properties are influenced by quantum-confinement effects. Refer to "Synthesis and size-dependent properties of zinc-blende semiconductor quantum rods" by S. Kan, T. Mokari, E. Rothenberg and U. Banin in Nature Materials 2, 155-158, March 2003.

In a preferred example, a variety of nanotubes are made in processes that allow for a level of control over their formation that is desirable, high, or complete control. Thus the nanotubes might be made with specific properties desired for use in inventive images, e.g., they might be used as building blocks to make inventive images, as stabilizers, as strengthening stabilizers, as image supports and/or as additives. As another example, nanotubes might serve as scaffolding for other materials, such as attached molecules like polymer molecules, e.g., nylon or acrylic molecules. Such attached molecules may add properties to the outside of the nanotube, e.g., to make an enhanced version of nylon or acrylic. In other examples, CNTs might be controlled or manipulated to change their positions, their shapes, to cut them, and/or to place them on electrodes. CNTs might even be prepared in ring forms if desired. In an illustration, CNTs and other nanomaterials are manipulated using light, lasers, green lasers, optical tweezers, holographic trap or holographic optical trap devices (e.g., those by David Grier of NY University, NY N.Y.), and/or holograms.

In a preferred example, inventive images are made with SWNTs, MWNTs, or both. For instance, SWNTs can be modified in embodiments and they can provide an enormous variety of derivatives that might for example be used with other materials such as a polymer, e.g., SWNTs can be made compatible, dispersible and they can be modified for coupling with another material like a polymer. For example, nanotubes might be coated, chemically modified or functionalized so that they interact with something else as desired, for instance, so that they will mix with or disperse in one or more other material(s) as desired, e.g., to form a nanocomposites, such as nanotubes functionalized to mix with a polymer to form a polymer nanotube composite. Refer to "Dispersion of Single-Walled Carbon Nanotubes in Aqueous Solutions of the Anionic Surfactant NaDDBS" Matarredona, Rhoads, Li, Harwell, Balzano, and Resasco, J. Phys. Chem. B 2003, 107, 13357-13367. Also refer to "Improvement of Thermal and Mechanical Properties of Carbon Nanotube Composites through Chemical Functionalization" Velasco-Santos, Martinez-Hernandez, Fisher, Ruoff and Castano, Chem. Mater. 2003, 15, 4470-4475. As another example, there are a wide range of tools that might be used to tailor-make SWNT polymer composites with the specific properties desired for inventive images. For instance it may be desirable to make changes that transfer applied stress to the composite's SWNTs, or it may be desirable to have some slippage between the SWNT and its polymer matrix to capitalize on the SWNTs' elastic and toughening properties. Refer to "Single wall nanotubes: a new option for conductive plastics and engineering polymers" by D. T. Colbert, in Plastics Additives and Compounding, January/February 2003, Elsevier Science Ltd. In an example, inventive images are made using methods, and/or materials described in U.S. Pat. No. 6,790,425, Smalley, et al. Sep. 4, 2004 "Macroscopic ordered assembly of carbon nanotubes," or using similar methods and/or materials. In a further example, the hollow cavities of SWNT, MWNT, Buckminsterfullerine, bucky balls, nanohoms, and/or other nanomaterials might be partially or entirely filled with one or more atoms, molecules or ingredients for use in inventive images, e.g., to enhance properties and/or to enable them to enhance or impart desired properties in inventive images. Examples of filled nanotubes are nanotube peapods that are nanotubes filled with buckyballs or fullerenes, e.g., the fullerenes might alter the electrical properties of the nanotubes, making areas of varying semiconducting properties that might function like transistors within the nanotube.

In another example, fullerenes might functionalized and/or their properties might be modified. For example, fullerenes might be made with chemical groups attached to their carbon atoms. Among examples are molecular shuttlecocks which might be used in liquid crystal in inventive images. Another example involves putting an atom inside a fullerene, these might be called endohedral fullerenes. In an example, the doping of a nanomaterial might be controlled on an atom by atom basis to the extent desired using nanotechnology, e.g., a nanotube or a buckyball might be doped to modify its electrical properties.

In embodiments, nanotechnology offers nanomaterials, devices, electronics, machines, systems, layers, coatings, paints, inventive images and/or parts thereof that might self assemble, spontaneously organize, self organize and/or self replicate (entirely or partially). For example, once set in motion, self assembling layers or devices may form or build themselves entirely or partially, e.g., reducing the time and effort which might have been required to build such items, and perhaps reducing the cost. Molecular recognition and/or various templates may be used in self assembly processes. Crystal growth is another example of self assembly which might be used to make nanomaterials for inventive images. Another example is the use of biological materials, biological systems, organic materials, organisms and/or genetically engineered organisms (e.g., viruses, proteins, DNA, and other organic machinery) to assemble nanomaterials such as inorganic materials like semi conducting nanoparticles into useful forms or devices, e.g., LCDs, sensors, memory chips and electronic devices (refer to the work of Dr. Angela Belcher at MIT and to the work of Cambrios Technologies Corp. in MA). For example, artificial DNA might self-assemble CNTs into patterns and forms, e.g., which may be able to function as nanoelectronics, nanowires, circuits, computer circuits, etc. Small biological systems (such as those employing bacteria), might serve as templates for fabricating more complex systems such as machines. Biological molecules might control the assembly of nanowire structures, e.g., to make electronics, circuits, etc. An example of molecular self assembly was reported by IBM in "Low Voltage, Scalable Nanocrystal FLASH Memory Fabricated by Templated Self Assembly" by K. W. Guarini, C. T. Black, Y. Zhang, I. V. Babich, E. M. Sikorski and L. M. Gignac at the IEEE International Electron Devices Meeting (IEDM) in Washington, D.C. on Dec. 9, 2003. Also refer to work at DuPont Central Research and Development and Columbia University, NY N.Y. forming a random self-assembled network of electrically conductive CNT embedded in polymer that can be used for thermal printing, e.g., see Applied Physics Letters Aug. 2, 2004. Self assembly processes used to make inventive images might have any degree of control, predictability, and precision, even a very high degree. As an example, a variety of flat and curved structures of nanomaterials might be formed with a high level of predictability, depending on the architecture and composition of the building blocks used. Refer to "Science" Jan. 16, 2004. Self assembled forms used to make inventive images might be further processed as desired. Nanomaterials made or partially made in self assembly processes might for example, be key components in smart materials, and they might be the basis which enables or a factor enabling inventive images or parts thereof to be smart.

In another example, buckytubes or SWNT self assemble into ropes or pathways the ends of which might be very difficult to find using electron microscopy. These ropes might for instance, be made of many buckytubes (e.g., tens, hundreds or thousands of buckytubes. The buckytubes in such ropes might be aligned, they might run side by side, they might branch and recombine, etc. Thus, such ropes might be used as conductive pathways or as electrically conductive pathways in inventive images, they might be desirable in image supports, and/or other inventive image parts or layers. In inventive images electrically conductive pathways might for example, be desirable in nanocomposites or in hybrid nanomaterials. The loading of buckytubes that might be required to achieve the conductivity level desired in a nanocomposite or hybrid nanomaterial might be less or significantly less than required using conventional practices.

In embodiments, two or more nanotechnologies or processes are used to make an inventive image part as desired. Some examples use self assembly processes with other technologies. For example, lithography may make patterns on a polymer material's surface chemistry, then a film of block copolymers may be deposited on the surface, the molecules of which might arrange themselves or self assemble.

In embodiments, nanomaterials, such as examples provided herein, might be applied on, painted on, printed on, deposited on, self assembled upon, grown upon, layered on, transferred onto, mixed into, sprayed on, patterned on, applied by dipping, layered on, coated on, spin coated on, adhered, printed on, ink jet printed, painted or brushed upon, marked on, written on, applied using nanoxerography or a xerographic printing process, and/or applied in another way onto a mold, into a composition used to form an inventive image (such as a cPRM, paper pulp or another mixture), or onto an inventive image or part thereof, such as an image support that may be a stabilizer or part of a device or nanomachine. Any material desired might be used as an image support (e.g., stabilizer) for superimposed nanomaterials, e.g., image supports made of polymer, paper, metal, glass, crystal, silicon, fabric, fibers, stone, marble, onyx, other materials, a combination of these, etc. Nanomaterials (like CNTs, nanocrystals, nanoparticles, and/or other examples herein) might be ingredients in nanocomposites, hybrid nanomaterials, fabrics, fibers, paints, other colorants, coatings, layers, pastes, polymers, devices, machines, or other material forms used to make an inventive image or part thereof. Nanomaterials on an inventive image's surface may or may not be partially or entirely superimposed, and/or embedded.

In embodiments, inventive images or parts thereof are made with pure metal nanoparticles that have been induced to merge into a solid, without melting. (This might be called sintering.) In an embodiment, inventive images might be made with metal nanocomposites or hybrid nanomaterials. The use of nanomaterials in metals (such as aluminum, bronze, steel, silver, gold, magnesium, all kinds of metal leaf, etc.) might reduce their weight, enhance their strength, enhance their elasticity, and result in other desirable changes in inventive image formal elements, e.g., refer to examples herein. Amorphous metals such as Vitreloy and Liquidmetal (also called metallic glass) are examples of materials made with controlled atomic structures using nanotechnology which might be used to make inventive images, such as for use in making mounts, strengthening stabilizers, image supports, etc. Vitreloy is from Howmet Corporation of Greenwich, Conn. and Whitehall, Mich. (refer to www.howmet.com) and Liquidmetal is from Liquidmetal Technologies of Tampa, Fla. and Lake Forest, Calif. (refer to www.liquidmetal.com). These materials are not found in nature. An example is the amorphous alloy Vitreloy (e.g., Zr41.2Ti13.8Cu12.5Ni10.0Be22.5, or approximately 61% Zr, 12% Cu, 12% Ti, 11% Ni and 3% Be), which may be substantially harder, more elastic, stronger and tougher than steel, e.g., these properties in Vitreloy might be twice what they are in steel. Liquidmetal may for example be made using blends of titanium, zirconium, nickel, copper and beryllium which results in properties which do not exist in other materials, such as enhanced hardness, superior strength to weight ratio (e.g., it may be more than twice as strong as titanium or conventional titanium alloys), as well as superior elasticity, high corrosion resistance, high wear resistance, and unique acoustical properties, even in forms that are melted and molded or cast (which may not be true of conventional metals where the mechanical properties of forms that are melted and molded or cast may be inferior to those of wrought and forged forms limiting creative freedom and making intricate designs more difficult to achieve). Among the features such amorphous metals offer inventive images and parts thereof (such as mounts, image supports, strengthening stabilizers, and other inventive image parts) are the ability to have strong forms and structures which are thinner, more slight, less bulky, more durable and/or lighter than they would be using conventional materials such as conventional metals. Amorphous metals might also be used in nanocomposites and hybrid nanomaterials in inventive images.

Nanocomposites for used in inventive images might be homogeneous, heterogeneous or inhomogeneous. In an embodiment, nanotubes are uniformly dispersed or more or less uniformly dispersed (as opposed to bundled or clumped together) in at least one other, different material, such as in a nanotube nanocomposite or a nanotube polymer nanocomposite. Such uniform dispersion or approximate uniform dispersion may be desirable for enhancement of properties in the inventive image or part thereof, e.g., enhanced strength, electrical conductivity and/or thermal stability. When blending nanotubes into cPRMs or polymers to form nanocomposites in embodiments, it may be preferable to use as small a loading as possible, provided the nanotubes used enhance or impart the desired properties to the inventive images. This preference may for example, save on the cost, it may be better for processing purposes, it may enhance or ensure the mechanical integrity of the composites formed as well as that of the inventive images formed (higher filler loadings might risk the mechanical integrity of the resultant composites or inventive images), it may enable the nanomaterials to be invisible to the unaided eye in the inventive image, and it made enable the nanomaterials to be used without undesirably affecting the inventive image's optical properties (such as its transparency). Nanomaterials might be strongest when their CNTs run parallel to each other (e.g., embedded nanotubes), however their electrical and thermal conductivity might be most enhanced when their CNTs are randomly oriented (e.g., embedded nanotubes). (Refer to the December 2003 Journal of Polymer Science Part B: Polymer Physics.)

Any method(s) might be employed in embodiments to make composite or hybrid materials using nanomaterials. In examples, inventive images have nanocomposite or hybrid nanomaterials made by adding nanomaterials (such as CNTs, nanoparticles, nanocrystals, nanowires, nanofibers, nanorods and/or other examples herein) directly into or onto one or more other materials (such as polymer, cPRM, ceramic, metal, fabric, fiber, plaster, paper, glass, colorants, primers, adhesives, wood, and/or other conventional art materials), typically to enhance or impart desirable properties to the inventive image being made. (Examples are forthcoming.) In an example, an inventive image or part thereof might be formed by mixing or dispersing nanomaterials into a vehicle, matrix or liquid (such as water, a binder, a solvent, a conventional art material, and/or cPRM, e.g., that is polymerizing or that might be a polymer melt). The mixture or dispersion might be added into another material, mixture or composition. Alternately, the mixture or dispersion might be applied on a mold or on an inventive image or part thereof, e.g., an image support that may be a stabilizer. Such mixtures or dispersions might for example be applied or made into inventive images using any process(es) desired (they might even be applied like paints, inks, layers, coatings, etc.). Once applied, some of them might self assemble or organize themselves into an order, a film, a layer, a structure, a system, a device, a machine, and/or a material or part thereof that is useful and desirable.

In an example, a method that might be called coagulation might be used to mix SWNT into cPRM, polymer, or poly (methyl methylacrylate) (PMMA), evenly or more or less evenly (rather than in clumps or bundled together). Such a method might be used that is the same as or similar to that used by Karen I. Winey at University of Pennsylvania. For example, using such a method, SWNT might be mixed evenly or more or less evenly into PMMA by mixing nanotubes and PMMA into a solvent to form a fine suspension that is then plunged into distilled water. The PMMA precipitates out of this mixture rapidly, dragging the nanotubes with it and preventing them from clumping. At low concentrations, these nanocomposites may have an electrical conductivity that may be roughly about 100,000 times better when their nanotubes are randomly oriented than when they are well aligned in the nanocomposites. Refer to this work in the Journal of Polymer Science Part B: Polymer Physics, online publication, the week of Dec. 8, 2003 and in the print edition Dec. 15, 2003.

In another example, nanotubes such as CNTs might be ground and mixed with ammonium ion salts (which may be liquid at room temperature), to form a gel or a composite gel with nanotubes that are evenly, or more or less evenly distributed in it. This composite gel might be applied using any process(es) (e.g., printed, ink jet printed, poured, spin coated, brushed, etc.) onto a mold or onto an inventive image or part thereof (such as an image support). This composite gel might also be polymerized or hardened into a polymer. Such a nanocomposite gel might be used to make inventive images or a wide range of inventive image parts, such as cables, transistors, actuators, capacitors, batteries, fuel cells, layers, strengthening layers or partial layers, strengthening stabilizers; parts for mounting or display of inventive images; conductive layers, image supports that might be stabilizers, joints between image parts, image parts that support weight and/or are structural, colorants, other forms, or a combination of these. Such a nanocomposite gel might give inventive images desirable properties like enhanced strength, conductivity, light properties, or other examples herein. Refer to Science, Jun. 23, 2003, refer to work by researchers at the Japan Science and Technology Corp. (JST) of Kyoto University in Japan, and refer to the work of researchers at the Japanese National Institute of Advanced Industrial Science and Technology (AIST).

In an illustration, a nanotube liquid crystal nanomaterial might be used in inventive images. CNTs might be used in liquid crystal. A CNT gel might be made of a liquid crystal material and SWNT, such as that made at University of Pennsylvania, see Islam et al. Physical Review of Letters 2004. Or a nanotube liquid crystal nanomaterial might be used for inventive images like or similar to that made at University of Cambridge in England, see Science, Nov. 21, 2003.

In embodiments, CNTs might be grown directly on polymer image supports that might be stabilizers. Examples are those made by Stephan Hofmann and others at University of Cambridge, UK using plasma enhanced chemical vapor deposition. Among the uses of these are as field emitters in displays in inventive images, and/or for their conductivity. CNTs grown directly on polymer image supports might be desirable in inventive images for other purposes, see the examples herein. Refer to Applied Physics Letters, Dec. 1, 2003.

In an embodiment, nanoscale clay particles or clay mineral nanoparticles are combined with other materials or substances to make hybrid materials for inventive images. For example, clay nanoparticles or clay mineral nanoparticles might be used in layers, coatings, devices, machines, systems, and/or other inventive image parts or in an entire inventive image. The clay might impart or enhance structural support to the hybrid nanomaterials formed and/or other properties. In examples, hybrid nanomaterials are made in inventive images using clay films with nanoscale thicknesses (e.g., made of clay nanoparticles with polymer and/or other organic molecules). Hybrid nanomaterials made of clay nanoparticles might be smart materials, such as those made with organic molecules. In another example, nanoscale clay particles on crystals (or clay-coated crystals) may be useful as smart materials in inventive images, e.g., to make more complex structures and materials; malleable materials; strong substances; responsive and/or interactive inventive images. Refer to the May 27, 2003 issue of the chemistry journal Langmuir.

In an embodiment, a layering or a layer-by-layer technique is used to make an inventive image or part thereof with nanomaterials such as nanotubes, CNT, nanorods, nanocrystals, nanoparticles, and/or nanofibers. Such a technique might enable control or nanoscale control over properties. Such a process might be done by machines or robots if desired. For example, a layering or a layer-by-layer technique might be used to make very thin layers of different materials on an inventive image or part thereof (e.g., an image support) or on a mold surface.

In forming an inventive image or part thereof in embodiments, CNTs might be layered on one or more other materials, and/or sandwiched between two or more layers of one or more other materials to form a composite or hybrid nanomaterial that might have any of the exceptional properties of CNTs described herein. Examples of materials that might be used to form these composite or hybrid nanomaterials with the CNTs are one or more: polymers, ceramics, metals, papers, fibers, fabrics, plaster, glass, colorants, primers, wood, stones, metal, adhesives, other conventional art materials, or a combination of these. The composite or hybrid nanomaterial formed in these embodiments might be an inventive image or part thereof, e.g., it might be an image support, or an inventive image that benefits from the enhanced strength for example, to hold the weight of viewers or the weight of another part or structure, such as, an inventive image that viewers walk on, sit on or play on, or an inventive image that functions as a wall or a chair. It might be an image support that is conductive or that has enhanced conductivity. Its CNTs might be an electrically active layer that enables the inventive image to have another desired property, e.g., an electrical device and/or a light source.

Composite or hybrid nanomaterials might for example, be made by alternating or stacking nanotubes and at least one other material, using at least one layer of each but using as many layers of each as desired. For example, one or more very thin layers of polymer, metal, ceramic or any other materials in the examples above, might be used with one or more very thin layers of nanotubes such as a layer that is only about a single molecule of nanotubes. Layers may or may not be even, smooth, uniform, colored or continuous—aesthetic variations might be desirable. The layers might be formed using any of a wide variety of processes such as by adhering them, painting, printing or ink jet printing them on, spin coating, using other deposition methods, using a layer-by-layer process, using a dipping process, using a dispersion of the nanotubes (e.g., in water, in cPRM, in polymer, in a solvent); using other process; or a combination of processes.

In another example a layering or layer-by-layer process is used to form a composite or hybrid nanomaterial made of SWNT and polymer for making inventive images. Such a layer-by-layer process might be the same as or similar to that described in "Molecular design of strong single-wall carbon nanotube polyelectrolyte/multilayer composites" by A. Mamedov, N. Kotov, M. Prato, D. Guldi, J. Wicksted, and A. Hirsh in Nature Materials 1, 190-194, 2002. In a further example, functional nanomaterials (that may or may not be nanoscale), made in a layer-by-layer process might be used in inventive images. These functional nanomaterials might be films or layers and they may be made of multiple thin, very thin or ultra thin layers. They may for example be made in an electrostatic layer-by-layer deposition process. Such nanomaterials might be polymer films or they might be organic-inorganic nanocomposite thin films, e.g., with alternating layers of oppositely charged molecules. Examples made using conjugated polymers and inorganic nanoparticles may be useful for electrochromic displays and other purposes. Refer to Materials Today Vol. 8, Issue 5, May 2005, page 18. In other examples, transparent or translucent layers or films of polymer nanocomposites or hybrid polymer nanomaterials may be very useful in inventive images, such as CNT polymer nanocomposites. The use of such layers or films in inventive images may bring or enhance any of the properties described herein for nanomaterials, e.g., conductivity, strength, permanence, e-materials, etc.

In another example, alternating layers formed using layering or a layer-by-layer technique might be alternating negatively charged and positively charged layers. For example, negatively charged clay platelets such as montmorillonite (nanometers thick) alternating with positively charged polymer, or by layering clays and polyelectrolytes a material might be formed that mimics the natural structure of nacre or mother-of-pearl. Artificial nacre might be an extremely strong material or nanomaterial for use in inventive images, e.g., as a strengthening stabilizer and/or in forming an image support. Refer to the work of Nicholas Kotov, P. Podsiadio and Z. Tang at the U. of Michigan in Ann Arbor, e.g., their use of compounds normally found in insect shells and fungi cell walls in the recipe for artificial nacre. Refer also to "Nanostructured artificial nacre" by Z. Tang et al., Nature Materials 2, 413-418 (2003). As another example, layer-by-layer assembled films containing CNTs may have exceptional mechanical properties. Layer-by-layer techniques may enable multilayered thin films to be made that take advantage of the complex interactions that are possible between many different types of materials. Layer-by-layer techniques may also enable inventive images to have devices that emit light, solar cells, sensors, electronics, other devices, or other examples herein, e.g., solar cells made by layering arrays of nanoscale semiconductor particles or quantum dots with polyelectrolytes.

In an embodiment, a polymer nanocomposite or hybrid nanomaterial might be made by growing or putting (using any method) nanomaterials, or a mixture or dispersion containing nanomaterials onto a mold or an image support (e.g., stabilizer), and then, covering or coating this or them with cPRM and/or polymer. For example, nanotubes grown on the surface of a mold or image support, may be superimposed, coated or covered with polymer and/or cPRM (e.g., cured or hardened at room temperature). Nanotubes grown on an image support and then superimposed might remain on that image support in the inventive image. However, if desired, the nanotube polymer composite or hybrid nanomaterial formed might be peeled off or released from its mold or substrate, which preferably releases well. Refer to Nano Letters Oct. 8, 2003 and to work at Trinity College in Ireland and Rensselaer Polytechnic Institute.

In an embodiment, a flash welding process is used, e.g., refer to "Flash welding of conducting polymer nanofibres" J. Huang and R. Kaner, Nature Materials 3, 783-786 (2004). In examples, polymers may be flash welded (such as polymer blends and composites, or conductive polymers); flash welding might be done through a mask, photo mask or stopper photo mask so that areas are not affected; and flash welding might make films or layers, asymmetric films, patterned films, sensors, actuators, other devices etc., in inventive images.

In an embodiment, a dipping process is used to form a composite or hybrid nanomaterial with nanomaterials, such as nanotubes, nanorods, nanocrystals, nanofibers, nanowires, nanoparticles, and/or other examples herein. An image support (e.g., stabilizer) might be dipped into a dispersion of nanotubes (e.g., a dispersion in water, a solvent or cPRM), and then, if desired, dipping it into a polymer solution, building up as many layers as desired. If desired, after each layer is applied (or at any time thereafter), layered composite or hybrid nanomaterials such as these might be further strengthened by attaching chemical groups to the nanotubes and then heating or chemically treating them so that they form bonds with the polymer. If this step is done after each layer is applied, the composite or hybrid nanomaterial may become crosslinked, like a three dimensional web. Examples of such composite or hybrid nanomaterials made with about 50% nanotubes may be about as strong as silicon carbide and tantalum carbide (materials used to make extremely strong components for cutting tools, jet engines and aerospace uses). However, many inventive images do not need such great strength, thus lesser percentages and/or fewer layers of nanotubes may be desired, e.g., aesthetically. Refer to "Molecular design of strong SWNT/polyelectrolyte multilayer composites" A. A. Mamedov, et al., Nature Materials, 1, 190-194, 2002.

In another example, nanomaterials might be used in marking materials, such as in marking materials in conventional or specially designed marking or writing implements like pens, fountain pens, dip pens, pencils, brushes, and/or other marking and writing implements. In a further example, nanomaterials might be used in one or more printer cartridges, such as in ink jet printers (which might be conventional ink jet printers or ink jet printers specially modified or made for this purpose). A computer might control the printed application of these nanomaterials on an image support (e.g., stabilizer) that might be polymer, paper, metal, glass, crystal, silicon, fabric, another material or a combination of these. One or more nanomaterial inks or colorants that might have different properties and/or specifications (e.g., color, conductivity) might be used in printing to make an inventive image or part thereof. For instance, nanoparticles or gold nanoparticles in a solution might be ink jet printed in patterns, designs, networks, devices, microelectronic devices, resistors, capacitors, systems, interconnections, and other structures on an inventive image or part thereof such as an image support that may be a stabilizer (refer to Applied Physics Letters, May 19, 2003).

In further examples, polymers (such as thermoplastics), with nanomaterials may have different properties from those with conventional fillers and this may make them desirable or very desirable for use in inventive images. For example, the tensile strength of a polymer nanocomposite might be enhanced using a lower percentage or a significantly lower percentage of one or more nanomaterials than would be required using one or more conventional fillers. In examples, a small percentage of nanomaterials might be used in polymer nanocomposites. As an illustration (though the specific measurements depend on many factors such as the specific ingredients used, the method of their use and the purpose or purposes for using them in the inventive image), the strength of polymer might be significantly or radically increased by adding CNTs to it to form a nanocomposite or hybrid nanomaterial using percentages of CNTs by volume of about 0.5-20%, preferably about 1-15%, desirably about 1-10%, more preferably about 1-8%, more desirably at about 1-6%, and most desirably at about 1-5%. In another example, nanoparticles and/or nanoclays might be used in polymer nanocomposites to make polymers forms that might be stronger, stiffer, lighter, with enhanced thermal properties, reduced flammability, and/or other enhanced properties. For instance, adding a small percentage of silicate nanoparticles into polyimide resin (e.g., roughly about 2% by volume), may increase the strength of the polymer nanocomposite formed by about 100%. Nanomaterial ingredients such as these may not be visible or significantly visible in the polymer nanocomposite or in the inventive image, and if they are visible, they are likely to be less visible than a conventional filler might be. There may also be other desirable consequences, such as the enhanced strength of a polymer nanocomposite may enable inventive images to be made with forms and/or structures that are slighter, less bulky, more minimal, thinner, and/or lighter in weight. For example, a clay polymer nanocomposite formed by adding clay particles into a polymer matrix at about 1-5% by weight may retain a high degree of optical transparency (e.g., in films and coatings). Refer to work by C. Park, J. W. Connell and J. G. Smith at Langley Research Center, Hampton, Va.

In further examples, SWNTs might be used to make fiber nanocomposites for inventive images. For example, SWNTs might be added to a polymer at about 10% by weight to increase tensile strength, reduce creep and toughen the resulting nanocomposite fiber, e.g., SWNTs poly-(p-phenylenebenzobisoxazole) (PBO) nanocomposites, for instance, sold under the trade name Zylon by Toyobo in Osaka, Japan (www.toyobo.jp.co).

In an embodiment, a ceramic CNT composite is made for inventive images. In comparison to conventional ceramics, it may, for example, be tougher, more resistant to fracturing, cracking and stress; stronger, less brittle, conductive of electricity, conductive of heat, and/or it may be able to function as a thermal barrier depending on the orientation of its CNTs. A ceramic CNT composite might be made using alumina (aluminum oxide) such as in powder form, with about 5-10% CNTs by weight. If desired, this composite may also contain about 5% finely milled niobium. Refer to Applied Physics Letters August 2003. In an example, a ceramic nanocomposite might be used in inventive images made with traditional ceramics, SWNT, and metal niobium. It might be able to endure high temperatures, have controllable heat conductivity, chemical inertness, electrical conductivity as either as semi conductor or a full conductor, and enhanced strength, e.g., against fracturing.

In examples, nanoparticles such as silicate (e.g., nanoclay) added to polymer might enhance properties (e.g., such as its strength). If the polymer is not opaque, this might not reduce its transparency or translucency. In further examples, nanoparticles might be added to metals and/or to other non polymeric materials used in inventive images, for example, to make them stronger, e.g., such materials might be used for making mounts, bases and other means of display, as well as strengthening stabilizers and image supports. For instance, silicon nanospheres with diameters of about 40 to about 100 nm are not only harder than silicon, they are among the hardest materials known, falling in between sapphire and diamond. These might be used in inventive images, e.g., in a layer or coating, in a nanocomposite such as a polymer nanocomposite, etc. As another example, buckyballs incorporated into a polymer matrix or cPRM for example, in a low percentage, might enhance the strength of the polymer formed.

In a further example, a fullerene based polymer that might be highly crosslinked may be used to make an inventive image or part thereof such as an image support, e.g., stabilizer. It might have enhanced hardness and high thermal stability. It might for example, be used in an inventive image by spraying, dipping and/or spin coating.

In embodiments, processing a nanocomposite may be easier than processing its ingredients separately. For example, processing polymer nanocomposites (such as CNT polymer composites) can be easier than processing the same polymer without nanomaterials in it.

Further examples of formal elements (or properties) that might be enhanced in inventive images or imparted to them by nanomaterials and/or nanotechnology follow in (a)-(r).

(a) In embodiments, nanomaterials and/or nanotechnology might enable, assist or cause inventive images to be stronger, more rigid, to have other enhanced mechanical or physical properties, and/or enhanced permanence. For example, the use of nanomaterials and/or nanotechnology in inventive images or part thereof might enhance their resistance to change and/or wear, hardness, scratch resistance, tensile strength and/or toughness; it might reduce fragility; reduce sagging (e.g., by linear polymers); enhance weatherability, enhance durability, enhance resistance to rust or corrosion, and/or enhance the ability to self clean or to repel stains, dirt, and/or liquids (e.g., water); it might provide anti-microbial properties; improve chemical and/or heat resistance, and/or enhance flame retardancy; it might impart or improve magnetic properties; increase resistance to adverse effects of UV light, (e.g., functioning as a UV light stabilizer or absorber); etc. Moreover inventive images made in these embodiments might have one or more of these improved or new properties without compromising the aesthetic desired, e.g., the nanomaterials may be invisible in the inventive image, even if the inventive image is transparent and colorless. Nanomaterials may for example, be image supports or strengthening stabilizers in inventive images. Nanomaterials might be protective layers or external layers in inventive images. In addition or instead, nanomaterials may reinforce or strengthen an inventive image part such as a bond or a joint. Inventive images made using these embodiments, may have these or other such improved or new properties from nanomaterials like nanotubes, nanofibers, nanocrystals, nanoparticles, nanowires, nanoropes, nanotextiles, buckypaper, branched structures composed of nanoparticle chain aggregates (NCA), e.g., for making nanocomposites with enhanced mechanical properties; nanosized silicon dioxide crystals; nanocomposites, hybrid nanomaterials, other examples of nanomaterials provided herein, and/or other nanomaterials.

As examples, nanotubes, CNTs and SWNT or buckytubes are reported to have tensile strength that is many times the strength of steel (e.g., about 60 to 100 times the strength of steel, or stronger), yet nanotubes may weigh much less than steel, and they might be flexible (e.g., nanotubes may have about one-sixth of the weight of steel). In the use of CNTs to strengthen other materials, such as in CNT polymer nanocomposites, it may be desirable for the embedded filaments to run parallel to each other. In addition, a super hard phase of carbon has been made by applying pressure to CNTs and releasing this pressure. The resulting nanomaterial is reported to be at least as hard as cubic diamond, and its bulk modulus and hardness are at least compatible to those of diamond. Refer to work done at the Los Alamos National Laboratory, the University of Arizona, and Cornell University published in PNAS, and online at www.nanotechweb.org in "Nanotubes harden under pressure" Sep. 23, 2004.

Nanomaterials such as nanotubes, SWNT, buckytubes and buckypaper might be used to change or control the strength to weight ratio or the ratio of strength to the structure, form and/or the mass of inventive images or parts thereof, such as image supports that may be stabilizers. Such inventive images or parts thereof may for example, be made of nanotube composite or hybrid nanomaterials like polymer nanotube composites, polymer CNT composites and other examples herein. The new strength to weight ratio, and/or the new ratio of strength to structure, form, and/or mass enabled by nanomaterials may result in novel inventive images. For instance, new kinds of forms and structures might be made using just nanomaterials (e.g., using just CNTs), and/or the use of nanomaterials with one or more conventional image making materials (e.g., one or more polymers, wood, paper, glass, ceramics, metals, stone, marble, onyx, alabaster, and others), may enable inventive images to be made with new forms or structures. Further description is forthcoming.

As other examples, nanotubes of boron nitride may be less fragile than CNTs, as well as more heat tolerant and less likely to oxidize than CNTs. Super tough nanoscale films of crystalline carbon may be used on or in inventive images (these films might be called artificial diamond coatings). These films may be porous and/or electrically conductive. In another illustration, molybdenum based nanocrystals or Mo—C—O nanocrystals may have exceptional mechanical properties, such as immense strength and stiffness. Refer to "Mechanics of nanosprings: stiffness and Young's modulus of molybdenum-based nanocrystals" by C. Durkan. A. Ilie, M. S. M. Saifulla and M. E. Welland, in Applied Physics Letters 80, 4244-4246, Jun. 3, 2002. Nanotubes, CNTs, boron nitride nanotubes, molybdenum based nanocrystals or Mo—C—O nanocrystals, buckytubes, other nanocrystals, and/or other nanomaterials may be desirable in nanocomposites and hybrid nanomaterials for making inventive images because of the strength, rigidity, enhanced permanence, and/or other such properties they may impart. These properties may enable inventive images to be lighter in weight, less massive and/or slighter.

In a further example, nanocrystalline metals may offer inventive images enhanced strength and hardness, as well as other properties that might be desirable, like a higher electrical resistance, an enhanced specific heat capacity, improved thermal expansion properties, lower thermal conductivity, and/or improved magnetic properties. Metal nanocrystals have shown to be about 100-300% harder than these same materials are in conventional forms or in forms made using bulk technology. Metal nanocrystals might be incorporated into inventive images or parts thereof, for example, for extra strength, wear resistance, and/or permanence, such as metal nanocrystals used in polymer nanocomposites, aluminum nanocomposites, or other metal nanocomposites in inventive images, e.g., in image supports, strengthening stabilizers, mounts, and other means for installation and display. In an example, a tungsten-carbide-cobalt composite powder of a nanoscale grain size may be used to make inventive images, e.g., it may be an alloy that is very hard such as that from Nanodyne of New Brunswick, N.J. In other examples, nanocrystalline copper may be up to about five times harder than micrometer sized conventional copper. Also refer to the nanotech amorphous metal examples herein.

The increased strength, rigidity and permanence of inventive images made in these embodiments may enhance their ability to be self supporting and/or freestanding, e.g., with reduced, minimal or no additional mount, brace, backing, other reinforcement or other assistance. As an example, a large image support might be made or partially made of a nanocomposite or hybrid nanomaterial comprised of at least one polymer that might be a linear polymer (like acrylic) and/or a weak or fragile polymer (such as an absorbent polymer, conductive polymer, a polymeric composition made with either or both of these, another polymer, or a combination of these). This large image support might be rigid and strong, even though it may be very thin, e.g., it may about four feet square or larger, and its thickness might be about an eighth of an inch, about a sixteenth of an inch, or thinner. The enhanced rigidity and strength of such an image support might even enable it to be self supporting and/or freestanding. In comparison, an image support made of the same composition and size without nanomaterials might not be as rigid or as strong, and it might not be as capable or capable of self support or of being freestanding, e.g., it might easily sag or risk sagging, and it might need reinforcement to be strong, rigid, self supporting and/or freestanding, and/or to be displayed. Such a large image support made with nanomaterials might be transparent, translucent and/or opaque. Its nanomaterials may or may not be visible though their effect may be significant.

In an example, one or more buckypapers used in inventive images (e.g., as image supports) might enhance and/or impart one or more properties or formal elements described in this section (a), e.g., mechanical and physical properties, strength, durability, toughness, etc. In another example, a silica shell or coating on a nanotube, a MWNT or a SWNT might enhance stiffness and/or rigidity and nanocomposites made with such nanomaterials may have improved nanomechanical properties. Refer to Olek et al., Langmuir 2005. For instance, the use of a small percentage of silica coated MWNT (e.g., about 1-5%), in PMMA nanocomposites may result in increased hardness, strength and/or nanomechanical properties. Refer to Materials Today, Vol. 8, issue 4 Apr. 2005 p. 18.

In a further example, nanoparticles might be used in polymer nanocomposites to reduce or eliminate the undesirable or potentially undesirable effects of UV light exposure. Such nanoparticles might for example, be invisible to the normal human eye in transparent or translucent polymer nanocomposites, they may allow visible light to pass through them.

In another example, nanomaterials may be used to impart wear resistance, hardness, and/or scratch resistance; the ability to self clean, repel dirt, repel moisture and/or liquids (such as water); stain resistance and/or corrosion resistance; and/or the ability to self heal to inventive images or parts thereof, such as to coatings, surfaces, paints, other colorants, devices, electronics, machines, systems, other materials and/or parts thereof. Such properties might enhance the permanence of inventive images and/or reduce cleaning, maintaining and repairing inventive images or parts thereof. As a specific example, the use of ceramic nanoparticles in and/or on the surfaces of inventive images (such as in nanocomposites or hybrid nanomaterials), may significantly increase their scratch resistance. Thus, inventive image surfaces may remain as they were when they were made for a longer period of time, increasing their permanence, e.g, their surfaces may remain glossy and/or evenly colored longer, perhaps requiring less care and less conservation. Inventive image surfaces may for example, be made with ceramic nanoparticles in and/or on them in formulations and/or in processes that may be similar to or like those used by Mercedes Benz of Stuttgart, Germany to coat cars, e.g., such ceramic nanoparticles might have diameters of less than about 20 nm. Ceramic nanoparticles might for example, be used in inventive images in paints, colorants, dyes, inks, layers, films, coatings and surfaces, refer to (i) below. Inventive images and/or their surfaces might for example, be made with ceramic polymer nanocomposites or hybrid nanomaterials.

Some kinds of nanomaterials may enhance toughness, while reducing fragility, brittleness, the tendency to fracture or crack, and/or other such properties of inventive images or parts thereof, thereby enhancing strength and permanence. Some nanomaterials offer these properties in their use in inventive images or parts thereof with or without the presence of other materials, such as in nanocomposites and hybrid nanomaterials. As an illustration, nanotubes might endure bending better than the strongest carbon fibers. Such resilience might be useful in inventive images. The use of nanotubes in composites and/or hybrid nanomaterials with polymers, glass, ceramics, other conventional image making mediums, and/or other materials might make them less fragile, tougher and more resilient, reducing their tendency to fracture or crack, e.g., when inventive images made with them are displayed, installed, handled, transported, bumped, or dropped. SWNTs, for example, have great stiffness in tension and in bending. In comparison, many other stiff materials are brittle. The toughness of SWNTs is also notable. Examples of SWNT can be stretched more than about 20% beyond their resting length, they can be tied in a knot, or bent completely over and incur no defect when released. SWNTs are said to be the strongest known fibers in tension.

In other examples, and the use of nanomaterials in ceramics may make them more permanent. For instance, nanocrystalline ceramics might have enhanced ductility or malleability, wear resistance, and toughness, (such as the ability to endure impact or applied strain), reduced fragility and brittleness, and/or an enhanced ability to bond with metal. These qualities might be useful in inventive images along with the comparative ease with which nanocrystalline ceramics may be ground and polished. In an illustration, CNTs might be added to alumina based systems to increase their fracture toughness. For example, adding about 4-11% CNTs to form a nanotube ceramic nanocomposite may double or triple the ceramic's resistance to fracturing. Refer to "Single wall carbon nanotubes as attractive toughening agents in alumina-based nanocomposites" by G.-D. Zhan, J. D. Kuntz, J. Wan and A. K. Mukherjee in Nature Materials 2, 38-42, January 2003.

By offering the ability to make structures and forms that are stronger, tougher, less likely to crack or fracture, less fragile, less brittle and/or more resilient than those made with conventional practices, nanomaterials may enable inventive images to have compositions, designs, structures, and forms that may be different or very different from those made using conventional practices, without compromising strength or permanence. Nanomaterials enable the formation of inventive images with compositions, designs, structures, and forms that may be novel.

In illustrations, the strength and permanence of conventional materials and conventional image making materials like polymer(s), glass(s), crystal(s), metal(s), paper(s), ceramic(s), wood(s), marble(s), stone(s), onyx, alabaster, and/or weak or impermanent material(s) might be enhanced with nanomaterials in inventive images or parts thereof, e.g., using nanocomposites and/or hybrid nanomaterials. Examples of inventive images or parts thereof with enhanced strength and permanence due to nanotechnology might be made with CNT polymer composites, CNT glass composites, CNT crystal composites, CNT metal composites, CNT ceramic composites, CNT polymer hybrid materials, CNT glass hybrid materials, CNT crystal hybrid materials, CNT metal hybrid materials, and/or CNT ceramic hybrid materials, and/or other examples of nanomaterials provided herein (e.g., a layer containing CNTs might be on and/or within polymer, glass, crystal, metal, marble, onyx, alabaster, stone, paper, or ceramic). Since nanomaterials may enhance inventive images' strength and permanence, the selection of other material(s) for use with them in inventive images might be based or more heavily based on aesthetic concerns rather than structural, practical or utilitarian concerns.

As further examples, the enhanced strength and/or permanence provided by the use of nanomaterials and nanotechnology in inventive images or parts thereof affords image makers the freedom of making inventive images with structures and/or forms (e.g., image supports that might be stabilizers), slighter, with less mass, less bulky, thinner, smaller, lighter in weight, less solid, hollow, less visible, and/or more easily hidden from view than comparable conventional images—freedom image makers may or may not exercise. The structure of an inventive image made with a nanocomposite or with a hybrid nanomaterial might for example, be noticeably or significantly smaller, thinner, less bulky, less massive, lighter in weight, less visible and/or more easily hidden from view (partially or entirely such as by the rest of the inventive image's form) than might be possible using a material made without nanotechnology (e.g., the image's structure might be its armature, its backing, an internal layer or form, a brace, or another image part, this structure might be a stabilizer, an image support or an image support stabilizer). Choices by image makers about the structures, forms and/or compositions of inventive images or parts thereof made with nanomaterials and about other material(s) used in them might be less determined by structural, practical and utilitarian factors, and more determined by aesthetics than might be possible without nanotechnology—a valuable expansion in creative freedom and aesthetic control in image making. These are further examples of ways nanomaterials may enable the formation of inventive images with compositions, designs, structures, and forms that may be different or very different from those that may be made using conventional practices, without compromising strength or permanence. Additional examples are forthcoming. The properties that might be created in inventive images and parts thereof using these embodiments might also enhance or create aesthetic effects, such as the examples herein and in U.S. Patent Application No. 20030035917-A1. Refer to examples in (o)-(r) below.

(b) In embodiments, nanomaterials and/or nanotechnology might enable, assist or cause inventive images or part thereof to be conductive, semi conductive, or superconducting. Examples of these nanomaterials are nanotubes, nanofibers, nanocrystals, nanoparticles, nanowires, CNT nanowires, pure nanotube power cables known as quantum wires, conductive polymer nanowires; electrically conductive block copolymer nanowires (e.g., made of regioregular polythiophenes); semiconductor nanowires made of silicon, gallium nitride and indium phosphide; nanoropes, nanotextiles, nanocomposites, hybrid nanomaterials, polymer nanocomposites; conductive polymer nanocomposites; polymer nanocomposites that are flexible and/or thin or very thin;

polymer nanotube nanocomposites, polymer nanotube nanocomposites that conduct electricity using their nanotubes and/or their polymer, polymer CNT nanocomposites, polymer hybrid nanomaterials, buckypaper, sheets of carbon atoms or graphite which might be thin or very thin, other examples provided herein and/or other nanomaterials. The conductive properties of nanomaterials may be used in inventive images for a wide array of features requiring conductivity, energy and/or electricity. There are examples herein and in U.S. Patent Application No. 20030035917-A1, such as, solar devices or cells, OLEDs, EL Lamps, other light sources, reflective displays, e-materials, EPDs, electrochromatic effects, thermochromatic effects (e.g., the electricity can be used to produce heat), computers, devices that play sound, sensors, optoelectronic devices, electroactive layers, smart features, other interactive features, other devices or systems, etc. In inventive images, the conductive properties of nanomaterials might also be useful and desirable in paints or other colorants, for printing, as coatings, as layers, as surface preparation stabilizers, for bonding, in fibers, in textiles, in thin films, as underlayers, to make image supports that might be stabilizers, to make other image parts, or to make the entire inventive image. Refer to smart paints, smart colorants, smart coatings and smart images below.

In inventive images, the use of a conventional means of conductivity (e.g., copper wires), might be partially or entirely replaced by nanomaterials such as nanowires. Inventive image parts made using nanomaterials might for instance, function as wires. Nanowires for use in inventive images may be made of any composition, e.g, CNTs, quantum wires, gold nanowires, hybrid nanowires; nanowires of silicon and nickel or nickel silicide wires, polymer nanowires, or wires that are part silicon and part nickel-silicon (which might be highly conductive), etc. Nanowires may have closely space walls, and they may have negligible impurities, so the path electrons travel through them may be straighter and more direct than it typically is in conventional wires. Thus, electron transit through nanoscale wires may be hundreds of times faster than it may be through conventional wires. Nanowires or molecular wires might be used instead of silicon and/or instead of copper wires in inventive images or part thereof, e.g., in circuits and other devices.

For example, CNTs may conduct electricity. They might for example conduct as efficiently as or more efficiently than copper (they may be called metallic nanotubes or quantum wires), they may be semi conducting or even superconducting in inventive images. They may be also be insulators. Nanotubes might serve as wires in inventive images, or they might be used to make wires in inventive images. For example, strings of nanotubes that may be identical or nearly identical, might be woven into long wires which may be as efficient or more efficient conductors than copper, yet they may be much lighter. Nanowires might be grown with a wide variety of electrical properties. Nanotubes might be added to, or used with, in or upon polymer and/or other material(s) (see examples herein) to form a nanocomposite or hybrid nanomaterial in an inventive image or part thereof, which may be conductive, semi conductive, and/or which may modify the inventive image's conductivity. As an illustration, an electrically conductive polymer nanomaterial might be made using conductive polymer, non-conductive polymer or both. It might be an image support or an image support stabilizer of any thickness. This polymer nanomaterial might for example, have an embedded network of random self-assembled, electrically conductive CNTs, and this polymer nanomaterial might be suitable for thermal printing. Refer to work by DuPont Central Research and Development, and by Columbia University in NY such as the polymer nanomaterial they made that consists of a conductive polymer that connects the network of CNTs, forming a highly conductive network, that is surrounded, encased or embedded by a non-conductive or insulating polymer. Also refer to Applied Physics Letters, Aug. 2, 2004.

Nanotubes may for example, make polymer composites as conductive as copper or better conductors than copper. Nanomaterials such as nanotubes or SWNT might be added to conductive polymers to enhance their performance. For instance, polyaniline (PANI) may not typically be conducting enough to replace copper wires, but with added nanotubes, PAM may be used instead of copper wire. Such nanotube PANI composites may be lighter than copper wires, and they may have other desirable properties in inventive images, e.g., aesthetic properties. Nanotubes might for example, be made, grown, designed or engineered so that they have the particular conductivity or semi conductivity desired, and if desired, the electrical properties of nanotubes might be made to change in response to stimuli, triggers and/or influences, such as the presence of particular substances, mechanical stress, the flick of a switch, use of a touch control, sound (e.g., a voice), movement or gesture recognition technology, etc. In the use of CNTs for conductivity in other materials, such as in CNT polymer nanocomposites, it may be desirable for the embedded filaments to be randomly oriented (rather than parallel which might be preferred for enhancing strength).

In a preferred example, a conductive or semi conductive polymer nanocomposite or hybrid nanomaterial may be used to make inventive images, e.g., it may be electrically conductive. In such a material, some or all of the nanomaterials might be conductive or semi conductive, some or all of the polymer might be conductive or semi conductive, or both. Spin coating is an example of a method that might be used to form conductive and semi conductive nanomaterials in films, coatings and layers on inventive images or parts thereof such as image supports (e.g., stabilizers). Examples of such films coatings and layers might be thin or extremely thin, (e.g., about 50 nm. thick or about 5 nm. thick) and they might have carrier mobilities that are higher or significantly higher than other spin-coated semiconductors, e.g., at around about 10 times higher. Refer to the work of David Mitzi at IBM.

Conductive or electrically conductive polymer nanocomposites or hybrid nanomaterials might be used in inventive images in many ways (refer to the examples herein and in U.S. Patent Application No. 20030035917-A1). Examples of some of the conventional applications of conductive polymers are for antistatic, electrostatic dissipative and electromagnetic shielding and absorbing materials, for OLEDs, as inks, etc. Conductive polymers such as those used with nanomaterials in composites and hybrid nanomaterials can be used for these purposes in inventive images. However as the description in U.S. Patent Application No. 20030035917-A1 illustrates, the use of such conductive polymers or conductive polymer made with nanomaterials (in nanocomposites or hybrid nanomaterials) in inventive images might be much broader, e.g., use for aesthetic purposes in inventive images such as for color and/or light.

In another example, inventive images of these embodiments might be made with SWNTs, such as those from companies like Carbon Nanotechnology Inc. of Houston, Tex. SWNT may provide or enhance conductivity, for example, in nanocomposites, hybrid nanomaterials and inventive image parts. In another example, in an electrically conductive polymer nanocomposite, the nanomaterials might be nanotubes, CNTs or MWNTs. These nanotubes might be about 50-150 nm in diameter with an aspect ratio greater than about 800.

These nanotubes or similar ones might be used to create electrical conductivity in almost any commodity polymer with negligible impact on the polymer's mechanical properties or processability. These nanotubes have a capacity to carry current that is comparable to copper but with significantly lower density. The use of such a high aspect ratio enables the nanotubes to be conductive using a low percentage of them in the polymer, e.g., using less than about one half of one percent by volume. In comparison, much more of a conventional metal filler might need to be used for the same or similar conductivity. Electrically conductive polymer nanocomposites such as those made with MWNT and/or SWNT also offer other features that might be desirable in inventive images such as reduced weight, the potential of less visibility or more controlled visibility in the polymer and in the inventive image, greater durability, low temperature processability, rigidity, the ability to have a structure and/or a form that is slighter, with less mass and/or other features described herein. (Refer to the Air Force Research Laboratory's Materials and Manufacturing Directorate, Nonmetallic Materials Division, Polymer Branch, Wright-Patterson AFB OH.)

In embodiments, inventive images are made with one or more electrically conducting nanomaterials that are films, thin films, sheets, layers, or buckypapers. These nanomaterials might be transparent, translucent and/or opaque. Examples of these nanomaterials might be made with CNTs, SWNT, DWNT, sheets or films of carbon atoms or graphite, nanocomposites, hybrid nanomaterials, or a combination of these. The nanomaterials in these embodiments might be used for a wide variety of purposes in inventive images such as electronics, LEDs, OLEDs, other displays, transistors, computer chips, photovoltaics, solar cells, touch screens, electrochromics, devices, systems, other smart, intelligent or responsive features, or any of the other examples provided herein. In an example, electrically conductive sheets or films of carbon atoms or graphite that might be any thickness (even thin, very thin, only about a few atoms thick, or about three atoms thick) might be used in inventive images, e.g., in image supports or image support stabilizers, and/or in inventive images or parts thereof that are transparent or translucent. For instance, refer to research in the Oct. 22, 2004 issue of Science. Examples of nanomaterials in these embodiments that might be preferred are transparent and/or translucent, and some of these are made of sheets or films of carbon atoms, CNTs, SWNT and/or DWNT, e.g., buckypapers. Refer to the Aug. 27, 2004 issue of Science; refer to "Transparent, Conductive Nanotube Films," Rinzler et al., Science 305, 1273 (2004); and refer to "Metallic/Semiconducting Nanotube Separation and Ultra-thin, Transparent Nanotube Films" Rinzler et al., Proceedings of the XVIII Winterschool on the Electronic Properties of Novel Electronic Materials, American Institute of Physics, NY 2004. Also refer to work done at University of Florida in Gainesville, Fla., and the Hungarian Academy of Sciences such as their flexible, transparent, electrically conductive, SWNT film that has the maximum amount of contact between the nanotubes and the film.

At room temperature, examples of semiconducting CNTs have been found to have a higher mobility than that of any known material. In an example, inventive images might be made with electrically conductive nanomaterials such as CNTs. These nanomaterials might be positioned so that they span pairs of tiny electrodes. Thus for example, a circuit can be made. This might, for example, be accomplished using methods developed by Junghoon Lee and colleagues at Northwestern University in Illinois, e.g., refer to "Nanotubes go AC/DC" by Philip Ball, Apr. 1, 2004, on www.nature.com, and to "Toward large-scale integration of carbon nanotubes" Chung J., Lee K.-H., Lee J. and Ruoff R. S., Langmuir, advance online publication, 18 March, 2004.

In an example, Fibril Nanotubes by Hyperion Catalysis International of Cambridge Mass., with an aspect ratio of 1:1000 and greater, might be added to inherently nonconductive polymer(s) to provide them with an electrically conductive network at percentages significantly lower than conventional fillers would need to be used at, to produce the same conductivity.

Further examples of conductive, semiconductive or superconductive nanomaterials for making inventive images are layers, coatings, films, and inks that are transparent or translucent, e.g., nanomaterial polymer composites or hybrid materials. These might be flexible and/or rigid. Examples of these might be used for electrodes, transparent electrodes, circuits, lighting, displays, OLEDs, flexible displays, EL Lamps, e-materials, electrochromic systems, photovoltaics, touch screens, and they might be used in other examples described herein (e.g., they might be used instead of ITO, instead of an ITO coated polymer image support, and/or instead of an ITO coated glass image support). Such conductive nanomaterial inks might be applied onto inventive images or parts thereof (e.g., onto image supports that might be stabilizers) in patterns, they might be applied uniformly, they might be applied as desired, and/or they might be applied using a roll to roll process, e.g., such inks might be CNT inks or CNT-polymer inks. Among the sources for such nanomaterials is Eikos Inc. of Franklin, Mass. (refer to www.eikos.com). Eikos makes transparent CNT ink that can easily be printed onto flexible polymer films or image supports (e.g., stabilizers). Because CNT composites might reach the electrical percolation threshold at relatively low loading levels (such as at a loading level of about 0.04% wt.), the CNTs do not affect or do not significantly affect the other properties of the matrix material, e.g., the CNTs do not affect the optical properties or the color of such composites for instance, the transparency of polymer in a CNT polymer nanocomposite formed with such a low loading of CNTs. In comparison, conventional composites might have to be filled with high loading levels (such as a loading level greater than about 5% of the media) to reach the electrical percolation threshold. This may result in poor mechanical and optical properties. Refer to "Carbon Nanotube Based Transparent Conductive Coatings" by Paul J Glatkowski of Eikos Inc., and other documents on the Eikos website.

In an example, conductive or superconductive wire might be made of nanocrystalline ceramic for use in inventive images. In another example, nanocrystalline diamond is used in inventive images, e.g., as a semiconductor. Nanocrystalline diamond is stronger than silicon and may enhance or impart other desirable properties to inventive images. Also, nanomaterials or fullerene that may be combined with metal atoms and nanotubes may offer superconductivity to inventive images. Ultrathin superconducting wires made with nanomaterials may withstand stronger magnetic fields than bigger wires. Refer to work done at the University of Illinois at Urbana-Champaign such as that done with SWNT and molybdenum-germanium (see Physical Review Letters, Jan. 14, 2005).

Note that in other embodiments, nanomaterials might be insulators in inventive images, e.g., nanotubes may be insulating.

(c) In embodiments, nanomaterials and/or nanotechnology might be used to make part or all of devices, machines and/or systems that may or may not be nanoscale in inventive images. In addition or instead, nanomaterials and/or nanotechnology may enable, assist or cause light emission in inventive images or part thereof. Among examples of nanomaterials useful in these embodiments are: nanotubes, CNTs, nanofibers, nanocrystals, nanoscale luminescent crystals, nanoparticles, nanowires, nanoropes, quantum dots, thermoelectric nanomaterials; nanomaterials that are optical fibers, magnetic nanoparticles, semiconductor nanowires made of silicon, gallium nitride and indium phosphide; silica nanowires, nanotextiles, nanosprings, nanobelts, nanocoils, nanocubes, fullerenes, quantum wells, quantum dots, nanobrushes, polymer nanobrushes, nanograss, nanocomposites, hybrid nanomaterials, nano-optical platelets, buckypaper, nanoparticles and nanocrystals with core-and-shell structures, photochromic dye-conducting polymer core-shell nanomaterials; photoluminescent photochromic dye-conducting polymer core-shell nanomaterials; pyrene/polypyrrole core-shell materials; diamond nanomaterials, synthetic single crystal diamond nanomaterials (e.g., made by chemical vapor deposition or CVD); nanomaterials that are magnets or high powered or strong magnets, silicon nanowires; polymer nanowires; nanorotors; biological materials; diatoms, marine diatoms, single celled marine life forms, algae; electronic peptides designed and linked into precise chains by man to make electronic grade materials (e.g., for use in electronic devices that may be cheaper, more flexible and/or lighter); other examples herein, and/or other nanomaterials. Examples of the devices, machines and systems that might be partially or entirely made of nanomaterials in inventive images are: electric, electronic and mechanical devices, machines and systems; printed electronics made with carbon nanotubes; computers, displays, transistors, TFTs, transparent transistors, flexible transistors, capacitors, inductors, resistors, actuators, circuits, integrated circuits, batteries, high-energy-density batteries, nanobatteries, power cells, fuel cells, light emitters, OLEDs, other LEDs, displays, other light sources or light emitting devices, conductive systems, wiring systems, diodes, sensors, electromagnetic sensors, photosensors; light recording devices, machines, materials and/or systems; smart window and electroactive window devices, systems or effects; reflective displays or e-materials, computer chips or chips, computer memory, optical memory devices, optoelectronic memory devices; other data storage; nanoelectric devices based on ionic conductors; microelectronics made with nanotechnology and/or nanomaterials; communications devices, machines and systems; semiconductor devices made with CNTs; devices, machines and systems in the form of fiber, fibers or nanofibers; fuel cells; lasers; photovoltaic cells or devices; solar cells; photonic and optoelectronic materials, devices, machines and systems; optical interconnects; an oscillator or an electromechanical oscillator made with CNTs; photonic band gap materials; optical communications materials, devices and systems; devices, machines and/or systems made using DNA, artificial DNA, protein, bacteria, and/or other biological materials that may be natural or artificial; heat conducting, modulation or diffusing devices, machines and systems; nanoelectromechanical systems (NEMS); electronics made with diamond nanomaterials; as well as microelectromechanical systems (MEMS). Such devices, machines, systems and parts thereof might be nanoscale or larger e.g., nanomachines and nanoscale devices such as those wired using nanocrystals and/or nanotubes. Many of them might be very thin and flat or relatively flat, and they might be flexible, e.g., solar cells or devices, transistors, batteries, reflective displays, e-materials, light emitters, OLEDs, circuits, electronic systems, etc. These examples of devices, machines and systems and others of these embodiments might function very quickly, very efficiently and their performance may be very high quality.

Examples of devices, machines and/or systems or parts thereof of these embodiments are made using nanotechnology, and other examples are made using a combination of nanotechnology and conventional processes, e.g., a combination of conventional semiconductor processing techniques and nanotechnology processes.

It is generally preferable that devices, machines and systems in inventive images or parts thereof, such as those described in these embodiments, are integrated into the aesthetic of their respective inventive images to the extent desired. Alternately, it is generally preferable that devices, machines and systems are not visible in their inventive images (e.g., they might be nanoscale, very small and/or hidden). It may be generally preferable that devices, machines and systems constitute or comprise their inventive image's aesthetic or a major part of it.

Nanomaterial polymer composites might be used to make inventive image devices such as examples herein. For instance, the use of bismuth titanate (BTO) nanocrystals combined with polymethylmethacrylate (PMMA) as a polymer host to produce a composite thin film BTO/PMMA. One method to combine the nanomaterial and the host polymer is by but not limited to spin-coating. Refer to "Preparation and optical constants of nano-crystal and polymer composite $Bi_4Ti_3O_{12}$/PMMA thin films" by Hongliang Yang, Quan Ren, Guangui Zhang, Yuk Tak Chow, Hau Ping Chang and Pak Lim Chu, in Optics & Laser Technology, Volume 37, Issue 4, June 2004, Pages 259-264. Such a composite may be useful in creating or enhancing photo-electronic or electro-optical devices for inventive images. The host polymer in the composite inventive image may or may not be PMMA, and the nanomaterial may or may not be bismuth titanate and may or may not be a nanocrystal.

In embodiments, electronic nanomaterials or nanodevices (which may or may not be nanoscale) are made of nanotubes or CNTs and polymer. They might be nanocomposites or as a hybrid nanomaterials, and they might be made using any method, e.g., using printing processes, a layering processes, using conventional microfabrication processes, etc. For example, an electronic nanomaterial might be made of polymer and semiconducting nanotubes with or without metallic nanotubes. As an illustration, refer to work by the U.S. Naval Research Laboratory and Applied Nanotech Inc, such as in Applied Physics Letters, Jan. 17, 2005.

Nanomaterials might be used to make batteries or nanobatteries for inventive images. Such batteries might offer high energy, high power, greater efficiency, long life, long or infinite shelf life, the ability to be recharged, rapid power up capability, as well as other desirable features such as low cost, environmentally benign materials (like hydrogen), safety, etc. For instance, batteries of these embodiments might offer at least about ten times and perhaps about 100 times the charge and discharge rates of conventional rechargeable batteries. Batteries of these embodiments may for example, be made with CNTs, which may enable them to have a longer life than batteries made without CNTs or other nanomaterials. CNT batteries might be thin and/or flat. As an example, inventive images might be made with batteries or battery technology developed using nanotechnology by NTera of Dublin, Ireland (refer to www.ntera.com). These inventive images might for example have Li-ion batteries or Xoliox batteries by Ntera and/or Altair Nanotechnologies (refer to www.altairint.com) made using nanotechnology. These batteries may have nanomaterials as active battery components in the anode, the cathode or both. For example, their electrodes may be made of nanostructured metal oxides like nanocrystalline lithium titanate spinel, instead of conventional materials. TiO2 might for example, be in such batteries instead of a carbon based anode. Such batteries might have exceptional properties related to the size of their nanoparticles and/or the surface area of their nanomaterials. As another example a microbattery might be used in inventive images made with nanotechnology as described in "Xerogel nanocathodes used in lithium microbatteries" by C. Dewan and D. V. Teeters in Journal of Power Sources 119-121, 310-315 (2003). Batteries made using nanotechnology by mPhase Technologies Inc. (refer to www.mphasetech.com), Lucent Technologies (refer to www.lucent.com), and Bell Labs (refer to www.bell-labs.com) might be used to make inventive images. In an example, batteries or nanobatteries are made using nanograss. Examples are made by mPhase Technologies of Norwalk Conn., using nanograss developed at Bell Labs. In other examples, fullerenes, buckyballs, nanocubes, nanotubes, and/or other nanomaterials might be used to make power cells, fuel cells or batteries for inventive images, e.g., to make hydrogen cells, or fuel cell batteries made with nanotubes (such as those by NEC Corp of Japan). Further examples of nanomaterials used to make battery materials, photovoltaics, fuel cells, etc are made by or using technology from Altair Nanomaterials. Refer to www.altairnano.com/framesets/dev-lpmt_projcts_frmset.html and www.marketwire.com/mw/release_html_b1?release_id=80729. A nanomaterial battery by Toshiba might be used in inventive images, such as a lithium-ion nanomaterial battery.

Examples of inventive images have capacitors, supercapacitors, thin film capacitors, or thin film supercapacitors made using nanotechnology or nanomaterials, e.g., made from nanotubes, CNTs, or MWNT. Nanotubes are desirable for use in electrodes, for capacitors and supercapacitors because they can be highly conductive and because they have large surface areas for trapping electrical charges. Refer to work at the University of CA at Davis and Mytitek Inc. of CA, and refer to the Feb. 1, 2005 issue of Nanotechnology.

Inventive images or part thereof (such as image supports or image support stabilizers) may have transistors, TFTs, or field effect transistors (FET) made using nanomaterials, which may be opaque, transparent, translucent, small, and/or extremely small and which might be fast or extremely fast, or faster than conventional transistors. Nanotube or CNT transistors might be used in inventive images, e.g., made using MWNTs, SWNTs, or individual MWNT or SWNT. Transistors made from CNTs may have electrical properties that might rival or exceed conventional silicon devices. In an example, FET might be made using CNTs, e.g., sub 50 nm. long, refer to Nano Letters Jun. 23, 2004. FET made using CNTs might be used to make fast or very fast circuits in inventive images. In another example, inventive images might be made with nanomaterials that do the work of transistors, and these might be extremely small. Refer to work done at Hewlett-Packard Co. in CA in the Journal of Applied Physics, February 2005. In a further example, TFTs might be made for inventive images using semi conductor nanomaterials like nanowires and/or nanoribbons, such as Si or crystalline $SnO_2$ nanowire thin films, CdS nanoribbons, and/or nanowires with diameters from about 2 nm to about 100 nm made from single crystals of semi conductor materials like silicon, germanium and gallium arsenide. Such TFTs might be capable of a high level of performance and they might be made on a variety of substrates such as polymer(s), that may enable them to be large in size if desired, and/or flexible. Refer to "High-performance thin-film transistors using semiconductor nanowires and nanoribbons" by X. Duan, C. Niu, V. Sahi, J. Chen, J. W. Parce, S. Empedocles, and J. L. Goldman, in Nature 425, 274-278 (18 Sep. 2003). In a further example, inventive images might be made using vertical transistors, vertical FET, or vertical organic FET, e.g., made from nanowires. These might for example, be used in active matrix displays, memory, computer chips, or other devices in inventive images. Refer to work done at UCLA in LA, CA and refer to Applied Physics Letters, Nov. 22, 2004, and to Nano Letters Jul. 14, 2004. Inventive images may be made with technology used to make CNT transistors, such as in the article "Highly Efficient Gating and Doping of Carbon Nanotubes with Polymer Electrolytes," Siddons, Merchin, Back, Jeong and Shim, in Nano Letters Vol. 4 No. 5, 2004, 927-931. In another example, nanowire based FETs used in inventive images might be made using semiconductor nanowires or CNT, such as those developed by Nanosys, e.g., for use in solar cells, displays, RFID, etc. These FETs might be nanoscale and they might be made using inorganic materials like silicon. In a further example, very fast transistors in inventive images might be made using technology developed by Milton Feng and Walid Hafez at the University of Illinois at Urbana-Champaign, such as that published in Applied Physics Letters April 11, (or vol. 86, 152101). These might be made using indium phosphide and indium gallium arsenide.

TFT made in embodiments might enable inventive images to have thin, electronics, the visibility of which might be controlled. Such TFTs might for example, be part of inventive image supports that may be stabilizers. They may be part of inventive images that are used as or similar to the ways that conventional fabrics are used. For example, they may be used in inventive images that are supported as conventional artwork is supported (e.g., like a conventional cotton or linen canvas), or they may be used in inventive images that are worn such as fashion design. They may be used to make inventive image furniture, screens, paintings, sculptures, tents, coverings, floor coverings, handbags, or pillows. They may be used to make inventive images that can unroll and roll up, and/or fold and fold up, such as inventive images in scroll form or inventive images stored in tubes. Or they may be used for other such purposes.

In an embodiment, island metal films (IMFs) or metal island films are used in inventive images. IMFs might be films of two-dimensional nanoparticle ensembles made of metal that are less than about 100 nm high and several nanometers wide. Their metal might be any metal (such as gold, silver, tin, platinum, copper, chromium, bismuth, molybdenum, tantalum, etc.). IMFs might be used in inventive images for electron emission in cathodes for microelectronic devices, field emitters, etc and for light emission when a voltage is applied. Examples of their applications include optical devices, microcathodes, microsources of light, etc. e.g., for novel image displays. Refer to the article "Electro and light emission from island metal films and generation of hot electrons in nanoparticles" by R. D. Fedorovich, A. G. Naumovets, and P. M. Tomchuk, in Physics Reports, Vol. 328, Issues 2-3, April 2000, pages 73-179. Similarly, another example is to coat a surface with a continuous metal film and react it to transform this continuous film into islands of metal oxide that are no longer continuous. These islands can be anywhere up to several hundred nanometers in height and width or diameter. These islands function as nanostructures and might for example, be used in inventive images for sensor systems, field emitters, flat panel displays, lasers, amplifiers, lithography, power electronics, magnetic devices, etc. Refer to research at the University of Virginia.

Inventive images may have solar cells, photovoltaics, or other such means made using nanomaterials and/or nanotechnology to convert outdoor light, indoor light, infrared light, a broad spectrum of both visible and invisible light, or a combination of these into energy or electricity. These might be made with polymer, that might be conductive or semi conductive. These and/or the inventive images or the parts thereof that have them, might be flexible, rigid, thin, very thin, opaque, colored, translucent, transparent, and/or made to the dimensions and/or other specifications desired. Moreover these solar cells and photovoltaics, might be made using printing processes (such as silkscreen processes and other examples herein), with or without silicon and/or the use of vacuum systems conventionally used to make silicon based solar cells. Materials and processes that protect these solar cells and photovoltaics made using conductive polymer, nanotechnology and/or nanomaterials from adverse external or environmental elements are stabilizers, e.g., these stabilizers offer protection against adverse effects from sand, dirt, dust, oxygen, intense sunlight, extreme shifts in temperature, etc. Examples of these stabilizers are materials that encase or hermetically seal these solar cells or photovoltaics. Also, light converted by solar cells, photovoltaics or other such means made using conductive polymer, nanomaterials and/or nanotechnology in an inventive image, is a stabilizer. Energy or electricity produced by such means is a stabilizer too, provided it is used by the inventive image for one or more formal elements (aesthetic or utilitarian). Some or all of the energy or electricity produced by solar cells or photovoltaics might be used by inventive images right away, at a later time, over a period of time, or in a combination of ways. For example, the image might store some or all of the energy or electricity produced (e.g., in a battery that might be thin and/or rechargeable refer to examples herein). A solar cell in an inventive image might also function as a battery and/or a photo capacitor (e.g., refer to work done at Toin University of Yokohama, Japan and to Applied Physics Letters Oct. 25, 2004). This energy or electricity produced might be used in any way desired (see examples herein and in U.S. Patent Application No. 20030035917-A1 such as those which affect the formal elements). For example, electricity might power one or more nanoscale or larger: machines, devices, systems, light emitting devices, computers, sensors, displays or effects of light and/or color, e-materials, organic electronics, electrochromatic effects, sound effects, interactive features, changes or modulations in a formal element, etc. Solar cells or devices or photovoltaics might be created, designed or tuned to meet the specific goals of their inventive images, e.g., to absorb the kind of light desired, the meet desired aesthetic goals such as desired color, shape, thickness, etc.

As preferred example, inventive images may have solar cells, solar devices and/or photovoltaic devices made with one or more of: nanotubes, CNTs, carbon buckyball molecules, buckyballs, fullerene, C60, nanoparticles, nanorods, quantum rods, quantum dots, quantum wells, nanocrystals, titanium dioxide TiO2 nanocrystals or nanoparticles, branching nanocrystals, branching nanorods, branching assemblages of nanorods, tetrapods, nanotetrapods, nanowires, metal oxide nanowires, nanofilms, other nanomaterials, nanofilms, PbSe nanocrystals, lead nanoparticles, selenium nanoparticles, conjugated polymer, conductive polymer, semi conductive polymer, polymer nanowires, examples of polymer(s) herein and/or in U.S. Patent Application No. 20030035917-A1, polymer nanocomposites and/or polymer hybrid nanomaterials examples of nanomaterials herein, etc. Examples of solar cells and photovoltaic devices in inventive images do not have silicon, amorphous silicon, or polysilicon, or they do not rely on these like conventional solar cells and photovoltaic devices do. Polymer solar cells made with nanomaterials for use in inventive images might be flat, such as in sheet form or in large sheets, and they might be in any shape desired. They may be light weight. They may be flexible, e.g., made with polymer electronics. They may be thin (e.g., 1000 times thinner than conventional solar cells), and they may be less expensive or significantly less expensive than conventional solar cells. In a preferred example, a thin flexible polymer nanomaterial solar cell might be used in or on inventive images, e.g., embedded in polymer or used on it. In other preferred examples, inventive images are made with a flexible organic solar cell that is all polymer or mostly polymer, and/or a dye sensitized organic/inorganic hybrid solar cell. Part or all of polymer solar cells or photovoltaics might be made in a non-vacuum process, in a coating process or in a solution coating process, in a printing process, in a self assembly process and/or in a roll to roll process, e.g., using coating or printing machines and rollers. Part or all of polymer solar cells might be in a liquid, solution or other non-solid form. It might be brushed, painted, printed, spin cast, coated, and/or sprayed (e.g., in thin layers) onto an inventive image or part thereof, such as onto an image support (e.g., a stabilizer), that might be rigid and/or flexible, like a polymeric composition, fabric, fibers, a textile, or a flexible non woven form that might be able to unroll and roll up, and/or fold and fold up (like a polymer film or thin sheet). Such a solar cell might for example be made directly on and/or in polymer inventive image surfaces or forms, such as on and/or in inventive images that function as walls, paintings, sculptures, windows, skylights, sculptures, partitions, coverings, clothing, textiles, handbags, and/or fibers (which may then be further processed such as into fabrics or textiles, e.g., for sculptures, paintings, tents, clothing and other forms), etc. In an example, solar cells or photovoltaic devices may be applied onto an inventive image or part thereof (e.g., an image support), in a colorant or paint. In another example, solar cells or photovoltaic devices might be glued or adhered onto an image support or and inventive image, e.g., they may be in the form of a flexible or rigid, film, layer, thin layer or fabric. In an example, inventive images may have light, lights or other devices, with photovoltaic cells made using nanotechnology, that recharge themselves. Refer to examples by Terra Solar Development Corp.

A polymer solar cell may for example, have an extremely thin semi conducting layer sandwiched between two electrodes, at least one of which is preferably transparent or translucent. It may have a semiconducting layer, e.g., about 200 nm thick. It might be made with nanorods (e.g., nanorods of cadmium selenide and/or cadmium telluride) mixed into a semiconducting polymer (e.g., P3HT), as a nanorod polymer composite. Or it might be made with nanorods and a semiconducting polymer in a hybrid nanomaterial. unless there is another, different basis for such a designation Inventive images may have solar cells or photovoltaic devices made by or made using technology by Nanosys Inc. in Palo Alto, Calif. at www.nanosysinc.com; by Nanosolar Inc. in Palo Alto, Calif. at www.nanosolar.com; by ST Microelectronics of Geneva Switzerland; and/or by Siemens of Erlangen Germany. For example, solar cells made using proprietary technology by Nanosolar might be used in inventive images such as solar cells or nano-organic solar cells with "nanobrush" architecture. In these devices, the "nanobrush hairs" might be about 10 nm. in diameter, and they may be spaced about 10 nm apart, positioned perpendicularly to the electrodes they are in between, interdigitated with the other material. Nanosolar may use a wide range of materials in their solar cells, thus properties might be optimized for specific inventive images. Nanosolar may produce these solar cells so that they are highly uniform, using quick, simple solution based coating processes and inexpensive materials. A Nanosolar solar or photovoltaic device might also use titanium compounds and conductive polymer. In a further example, photovoltaic films or solar cells might be made in inventive images using a nanomaterial made of metal oxide nanowires that may be a liquid or another non-solid form, such as that made by Nanosolar. It might self assemble into a photovoltaic film. For example, it might be sprayed, coated or printed onto an image support or a polymer image support (e.g., a stabilizer) where it may self assemble.

In an example, inventive images may have dye based solar cells that use dye molecules to absorb photons. For example inventive images might have solar cells made using an organic dye as its light harvesting layer, like or similar to that in "A photovoltaic device structure based on internal electron emission" by E. McFarland and J. Tang in Nature 421, 616-618, Feb. 6, 2003. In an example, solar cells in inventive images might be made using conductive polymer (such as MDMO-PPV), with nanomaterials (such as PCBM molecules made from buckminserfullerene), e.g., as or similar to the solar cells in Applied Physics Letters 78, 841 (2001), S. Shaheen et al. In an example, solar cells for inventive images might use a photophysical process whereby for each incident solar photon two excitons (electron-hole pairs) are created (rather than one). Refer to work by Victor Klimov and Richard Schaller at Los Alamos National Laboratory in Los Alamos, N. Mex. (http://quantum dot.lanl.gov), e.g., see the article in Physical Review Letters. Examples of solar cells or photovoltaic cells for inventive images might be made with electrically conductive polymers and buckyballs. Refer to those made by Siemens. An example from Georgia Institute of Technology is a polymer solar cell that might be made with pentacene, a layer of carbon buckyball molecules, bathocuproine and an aluminum electrode, such as that described in Applied Physics Letters Nov. 29, 2004. A further example is a solar cell or photovoltaic device that harvests infrared light. It might be solution processed, e.g. applied by spraying, painting, printing, coating, etc. It might be made with lead sulfide nanocrystals and semiconducting polymer or conjugated polymer such as poly[2-methoxy-5-(2'-ethylhexyloxy-p-phenylenevinylene)] (MEH-PPV). Refer to work done at the University of Toronto in Canada, and to Nature Materials Jan. 9, 2005.

Inventive images that convert light into energy made using nanomaterials and/or nanotechnology may for example have photovoltaic molecular or solid state structures, cells, devices or machines that do artificial photosynthesis using light to produce electrical current in inventive images, imitating natural photosynthesis. Inventive images might have Graetzel or Gratzel cells made with nanomaterials such as titanium dioxide nanoparticles. Inventive images might have nanocrystalline dye-sensitized solar cells such as those by Michael Graetzel or Gratzel. Graetzel or Gratzel cells might be on inventive images or parts thereof (such as image supports), e.g., made using silk screen processes. Graetzel or Gratzel cells might be transparent or almost transparent, translucent, thin or extremely thin, and/or flexible. In another example, inventive images might have solar cells made with titanium dioxide nanocrystals coated with a dye, like or similar to those made by Toshiba of Kawasaki (see www.Toshiba.com/tai-new/). Such solar cells might for example, be transparent, flexible, made in a non-vacuum process (e.g., a printing or coating process) and they might operate efficiently even in cloudy weather.

In another preferred example, inventive images might be made with solar cells or photovoltaic cells or devices made by and/or made using technology by Konarka Technologies in Lowell Mass. (refer to www.konarkatech.com or www.konarka.com). Examples of these are made using titanium dioxide $TiO_2$ semiconductor nanoparticles or nanocrystals, and light absorbing dye; or semiconductive particles or nanoparticles of titanium dioxide coated with light absorbing dyes, embedded in an electrolyte between the front and back electrical contacts. Some or all of the polymer used in Konarka's solar cells or photovoltaic cells might be conductive. For example, Konarka makes solar cells using conductive polymers and carbon fullerenes or buckyballs to absorb light and transfer electrons. In another example, solar cells or photovoltaic devices may be made for inventive images using conductive polymers with quantum dots or semiconductor nanocrystals which may absorb throughout the visible spectrum and into or through the infrared, like Evidots by Evident (www.evidenttech.com). Konarka may use production processes that enable them to put photovoltaic cells on inexpensive, flexible polymer image supports (rather than on more costly image supports like glass or silicon). For instance Konarka uses cold sintering by which the materials in solar cells or photovoltaic devices can be made under temperatures that are relatively low. Polymer image supports in Kornarka's solar cells or photovoltaic devices may be flexible, thin, and light weight, and they may be stabilizers. Konarka's solar cells or photovoltaic cells may function efficiently in artificial light (indoors) as well as in natural light (outdoors). They may be any size or shape, they may be integrated into the aesthetic of inventive images, and they may be colored, opaque, and/or translucent. Konarka's solar cells or photovoltaic cells may be made in a roll to roll process, they may be in long flexible rolls, and they may be cut and configured into the sizes and shapes desired.

Photovoltaic fibers, textiles, fabrics, woven materials, clothing, examples of these that are fully integrated, and/or the technology for any of these might be used to make inventive images. Such fibers, textiles, fabrics, woven materials, and/or clothing might be able to generate power or electricity using light. The power generated might be used for another formal element of the same inventive image, e.g., to run a display or light. This power is a stabilizer. Refer to work done by Konarka and/or Ecole Polytechnique Federale de Lausanne in France.

In other examples, nanocrystals that are very good harvesters of light might be used in photovoltaic devices, solar cells, and/or in polymer nanocomposites or hybrid nanomaterials in inventive images, e.g., in devices capable of conducting optical communications. In examples, quantum confined atoms, atoms or ions caged inside nanocrystals, and/or doped nanocrystals are useful for making numerous kinds of devices in inventive images, such as a variety of optical devices, nanoscale photonics, photon detectors; light emitting devices (e.g., solid state lighting), displays (e.g., flat, slim displays, flexible etc.), sensors, nanomagnets, nanomenory chips for optical computers, optical logic and information storage, as well as lasers for use in inventive images. Examples of quantum confined atoms for use in inventive images are: ZnO nanocrystals, $Y_2O_3$ nanocrystals, $Gd_2O_3$ nanocrystals, quantum confined atom based phosphors, quantum confined atom nanophosphors, $Y_2O_3:Tb^{3+}$ nanocrystals, $Y_2O_3:Eu^{3+}$ nanocrystals, $Gd_2O_3:Tb^{3+}$ nanocrystals; $Eu^{2+}$ and $Mn^{2+}$ in quantum confined atoms of ZnO, ZnS:Mn nanocrystals, nanocrystals of oxide materials, etc. In preferred embodiments, quantum confined atom polymer nanocomposites are used to make inventive images. See descriptions below. Also, refer to work by Ramesh Bhargava or Rameshwar Bhargava, Nanocrystals Technology in Briarcliff Manor, N.Y. (www.nanocrystals.corn), and by Oak Ridge National Laboratory in Oak Ridge Tenn. (www.ornl.gov).

Tetrapod-branched inorganic nanocrystals may be used to make many materials, electronics, nanoelectronics, machines, devices, solar cells, photovoltaics and systems for inventive images. Refer to "Controlled growth of tetrapod-branched inorganic nanocrystals" by L. Manna, D. Milliron, A. Meisel, E. Scher, and A. P. Alivisatos, in Nature Materials 2, 382-385, 2003.

In a different example, nanofibers, such as vanadium oxide nanofibers, are used to make an actuator in an inventive image. In a further example, piezoelectric and/or ferroelectric based smart materials are used to make transducers and actuators in nanoscale machines and/or devices for inventive images. Structurally controlled piezoelectric and ferroelectric nanobelts and nanosprings might for example, be made using zinc oxide ZnO, as Zhong Lin Wang and Xiang Yang Kong have done at the Georgia Institute of Technology in Atlanta, Ga. Nanobelts and nanosprings might also be used for sensors, nanoinductors, and tunable components for MEMS and NEMS in inventive images. In an example, nanosprings might be used in composites; nanodevices; nanoswitches; nanosensors; nanoscale magnetic field producers and detectors; and/or in nanomechanical and nanoelectromagenetic devices in inventive images, e.g., helical silica nanosprings such as helical $SiO_2$ nanosprings. An inventive image might for example, have a nanoscale motor with nanoscale gears.

In examples, semiconducting nanowires are used to make nanomachines, nanodevices, and/or nanosystems inventive images, such as light emitters, LEDs, transistors, circuits, electronic circuits, other optoelectronic devices, sensors, heat pumping thermoelectric devices, optocommunications systems, photonic devices, electroactive layers, other devices, machines or systems (refer to examples herein and in U.S. Patent Application No. 20030035917-A1), or as parts thereof. For instance, nanowires composed to two different semiconductors, silicon and silicon germanium alloy in discrete alternating segments, or nanowires that are striped or superlatticed might be used in inventive images, as might nanowires made of germanium core surrounded by a silicon shell; other core-shell nanowires; nanowires of silicon, silicon oxide and germanium; other multi shell nanowires, and semiconducting nanowires encased in insulating shells. Nanowires might be also made by blending two elements together, such as by coating silicon wires with metal nickel and then exposing them to a high temperature to blend the two materials, forming a heterostructure. Such a heterostructure can then be reduced to nanoscale dimensions and be integrated into electronic devices for use in novel or existing technology. In an example, solid nanowires or very thin nanotubes might be used in conjunction with silicon transistors, for example in computers in inventive images (e.g., the nanotubes might be made of carbon, gallium arsenide or other semi conducting materials, and these nanotubes may for instance be about 1.4 nm wide). In an example, in forming a machine, device, or system or part thereof (such as an electronic device, a transistor, a circuit or a LED), for an inventive image, nanowires in a dispersion or solution might be assembled onto glass image supports and/or polymer image supports (that might be flexible and that might be stabilizers). This might be done at room temperature (though the nanowires may be synthesized at high temperature). The resultant machine, device, or system or part thereof might be capable of high quality performance, it might be rugged, and it might be light weight. Refer to work by Mike McAlpine at Harvard University in Cambridge, Mass. such as that reported at www.Nanotechweb.org in "Nanowire devices bend and flex" Oct. 22, 2003 and in Nano Letters.

In an example, nanowires and/or luminescent nanomaterials such as nanowires might be used in inventive images. One example is ZnO nanowires or nanomaterials synthesized using Au nanoparticles, which exhibit a green luminescence at room temperature. Refer to "Catalytic growth of semiconducting zinc oxide nanowires and their photoluminescence properties" by Y. W. Wang, L. D. Zhang, G. Z. Wang, X. S. Peng, Z. Q. Chu and C. H. Lian, in Journal of Crystal Growth, Volume 234, Issue 1, January 2002, Pages 171-175. The ZnO nanomaterials may be in any nanomaterial form, refer to examples herein. Au nanoparticles may or may not be used in the synthesis of ZnO nanowires. ZnO and other oxide, nanowires may be used in electro-optical devices such as light-emitting diodes, diode lasers, microelectronics, etc. to create or enhance an inventive image. In an illustration, LEDs made with nanomaterials such as nanowire or ZnO nanowire, might emit white light in an inventive image. Refer to Applied Physics Letters, Dec. 13, 2004, pp. 6004-6006.

In an example, nanowires, such as glass nanowires or silica nanowires are used to make machines, devices, systems or parts thereof in inventive images, e.g., optical devices, optical sensors, integrated circuits, optoelectronic devices, and photonic devices. Such nanowires might for example, be extremely strong, yet flexible also as they might be twisted and tied into tight knots. Despite having a diameter smaller than the wavelength of visible light, such nanowires may serve as guides around which light waves flow. Most of the light might be guided around these nanowires instead of inside of them. Such nanowires might be made with smooth or very smooth surfaces (e.g., at the atomic level), and they might be made with a uniform diameter so that the light might remain coherent as it travels. Refer to work by Eric Mazur and colleagues at Harvard University (e.g., at http://mazur-www.Harvard.edu), to Jacqueline Hewett's article on it in Opto & Laser Europe magazine, February 2004, and to the National Science Foundation at www.nsf.gov. In another example, semiconductor nanoribbons, nanoribbons of crystalline oxide, or nanowires may serve as waveguides in inventive images. Refer to work at the University of CA and Lawrence Berkeley National Laboratory, such as that in Science, Aug. 27, 2004. In another example, optical fiber nanomaterials may be used to make inventive images. In addition to or instead of their conventional uses (for transmission, information, communication, etc.), such optical fibers may be used in inventive images for their light emission—emitting light at their tips, along their lengths or both. Refer to "Subwavelength-diameter silica wires for low-loss optical wave guiding," Tong, L., et al., Nature, 426, 816-818. As an illustration, an inventive image might have a cluster of these optical fibers emitting light as an aesthetic element. Optical fibers may be used in different ways in inventive images that are rigid and/or flexible, even in the form of fabric or as part of fabric.

In an example, DNA or the self-assembly ability of DNA might be used to construct devices, machines and/or systems for inventive images. Among examples are logic gates and/or chips or microchips made using DNA, and circuits or CNT transistors, which for instance, might be used in small fast computers, or for data storage in images. In embodiments, a nanoswitch might be used that enables smaller and more powerful electronics e.g., for logic, for memory etc. Refer to Terabe et al in Nature 433, 47-50, (2005); refer to "Quantized Conductance Atomic Switch" in Nature Jan. 6, 2005; and refer to work done at Nuckolls Lab at Columbia University in NY and at Lindsay Lab, Arizona State University Tempe Ariz., in Nano Letters 2005. In an example, inventive images are made with electronic devices that use technology by Jim Hutchison of University of Oregon or that use similar technology, such as that described in Langmuir June 2004, and in U.S. Pat. No. 6,872,971 "Scaffold-organized clusters and electronic made using such clusters," e.g., for use in inventive images in transistors, memory, nanoelectronics, etc. In another an example, nanotechnology is used to make a hybrid device with silicon and gallium arsenide and a compatible material in between them, that might be used to make a super chip for inventive images, e.g., enabling wireless communications.

In embodiments, non-silicon nanomaterials (or nanomaterials not made of silicon) might be used to make a computer or part thereof for inventive images (with or without the use of silicon also). In embodiments, computers or parts thereof are made using conductive polymer or conductive polymer nanomaterials, e.g., polymer chips that might be called poly-chips, which might be extremely small, flexible, easy to manufacture (e.g., by printing processes or ink jet printing), and inexpensive. These computers or parts thereof may or may not have silicon, they might have other organic materials (such as CNT), they might be organic-inorganic hybrids, etc. In embodiments, nanomaterials might be used to make quantum computers or quantum computer parts for inventive images (e.g., chips that do quantum computing).

In embodiments, chips might be made with superconducting nanocircuits, quantum dots, quantum bits or qubits (e.g., preferably more than the few, perhaps for example, hundreds), nanowires, silicon nanowires, and/or strained germanium nanomaterials that might be more conductive than silicon. Such computers might be nanoscale or larger. In embodiments, integrated circuits might be made with nanomaterials or nanotechnology using process(es) as small as about 90 nm or smaller, about 65 nm. or smaller, about 45 nm or smaller, about 32 nm or smaller, about 22 nm or smaller, or that are in the range of about 65 nm. to about 20 nm. In embodiments, nanolithography is used to make electronics for inventive images such as integrated circuits or chips. Examples are liquid immersion or immersion lithographic processes (such as processes as small as about 193 nm); imprint lithography or nanoimprint lithography; and extreme ultraviolet lithography or EUV. In embodiments, nanotubes (such as CNTs) might be used in inventive images in integrated circuits, integrated silicon circuits, computer circuits, logic, logic circuits, logic gates, memory, and/or related devices, which might be tiny, e.g., for use in computers. The CNTs may, for instance, replace some or all copper wires used in circuits conventional practices, (CNTs may carry much more current density than copper, they transmit electrons faster and they dissipate heat more readily). Inventive images might be made with nanotube based, nonvolatile random access memory or RAM that might be high density, such as NRAM by Nantero of Woburn Mass., and at www.nantero.com, or memory developed by LSI Logic or Gresham, Oreg. Other nanomaterials by Nantero might be used in inventive images if desired, such as nanotube films and fabrics (e.g., refer to U.S. Pat. No. 6,706,402), CNT-based radiation-hard random access memory that might be non-volatile, NEMs switches and logic. In another example, inventive images might be made with optoelectronic memory devices which are nanomaterials, such as those made using carbon nanotubes, e.g., those made using CNT transistors and photosensitive polymer such as those by Nanomix Inc and UCLA, refer to Nano Letters, Jun. 16, 2004. Other examples of memory made using nanotechnology for use in inventive images are: memory made with polymer and/or buckyballs (e.g., refer to Applied Physics Letters Nov. 29, 2004, refer to work done by UCLA and Rohm and Haas Electronic Materials Co. such as their high speed, nonvolatile memory made with polystyrene and gold nanoparticles, see Nature Materials Nov. 28, 2004); ferroelectric random access memory, FRAM, or memory made with ferroelectric nanomaterials, such as ferroelectric nanodisks and/or nanorods (refer to Nature, Dec. 9, 2004, and to Fujitsu Microelectronics America Inc.); magnetic RAM or MRAM, in which data is stored magnetically such as spin-momentum magnetic memory cells (e.g., refer to work done a NVE Corporation in Eden Prairie, Minn. and refer to U.S. Pat. No. 6,744,086); ovonic memory, ovonic unified memory, or memory that records data electrically onto thin films; molecular memory that reads and writes data by adding and removing electrons off nanoscale molecules; hybrid devices that combine nanotechnology and MEMS, such as IBM's Millipede; memory with three dimensional architectures in which data is stored vertically in addition to or instead of horizontally; data storage made using germanium crystals or nanocrystals; nanowire memory cells (e.g., in a transistor, for example, refer to work done at University of Southern CA and NASA Ames Research Center); memory made using porphyrins (refer to Applied Nanotech in Austin, Tex.); holographic memory; optical memory that stores photonic qubits, such as for use in all optical computers etc. (refer to work done at NASA's Jet Propulsion Laboratory and to Physical Review Letters Nov. 21, 2003); nanomechanical memory such as that made from single-crystal silicon wafers (refer to Badzey et al., 2004 Applied Physics Letters 85, 3587); memory by ZettaCore of Denver, Colo., at www.zettacore.com; and other examples, etc. A memory device, a FLASH memory device, circuits, logic circuits, microelectronics, other devices or parts thereof might be made using nanocrystals, silicon nanocrystals, and/or silicon-based self assembly. Small memory devices that can store large quantities of data might be made using molecules called rotaxanes, e.g., such as those made at Hewlett-Packard's Quantum Science Research Lab.

In another example, arrays of CNTs might be used as electronic circuits in inventive images. Aligned nanotubes on a sapphire base might be a transparent conducting material in inventive images. Refer to the Nov. 15, 2004 issue of Angewandte Chemie International Edition, refer to work at the Weizmann Institute of Science in Isreal, see work at the U.S. National Institute of Standards and Technology in Md and Colorado, and refer to Applied Physics Letters 2004.

Antennas made with nanomaterials (such as CNTs or MWNT), may be used in inventive images in embodiments. Due to their small size, they might pick up light such as nanoscale wavelengths of visible light. They might not pick up radio waves. For example, refer to Applied Physics Letters Sep. 27, 2004.

In an example CNTs might be used to make power semiconductors; semiconductors with high voltages and currents (as well as low voltages and currents); power switches; or power transistors. Nanotubes might be used as switches controlling such devices as LEDs and electric motors in inventive images. In another example, MWNT might be used to make a nanometer-scale rotational motor. Such a device might be useful in sensors, optical devices, optical mirrors, detectors, computer information transmission, computer information storage, etc. in inventive images. Refer to work by A. Zetti Research Group at the Berkeley National Laboratory, U.S. Department of Energy in Berkeley, Calif. such as that published in Berkeley Lab's "Nanotech Briefs," and in Nature, Vol. 424, Jul. 24, 2003 page 408-410 "Rotational actuators based on carbon nanotubes."

In an example, a NEM device might be used in inventive images exploiting surface tension effects, such as that by A. Zetti and colleagues at the UC Berkeley and Lawrence Berkeley National Laboratory. Refer to B. C. Regan et al. 2005, Applied Physics Letters 86, 123119.

As further examples, single molecules can act as devices such as molecular switches, as wires, they can convert light into mechanical energy, photosensitive molecules might serve as switches or actuators in devices or machines, a transistor might be made with a channel just one molecule wide, a transistor might be a single CNT that can be switched on and off with a single electron, a transistor might be made from a pair of SWNT and organic molecules, a nanotube (e.g., SWNT) transistor might have a channel length of only about 18 nm., a magnet might be made of a single molecule, a computer circuit might be wired up within a single CNT, a laser might be made of a single atom, a logic gate might be made of a single molecule, logic circuits or logic functions might be within single molecules, carbon film that is only one atom thick might be used in devices; SWNT in devices may only be one molecular layer thick so that every atom might be a surface (e.g., sensors might be extremely sensitive), formations of nanowires might be used to make extremely small LEDs, computer chip circuits measuring less than about 100 nm wide might operate at speeds much faster than conventional ones, and electronic parts might be made by joining single molecules together. Quantum dots might be used to make transistors, or computers. For example, a logic gate might be made using electrons (e.g., two or three electrons) trapped in a quantum dot (refer to Science, Aug. 7, 2003). A nanomotor might be made that is about 500 nm wide such as that made by Alex Zetti and colleagues at the University of CA., Berkeley using a MWNT on a silicon wafer with a gold square measuring about 200 nm wide. As another example, disordered assemblies of gold nanowires and conductive organic molecules might function as non-volatile memory and/or as logic gates in inventive images. Refer to "NanoCell Electronic Memories" by Tour et al. in the Journal of the American Chemical Society, Oct. 20, 2003 or Oct. 29, 2003.

In other examples, fullerene based materials may be in photonic devices in inventive images. In an example, various hydrogel based nanoparticles may be used to form photonic crystals the optical properties of which might be tuned by thermally adjusting the particles' water content, e.g., such nanoparticles may be synthesized from poly-N-isopropylacrylamide (pNIPAm).

In further examples, smart materials that change in response to an electric field might be made from nanoparticles or other nanomaterials for use in inventive images. Such nanomaterials might for example, swell, expand, contract, and/or bend in response to a trigger, stimuli and/or influence. Examples of such nanomaterials may have much faster response times than polymer hydrogels and conductive polymers generally have shown to date. In Advanced Materials 15, 922-926, of Jun. 5, 2003, "Nanoparticle actuators", by B. Raguse, K.-H. Muller, and L. Wieczorek describe a new class of electromechanical actuator materials made by using the conductive and structural properties of nanoparticle aggregates. A CNT actuator might be used in inventive images. In another example, actuators made of nanomaterials that change shape in response to electricity may be used in inventive images such as actuators made of nanocrystals of NiTi (nickel and titanium) e.g., by Nanomuscle of Antioch, Calif. (see www.nanomuscle.com).

In further examples, nanotechnology and/or nanomaterials are used to make reflective displays, electro-optic mediums, electrochromic systems or (e.g., displays), and/or e-materials for use as inventive images or parts thereof. These may be bistable, flexible, rigid, opaque and/or transparent. NanoChromic displays by Ntera of Dublin, Ireland (refer to www.ntera.com) are further examples. These might be thin or very thin, paper-like, electrochromic displays. They may be changed by electricity, the switching time may be rapid and require low voltage. NanoChromic displays may have transparent electrodes made of nanostructured films of semi conducting metal oxides and electrochromic molecules, electrochromophores or viologen molecules that may be colored or bleached depending on the introduction or the removal of an electron. By using different viologen molecules, these displays can have different colors. Their backgrounds might be colored and/or transparent. The nanomaterial films' large surface area makes these displays more effective, e.g., it accommodates large numbers of viologen molecules that can create high quality color and high contrast or resolution, as well as fast switching speeds. Between the electrodes, NanoChromic displays may have a reflector made of a nanostructured film of titanium dioxide, giving the display a highly reflective, bright white background like that of conventional paper. NanoChromic displays require little power. They are bistable, thus they will remain colored using no power until they are actively bleached or changed. Refer to "Nanomaterials-Based Electrochromics for Paper-Quality Displays" by U. Bach, D. Corr, D. Lupo, F. Pichot and M. Ryan in Advanced Materials, 14, No. 11, Jun. 5, 2002, page 845. NanoChromic displays may be made using existing facilities and machinery conventionally used to make LCDs e.g., as by Densitron Technologies PLC, in the UK and Merck KgaA of Germany.

Other preferred examples are E-Ink Corp.'s displays and technology (see www.eink.com) made with nanomaterials and/or nanotechnology. See examples in patents assigned to E Ink Corp. such as: U.S. Patent No. 20030096113, May 22, 2003, "Electrophoretic displays using nanoparticles;" U.S. Pat. No. 6,580,545 Jun. 17, 2003 "Electrochromic-nanoparticle displays;" U.S. Pat. No. 6,538,801 Mar. 25, 2003 "Electrophoretic displays using nanoparticles;" and U.S. Pat. No. 6,323,989 Nov. 27, 2001 "Electro phoretic displays using nanoparticles." Also refer to "Nanotube-Based Ultrafast Electrochromic Display" by S. I. Cho, W. J. Kwon, S. J. Choi, P. Kim, S-A. Park, J. Kim, S. J. Son, R. Xiao, S-H. Kim and S. B. Lee, in Advanced Materials, 17, No. 2, Jan. 31, 2005, p. 171.

In embodiments, inventive images or parts thereof might function as smart windows or they may have electrochromic systems or other technology that is used on smart windows or similar to this which is made using nanotechnology and/or nanomaterials, e.g., a smart window layer or part thereof might be used on an inventive image or part thereof, such as on a polymeric image support that may be a stabilizer. Examples of smart windows change in color and/or light properties with a trigger, stimulus or influence (such as electricity), e.g., darkening and becoming less transparent, or becoming lighter and more transparent in response to the trigger, stimulus or influence. This might be desirable in inventive images or parts thereof for aesthetic and/or utilitarian purposes. It may for example, serve as a design or compositional element, and/or as an underlayer for superimpositions such as colorants like paints, collaged elements, attachments, added layers or parts, etc., e.g., a changeable compositional element or underlayer for an inventive image painting, construction, wall, ceiling or window. An inventive image might have one or more of such compositional elements. Inventive images or parts thereof might of these embodiments might be made using technology and/or materials from Ntera, e.g., NanoChromics technology or materials that might have fast switching times, very low power consumption, a wide range of colors, polymer image supports (e.g., stabilizers) and other desirable features.

In examples, devices, systems, machines circuits, electronics, sensors, photonic systems, electronics, polymer electronics, other such forms, or parts of these might be made by printing, ink jet printing, writing, marking, spraying, spin coating, painting, or applying nanomaterials, conductive polymers and/or compositions containing one or a combination of these to an image support that may be a stabilizer. For instance, such forms may be made by adding nanomaterials to a liquid or other medium like a solvent or a polymer. This might then be used as an ink, a paint or a colorant. The mixture might be applied using any method, e.g., it might be used in an ink jet printer, in a pen, in a marker, on a brush, in a pencil, etc. Nanomaterials might be key components in smart inks, intelligent inks, smart colorants, smart paints, etc.

Light emitted in inventive images using nanomaterials and/or nanotechnology might be constant, or it might change a little or a lot over time at any rate, even with video speed. Also, this emitted light might be controlled and/or modulated, such as by viewers, touch controls, sensors, programming in the image itself, movement or gesture recognition technology, or remotely, e.g., by a computer or nanocomputer, by another nanodevice that is part of the image, remotely via the Internet, using wireless communication, etc. The use of nanomaterials in light sources might enhance or impart to them and/or to their inventive image one or more of the properties described herein such as color and/or light properties, enhanced performance and/or functionality (e.g., enabling them to be programmed), enhanced mechanical and/or physical properties, greater stability or permanence, conductivity, etc.

Conductive or semi conductive nanomaterials (such as nanotubes, CNTs, nanowires and nanocrystals) may cause or contribute to light emission in inventive images. As another example, crossed wires made with nanoscale semiconductors may function as light emitters.

CNTs might be used in different ways to make the light emitting inventive images of these embodiments. CNTs are excellent field emitters. They can produce streams of electrons with high efficiency which might be used for light emission in inventive images such as for still and/or for changing light emission, e.g., as they may be used in displays like televisions and computer monitors. Products and/or technology used to make televisions, displays, flat panel displays, and flat computer monitors with nanotechnology might be used to make inventive images such as that by companies like Samsung of Korea, Dupont, Motorola Inc., and SI Diamond Technology of Austin, Tex. (also known as Nano Proprietary and by its subsidiary Applied Nanotech of Austin, Tex., refer to www. Dupont.com/et, www.cdreamdisplay.com, www-.sidiamond.com and www.nano-proprietary.com), etc. Inventive images might also be made using field emission displays (FEDs) made of CNT materials such as those made by or made using technology by Nanomix of Emeryville Calif., (refer to www.nano.com), Noritake of Japan (refer to www.noritake.com), DuPont Electronic Technologies of Research Triangle Park, N.C. (refer to www.Dupont.com/et); Carbon Nanotechnologies in Houston Tex. (see www.cnanotech.com); and/or Osaka Gas Co. Ltd. of Japan whose carbon nanotube called Meta-Carbo has iron inside the tube and who also makes carbon nanotubes called Amo-carbo. Products and/or nanotechnology used to make displays by cDream of San Jose, Calif., might be used to make inventive images, like their thin flat FEDs made with CNTs, conventional CRT technology and high voltage phosphor technology, such as that described at the Society for Information Display 2003 Conference in the session "Low-Temperature Carbon Nanotubes for Triode-Type Field Emitter Arrays" on May 21, 2003 in Baltimore, Md. cDream's displays for inventive images might be made with a planar array of CNTs emitters that positions a very redundant electron source behind each subpixel (instead of the conventional hot filament electron gun of conventional cathode ray tubes). Such displays might have wide viewing angles, high display quality, and they may require low power. In another illustration, CNTs may make a display that may be flat-panel and/or flexible, such as the CNTs FEDs by the Industrial Technology Research Institute and Samsung. Refer to U.S. Pat. No. 6,692,791 and "Fully sealed, high-brightness carbon-nanotube field-emission display" by W. B. Choi et. al. *Applied Physics Letters* 75 (20) 3129, 15 Nov. 1999.

In another example, CNTs can be used in light emitting diodes in inventive images. These may be called CNT diodes or CNT LEDs. Such a diode may or may not be able to also function as a field effect transistor. This may be possible using an electric field to create the p and n regions within the semiconducting material. The electron flow might be restricted to a single direction and may be switched to another direction. Refer to Lee et al., Applied Physics Letters, 5 Jul. 2004 and GE Global Research at http://geglobalresearch.com/04_media/news/20040707_nano.shtml. Refer also to U.S. Patent Application No. 20040104396 "Device using self-organizable polymer" filed Nov. 14, 2003. In a further example, nanodiodes might be made for inventive images by changing or controlling CNT properties, such as by the use of electric fields or other means, e.g, like or similar to work by Ji-Ung Lee and colleagues at the Nanotechnology Advanced Technology Program, GE Global Research Center, Niskayuna, N.Y.

Semiconducting nanotubes may fluoresce and CNTs may enhance the fluorescence of materials they are close to. CNTs may for example, act as a source of electrons stimulating light emission from a secondary fluorescent material. Electron field emissive materials might be used to make inventive images in these embodiments, such as in making displays like flat screen displays. Examples are: diamond-like thin films, fullerenes, spindt-tips, silicon nanowires, nanoscale tip structures formed by irradiating silicon with a laser, and, silicon field-emission tips resulting from laser crystallization of amorphous silicon. Refer to "Electron field emission from excimer laser crystallized amorphous silicon" by Y. F. Tang, S. R. P. Silva, B. O. Boskovic, J. M. Shannon and M. J. Rose, Applied Physics Letters 80, 4154-4156, May 3, 2002). Also refer to "Flat Panel Display Prototype Using Gated Carbon Nanotube Field Matters" Applied Physics Letters, Feb. 26, 2001. In inventive images that have displays made using CNTs such as those described in the article above, a single pixel might have many CNTs (e.g., thousands of them), so that there is a lot of redundancy and pixels will not deteriorate over time, or they may not deteriorate quickly or significantly over time. Also, because CNTs are so small, the number of pixels used in a display could result in resolution that is higher than the human eye can appreciate. Buckytubes may be great field emitters, they can be used to make electron based devices more effective and longer lasting, and to make flat panel displays for inventive images.

As another example, FEDs might be made for inventive images with nanofibers such as graphite nanofiber emitters, e.g., those by K. Hagiwara, M. Ushirozawa, K. Tanaka, S. Okamoto, T. Yamamoto, M. Hirakawa, H. Nakano, O. Miura, H. Murakami, K. Okasaka and T. Sadaki at NHK Science and Technical Research Laboratories in Tokyo, Japan. In a further example, inventive images may be made with hopping-field-emission-display (HOPFED) architecture or technology such as that described by Philips and LG. Phillips Displays, refer to H. M. Visser et al. SD) Intl. Symp. Digest Tech. Papers, 806 (2003), and refer to Information Display October 2004 a SID publication.

Emitted light in inventive images or part thereof might be from the use of nano-emissive display (NED) technology by Motorola's Microelectronic and Physical Sciences Labs or from the use of similar technology. Such a display might for example, be thin or very thin, e.g., perhaps 0.5 in. thick. In another example, ferroelectric materials may be used to create a programmable OLED light source. The ferroelectric bandgap crystals allow the opportunity to control and manipulate light. ferroelectric materials might be used to make light emitting devices and/or optical displays that might be nanoscale or macroscopic. See U.S. Pat. No. 6,028,835.

Inventive images might be made with light emitted from miniature cathode ray tubes that are fitted with many CNTs, e.g., hundreds of CNTs. A single pixel in a display might be made of three of these CNT cathode ray tubes. A display of four meters by three meters might have about 1.4 million of these CNT cathode ray tubes, they might be installed on a polymer image support, and they might be turned on and off using electricity. The nanotubes in such a display might be about 50 nm in diameter and a few microns long, e.g., between about 5 and 10 microns long. Such a display might be flexible, e.g., it might roll up like a scroll or like a blueprint. Such displays in inventive images might be made using products and/or nanotechnology from, or similar to that by Jean Chretien Favreau, Vu Thien Binh, and/or their company, Inanov in France, such as "Nanopage" and such as that in U.S. Pat. No. 6,433,702 Aug. 13, 2002.

In other examples, CNTs might be light emissive, as might nanofibers. Among the potential uses of light from CNTs in inventive images, may be for communication, displays and/or processing data in computers, transistors, optical communications, electronic devices, etc. (refer to examples herein). CNTs may for example, function as compact, nanoscale and easy to integrate photon emitters. They might be used in photonic and/or optoelectronic devices and/or in sensors in inventive images, as for example is described in "Electrically induced optical emission from a carbon nanotube FET" by J. A. Misewich, R. Martel, Ph. Avouris, J. C. Tsang, S. Heinze, and J. Tersoff in Science vol. 300, May 2, 2003, 783-786. Also refer to Science, Sep. 5, 2003. The wavelength of the light emitted by a CNT light emitting device such as that described in this Science article, might be determined by the bandgap of the nanotube, which depends on the nanotube's diameter. Therefore, selecting nanotubes of a particular width, may be a way to select and control emission color in inventive images.

In another example, silver nanoparticles can be added to a flexible substrate to improve line alignment. Refer to "Ink-Jet Printing of Functional Polymers and Materials: First International Workshop in Eindhoven" by B. J. de Gans, U.S. Schubert in *Macromolecular Rapid Communications*, Vol 26, Issue 4, pp 331-2 (7 Feb. 2005) and www.plasticlogic.com Individual CNTs might emit light in inventive images when electric current is run through them. This process that might be called electron-hole recombination. Refer to research by James Misewich at the U.S. Department of Energy's Brookhaven National Laboratory and at IBM's T.J. Watson Research Center.

As another example, bulbs made of CNTs might be in inventive images. For instance, CNTs might serve as a filament in a simple light bulb. Refer to "Polarized incandescent light emission from carbon nanotubes" by P. Li, K. Jiang, M. Liu, Q. Li, A. S. Fan and J. Sun, in Applied Physics Letters 82, 1763-1765, Mar. 17, 2003. CNTs might replace conventional tungsten filaments in light bulbs, refer to J Wei et al. in 2004 Applied Physics Letters 84(24) 4869-4871.

In further examples, other emissive nanomaterials might be used in these embodiments. Further examples are nanorods of cadmium selenide (CdSe), nanorods of CdSe with a layer of ZnS on their outer surface, or core/shell CdSe/CdS/ZnS nanorods (see reference to work by L. Manna, E. Scher, L.-S. Li, and P. Alivisatos above). Nanocrystals or CdS/ZnS nanocrystals might be used in inventive images for their light properties, e.g., refer to "Electrically Driven Nanocrystal Emitters Proposed" in Photonics Spectra, page 109 July 2004; refer to "CdS/ZnS Nanocrystals Display Blue Lasing" Photonics Spectra p. 101, April 2005, and refer to Applied Physics Letters, Feb. 14, 2005, and other such work done at Massachusetts Institute of Technology in Cambridge, Mass. Nanocrystals made from a cadmium selenide core within a cadmium sulfide shell might be made to emit multiple colors of light depending on their size. Nanorods or rod shaped nanocrystals might be stacked for use in LEDs in inventive images. As other examples, semiconducting nanoparticles such as quantum dots and rods can emit light, and nanocrystals have excellent luminescent properties and can also emit light. Their optical and electronic properties might be tailored for different purposes, such as to make LEDs or other colorants for inventive images. OLEDs made using nanomaterials such as nanocrystals or quantum dots might be desirable for use in inventive images. Quantum dot polymer composites might be used to make OLEDs or LEDs in inventive images, for example, combining the desirable properties of inorganic materials (such as their stability, their color purity, and their high performance electrical and optical properties) with the desirable properties of polymers (such as their flexibility and manufacturing processes like solution processing).

Inventive images might for example, be made with one or more OLEDs, LEDs or nano-OLEDs made using nanomaterials like semiconductor nanocrystals. For example, nanocrystals may emit light of any color, and this color may be highly saturated in comparison to conventional light emitting sources enabling the formation of brighter, higher contrast and more accurately colored light sources like displays. The color light emitted by nanocrystals may depend on their size. Thus, every light emitting nanocrystal in a light emitting device might be made of the same composition regardless of how many colors the display has. Light emitting devices made with colored light from nanocrystals that are chemically the same is different from conventional light emitting devices and may offer advantages such as a consistency and ease in performance, processing and manufacturing. Moreover, the nanocrystals in a Nano-OLED or other light emitting device might produce a high luminescence in only a thin layer, e.g., in a layer that is about one nanocrystal in thickness which may be about 3 nm thick. As example, technology described in these two patents or related technology might be used to make inventive images. Refer to U.S. Pat. No. 6,864, 626 Weiss, et al. Mar. 8, 2005 "Electronic displays using optically pumped luminescent semiconductor nanocrystals" and refer to U.S. Pat. No. 6,322,901 Bawendi, et al., Nov. 27, 2001 "Highly luminescent color-selective nano-crystalline materials." Nanocrystals may be excited using a quantum well or electron trap to inject pairs of electrons and holes into nanocrystals, which pair up to emit photons. This method may or may not serve to eliminate the need to connect wires directly to the nanocrystals because the nanocrystals may function to emit light wirelessly. This method may also be used to improve the efficiency of a light-emitting device fabricated using nanocrystals.

Nanocrystals in Nano-OLEDs, OLEDs or LEDs might for example, be selected from the group of semiconductor compounds CdS, CdSe, CdTe and mixtures of two or more of these. Inventive images or parts thereof might be made as described in U.S. Pat. No. 6,608,439 entitled "Inorganic-based color conversion matrix element for organic color display devices and method of fabrication" by inventors, Soklik et al., assignee: eMagin Corporation of Hopewell, Junction, N.Y. As another example, nanocrystals and/or other nanomaterials embedded in polymer, glass or crystal might emit light in an inventive image. This might be done in inventive images using techniques and/or processes used by or similar to those used by researchers at the National Institute of Advanced Industrial Science and Technology of Ikeda, Japan and published in Langmuir, Jan. 6, 2004. Work by researchers at Los Alamos National Laboratory making nanocrystal LEDs offers an example, such as that reported in Nature Jun. 10, 2004. In another example, semiconductor crystals or nanocrystals for fabricating light emitting diodes can be manufactured using an approach called cantilever epitaxy or a similar technology. In this method, a semiconductor material such as gallium nitride is inserted into trenches created on a sapphire surface, and a temperature change is applied. The result is a virtually flawless LED that can also emit white light. Refer to "Control of crystallographic tilt in GaN grown on Si (111) by cantilever epitaxy" T. M. Katona, J. S. Speck, S. P. DenBaars. *Applied Physics Letters*, 81, pp. 3558-3560, (2002) and U.S. Patent Application No. 20020090816 "Cantilever epitaxial process". Refer to work at Sandia National Laboratory in CA and NM such as that by Jerry Simmons, and that using quantum dots or encapsulated quantum dots in solid-state white light emitting devices.

In an example, hybrid OLEDs that have light emitters made with cadmium selenium (CdSe) nanocrystals, quantum dots or colloidal quantum dots might be used in inventive images or part thereof. In an example, a single layer of colloidal quantum dots or CdSe quantum dots (e.g., so thin that it may only be about a single layer of molecules), might be sandwiched between thin films in an OLED, e.g., in a structure with the one thin emissive layer between a hole transport layer and an electron transport layer. The emissive layer in a quantum dot LED (or QD-LED) may for example, only be about a few nanometers thick. It might be made of single nanocrystals, e.g., with diameters of about 3 nm., that are preferably uniformly distributed. Such a quantum dot array might be made using self assembly, for example, after spin casting the nanocrystals onto an image support in a solution, the nanocrystals may spontaneously undergo a phase segregation, popping up onto the top of the organic layer. These might for example be specially coated CdSe/ZnS quantum dots spin coated onto an ITO coated polymer or glass image support. The luminescent spectrum of such OLEDs might be tuned to particular wavelengths by varying the size of the quantum dots. Because in inorganic nanocrystals every electron-hole recombination can produce a photon, such quantum dot LEDs made with simple inorganic nanocrystals have the potential of achieving 100% quantum efficiency at any wavelength. (This possibility of achieving 100% quantum efficiency is also offered by the use of phosphorescent emitters in OLEDs described in forthcoming text.) Refer to "Electroluminescence from single monolayers of nanocrystals in molecular organic devices" by S. Coe, W.-K. Woo, M. Bawendi, and V. Bulovi in Nature 420, 800-803, Dec. 19, 2002. Such hybrid optoelectronic structures made of organic and inorganic materials are desirable for making active devices in inventive images. In other examples, the single molecule thick emissive layer between the electron transport layer and the hole transport layer in the OLED may be a molecular bilayer of cyanine dyes, or it may be a rubrene dye layer. In further examples, the OLEDs or LEDs in inventive images are nanoscale and/or nanomaterials. Refer to Purcell et al. Physical Review Letters, 11 Mar. 2002, refer to 'Fabrication and Properties of Organic Light-Emitting "Nanodiode" Arrays' by J. Veinot, et al., in Nano Letters 2, Mar. 12, 2002; and refer to "Scaling Quantum-Dot Light-Emitting Diodes to Submicrometer Sizes" Applied Physics Letters, Sep. 2, 2002. Also refer to other descriptions of OLEDs and hybrid OLEDs herein.

Quantum dots may be efficient light emitters and/or they might offer other enhancements such as modification of the color or of the color quality of the emitters. Because nanocrystals are smaller than waves of light, they do not scatter light waves (unlike the materials used in conventional lighting). In an example, light emitted from quantum dots may be used in inventive images. This might for instance, be in fluorescent lights, LEDs, and/or incandescent lights in inventive images. Quantum dots that are encapsulated nanocrystals might be used, such as nanocrystals encapsulated in polymer. The light emitted by the quantum dots in this example might be white light, it might be colored or both. For each quantum dot, the color or wavelength of light might be determined by its size. Color also might be affected by interactions between nanocrystal clusters and the materials in which they are embedded.

As another example, quantum confined atoms might be used to enable, cause or to assist the emission of light in inventive images. In examples, light emitting quantum confined atoms are used to make inventive images. They may for example, be used in solid state light emitting devices in inventive images. UV light might excite the atoms and cause luminescence. In a preferred example, quantum confined atoms may be mixed with one or more polymers and formed into any shape or form desired in making an inventive image, e.g., the mixture might be made into an image support that may be a stabilizer and it might be light emitting. In examples of nanomaterials made using quantum confined atoms (such as the quantum confined atom polymer nanocomposites), the efficiency of light emitted from a single caged atom (ion) may be the highest when the particle size is less than about 5 nm, or between about 2-5 nm. Lighting made using quantum confined atoms in inventive images might run cool, it might work under even the most demanding conditions, it might be very efficient, and/or it might last substantially longer than conventional light sources, e.g., hundreds of times longer. Quantum confined atoms such as nanophosphors might also be used to increase the efficiency of conventional light sources used in inventive images, such as LEDs, halogen lamps, fluorescent bulbs, etc. In addition, quantum confined atoms might also be used to make light such as displays in inventive images like flat panel displays. Refer to U.S. Pat. No. 5,455,489 entitled "Displays Comprising Doped Nanocrystal Phosphors" and U.S. Pat. No. 5,422,489 entitled "Light Emitting Device" both of which are by the inventor, Rameshwar N. Bhargava of Ossining, N.Y. Also refer to the description and examples of quantum confined atoms above, refer to other work by Rameshwar N. Bhargava, see Nanocrystals Technology in Briarcliff Manor, N.Y. (www.nanocrystals.com), and Oak Ridge National Laboratory in Oak Ridge Tenn. (www.ornl.gov).

Nanowires might be used to make the light emitting inventive images of these embodiments. In a further example, LEDs or NanoLEDs are made using nanowires of indium phosphide (InP). These might for example, be used in inventive images as light sources and/or in integrated optical circuits such as for communication and/or interactive purposes.

The color of light emitted by LEDs made of nanowires, might be precisely tuned by controlling the diameter of the nanowires when they are made. In a further example, using nanotechnology LED clusters can be made which have three LEDs, a red, a green and a blue. Thus by mixing these colors and controlling their intensity, any color might be created. Such LED clusters might be small enough and they might be installed in an inventive image or part thereof densely enough so that the display of light made using many of them is smooth to the human eye in an inventive image.

In a further example, nanomaterials such as nanospheres can be used to fabricate OLEDs. This might for instance be done using a miniemulsion process is adopted to obtain spheres of semiconducting polymers of the size of 50-500 nm. Such a system may be useful in achieving improved device efficiency through enhanced electron injection. Such a system may lead toward the fabrication of nanoscaled OLEDs. Refer to "Organic Light-Emitting Devices Fabricated from Semiconducting Nanospheres" by T. Poik, S. Gamerith, C. Gadermaier, H. Plank, F. P. Wenzl, S. Patil, R. Montenegro, T. Kietzke, D. Neher, U. Scherf, K. Landfester, and E. J. W. List, in *Advanced Materials* 2003, pp 15, No. 10, May 16.

Nanomaterials such as these examples and others used to make conventional displays (like flat screens) might be desirable in inventive images or part thereof. Examples are light emitting paintings, sculptures, murals, walls, pillows, chairs, tables, lamps, handbags, etc.

In embodiments, light-emitting silicon, a light emitting silicon nanomaterial and/or light-emitting silicon nanocrystal is used in inventive images. In embodiments, inventive images or parts thereof have a silicon based LED, light made using, from or based on silicon nanocrystals, a silicon nanocrystal field-effect LED, a silicon nanocrystal transistor capable of emitting light, and/or a field-effect LED. Refer to "Glow in the spark silicon" on www.nature.com by Philip Ball, 8 Mar. 2001; "An efficient room-temperature silicon-based light emitting diode" Ng, W. L., et al., Nature 410, 192-194 (2001); "Light-Emitting Silicon Shines Much Brighter in New Invention," New York Times, Oct. 28, 2002, by John Markoff; "Silicon nanocrystal transistor shines" Technology Research News Feb. 9/16, 2005 at www.trnmag.com; see Nature Materials Jan. 23, 2005; the work of Robert J. Walters and colleagues from the Harry A. Atwater's group at California Institute of Technology in Pasadena Calif., e.g., see Nature Materials February 2005; and "Light Emitting Silicon Heralds Breakthrough" Neil Munro, Sydney at www.asiabiztech.com/nea/200111/coau_152120.html (Nikkei Electronics Asia November 2001), Nikkei Business Publications, Inc. Also refer to InnovaLight of St. Paul Minn. and at www.innovalight.com. Nanocrystalline porous silicon or nanocrystalline silicon (a form of porous silicon) is another example that might emit light in inventive images. Refer to "Generation of ballistic electrons in nanocrystalline porous silicon layers and its application to a solid-state planar luminescent device" by Y. Nakajima, A. Kojima, and N. Koshida, Applied Physics Letters 81, 2472-2474, Sep. 23, 2002. In additional examples, silicon nanowires are used to make FEDs in inventive images.

In embodiments, nanoshells, such as metal nanoshells, are used to make inventive images. Nanoshells may for example absorb and/or scatter light in inventive images at virtually any wavelength in the visible or infrared ranges, depending factors that might be controlled and/or tuned, such as the material(s) the particle is made of, the particle's dimensions and other specifications. Thus nanoshells (like silica gold nanoshells) might be used in and/or on layers, coatings, films, devices, sensors, optical materials, solar collection materials, photonic devices, nanostructures used for plasmonics, nanolenses, or other inventive image parts or in entire inventive images made of polymer, fabric, glass, crystal; nanocomposites or hybrid nanomaterials such examples herein; other examples herein and in U.S. Patent Application No. 20030035917-A1, and/or other materials. Embedding nanoshells in other materials like polymers, nanocomposites or hybrid nanomaterials may modify the host materials' properties.

In examples, nanoshells might be used to inhibit photo-oxidation in conducting polymers, e.g., in polymer OLEDs, photodiodes, displays, solar cells, lasers, and transistors. This may for example, enhance the performance and/or the permanence or lifetime of these devices. Examples of the conducting polymers nanoshells might enhance are: poly[2-methoxy-5-(2'-ethylhexyloxy) 1,4-phen-ylenevinylene] (MEH-PPV) or poly(3-octylthiophene) (P3OT). In other examples, nanoshells might be used to achieve a dramatic optomechanical response in nanoshell hydrogel composites. For instance, nanoshells embedded in thermally responsive polymers form composites, such as nanoshell N-isopropylacrylamide composites, that may be capable of significant photothermally stimulated volume changes that may be controllable and/or reversible. Refer to work at Rice University in Houston Tex., such as "The Optical Properties of Nanoshells" by Naomi Halas in Optics and Photonics News, August 2002, pages 26-30.

Devices, machines, systems, light, and/or emitted light in inventive images may enable or create a desirable function, subject matter, content, meaning, and/or aesthetic. Refer to examples (n), (o), (p) and (r) below. Notably, the visibility and aesthetic contribution of devices, machines, and systems of these embodiments in inventive images can be controlled as never before, opening the door for a wide range of new aesthetic effects and novel images. Inventive images may have desirable, new or enhanced properties from devices, machines and systems made using nanotechnology and nanomaterials, without issues and problems which often come with conventional devices, machines and systems made without nanotechnology. For example, devices, machines and systems made with nanotechnology can be significantly smaller, less visible, significantly less visible, barely visible, more easily hidden from view, invisible in the inventive image and/or lighter in weight than they might be without nanotechnology. Without nanotechnology, the physical forms of such devices, systems and/or machines often presented issues or problems, e.g., the device has to be integrated into the image physically and/or aesthetically, or the device had to be hidden. Devices, systems and machines made using nanomaterials, might for example, easily be integrated into inventive images (physically and/or aesthetically), and they might be visible to the extent desired. Their visibility and their presence as aesthetic parts of formed inventive images can be principally or entirely aesthetic choices. They might for example, be integrated into image supports (e.g., stabilizers) with little or no visibility or with aesthetically desirable visibility, and this visibility might be easily modified or changed. Refer to (q) below.

These embodiments offer ways that inventive images might be smart images. They may for example, have capabilities, that might be significant and/or novel from nanoscale machines, devices, systems, materials and the like; they may self actuate; and/or they might respond to or interact with external stimuli, the environment and/or viewers, directly or indirectly. For example, inventive images of these embodiments might have sensors or nanosensors with any degree of sensitivity even very high. These might detect and respond to light, sound, electricity, temperature, movement, water, particular molecules and/or specific biological forms. Sensors that are nanoscale or even larger might enable inventive images to acquire, process and use information, perhaps in massive quantities, perhaps quickly, and perhaps efficiently, while possibly contributing little weight, mass or size, and using little power, e.g., they might be easily integrated into inventive images or hidden from view. As further examples, smart inventive images of these embodiments might have nanoscale computers, sensors, electronics, solar cells, actuators, light emitting devices, batteries, and/or other examples herein. Nanomaterials used in devices, systems and machines in inventive images might enable them to have enormous memory capability in an extremely small size form (e.g., the size of a postage stamp or smaller). They might be easy to use or integrate into inventive images that might be interactive, responsive, smart, novel, unique, and/or unlike any images ever made before. Further examples of inventive images of these embodiments might have or might be comprised of large numbers of nanomachines (e.g., ranging from simple to complex) functioning independently or together (e.g., in a system or in a swarm or in swarms) to accomplish objectives that may be complex.

As an illustration, an inventive image that might have a utilitarian functions (such as a wall, clothing, a ceiling, a floor, a table, a chair, a container, a wearable accessory, etc.) may have computers or nanocomputers as part of it that may or may not be visible, but which may have any or all of the other features that conventional computers offer. It may also have features and capability that are enhanced or new in comparison to conventional computers, e.g., these computers or nanocomputers might be smaller, faster, with enhanced interactivity, larger displays that may have greater resolution, larger memory, etc.

(d) In embodiments, nanomaterials and/or nanotechnology might enhance or impart visual and/or optical effects in inventive images such as color and/or light properties. Among examples of the nanomaterials that might be used in these embodiments are nanotubes, nanofibers, nanocrystals, nanoparticles, nanowire, nanorope, buckypaper, nanotextiles, nanocomposites, hybrid nanomaterials, other examples herein, and/or other nanomaterials. The visual and/or optical effects created in these embodiments might change and/or modulate in inventive images. These inventive image properties or formal elements might for example, change or modulate on their own, e.g., due to programming. In addition or instead, they may change or modulate with stimulation, triggering, or another influence. For example, when stimulated by one or more stabilizers, such as applied current or electricity (e.g., electrochromatic or electrochromic effects); a chemical; a liquid (e.g., solvatechromic effects in which liquid stimulates color change); light (e.g., photochromic effects); temperature change (e.g., thermochromic effects); one or more sensors, perhaps in combination with another stabilizer; electron beam (e.g., carsolchromic effects in which electron beam stimulates color change); pressure (e.g., piezorochromic effects or piezochromism in which pressure stimulates color change); and/or another stabilizer. The change or modulation in might also occur when a dial is turned, a button or touch control is activated, in response to voice command, sounds, movements, changes in light and/or other interaction from viewers. Examples are herein.

In an example, inventive images are made with electrochromatic nanomaterials, such as electrochromatic nanoparticles, nanocrystal quantum dots, semi conducting nanoparticles, semi conducting cadmium selenide or indium phosphide nanoparticles, etc. With the addition or the withdrawal of one or more electrons, such nanomaterials might change in optical and/or visual properties, e.g., color and/or light. Electrochromatic nanomaterials in inventive images may enable their optical and/or visual properties to be switched. Such changes might be visible as part of these inventive images, e.g., contributing to or creating the aesthetic. As an example, refer to U.S. Pat. No. 6,580,545 Jun. 17, 2003, "Electrochromatic nanoparticle displays."

As another example, semi conductor quantum dots might fluoresce at precise frequencies, triggered by electricity or by a variety of wavelengths. They also might reflect, refract and/or absorb light in ways that may be affected by voltage. This might be used in electrochromic or photochromic effects in inventive images such as by the use of electricity or light to change or modify color in inventive images or part thereof. It may also be useful in solar cells.

In another example, one or more kinds of nanomaterials (such as nanoparticles) in an inventive image may disperse or aggregate in response to a trigger, stimulant or influence, such as electricity or an electric field. These nanomaterials or nanoparticles might only be visible as part of the inventive image when they are aggregated. When dispersed, they may not be visible to the human eye. The visual and/or optical properties (such as the color and light properties) of such inventive images may change as nanomaterials or nanoparticles disperse and aggregate. These nanomaterials or nanoparticles may aggregate in different configurations changing the inventive image's visual and/or optical properties in a way that might be random, designed and/or controlled. Such nanomaterials or nanoparticles may have one or more dimensions, such as their diameter, substantially less than wavelengths of visible light. For examples, refer to U.S. Pat. No. 6,323,989 Nov. 27, 2001 "Electrophorectic displays using nanoparticles," refer to U.S. Pat. No. 6,538,801 Mar. 25, 2003 "Electrophoretic displays using nanoparticles" and refer to displays and technology by E Ink Corp.

In further examples, nanomaterials enhance or impart visual and/or optical effects (such as effects of color and light) by their visibility in inventive images and/or by their interaction(s) with other ingredient(s) in or component(s) of these inventive images. For instance, a nanotextile, a nanorope, or an inventive image part or mount made, largely made or partially made using nanotubes may be a visible part of an inventive image, e.g., attached to it or embedded to it. In another example, if enough nanoscale nanomaterials (such as nanodots or gold nanoparticles), are close enough together in an inventive image (but not close enough together to combine with one another into larger forms that are not nanoscale), their color and/or light effects, or their other visual or optical effects might be seen with the naked eye, e.g., they might be on an inventive image surface; within a transparent or translucent inventive image or a part thereof (such as within a polymer nanocomposite or hybrid nanomaterial); and/or in an inventive image or a part thereof made of or largely made of nanomaterials.

In an example, inventive images might have two or three dimensional patterns, designs and/or structures that might be electrically conductive, of agglomerated silver nanoparticles made using a laser, using a laser fabrication process, or using multiphoton absorption laser fabrication. Refer to Optics Express, Feb. 21, 2005, pp. 1275-1280.

In other examples, the use of nanomaterials and/or nanotechnology in inventive images or part thereof, might enhance or provide iridescence, fluorescence, reflectivity, luster, color (hue, value and/or intensity), transparency, translucency, opacity, a high refractive index, and/or effects from the use of a different refractive index. Such effects might for example, be created on one or more inventive image surfaces, they might exist within inventive images, or at different depths within it, e.g., at different depths within a transparent or translucent polymer nanocomposite inventive image or part thereof (like an image support that may be a stabilizer). For instance, silicon nanomaterials may be fluorescent. The fluorescence of silica nanoparticles may approach the brightness of quantum dots, which might for example, be desirable visually and/or for such uses as optical computing and sensors. Refer to work done at Cornell University such as that reported in NanoLetters Jan. 12, 2005. In a further example, the fluorescent emission of semiconductor nanoparticles might be used in images for visual effects, for devices like optoelectronic devices, etc. Moreover, it might be tunable. For example, refer to "Band gap engineering of CdTe nanocrystals through chemical surface modification in J. Am. Chem. Soc. advance online publication, Jan. 20, 2005.

In examples, the large surface area of nanomaterials and their small size may enhance or create these and/or other visual and optical effects. It may enable them to bring new and improved properties to inventive images, such as enhanced color saturation, more subtle color gradations, more complete color mixtures, enhanced transparency, enhanced gloss, enhanced mattness, enhanced reflectivity, enhanced luster, enhanced iridescence, etc. Such effects might for example, be made using nanomaterials like metal nanomaterials in transparent inventive images or parts thereof made with polymer, glass, and/or crystal. Such effects may be constant, or they may change or modulate in any manner and using any means desired.

As a further illustration, inventive images or parts thereof such as layers, films and thin films made using nanomaterials might be photochromic. Such inventive images or parts thereof may for example, darken and/or change or modulate in color and/or light properties with exposure to UV light (a stabilizer). Examples of these photochromic effects might return to their original color (which might be clear and colorless) when their UV light exposure ends. Other examples might retain their changed or darkened color once their UV light exposure ends. Then, for instance, by exposing them to intense white light filtered to remove UV (which may be called "photo bleaching"), they may either be brought all the way back to their original state (which might be clear and colorless), or they may have color and light properties determined by the color of the bleaching light to which they are exposed. When bleached with a particular wavelength of light, such photochromic inventive images or parts thereof (e.g., layers or films) might only recover their transparency and their original color or lack thereof, as well as their light properties, to light with a wavelength similar to that of the bleaching light. Thus, such photochromic inventive images or parts thereof might be colored with light and this might be controlled and/or reversed. These photochromic inventive images or parts thereof (e.g., films) might be made of titanium oxide embedded with silver nanoparticles. Refer to "Multicolour photochromism of TiO2 films loaded with silver nanoparticles" by Y. Ohko, T. Tatsuma, T. Fujii, K. Naoi, C. Niwa, Y. Kubota and A. Fujishima in Nature Materials 2, 29-31, January 2002.

In other illustrations, nanomaterials and/or nanotechnology enable inventive images or parts thereof to have visual and/or optical effects that can be controlled by electricity such as effects of color and/or light, e.g., electrochromatic effects. For example, the colors and/or light properties of an inventive image or a part thereof (such as an image support), might change or modulate by turning a switch, touch controls, gesture or movement recognition technology, a change in electrical current, and/or due to the design or programming of the inventive image, e.g., the change or modulation might be from clear and colorless, to a blue that might be transparent, translucent or opaque. If desired such a change might change one or more of the inventive image's other formal elements to any degree from slight to dramatic. For example, an inventive image's underlayer or areas of its composition might change in color and light properties, e.g., preprogrammed or interactively. An inventive image's function might change as its color and light properties change (e.g., it may serve as a light source that is triggered by the presence of people or that is triggered by a switch); or it may even change from being see through (transparent or translucent) to not being see through (to less translucent or even to being opaque) such as from serving as a window to serving as a wall or as a partition. Other formal elements might change as its color and light properties change too, e.g., the inventive image's subject matter and its meaning. U.S. Patent Application No. 20030035917-A1 describes other ways in which an inventive image or part thereof might change from being see through (transparent or translucent) to not being see through (to less translucent or even to being opaque).

In embodiments, the optical and/or visual properties that nanomaterials enhance or impart in inventive images might be partially or significantly determined by their size(s), shape(s), and by the composition(s) or ingredient(s) surrounding them in the inventive image. Refer to computer programs by George Schatz of Northwestern University in Evanston Ill., that show how the size(s), shape(s), composition(s) and solvent environment of nanoparticles determines their color, that enable nanostructures to be tailored to respond to specific colors of light. Refer to www.chem.northwestern.edu/~schatz or www.chem.northwestern.edu/brochure/schatz.html. Such information and computer programs might be very useful in making inventive images.

The optical and/or visual properties made in these embodiments may enable or create a desirable aesthetic in inventive images. Refer to examples (o), (p) and (r) below.

(e) In embodiments, nanomaterials and/or nanotechnology might enhance or impart inventive images with the ability to conduct, modulate, diffuse, resist and/or block heat. This ability may for example, be useful in inventive images with devices, computers, systems, electronics, machines and the like that are nanoscale or larger, such as examples herein and in U.S. Patent Application No. 20030035917-A1. This ability may enhance the function of the inventive images, refer to (n) below. It may enhance the stability and/or permanence of inventive images, e.g., valuable fine art is commonly kept at controlled temperatures, though it does not conventionally control or adjust to temperature itself. Examples of nanomaterials that might be used in these embodiments are nanotubes, CNTs, nanofibers, nanocrystals, nanoparticles, buckypaper, metal nanoparticles, polymer coated gold nanoparticles, nanograss, nanotextiles, nanomachines, sensors, nanocomposites, hybrid nanomaterials, PCMs that are nanomaterials, other examples herein, and/or other nanomaterials.

In an example, nanomaterials and/or nanotechnology are used in a device, machine, system, or part thereof to cool inventive images or parts thereof, e.g, to cool devices, machines and systems or parts thereof. An example is a cooling system or device that might be called nano-lightning, e.g., made with CNTs. Refer to work by S. Garimella, T. Fisher, D. Schlitz and V. Singhal at Perdue University, West Lafayette, Ind., and to Thorrn Micro Technologies Inc. In another example, nanograss may be in a cooling system in inventive images e.g., for chips and perhaps other devices, machines or systems, refer to work at Bell Labs (see www.bell-labs.com).

As another example, nanotubes might modulate heat as polymer is forming, and/or nanotubes might modulate and/or conduct heat in the formed inventive image. In an example, nanomaterials and/or nanotechnology might be used to make PCMs for inventive images. Refer to PCMs above. Among the reasons why PCM nanomaterials may desirable in inventive images is the high surface area they offer.

The ability of CNTs to conduct heat makes them well suited for use in electronics and in devices, machines and systems in inventive images. In the use of CNTs in other materials for thermal conductivity (such as in CNT polymer nanocomposites), it may be desirable for the embedded filaments to be randomly oriented (rather than parallel to each other which might be preferred for enhancing strength). SWNTs might be preferred for use as conductors of heat in inventive images because they may be the best known conductors of heat, exceeding diamond (see J. Hone, B. Batlogg, A. T. Johnson, J. E. Fischer, Science 289, 1730, 2000).

In an example, metal nanoparticles, or polymer coated gold nanoparticles may have desirable thermal properties (such as thermal conductivity) for use in inventive images. Refer to work by researchers at the University of Illinois at Urbana-Champaign, such as Zhenbin Ge, David Cahill and the Braun Research Group. Refer to work done at the University of Minnesota in Minneapolis Minn., such as work by the Taton Group. Also refer to Nano Letters 2005. Thermal control or insulation might be accomplished (completely or partially) in an inventive image, by the use of nanolaminates or superimposed layers of dissimilar materials because heat cannot travel effectively through such layers. See the journal, Science Feb. 13, 2004. In another example, aerogel nanomaterials might be used to control or modulate heat or temperature, or for thermal insulation in inventive images.

In further examples, nanomaterials may enable inventive images to modify the temperature in the area around them. For example, an inventive image functioning as a wall, a mural, a ceiling, a floor, a sculpture, or as part thereof may effect the temperature of the room or area around it in a desirable way, in a way that contributes to the meaning of the image, or both. For instance such an inventive image might show a scene that correlates with the way it is affecting the temperature in the space around it, e.g., it may warm the area around it and show the tropics.

(f) In embodiments, nanotechnology and/or nanomaterials may enable, give, or assist in giving inventive images or parts thereof the ability to detect problems or risks within themselves, and/or the ability to mitigate, resolve or eliminate such problems or risks. Examples of such nanomaterials are sensors, computers, devices, machines, systems, nanocomposites and/or hybrid nanomaterials such as those made with polymer. These might be conductive or non conductive, and nanoscale or larger. Among the problems and risks that such nanomaterials might detect or assist in detecting are cracks, fractures, impact, dents, weaknesses, hardware failure, fatigue, temperature or light changes, other environmental conditions, viewers getting to close to the inventive image, etc. An inventive image may for example, make changes itself to mitigate, resolve or eliminate such problems or risks, e.g., changes in its inner structure and/or surface. For example, a polymer nanocomposite or hybrid nanomaterial in an inventive image or part thereof might be self repairing, or self healing. Refer to further description above.

In one illustration, a composite or hybrid nanomaterial might have conductive nanomaterials (such as CNTs), and tiny filled minicapsules (e.g., a micron or so wide). When a crack or fracture occurs, the change in the material's electrical properties might trigger the minicapsules in that area to open and fill the crack or fracture (e.g., using sensors to pinpoint the crack's location). In another example, a nanotube polymer composite material used to make inventive images might automatically return to its original form if it is pushed in, bent or damaged, e.g., when dented it returns to its original form. This is a feature already available on X-TRAIL car fenders made of nanotube polymer composite materials by Nissan of Japan. Shape memory materials and/or EAPs that are nanomaterials might be used to make such inventive images.

(g) In embodiments, inventive images have one or more threads, yarns, cords, strands, cables, fibers, fabrics, wires, ropes, textiles, meshes, woven materials, or the like (hereafter referred to as TYCSC) made using nanotechnology and/or nanomaterials. These may or may not be nanoscale. TYCSC might for example, be made with nanocomposite or hybrid nanomaterials; nanomaterials and polymer and/or conductive polymer; polymer or conductive polymer nanomaterials; nanomaterials or CNT and Zylon; CNTs or SWNT with or without one or more other ingredients; SWNT and polyacrylonitrile; nanofibers, nanocrystals, nanoparticles, nanoclay, nanowires; actual or artificial spider silk, one or more of its ingredients (such as proteins or genes), or fibers or nanofibers made from such spider silk or its ingredients; other examples of nanomaterials herein, and/or other nanomaterials. These TYCSC may for example, be made of pure or almost pure nanomaterials (e.g., 100% or almost 100% CNTs). These TYCSC may enhance properties in inventive images or impart properties to them that are improved or new, such as: greater strength, mechanical properties, electrical conductivity, durability, solvent resistance, resilience, permanence, thermal or heat properties (such as thermal conductivity, raising the temperature at which the material softens, etc.), reduced shrinkage, porosity, absorbency, reduced absorbency, nonabsorbency or being impenetrable, light properties (such as light emission), color effects (such as the ability to shift or modulate color), stiffness, reduced shrinkage, the ability to be self-cleaning or to repel stains and dirt, properties from having a small diameter, properties from having a high surface area, reduced weight, the ability to change or modulate, the ability to be responsive, the ability to be interactive, the ability to self actuate; the ability to function as or like a device, a system or part thereof (e.g, a sensor; a device or system with sensors; solar cell, electricity storing supercapacitor, OLED, light emitter, computer, communications device, etc.); other enhanced or new properties, e.g., refer to other examples herein. Moreover, TYCSC made of these embodiments may be stronger, tougher, slighter, lighter weight, less visible, more easily hidden from view and/or different aesthetically and/or functionally in other ways from conventional TYCSC. TYCSC made of these embodiments, might comprise an inventive image or part thereof. They may offer inventive images desirable qualities, that might make them new or unique, and/or qualities that might contribute to their novelty and/or uniqueness. Refer to work done at Georgia Institute of Technology, Rice University, Carbon Nanotechnlogies Inc., and work by the U.S. Air Force and Richard Smalley. See CNT fibers in Science, Sep. 4, 2004.

Examples of TYCSC, made of these embodiments are further processed in making inventive images, for instance, using additive and/or subtractive processes, using conventional methods and/or using methods described in U.S. Patent Application No. 20030035917-A1, e.g., they might be sewn, cut, chopped, woven, embedded, tied, superimposed, macramed, knotted, braided, stranded, coated, layered, knitted, etc.

TYCSC made of these embodiments might for example, be used as inventive images or part thereof (such as in layers, films, coatings, colorants, three dimensional parts, etc.), as image supports (e.g., stabilizers), as strengthening stabilizers, to enhance or provide structure; to install, display or mount an inventive image; to connect inventive image parts; for electrical conductivity (e.g., carbon nanofibers or CNT nanomaterials); in devices, systems, or machines nanoscale or larger; for aesthetic and/or utilitarian functions (such as for reinforcement, conductivity or strength), or a combination of these purposes.

TYCSC of these embodiments may be made using any process(es), they may be developed using any process(es), they might be continuous or as continuous as desired, and they might be any length. For example, they might be grown out of vapor, grown with the use of a catalyst, pulled or spun out of the furnace or out of the chemical vapor deposition furnace (e.g., by winding them on a rotating rod), processed from solution, made using spinning methods, using conventional solution spinning techniques, electrospinning, electrostatic spinning, flash-electrospinning (e.g., nanofibers), twisting nanomaterials with other materials, made using conventional practices or using modified conventional practices, made using combinations of these, etc. Examples are CNT yarns produced using technologies adapted from the textile industry such as CNT yarns made using adaptations of technologies used to spin wool and other conventional fibers, e.g., as those CNT yarns made by CSIRO Textile and Fibre Technology of Australia and The NanoTech Institute at the University of Texas in Dallas, Tex., (refer to "Multifunctional Carbon Nanotube Yarns by Downsizing an Ancient Technology" Mei Zhang, Ken R. Atkinson, and Ray H. Baughman, Science 19, November 2004; 306: 1358-1361).

Nanofibers or nanofiber webs that are electrospun might for example, be applied into and/or onto an image support (e.g., stabilizer) which might be made of any material(s) desired, such as polymer, paper, glass, metal, conventional fabric or textile, stone, marble, other examples herein and in U.S. Patent Application No. 20030035917-A1, etc. In illustrations, CNTs, carbon nanowires, and/or nanoparticles might be used to make nanofibers or fibers. In examples, thread or yarn is made from nanotubes in processes which may involve suspending nanotubes in liquid and inducing a current to align them, in processes in which nanotubes align as they form in a vapor of carbon atoms using a flow of hydrogen gas, and/or in processes in which CNT yarns are drawn out or pulled out of super-aligned arrays which serve as cocoons, and then they might be strengthened by heating the junctions between the nanotubes. Refer to "Spinning Continuous Carbon Nanotube Yarns" Nature, 419, Oct. 24, 2002. As another example, carbon nanofibers might be grown by depositing carbon from a gas mixture containing carbon with the assistance of fine metal catalyst particles. In a further example, threads have been made yards long that are pure CNTs or almost 100% CNTs by Dr. Matteo Pasquali and others at Rice University, e.g., published online by "Macromolecules," Dec. 8, 2003, in "Superacids ease nanotube fibre production" 12 Dec. 2003 published on www.Nanotechweb.org, and in the NY Times, Dec. 9, 2003. Dr. Pasquali's research team made these CNT threads by dissolving or mixing CNTs with sulfuric acid. The nanotubes aligned themselves and then formed liquid crystals that may be processed into pure fibers. In a further example, continuous nanofiber of any length might be spun from CNT smoke or aerogel, like or similar to that made by Alan Windle and colleagues at the University of Cambridge, UK, refer to Science, Mar. 11, 2004. Refer also to "Electrospinning Nanofibers of Polyaniline and Polyaniline/Polystyrene and Polyethylene Oxide) Blends" Manuel J. Diaz-di Leon, Proceeding of the National Conference on Undergraduate Research 2001, University of Kentucky, Lexington, Ky.

In preferred examples, TYCSC are made using nanomaterial composites. Examples are composites of CNTs and/or nanoparticles, and one or more polymers, e.g., CNTs mixed into cPRM. Further examples are: polypropylene nanofiber composites, PMMA nanofiber composites; nanofibers of poly(p-phenylene-2,6-bensobisoxazale) or PBO and/or PBZT; poly(acrylonitrile-co-butadiene-co-styrene) (ABS) nanofibers; PVA CNT composite fibers (e.g., see Nature Jun. 12, 2003); SWNT polymer composite fibers; MWNT polymer composite fibers, polymer coated nanomaterials such as polymer coated nanofiber or polymer coated carbon nanofiber, conductive polymer nanocomposites, etc. Any of these or other examples might if desired, be used to make larger forms such as fabric, rope, cables, textiles, image supports (e.g., stabilizers), other inventive images parts, etc. As an illustration, in Nature Materials 1, 190-194, 2002, A. A. Mamedov et al., report on the formation of a nanotube polymer composite with mechanical strength six times that of conventional carbon fiber composites.

In further examples, polymeric nanofiber composites made using CNTs, SiC whiskers, silica, colloidal silica, nanoclay particles and the like might be used to make inventive images. Examples of the polymer that may be in these nanocomposites are: polyester, nylon, acrylic, PMMA, polystyrene, cellulose, etc. These polymeric nanofiber composites might be used to make fibers or textile fibers for inventive images.

In examples nanotechnology and/or nanomaterials are used to make, TYCSC, using spider silk, artificial spider silk, one or more of its ingredients (such as proteins or genes), or a combination of these. Spider silk nanomaterials might be in the form of nanocomposites, and/or hybrid nanomaterials, e.g., the spider silk might be used with polymer, CNT, conductive polymer, or any of the other materials described herein. Like natural spider silk, spider silk nanomaterials might be desirable in inventive images for their distinctive formal elements, such as superior mechanical properties, strength, toughness, lightness and flexibility. Examples of such spider silk for use in inventive images might come from Nexia or they might be made using technology or materials from Nexia, of Vaudreuil-Dorion or Quebec, Canada, or like that from Nexia. Nexia has exclusive worldwide rights to broad patents covering spider silk genes and proteins and is in the process of developing a commercial spinning process for its BioSteel product(s) that may be desirable in inventive images. Refer to www.nexiabiotech.com.

In preferred examples, nanomaterials and/or nanotechnology might be used in nanocomposites or hybrid nanomaterials to enhance conventional TYCSC. For instance, CNTs might be used to improve conventional polymer fibers and conventional fabrics. More specific examples are the use of SWNT to enhance polyacrylonitrile, and the use of CNTs to enhance silk, cotton, and linen. Such enhanced conventional materials might have any of the properties offered by nanomaterials like enhanced strength, toughness, durability, solvent resistance and stiffness, reduced shrinkage, a lighter weight, thermal and electrical conductivity, light emission, the ability to change, other examples herein, etc. In examples, the percentage of CNTs used to make polymer nanocomposite TYCSC might depend on the properties desired, e.g., for conductive fibers might require up to a maximum of about 20% CNTs, while achieving other properties might only require a maximum of about 10% CNTs.

In a preferred example, TYCSC might be hybrid nanomaterials made in layers or nanolayers. Such layering might be used to enhance utilitarian and/or aesthetic elements, such as conductivity, electrical conductivity, absorbency, responsive features, interactive features, light properties, permanence, strength, etc. Examples of TYCSC that might be coated are conventional or they are partially or entirely made of nanomaterials (e.g., a fiber or fabric made of about 100% CNTs or less; a fiber or fabric made of polymer, silk, glass, titanium, alumina, gold, silver, cotton, linen, etc.). Coatings used might be made of nanomaterials, polymers, another material, or a combination of these. For example, a polymer fiber may be coated with a nanomaterial layer or nanolayer to enhance its properties or to give it new properties such as the examples herein. In another example, a layer or nanolayer coating of poly(glycidylmethacrylate) (PGMA) on a TYCSC, might be a surface preparation or a surface preparation stabilizer enabling a subsequently superimposed layer (such as a layer that adds desired properties, or a functional polymer) to bond or to bond better. Refer to "Hybrid Polymer Nanolayers for Surface Modification of Fibers" by I. Luzinov, R. V. Gregory, S. H. Foulger, and V. V. Tsukruk, in National Textile Center Research Briefs—Materials Competency, June 2003.

In a preferred example, a coagulation based CNT spinning process is used to make CNT polymer composite fibers like or similar to those in "Super-tough carbon-nanotube fibres" by A. B. Dalton, S. Collins, et al., in Nature, Vol. 423, Jun. 12, 2003, 703. These fibers are desirable for use in inventive images because they are extraordinarily strong, they might provide structure, they are conductive and light weight. These fibers may be tougher than any natural or synthetic fiber described before, they are about 17 times tougher than Keviar fibers, about 20 times tougher than the same weight steel wire, and tougher than spider silk. These or fibers similar to them might for example be embedded and/or woven in inventive images, e.g., for strength, stiffness, electronics that might connect to other parts or devices, for textiles or fabrics, or for a combination of these and/or other purposes. Examples of these fibers might be coated with electrolytes and used as capacitors in inventive images, e.g., woven into fabrics.

Examples of fibers made in these embodiments are fibers containing nanoscale particles and/or other nanomaterials, such as nanoscale embedded particles or nanoscale embedded hard particles, e.g., nanoparticles of polymer, ceramic, metal, CNTs, minerals, carbon black and/or graphite. Among these are fibers containing nanoparticles such as fibers made of nanoparticle polymer composites, like fibers made of nanoparticle MMA composites or nanoparticle PMMA composites, e.g., with nanoparticles of CNTs and/or carbon black. Other examples are fibers made of CNTs and nylon, and fibers of CNTs and polybutyleneterephthalate (PBT). Such fibers may be made using any process(es), e.g., by mixing nanoparticles into cPRM or polymer, from cPRM or a polymer solution.

In another example, inventive images are made with continuous nanofibers such as continuous polymer nanofibers or other continuous polymer nanomaterials (e.g., TYCSC). Continuous nanofibers might for example, be made of polymer, carbon, and/or ceramic nanofibers and/or they might be polymer composites, e.g., transparent or translucent.

In an illustration, a nanofabric might be made of 100% or of almost 100% CNTs. In another illustration, a nanofabric might be made of carbon atoms, it may be extracted from graphite crystals, it might be a two dimensional fullerene, it may be a graphene nanofabric, and it might be called graphene. Graphene might be as thin as a single atom thick, as that made by the research team led by Andre Geim at the University of Manchester in the UK, and scientists at Chernogolovka, Russia which is a stable, highly flexible, strong and conductive nanofabric. Graphene might be useful for its unusual electronic, mechanical and chemical properties at the molecular scale, such as its conductivity, strength, flexibility and stability. It might for example, be useful for very fast transistors, electronics, computers, and extremely strong, stable and flexible nanomaterials, inventive images, and parts thereof. Other applications for graphene may be the same wide range that CNTs have.

As a further illustration, an inventive image or part thereof made of a woven fabric or textile fabricated using nanomaterials might be smart. For example, such a fabric or textile might change or modulate in color(s) and/or in light properties (such as light emission), for example, in response to electricity or light (it might have a battery, solar cell or system), in response to sound such as voice activation, by the use of touch controls, gesture or movement recognition technology, or in response to temperature. Such a fabric or textile might have sensors or nanosensors that prompt it to change or modulate, e.g., it might change its porosity and/or its coloration in response to heat, humidity or moisture, electricity and/or light. An inventive image or part thereof made of a fabric or textile such as this might change in color and/or light properties according to the time of day, and/or it might become more or less porous according to weather or environmental conditions. Thus if such an inventive image were a painting on such a changing fabric (e.g., rather than on a traditional canvas), its colors or light properties might change or modulate. In addition or instead, it may be more permanent in withstanding changing or modulating environmental conditions, e.g., if it is an oil painting, its colors and/or its light may change as the color and/or light of its fabric underlayer changes and it may be less likely to crack because its smart fabric image support may expand and contract less than a traditional canvas, and/or its smart fabric may expand and contract as needed by the painting in the environmental conditions it is experiencing. As another example, such a smart fabric might be inventive image clothing, walls or floors that might change color and/or light properties as day changes to night, and that might also provide more warmth when it is cooler as well as more free passage of air when it is hot. In an example, such a smart fabric might be used in a composite or hybrid nanomaterial such as with one or more polymers, e.g., embedded in a polymer or attached to a polymer image support, the smart fabric might even be a strengthening stabilizer.

In another example, a smart fabric or textile in an inventive image or part thereof might have a computer, solar cell, light emitting device, an OLED, another kind of display, an information system, a communications system, sound emitting device, battery, an e-material, an electrochromic system and/or one or more other machines, devices, systems, or part thereof, that may or may not be nanoscale, and that might be part of it, woven in it, and/or embedded in it. For instance, nanomaterials embedded in polymer or coated on polymer might be used to make such a smart fabric, e.g., nanorods embedded in polymer might be used to make fibers that function as a super chip for a nanocomputer in the fabric, for instance, in an inventive image that functions as a wall hanging, clothing, a wearable accessory, a screen, a wall, a bed cover, upholstery, sculpture, a canvas, a table top object, or the like.

(h) In embodiments, nanomaterials and/or nanotechnology might enhance, fortify or cause temporary, lasting or permanent bonding in inventive images. Examples of such nanomaterials are nanotubes, nanofibers, nanocrystals, nanoparticles, magnetic nanomaterials, nanowire, nanorope, nanotextiles, nano-velcro, nanomaterials with structures, morphologies, architectures, topologies, ends, or sites that attach, link or bond easily or well; biological nanomaterials; bacteria; nanocomposites, hybrid nanomaterials, other examples herein, and/or other nanomaterials. Nanomaterials might for example, serve as bonding materials, for instance, functioning as or like adhesives, welding, solder, Velcro or nano-velcro, magnets, fibers, wires, ropes, cables, tapes, fabrics, hardware (e.g., nails, screws, bolts, nuts, turnbuckles, crimps, etc.), mounts, bases, and the like (each of which may or may not be nanoscale). Examples of nanomaterials used for bonding in inventive images may have ends, sites, structures, morphologies, architectures or topologies that attach, link, grip or bond easily or well.

Examples of nanomaterials may function for bonding, sticking or gripping in inventive images in a manner that is like, similar to or mimicking the way that the feet of insects, lizards, and/or geckos do, e.g., when these creatures walk up walls or on ceilings. For instance, such nanomaterials might have lots of tiny fibers on them (e.g., like the toes of geckos), and/or they may bond or attach using van der Waals forces. They might be in any form, e.g., as a liquid, a paste, a gel, a tape, a fabric, etc. Refer to work done at the UC Berkeley in CA, the Institute for Microelectronics Technology in Russia, and at the University of Manchester in England, such as adhesives or tape that mimic the mechanism used by geckos, e.g., see Nature Materials, July 2003. Also refer to nanofur being developed by Nanosys in Palo Alto, Calif. Further examples are nanomaterials which form a kind of velcro or nano-velcro. For instance, a kind of nano-velcro might be made using CNTs with hook ends that might hold inventive image parts together as strongly as or more strongly than any conventional adhesive or glue. Refer to "Bonding and energy dissipation in a nanohook assembly" by Berber, S., Kwon Y.-K. and Tomanek, D., in Physical Review of Letters 91, 165503 (2003). Nanowires provide another example, such as nanowires made into centipedes with bristled morphologies (also called bristled nano-centipedes), the exceptional bonding capability of which might be used to form very strong nanocomposites, sensors, inventive images surfaces that bond well to superimpositions, etc. Refer to the work of scientists from the University of Michigan (such as Nick Kotov) and Purdue University in the U.S. and the University of Vigo in Spain, such as nanomaterials they made comprised of cadmium tellurium (CdTe) nanowire cores coated with bristled silica.

In an example, adding inorganic or inorganic hard phase nanomaterials or nanoparticles (such as silica or silica nanoparticles measuring about 10-20 nm.), into dispersions of acrylates or styrene acrylics might enhance their desirable properties. Such dispersions might be used as binders, e.g., for coatings, colorants, glues, etc. It is desirable that such dispersions are homogeneous. Conventional nanosize particles or materials in such dispersions that are polymer, acrylic or acrylate are preferably not classified as nanomaterials or as stabilizers herein.

As another example, the conductivity of CNTs in a polymer nanocomposite or hybrid nanomaterial (such as a paint, a layer, a coating, or another image part), may improve or be the basis for the polymer's ability to bond to surfaces and/or to superimposed applications. For instance, nanomaterials embedded in polymer composites may make the surface electrically conductive. This surface might attract and bond to paint particles more efficiently and with enhanced strength and it might eliminate the need for a primer coat. In examples, Hyperion Catalysis International of Cambridge, Mass. (refer to www.fibrils.com) makes nanocomposites using MWNT called Fibril nanotubes and polymer for electrostatic painting. In another example, General Motors has mixed nanotubes in polymer nanocomposites to make car parts. During painting, an electric charge is conducted into these polymer nanocomposites that may enhance the bond between the paint and the polymer nanocomposite substrate. In a related example, paint given an electrical charge is applied onto a nanotube polymer composite material that is a good conductor of electricity (e.g., the paint is sprayed, printed or painted on). Such methods might be useful in making inventive images.

In a different example, nanohorns have good adsorptive and catalytic properties. Substances stick to them, and they enhance chemical reactions. Enhanced bonding might can occur using nanoparticles in thin film coatings in inventive images and the nanoparticles may also enhance the flexibility, durability and smoothness of thin film coatings, and/or other properties. In a further example, nanotubes might join, fasten or connect inventive image parts. For instance, refer to the U.S. Patent No. 60/074,463, "Micro-fastening system and method of manufacture," D. Tomanek, R. Enbody and Y.-K. Kwon. In another example, nanomaterials might have different magnetism properties than other materials, e.g., they might be used to make stronger, more permanent magnets for inventive images, for instance, using nanocrystals.

Embodiments for the use of nanomaterials for bonding may be used to connect inventive image parts, to install, mount and/or display inventive images, and/or for other purposes.

(i) In embodiments, inventive images or part thereof might be made with one or more paints, colorants, pigments, dyes, inks, primers, adhesives, layers, films, coatings and/or surfaces that are made with nanomaterials and/or nanotechnology. These may for instance, be made with nanotubes, nanofibers, nanocrystals, nanoparticles, nanowire, nanorope, buckypaper, nanodots, nanobrushes, polymer nanobrushes, EviComposites (quantum dots integrated into resins and polymer compositions by Evident Technologies of Troy, N.Y. www.evidenttech.com), sensors made with nanomaterials which might be nanoscale, nanocomposites, hybrid nanomaterials, devices made with nanotechnology or nanomaterials, other examples herein, and/or other nanomaterials. Examples of these paints, colorants, pigments, dyes, inks, primers, adhesives, layers, films, coatings and surfaces have properties which are enhanced, novel, desirable and/or useful, such as any of the properties nanotechnology might impart in inventive images described herein. As more specific examples, a paint, colorant, pigment, dye, ink, primer, adhesive, layer, film, coating and/or surface of an inventive image made with nanomaterials may have one or more of the following properties.

1). It may have new or enhanced conductivity, strength, toughness, flexibility, bonding capability, hardness, porosity, light properties, magnetic properties, effects of color, wear resistance, scratch resistance, and/or permanence. It may be structural or it may be more structural than conventional paints, colorants, pigments, dyes, inks, primers, adhesives, layers, films, coatings or image surfaces. For example, a paint, colorant, dye, ink, primer, adhesive, layer, film, coating and/or surface made with CNTs might be structural in the sense that it might contribute to, be part of, or comprise all of the structure and/or form of an inventive image or part thereof. In addition or instead, it might impart other properties to inventive images, such as electrical, light and/or thermal properties, other properties described herein, etc. Refer to the previous description of conductive layers and coatings, e.g., by Eikos Inc., and of conductive and semi conductive nanomaterial inks, e.g., by Xerox Corporation.

2). It may have the ability to detect temperature, stress, damage, sound, color, light, pressure, change within the inventive image and/or outside of it, etc. It may have a self healing ability (e.g., repairing cracks, fractures, scratches, corrosion, etc.); a self cleaning ability; it may self assemble or partially self assemble; it may be able to detect problems or risks within itself and/or within other parts of its inventive image; it may have the ability to protect itself or the inventive image from the undesirable environmental conditions; it may have the ability to permit its own easy removal (such as in response to specified input or orders), and/or it may have the ability to modulate or conduct heat, etc. Such paints, colorants, pigments, dyes, inks, primers, adhesives, layers, films, coatings and/or surfaces might for example, be made using sensors made with nanomaterials or that are nanomaterials (that may or may not be nanoscale). In addition or instead, they might be made using the conductivity of nanomaterials.

3). It might have, incorporate and/or be connected to one or more nanomachines, nanodevices, nanosystems, nanocomputers, nanosensors, other computers, other machines, other devices, other systems, other sensors, or the like, e.g., attached, embedded or inlaid, for instance, in an inventive image surface, or in an image support that may be a stabilizer.

4). It might be made with smart dust, responsive polymer, absorbent polymer, and/or conductive polymer, (refer to descriptions herein and in U.S. Patent Application No. 20030035917-A1). It might be made with and/or be connected to specially designed molecules that may be sensitive to electrical signals, e.g., these might respond to certain electrical signal(s) by lighting up, by changing color and/or by changing light properties in another way.

5). It might respond to a command, trigger, stimuli, or influence, such as any of the examples herein, e.g., temperature or environmental change, electricity, changes in light and/or sound; the turning of a dial or pressing of a button; and/or it might be programmed, designed or engineered. Its responses may be at any rate desired, e.g., immediate, slow, or time release responses. One or more of properties of a paint, colorant, pigment, dye, ink, primer, adhesive, layer, film, coating and/or surface made with nanomaterials might modulate or change in an inventive image, e.g., its color, light properties, its surface, and/or the visibility of some or all of its nanomaterials to the human eye might change or be able to be changed. In an inventive image, a paint, colorant, pigment, dye, ink, primer, adhesive, layer, film, coating and/or surface made with nanomaterials might be interactive (such as with viewers and/or with the environment, e.g., using sensors, computers, and/or conductivity).

Films made using nanotechnology and/or nanomaterials might be organic, and/or inorganic and thin or very thin (e.g., from about 1 nm. to about 5 nm., they may only be one molecule or one atom thick, and/or they may be buckypaper). Such films may be made with one layer or multiple layers of the same or different compositions. Their nanomaterials may or may not be visible, and these films may have a wide range of other properties that are useful in inventive images.

The large surface area and small size of nanomaterials or of the features of nanomaterials might bring improved or new properties to paints, colorants, pigments, dyes, inks, primers, adhesives, layers, films, coatings and/or surfaces used in inventive images. Examples are described herein, like greater color saturation, enhanced light properties, a more subtle and greater range of colors, more thorough color mixtures, more subtle color gradations, more uniform surface, enhanced scratch resistance, new or enhanced bonding capability, etc.

Also, as these examples show, paints, colorants, pigments, dyes, inks, primers, adhesives, layers, films, coatings and/or surfaces made with nanomaterials for inventive images might be smart, e.g., they might self actuate, or be responsive.

Examples of these paints, colorants, pigments, dyes, inks, primers, adhesives, layers, films coatings and/or surfaces are made of nanomaterial polymer composites or hybrid nanomaterials, such as a CNT polymer composite or hybrid material; a composite or hybrid material made with noble metal nanoparticles or with boron containing materials; or a ceramic polymer nanocomposite or hybrid material.

In a further illustration, one or more layers, coatings, and/or films made using nanotechnology and/or nanomaterials that are on inventive images, might be: continuous, uniform, even, thin or extremely thin, protective, conductive, electroactive (e.g., electrically active transparent coatings or transparent electrodes), electrochromatic, photochromic, colorless, only slightly colored or tinted, transparent, translucent, they might impart a light property to the inventive image (e.g., iridescence, a metallic shimmer, emitted light), they might enhance the inventive image's durability or permanence, scratch resistance, toughness, strength, rigidity or a combination of these. Examples may function as new kinds of varnishes, finishes or sealants, or as clear colorless protective or finish coatings or films on inventive images. Examples of such layers, coatings and films have properties described in two or more of the examples herein.

Nanotechnology and nanomaterials for these embodiments might be obtained from any suitable source such as: The Smart Coatings Program at New Jersey Institute of Technology, at the U.S. Army ARDEC, Industrial Ecology Center in Picatinny Arsenal, N.J., at Clemson University, SC, and at U.S. Army Research Lab Adelphi and APG; from Advanced Nano Products Co. Ltd, in Taejon, Korea; from Nanogate Technologies GmbH in Saarbrucken and Wiesbaden, Germany (refer to ww.nanogate.com); from Cima Nanotech of St. Paul, Minn., such as their conductive inks and coatings which might be printed or ink jet printed for example to make electronics (these or some of these might be transparent and/or made with nanometals), (refer to www.cimananotech.com), and/or from other sources named in herein.

(j) In embodiments, nanomaterials and/or nanotechnology enable, assist or cause inventive images or part thereof to be absorbent and/or porous (e.g., porous that are nanoscale and/or larger pores). Examples are CNTs and other nanomaterials containing carbon or carbon nanostructures, nanofibers, nanoparticles, nanocrystals, nanocubes, nanofilters, nanomaterials that are textiles or fabrics, nanocomposites, hybrid nanomaterials, and other examples herein. Nanotechnology may enable pores to be formed, designed, engineered or controlled as desired. In examples, absorbent or porous nanomaterials of might be used: in layers, in nanocomposites, in nanocomposite layers, and/or in hybrid nanomaterials in inventive images or part thereof. Pores or nanopores that form or assist in forming bonds to superimpositions may be stabilizers. Pores increase the surface area of nanomaterials, which might enhance their uses in inventive images. The porous or absorbent polymers and nanomaterials of these embodiments might be useful in inventive images for aesthetic and/or utilitarian purposes. They may for example, enhance or enable bonding (e.g., superimposed applications may penetrate); impart or enhance light properties (e.g., making the surface matte); and nanopores might be used in an electrically insulating membrane or material in the inventive image. The porosity and/or absorbency in inventive images might control, allow, or selectively allow passage of subjects through it or through part of it, e.g., (a). as a filter; (b) to control, store or allow passage of subjects that might be smaller than a certain size, larger than a certain size, or a combination of these (e.g., using reverse selective membranes); and/or (c) to control, store or allow the passage of vapor, moisture, air, gasses, heat, water, solvents, particles, other materials, other liquids or substances, anything else, etc. (e.g., nanomaterials like nanocubes might store hydrogen in a fuel cell or battery, for example, in a computer or other device). Moreover, the porosity or absorbency of the inventive image or part thereof might be tunable, controllable, and/or changeable (e.g., using a stimulant, trigger, programming or design). Refer to "Reversibly erasable nanoporous anti-reflection coatings from polyelectrolyte multilayers" by J. Hiller, J. Mendelsohn and M. Rubner, Nature Materials 1, 59-63 (2002). In an illustration, pores or the lack of pores, absorbency or the lack thereof in inventive images keeps molecules, subjects that threaten or decrease permanence, and other subjects out of or off of them, e.g., protecting a more vulnerable or less permanent inventive image part beneath, such as protecting its coloration, e.g., protecting conventional painting and drawing applications.

In examples, inventive images are made with nanoporous solids made of carbon, silicon, silicate(s), polymer(s), ceramic(s), metallic mineral(s) or compound(s) of organic material(s); metal or organic materials and silicon. Or, they might be made with polymer and ceramic, or with metal-organic framework(s), grid(s) or lattice(s) (e.g., like nanocubes).

In examples, it is polymer or polymeric composition in an inventive image or part thereof that is absorbent and/or porous. The size of the pores may or may not be tunable, controllable, changeable, and/or reversible, e.g., by pH-induced swelling, such as by the exposing the polymer to a stabilizer like water of a particular acidity or ph level. Pore size might be able to be fixed so that cannot be changed, for example using a stabilizer like heat, e.g., by baking the polymer at 60-90° Celsius. Polymers in these examples might be water soluble, they might be applied in a water solution of a particular pH using methods like printing, ink jet printing, painting, and spin coating, e.g., ink jet printing may pattern surfaces, e.g., with pores in desired places or designs.

As inventive images may be further processed, their absorbency and/or pores may be penetrated by one or more superimposed applications, e.g., colorants, paints, inks, binders, glues, primers, sizes, photo emulsions, drawing materials, and/or conventional image making mediums.

In another illustration, inventive images in these embodiments might be made using porous polymers or other porous materials conventionally used for drug delivery or for purposes that are related or similar. These polymers or other materials might be optimized for use in inventive images, e.g., so that superimpositions like applications of colorants penetrate into them well. Also refer to the example herein of inventive image fabric or textiles the porosity of which controls, allows for and/or prevents passage through the inventive image.

(k) In embodiments, the use of nanomaterials and/or nanotechnology can improve and/or change inventive images made of multiple parts. Examples are above in sections (a) and (h) of this list.

Nanomaterials in these embodiments, such as nanocomposites, might be used in layers in inventive images or in part thereof. Or they might be used in one or more locations or parts in inventive images e.g., places that require or may need greater strength or other enhancement. For example, nanomaterials may comprise or reinforce: the joints and/or perimeters of inventive image parts, areas of the image parts that need to or may need to endure stress, image parts that support weight, and/or installation, mounting and/or display of inventive images or parts thereof. As another example, nanomaterials may be used throughout inventive images or parts of them in these embodiments. Examples of nanomaterials that might be used in these embodiments are: nanotubes, CNTs, nanofibers, nanocrystals, nanoparticles; wires, ropes, cables, nanocomposites, hybrid nanomaterials, textiles, fibers, and fabrics made with nanomaterials; nanostructured metals and alloys, metal nanocomposites, buckypapers, polymer nanocomposites, ceramic nanocomposites, other nanocomposites, other examples herein, and/or other nanomaterials.

Nanomaterials might for example enable inventive image parts to connect to and/or support one or more other parts in ways that stronger, more permanent, more flexible, more resilient, slighter, less bulky, with less mass, improved in other ways, and/or new. Inventive image parts and/or joints made using nanomaterials might support more weight than comparable conventional image parts. They may also have forms, structures, bonds and/or connections that may be slighter, less bulky, with less mass, lighter, less visible, more easily hidden, different in appearance and/or with aesthetic properties that are easier to control and/or modify as desired than conventional image parts. Moreover, decisions regarding these properties may be aesthetic choices rather than structural and/or utilitarian requirements, or they may be less dictated by structural and/or utilitarian requirements than they are using conventional practices.

(l) In embodiments, nanomaterials and/or nanotechnology are used to enhance or create part or all of the means of mounting, installing or displaying inventive images, and this means may be improved and/or new in comparison to conventional practices. Such means may for example, use nanotubes or nanofibers, nanorope, other examples of nanomaterials herein, etc. For instance, inventive images' enhanced strength, resilience and other properties, (e.g., in their forms, structures and/or in other means of display), may make them easier to mount, install or display, refer to example (a) above. For example, in comparison to conventional images, inventive images might have structures and/or forms that are more slight, less bulky, thinner, with less mass, lighter weight, made of fewer parts, less visible, more easily hidden from view, connected to the inventive image differently (e.g., with fewer points of contact, or less surface area in contact), etc. Among the consequences, inventive images might have aesthetic qualities such as those in sections (o) and (r) below, (e.g, a greater sense of lightness). In addition, the enhanced and new formal elements available to inventive images from nanomaterials and/or nanotechnology may enable decisions regarding their means of mounting, installing, or displaying to be based more on aesthetics than conventional practices allow. Refer to section (q) below, and (h) and (k) above. Nanomaterials and/or nanotechnology might also enhance or impart other properties to the means of mounting, installation or displaying inventive images, such as conductivity, light properties, coloration, strength, resilience and other examples herein.

(m) In embodiments, movement and/or sound in inventive images is enhanced, assisted, or created using nanotechnology and/or nanomaterials such as by use of nanotubes, nanofibers, nanocrystals, nanoparticles, nanowire, nanorope, nanotextiles; polymer nanomaterials; devices, machines and systems made using nanotechnology; nanocomposites (e.g., polymer nanocomposites), hybrid nanomaterials (e.g., with polymer), by using conductive or semi conductive nanomaterials (like nanotubes or nanofibers, semi conductive polymers, etc.); responsive polymers, EAPs, absorbent polymers, shape memory polymers and/or shape recovery polymers, (e.g., in nanocomposites or hybrid nanomaterials); by using other shape recovery nanomaterials or shape memory nanocomposites; by using solar cells and/or sensors made with nanomaterials, other examples herein and/or other nanomaterials, or a combination of these, (refer to examples herein and in U.S. Patent Application No. 20030035917-A1). This might for example be movement and/or sound of any kind. It might be different from or like that made in images using conventional practices. Such movement and/or sound(s) may or may not depend on, or require viewer initiation or interaction, it may be initiated by viewers (intentionally or otherwise, e.g., using sensors), or it might be initiated by another trigger, stimulant or influence (see examples herein). In an example, shape memory nanomaterial such as a polymer nanocomposite or hybrid nanomaterial (e.g., made with CNTs and a polymer), might be used in an inventive image which returns to its original shape when exposed to a trigger, stimulus or influence (that may be part of the inventive image and/or external to it) such as electricity, heat, or any of the other examples herein. The shape memory nanomaterial's response to the trigger, stimuli or influence might be repeatable. Refer to work from the U.S. Air Force Research Laboratory's Materials and Manufacturing Directorate, e.g. by Dr. Richard Vaia.

In an embodiment, nanomaterials are used to reduce sound and/or movement in inventive images. Such nanomaterials might for example, be used in conjunction with mounts, devices, machines, systems, and/or interactive features in inventive images. For example, the ability of conventional vibration reduction materials to dissipate energy might be augmented by the addition of nanomaterials or CNT in the form of nanocomposites or hybrid nanomaterials for use in inventive images. Refer to work by scientists at Rensselaer Polytechnic Institute in Troy, N.Y., such as that by Nikhil Koratkar available online in Nature Materials on Jan. 10, 2005.

(n) In embodiments, inventive images made using nanomaterials and/or nanotechnology are able to function differently than images made without nanomaterials. They may be smart, with enhanced and/or new properties that enable them to function in ways that are improved or new. There are examples herein, for instance, using CNTs, nanofibers, nanocrystals, nanoparticles, nanowires, nanoropes, nanotextiles, nanocomposites, hybrid nanomaterials, smart materials; devices, machines and/or systems made using nanotechnology; other examples and/or other nanomaterials. For example, smart inventive images or parts thereof may respond to and/or to interact with people and/or the environment; they may offer communication, information or entertainment; they may be engineered to perform one or more particular tasks at any level from simple to complex, and/or they might have machines, computers, sensors, devices, OLEDs, e-materials, cameras, movement or gesture recognition technology, and/or other smart materials.

As further examples, inventive images made with CNT glass composites or nanotube polymer composites might function as inventive image floors, doors, stairways, walls, murals, and large or monumental sized sculptures, all of which might be substantially more durable, stronger, more resilient and lighter weight than comparable conventional images. An inventive image painting made with nanomaterials such as CNTs could have a utilitarian function that would not be otherwise possible. Among examples are inventive image paintings that: (a) support significant weight, e.g., a painting that functions structurally as a wall or as a wall portion, or as a window, ceiling, or floor; (b) have visible or unseen computers or nanocomputers providing visual, written and/or auditory display(s) and/or information that might for example, be preprogrammed, interactive, responsive, and/or connected to the Internet; (c) may modulate in visual or optical effects in response to the presence of viewers and/or in response to the natural light outside, e.g., providing light when people are there and natural light is insufficient or non-existent; (d) may have an electrochromic system, etc.

In an embodiment, nanotechnology is used to make smart nanomaterials that can be switched from absorbent to non absorbent or impenetrable, that can be switched from being hydrophobic to being hydrophilic, or that can be switched from being able to bond to a superimposition to being unable to bond to it. The switch might be a trigger, stimulant or influence e.g., electrical voltage, a touch control, it might be programmed, or other examples herein. A specific example of such a nanomaterial is nanograss. Refer to work by Dr. Tom N. Krupenkin at Lucent Technologies' Bell Labs and University of Pennsylvania, e.g., see it in Langmuir, May 11, 2004.

In a further example, in an embodiment, an inventive image or part thereof might be a utility fog or a polymorphic smart material. These might for example, be reconfigurable smart images, e.g., self actuating and/or responsive to a trigger, stimulant or influence. For example, they might appear and disappear, partially or completely as their forms change. They might be comprised of different numbers of separate parts at different times, and/or they might move, hover, fly around and/or act upon other objects (e.g., pushing other objects, turning on devices).

(o) In embodiments, inventive images or parts thereof may have aesthetic properties or an overall aesthetic enhanced by or the result of the use of nanotechnology and/or nanomaterials. Examples are: an aesthetic of light and space; a sense of being light and/or airy; a sense of floating or weightlessness; the appearance that laws of gravity are defied; the appearance of precarious balance; a sense of being threatening (e.g., due to the appearance of precarious balance); an ethereal sense; objecthood; the perception or reality of form being dematerialized, and other aesthetic effects. (Refer U.S. Patent Application No. 20030035917-A1). Such aesthetic effects may for example, be possible because nanomaterials gave an inventive image a greater strength to weight ratio, superior tensile strength, emitted light, and other improved or new properties described herein. Image makers can use nanomaterials and nanotechnology to effect the aesthetics of inventive images to any extent desired, ranging from insignificantly to major. The use of nanomaterials and nanotechnology in inventive images opens up a multitude of enhanced and new aesthetic possibilities for inventive images, and is likely to enable inventive images to be made that are new, unique and unlike any images ever made before.

(p) In embodiments, the use of nanomaterials and/or nanotechnology might enable, assist or cause inventive images to have subject matter, content and/or meaning that was not otherwise possible and/or that is new, e.g., due to the improved and new properties that nanomaterials impart. This may be comparable to the way that a sense of defying gravity was possible as never before when welding was first used to make metal sculpture, and a sense of dematerializing space and form was possible as never with the invention of Light Art and Light and Perceptual Art. Refer to U.S. Patent Application No. 20030035917-A1. As examples, the subject matter, content and/or meaning of inventive images may be effected or constituted from: (i) the aesthetic properties described above in (o); (ii) smart materials made using nanomaterials, such as responsive and/or interactive features, e-materials, OLEDs, etc.; (iii) the visual, light and/or optical properties nanomaterials may impart; (iv) properties enabled by these of nanotechnology to make thin batteries, thin solar cells, e-materials, other devices and/or electrically conductive nanomaterials; and (v) the physical, mechanical, visual and light properties nanomaterials might impart in inventive image paintings on transparent or translucent image supports (e.g., stabilizers), and the improved permanence brought by nanomaterials, e.g., if they are large in size (such as murals), if their forms and structures are as slight as possible, if they are self supporting and/or if they support weight.

(q) In embodiments, the use of nanomaterials and/or nanotechnology might reduce or eliminate the need for aesthetic choices in making inventive images to be determined by practical, structural and/or utilitarian concerns. Thus nanotechnology offers creative and aesthetic freedom in making inventive images. Using nanomaterials, the forms and/or structures of inventive images, and often other formal elements might be determined more by aesthetics than is possible without using nanomaterials. Or, formal elements might be determined completely by aesthetics whereas without nanomaterials, this might not be possible.

For example, because nanomaterials can enable inventive images to have greater strength and permanence than might be possible otherwise, if the aesthetic desired calls for their forms and/or structures to be more slight, thinner, less bulky, hollow to any extent, and/or connected in fewer places than is possible without risking impermanence using conventional practices, the aesthetic desired may be able to be realized without risking impermanence using nanomaterials. As another example, because nanomaterials like CNTs can substantially enhance the strength and permanence of other material(s) they are used in and/or with (e.g., in the form of nanocomposites and hybrid nanomaterials), the choice of the other material(s) used in inventive images might be based on aesthetics completely or to a greater extent than might be possible without nanomaterials (e.g., as opposed to basing the decision on a concern for strength and permanence). For instance, the choice of one or more polymers, metals, ceramics, glasses, papers, stones, and/or other materials (such as examples herein) used in a nanocomposite, or used in a hybrid nanomaterial in an inventive image can be based to a greater extent on aesthetics than on strength and permanence, and it might be able to be based principally or completely on aesthetics because the inventive image may be able to rely on its nanomaterials for strength, its structure, its means of display, etc. In another example, the use of nanomaterials that emit light or their use in light sources like OLEDs can free image makers from having to figure out how to integrate the physical form of a light source into the aesthetic and the design of the inventive image, and/or having to figure out how to hide the undesirable visibility of such a light source in the inventive image and/or in the area in which it is viewed. Image makers may also be freed from these same issues and problems, in the use of other devices, machines and systems, (such as computers, transistors, and electrical devices) particularly if they are small or nanoscale, and if their conventional forms are significantly larger. Refer to (c) above.

(r) The use of nanomaterials and/or nanotechnology enables inventive images to have an aesthetic of light and space, and this might be done in new and unique ways and/or in ways that make these images new and unique. (Refer to U.S. Patent Application No. 20030035917-A1.)

In preferred embodiments, new versions of conventional image making materials might be made with nanotechnology and/or nanomaterials. For instance, among these might be enhanced or new: oil or acrylic paints, watercolors, gouache, tempera paints, egg tempera, vinyl paints, alkyd paints, inks, papers, canvas, paper mache, clays, plaster, metals, metal leaf (e.g., gold leaf, silver leaf etc.), wood, varnish, lacquers, etc. They might for example be enhanced or changed in one or more of the ways described herein.

In an embodiment, piezoelectric nanomaterials, piezoelectric nanocomposites or piezoelectric polymer nanocomposites are used to make inventive images. Nanomaterials might for example, be used to enhance piezoelectric polymers. In an example, when nanotubes are added to polyvinylidene fluoride (PVDF) (for instance, in a low percentage e.g., about one nanotube to 8000 PVDF strands), the PVDF may become approximately three times more sensitive to pressure. Whereas processes for making PVDF into desirable forms without nanotubes typically destroys the molecular structure that makes it piezoelectric, the use of nanotubes in the polymer may keep it in a stabile piezoelectric state. Thus, piezoelectric nanotube PVDF composites and others piezoelectric nanomaterials might for example, be used to make woven inventive images or parts thereof. For example, fabric artworks like those by the artist, Christo might be made out of such a piezoelectric nanomaterial. As the wind blows against the artwork, the piezoelectric nanomaterial might generate electricity for another use, such as to produce light, sound, color, and/or movement; to run devices, machines, computers, or systems (nanoscale or larger), etc. Piezoelectric nanomaterials might be used in a kinetic inventive image (such as a mobile) that might even power itself in part or entirely. As additional examples, piezoelectric nanomaterials may be used in inventive images that are interactive with viewers, such as images which change or modulate when viewers put their hands on them (e.g., inventive image paintings, sculptures, works of design such as purses, home products, etc.); inventive images which change or modulate when viewers walk on them (e.g., inventive image floors, floor pieces, carpets, stairways, etc.); and/or inventive images which change or modulate when viewers sit on them (e.g., inventive image pillows, seats, floors, carpets, quilts, coverings, etc.). Such inventive images might change or modulate in any way using electricity. Examples are herein and in U.S. Patent Application No. 20030035917-A1, for instance, examples in which electricity changes or modulates the inventive image's formal elements, e.g., its color, its light properties, etc. The power generated by piezoelectric nanomaterials might be used by inventive images at any time, (e.g., right away, or stored and used later, etc.) such as for another formal element.

In embodiments, inventive images are made with photorefractive polymer, with or without nanomaterials or other smart materials. As an example, a photorefractive polymer with a polyacrylate backbone which might have tetra-phenyl-diphenyldiamine side units might be used in an inventive image. In an embodiment, photorefractive polymers have mobile electronic charges that might be moved into new locations using nanotechnology and/or nanomaterials, e.g., their electric charges might be moved by light or by an electric field. An example of optical gain within a photorefractive polymer can be demonstrated when two laser beams are directed into the polymer, some energy is transferred from one beam to the other, resulting in an amplified beam and an attenuated beam, with some of this energy transferring into the material and changing its index of refraction. Photorefractive polymers can be made by modifying poly(p-phenylene terphthalate) or PPT with a charge transporting group such as a carbazole (CZ) and doped with a sensitizer such as $C_{60}$ and nonlinear optical chromophores. As an illustration, an inventive image or part thereof made using such a photorefractive polymer might change in color and/or light properties with exposure to intense light, e.g., changing from clear and colorless or lightly colored, to coloration that is darker and perhaps translucent. Photorefractive polymers may also be used in devices or machines in inventive images such as in image processing, in image or information storage devices and/or in holographic devices. Refer to "Photorefractive polymers—A Status report" by D. M. Burland, G. C. Bjorklund, W. E. Moerner, S. M. Silence and J. J. Stankus in Pure & Appl. Chem. Vol. 67, No. 1, pp. 33-38, 1995 and "Photorefractive material based on a polymer containing photoconductors and nonlinear chromophores" by Yiwang Chen, Bo Zhang, and Feng Wang in Optics Communications Vol. 228, Issues 4-6, pp 341-348, 2003. Refer also to "Carbazole-containing polymers: synthesis, properties and applications" by JV Grazulevicius, P STroghriegl, J. Pielichowski and K. Pielichowski in Progress in Polymer Science, Vol 28, Issue 9, pp 1297-1353, 2003. Also, refer to work from the University of Arizona and Nitto Denko Technical Corp. in Applied Physics Letters, Sep. 13, 2004.

More preferred examples of nanotechnology for use in inventive images are other nanomaterials; nanostructures that use single CNTs instead of silicon as the active semi conducting material such as forms of nanoelectronics; silicon nanotubes; bucky balls; buckytubes; dopeyballs; nanotube fibers; materials with nanopores or nanoparticles; nanoscale forms of layered carbon such as cones, folded sheets, filaments, and other nanoscale shapes; nanohoms; nanohorns with atoms or molecules inside them; polymer nanomaterials; diatoms, marine diatoms, single celled marine life forms, algae; EviComposites; nanorods; nanophase carbon materials; inorganic and non-CNTs (such as those made from boron nitride an silicon); organic nanotubes made from self-assembling cyclic peptides (protein components) or from naturally occurring ring heat shock proteins; strings of identical nanotubes, (which may be called clones though they are not alive); strings of identical nanotubes woven into long wires; nanocones; low-dimension structures such as quantum wells, quantum wire and quantum dots; nanotube transistors; single molecule organic switches; materials or objects with electrical bistability; nanoscale magnetic structures; quantum dots of magnetic materials; nematic nanotube gels; microencapsulated particles; encapsulated nanomaterials; C70; C84; hollow nanomaterials; nanomaterials that are partially or entirely filled with one or more materials; genetically engineered organisms; nanopowders; nanoscale tip structures formed by irradiating silicon with a laser, or, silicon field-emission tips resulting from laser crystallization of amorphous silicon (e.g., suitable for making displays); nanoshells; metal nanoshells; core-shell nanocrystals; dendrines or dendrimers, dendritic polymers and block copolymers made with nanotechnology; dendrimers as hosts for small molecules; dendritic box; cadmium selenide nanoparticles; nanorods of cadmium selenide (CdSe), nanorods of CdSe with a layer of ZnS on their outer surface, or core/shell CdSe/CdS/ZnS nanorods (e.g., used for semi conducting properties, optical properties, luminescence, light emission and/or photovoltaic devices, refer to "Epitaxial growth and photochemical annealing of graded CdS/ZnS shells on colloidal CdSe nanorods" by L. Manna, E. Scher, L.-S. Li, and P. Alivisatos in Journal of the American Chemical Society, June 2002); core/shell nanomaterials; core/shell nanoparticles; core/shell semiconductor nanoparticles; nanocrystalline porous silicon; silicon nanocrystals; nanocrystalline solids; nanocrystalline materials; nanocrystalline metals; nanocrystals or nanomaterials which are capable of conductivity, luminescence and/or light emission or which are capable of contributing to at least one of these properties in inventive images; coated nanoparticles and other coated nanomaterials (e.g., a coating may modify or change the properties of nanomaterials if desired); nanotubes grown with the use of a metal catalyst; diamondoid structures; bucky diamonds; molecular electronics (ME or molectronics); molecular machine; molecular wire; MOLMAC (also known as molecular machine); NRAM (Nanotube-based/Nonvolatile RAM by Nantero Inc. of Woburn, Mass. refer to www.nantero.com); etc.

Among other preferred examples of nanotechnology for use in inventive images are nanomaterials that are optical fiber; electrochromic nanocrystals; electrochromic nanocrystal quantum dots; nanofoam, carbon nanofoam, magnetic nanofoam; nanograss; buckypaper; nanospheres; hollow nanospheres; small diameter CNTs; nanobatteries; bionanofiber; nanoclusters of aluminum atoms; quantum confined atoms or QCA; quantum dot (might also be called artificial atoms, electrostatically confined electrons, nanometer-sized semiconductor crystals, single-electron transistor, controlled potential barrier, Coulomb island, zero-dimensional gas, colloidal nanoparticle, or semiconductor nanocrystal); quantum dot nanocrystals or QDNs; quantum wire; smartdust or smartdust motes; superconductors made using nanotechnology; superconducting wires made of ceramic nanoparticles; superlattice nanowire pattern or SNAP methods; superlattices; striped or superlattice nanowire; carbon nanowires; nanowires comprised of silicon and silicon germanium alloy; nanowires made of germanium core surrounded by a silicon shell; other core-shell nanowires; nanowires of silicon, silicon oxide and/or germanium; semiconducting nanowires encased in insulating shells; nanowires made of indium phosphide (InP); silicon nanowires; single-crystal silicon nanowires; metal nanowires; metal nanomaterials; silicone nanowires; silicone/silica based nanowires and nanostructures; silica nanowires; silica nanotubes, silica nanofiber arrays; bi- and coaxial SiC/SiO2 nanowires; nanowires and nanorods fabricated in solution; inorganic nanowires; boron based nanotubes; boron nanowhiskers; silicon nanospheres; silicon nanorods; nanorods made out of other semiconductors, metals or even insulators; silicon nanomaterials; graphite nanofibers; multi-walled carbon nanofiber; fullerenes smaller than C60; C50 molecules; C36 fullerenes and solid C36; nanoscale dumbbells; inorganic nanomaterials; inorganic nanotubes; inorganic tubular nanostructures; piezoelectric nanotubes; manganite; nanotubes made of manganese oxide; fishbone carbon nanofiber; platelet-like carbon nanofiber; In2O3 nanofibers that may be semi conductive; silver nanowires; silver nanomaterials; titanium nanowires; titanium nanomaterials; MgO nanowires; SiO2 nanowires; Ga2O3 nanowires; GeO2 nanowires; ZnO nanowires; protein nanotubes; nanorings; nanobells; CNT conveyor belt, conveyor belts made of other nanomaterials; nanocarpet (upright nanotubes organized like a shag rug); and utility fog also called polymorphic smart materials.

These examples of nanotechnology are also preferred for use in inventive images: onion-like carbon or OLC, also called bucky onions; rosette nanotubes or rosette shaped nanotubes; nanobrushes; polymer nanobrushes; fullerides; nanocubes; nanoprisms; nanodots; dot like or spherical nanocrystals; rod shaped nanocrystals; iron nanocrystals; nanocrystalline steel; nanocrystalline metal; nanocrystalline powder; nanocrystalline nanopowder; nanocrystalline coatings; nanometal powder; nanostructures made of molybdenum oxide; functionalized nanomaterials; nanoplatelets; nano-optical platelets; fibrils; nanofillers; nanocatalysts; nanotriangles; aerogel nanomaterials; chalcogenide aerogels; antenna; nanoantenna; bowtie nanoantenna; indium arsenide nanorods; quantum rods; nanotetrapods; semiconducting nanoparticles; nanogels, nanovirus, artificial RNA; nanocables, single crystal nanotubes of gallium nitride; gallium nitride nanotubes; gallium nitride nanowires; nanotubes made from silica, alumina, silicon and metals; metal oxide ceramic nanoparticles; metal nanoparticles; gold nanoparticles; gold polymer-shell nanoparticles; silicate nanoparticles; metal nanocrystals; polymer nanostructures; nanocapsules; coated nanoparticles; helical nanotubes; nanopipettes; nanoribbons; nanocoils; nanosprings; nanowhiskers; silicon carbide whiskers; chopped carbon fibers; nano-silica filled PET fibers; nanospheres; nanospheres used in a colorant with a polymer gel such as in a photonic ink or p-ink, e.g., nanospheres in a colloidal crystal used with a polymer gel in a colorant (refer to the example herein); self assembled monolayer (SAM); nanomaterials that are one molecule thick; fullerenes made with one or more metal atoms; bipyridinium (polymer derived from N,N-bis[(p-trimethoxysilyl)-benzyl]-4,4'-bipyridinium bpy 2,2'-Bipyridine); molybdenum based nanocrystals or Mo—C—O nanocrystals; photonic crystals made using nanotechnology; tungsten photonic crystals; titanium and titanium alloy nanoparticles (such as those by Altair Technologies of Reno, Nev.); and shape memory alloys or SMAs made using nanomaterials (e.g., Nitinol by Shape Memory Applications, Inc of San Jose, Calif. refer to www.sma-inc.com).

Additional preferred examples of nanocomposites for use in inventive images are conductive ceramic nanocomposites; CNT-alumina nanocomposites; CNT metal composites; CNT ceramic composites; clay nanoparticle composites; nanofiber metal composites; nanocrystal metal composites; nanofiber ceramic composites; nanocrystal ceramic composites; colloidal crystal nanocomposites; metallopolymer-silica colloidal crystal nanocomposites; other polymer, metal and ceramic nanocomposites; plaster nanocomposites; glass nanocomposites; crystal nanocomposites; paper nanocomposites; wood nanocomposites; nanocrystalline copper; fabric nanocomposites; nanocomposite fibers; fiber nanocomposites; concrete nanocomposites; concrete hybrid nanomaterials, etc. In addition, any of these ingredient combinations might be used to make hybrid nanomaterials for inventive images rather than composites. Additional examples are shape memory polymer nanocomposites, such as shape memory polymers reinforced with silicon carbide (SiC) nanoparticles (the nanoparticles may improve the polymer's mechanical properties). Refer to "Shape memory polymer nanocomposites" by K. Gall, M. Dunn, Y. Liu, D. Finch, M. Lake and N. Munshi in Acta Materialia 50, 5115-5126, Dec. 3, 2002. Inventive images might be made with a nanotube ceramic composite like that described by G-D Zhan et al., in Applied Physics Letters, 83, 1228, 2003.

Additional preferred examples of nanotechnology for use in inventive images are: nanofabrication; chemical vapor deposition (CVD); vapor condensation; solution precipitation; physical vapor deposition; plasma enhanced chemical vapor deposition (PECVD); ball milling, hydrothermal pressure; annealing of soot; optical tweezers, holographic trap or holographic optical trap devices (such as the one by David Grier of New York University, NY N.Y.); high velocity oxy-fuel (HVOF) spraying; hypersonic plasma particle deposition (HPPD) process; reactive sputtering; vacuum arc deposition; laser furnace method of making nanotubes; laser pyrolysis; sol-gel technology; sol-gel processing of nanoparticles and other nanomaterials; spray conversion; gas phase condensation; gas phase processes; pulsed-laser vaporization (PLV); physical vapor synthesis (PVS); electrodeposition methods using plating baths to make nanostructured metals; MIMIC (micromolding in capillaries, a quick prototyping method); molecular computing; assembler or molecular assembler; directed-assembler (an assembler that can use external energy or inputed information); nanoscale robots; limited assembler; molecular beam epitaxy (MBE); organo-metallic vapor epitaxy, or metal-organic vapor phase epitaxy (MOVPE); nanomanipulator (e.g., from 3rd Tech in Raleigh, N.C.); atomic force microscope (AFM, also called a scanning force microscope); disassembler; computational nanotechnology processes; convergent assembly; the use of sol-gel chemistry with nanotechnology; surface processing of nanomaterials; controlled nucleation, directional growth and directional etching of nanomaterials; lithographic and non-lithographic patterning techniques; nanoscale lithography; nanosphere liftoff lithography; controlled feedback lithography; e-beam lithography; electron beam lithography; electron beam nanolithography; ion beam nanolithography; soft lithography (e.g., to print electronics and displays in inventive images); nanoprinting; nanoimprinting; nanoimprint lithography; templating; net shape forming; templates prepared using photolithography; ultra-precision motion and control devices; dip pen nanolithography; colored ink dip pen nanolithography; dry nanotechnology; nanosphere lithography; nano-imprint lithography (e.g., for making nanoelectric devices and optical devices); micro contact printing; and micro-imprint lithography at the nanoscale level.

Further preferred examples of nanotechnology for use in inventive images are: nanomaterial lasers; nanowire lasers; laser ablation methods; arc discharge methods; molecular self assembly; NEMS (or nanoscale electrical/mechanical devices); Langmuir-Blodgett; Langmuir-Blodgett films; atomic manipulation; atomistic simulations; ballistic magnetoresistance (BMR); bottom-up; bottom-up nanofabrication (also called nanoscale synthesis); Millipede by IBM; use of templates to direct self assembly of nanostructures (e.g., such as conducting nanowires); atom transfer radical polymerization or ATRP; laser-assisted direct imprinting or LADI; molecular manipulator; molecular-scale manufacturing; molecular manufacturing also called nanomanufacturing; molecular nanotechnology; molecular recognition; molecular systems engineering; molecular mechanics; nanowetting; positional controlled chemical synthesis or positional synthesis; positional assembly; positional devices; time-resolved terahertz spectroscopy; templating fabrication processes and materials for making various nanoscale structures (such as nanotubes) from a range of different materials; self-assembler; self-assembly; nanoscale crystal growth; evaporation induced self assembly; self repair; self-replication; superposition; top down; top down nanofabrication; top down molding (also called mechanical nanotechnology); automated engineering; automated manufacturing using nanotechnology-typically requiring little human labor; Brownian Assembly; Cams; CEC Processes; complementary metal oxide semiconductor (might be used in CMOS transistors and CMOS logic); dipolar bonds or dative bonds; harmonic oscillator; positional synthesis; receptors; replicators; scanning tunnelling microscope; sealed assembler labs; automated engineering; automated manufacturing; layer-by-layer assembly; ink jet printing; proximal probes (e.g., scanning tunneling and atomic force microscopes); scanning probe instruments; scanning probe microscope (SPM); scanning thermal microscope; magnetic force microscope; electron microscopy; high resolution electron microscopy; spectroscopy; sealed assembler lab; nanosoldering; nanowelding; other methods, materials and devices for controlling the growth of and/or for assembling nanostructures and nanocrystals (such as carbon nanostructures e.g., CNTs); processes for coating or encapsulating nanomaterials such as nanoparticles; electric-arc welding processes for manufacturing CNTs such as in U.S. Pat. No. 6,114,995); electrospinning; electrostatic spinning; flash-electrospinning; Biased Target Ion Beam Deposition (BTIBD); NanoAccess system-on-chip (SoC) manufacturing technologies by Chartered Semiconductor of Singapore and IBM; nanofiltration; nanofluidics; other nanotechnology practices; materials made using nanotechnology which are useful in embodiments; as well as materials, devices and systems made using one or more of the examples herein. As a further example, nanobrushes, molecular brushes, polymer brushes or polymer nanobrushes might be used to make inventive images. These might have different structures, e.g., they might be made with two or more polymers. Refer to work by Krzsztof Matyjaszewski at Carnegie Mellon University, Martin Moeller at the University of Aachen, Tadeusz Pakula at the Max Plank Institute, Mainz, Sergei Sheiko at the University of North Carolina, Chapel Hill, and Tomasz Kowalewski at Carnegie Mellon University. In embodiments, holographic gratings might be used to make inventive images. These may be made using nanotechnology. For example, they might be semiconductor nanocrystal films, for instance, with the active ingredient being cadmium selenide nanocrystal solids. Refer to work at the Los Alamos National Laboratory in Los Alamos, N. Mex.

Any suitable source for nanotechnology, nanomaterials, and complimentary and related materials, processes and information (e.g., on their websites) might be used in making inventive images. These are examples but there are many others. A number of these sources also offer materials and processes that might be used in other embodiments to make inventive images too.

Applied Nanotech Inc. a subsidiary of SI Diamond Technology Inc. in Austin Tex. offers cold carbon cathodes made with nanotubes; CNT gated electron source (a small field emission device ready for mounting in a vacuum system); quantum dots; CNT composites; and metallized CNTs which might be used to make inventive images.

Some examples of sources for nanotechnology and complimentary and related materials and processes for use in making inventive images are: Dekker Encyclopedia of Nanoscience and Nanotechnology, edited by James A. Schwarz, Cristian I. Contescu, and Karol Putyera, published by Dekker March 2004 as well as updates to this encyclopedia on their website; the journal, Nanotechnology, (refer to www.iop.org/EJ/), Institute of Physics and IOP Publishing Limited; "Carbon Nanotubes: Science and Applications", M. Meyyappan, NASA Ames Research Center, Moffett Firld, Calif.; sources named in "Small Times" Magazine "2004 Small Tech Business Directory" (refer to www.smalltechdirectory.com) and in updated versions of this directory; Aldrich Chemical Co. (refer to www.sigma-aldrich.com, refer to the flier entitled "New Nanomaterials from Aldrich" on their website as Sell-Sheet_nanomaterials.pdf; the Aldrich booklet entitled "Dendrimers: Building Blocks for Nanoscale Synthesis, Aldrichimica Acta", Vol. 37 No. 2 2004; refer to the Aldrich "Materials Science" catalog; and refer to various issues of Aldrich's "ChemFiles" such as: Vol. 5 No. 3 and 4, "Nanomaterials for Advanced Applications;" and Vol. 4 No. 3 "Volatile Precursors for Nanofabrication"); Nanomix Inc. of Emeryville, Calif. (refer to www.nano.com); NanoInk Inc. of Chicago Ill., see www.nanoink.net; MER Corporation of Tucson, Ariz. (refer to www.opus1.com/~mercorp/index.htmlx or mercorp.com); SES Research of Houston, Tex. (refer to www.sesres.com); Carbolex of Lexington, Ky. (refer to http://carbolex.com); BuckyUSA of Houston, Tex. (refer to www.flash.net/~buckyusa); Carbon Nanotechnologies, Inc. of Houston, Tex. (refer to www.cnanotech.com); Hyperion Catalysis International of Cambridge, Mass. (refer to www.fibrils.com); Nanocs Inc. of NY (refer to www.nanocs.com); NanoDevices Inc. of Santa Barbara, Calif. (refer to www.nanodevices.com); NanoLab Incorporated of Brighton, Mass. (refer to www.nano-lab.com); NanoCarbLab of Moscow, Russia (refer to www.nanocarblab.com); Institut National Polytechnique de Toulouse, France (refer to www.inp-toulouse.fr/srdi/nouveautes/nouveautes.shtml); Nanoledge of Clapiers, France (refer to www.nanoledge.com); Nanocyl of Namur, Belgium (refer to www.nanocyl.com); Rosseter Holdings Ltd of Limassol Cyprus (refer to www.e-nano-science.com); Iljin Nanotech of Korea (refer to www.iljin-nanotech.co.kr); GZ Energy of China (refer to www.gzenergy.com); Sun Nanotech Co Ltd of China (refer to www.sunnano.com); IBM Corp. of Armonk N.Y. (refer to IBM Nanoscale Science Department, www.researchibm.com/nanoscience); Lucent Technologies of Murray Hill N.J.; NASA Ames Research Center for Nanotechnology of Moffett Field, Calif. (refer to www.ipt.arc.nasa.gov); Rice University of Houston Tex., such as the Center for Nanoscale Science and Technology (e.g., refer to http://cnst.rice.edu/ and to http://nanonet.rice.edu); Harvard University in Cambridge Mass.; Center for the Science of Nanoscale Systems and their Device Applications of Cambridge Mass. (refer to www.nse-c.harvard.edu); Stanford University of Palo Alto Calif.; Rensselaer Polytechnic Institute (RPI), NY such as Center for Directed Assembly of Nanostructures (refer to www.rpi.edu); New Jersey Nanotechnology Consortium of Murray Hill, N.J.; Dartmouth University of Hanover N.H. (refer to www-.dartmouth.edu/~dmmg); University of Twente in the Netherlands (refer to Nanolink at www.mesaplus.utwente.nl/nanolink); Center for Electronic Transport in Molecular Nanostructures, Columbia University of NY, N.Y. (refer to www.cise.columbia.edu); Altair Technologies of Reno, Nev. (refer to www.altairinc.com); Center for Nanoscale Systems in Information Technologies, Cornell University of NY (refer to www.cns.cornell.edu); Center for Integrated Nanopatterning and Detection Technologies, Northwestern University of Evanston Ill. (refer to www.nsec.northwestern.edu); www.nanofabrication.nwu.edu; The National Nanotechnology Initiative in Arlington Va. (refer to www.nano.gov); Cornell Nanofabrication Facility, Cornell University Ithaca, N.Y. (Refer to www.cnf.cornell.edu); The Accelerator Laboratory at the University of Helsinki in Finland; Materials Science Research Center of Excellence Howard University School of Engineering, in Washington, D.C. (refer to www.msrce.howard.edu/~nanonet/NNUN.HTM); Penn State Nanofabrication Facility, The Pennsylvania State University, University Park, Pa. (refer to www.nanofab.psu.edu); Stanford Nanofabrication Facility, Stanford University, Stanford, Calif. (refer to http://snf.stanford.edu); Nanotech Electrical and Computer Engineering, University of CA. Santa Barbara, Calif. (refer to www.nanotech.ucsb.edu); Albany Institute of Nanotechnology, SUNY University at Albany, N.Y. (refer to www.albanynanotech.org); UCLA & UCSB: CA. NanoSystems Institute (CNSI) in Santa Barbara and Los Angeles Calif. (refer to www.cnsi-uc.org); Purdue University: Nanotechnology Center, of West Lafayette, Ind.; University of South Carolina of Columbia, S.C. (refer to NanoCenter www.nano.sc.edu/welcome.asp); Institute of Nanoscience, The Naval Research Laboratory, U.S. Navy Washington D.C. (refer to http://nanoscience.nrl.navy.mil/); Northeastern University Advanced Nano Products Co., Ltd. of Korea (refer to www.anapro.com); Nanophase Technologies Corporation of Romeoville, Ill. (refer to www.nanophase.com); Nanomanufacturing Research Institute, Boston Mass. (refer to www.nano.neu.edu and www.barnett.neu.edu/index.html); nanotechweb.org at www.nanotechweb.org; Nanotechnology Now at www.nanotech-now.com; NanotechNews.com at www.nanotechnews.com; The ASME Nanotechonology Institute, NY N.Y. at www.nanotechnologyinstitute.org; University of Cambridge, Nanoscale Science Laboratory of Cambridge UK, (refer to www-g.eng.cam.ac.uk/nano/frames.html); Notre Dame University: Center for Nano Science and Technology of Notre Dame Ind. (refer to www.nd.edu%7Endnano/index.htm); Texas Nanotechnology Initiative of Texas (refer to www.texasnano.org); Nanotechnology Alliance in Southern CA. of Los Angeles Calif. (refer to www.larta.org/Nano); Nanotechnology Institute—Ben Franklin Partners, Pennsylvania of Philadelphia Pa. (refer to www.sep.benfranklin.org/resources/nanotech.html); NanoBusiness Alliance at www.nanobusiness.org; New Mexico Nanoscience Alliance of Albuquerque, N. Mex. (refer to www.unm.edu/news/Releases/Aug6nanoscience.htm); Virginia: Initiative for Nanotechnology at www.inanova.org; Quantum Dot Corporation of Hayward, Calif. (refer to www.qdots.com); Nanodyne Inc of New Brunswick, N.J.; Nanometals of Kingston, Ontario; Advanced Technology Materials, Inc. (ATMI) of Danbury, Conn. (refer to www.atmi.com); Applied Nanotechnologies of Chapel Hill, N.C. (refer to www.applied-nanotech.com); Carbon Nanotechnologies, Inc. of Houston, Tex. refer www.cnanotech.com; DuPont of Delaware (refer to www.Dupont.com); Nanocor of Arlington Heights, Ill. (refer to www.nanocor.com); Southern Clay Products of Gonzales, Tex. (refer to www.scprod.com) which is now part of Rockwood Specialties, Inc. Headquartered in Princeton, N.J.; Electrovac Gesmbh of Klosterneuburg Austria (refer to www.electrovac.com); General Motors Research and Development of MI, refer to www.gm.com; Honeywell of Morristown, N.J. (refer to www.honeywell.com); ISE Electronics Corporation of Ise, Mie Japan, a subsidiary of Noritake Co., Ltd. (refer to www.noritake-elec.com/itron); Nanosys of Palo Alto, Calif. (refer to www.Nanosysinc.com); Molecular Nanosystems Inc. of Palo Alto, Calif. (refer to www.monano.com); Motorola of Schaumburg, Ill. (refer to www.motorola.com); Piezomax Technologies, Inc. of Middleton, Wis. (refer to www.piezomax.com); PixTech of Rousset France and Santa Clara, Calif.; Samsung Advanced Institute of Technology (SAIT) of Korea; SI Diamond Technology Inc. (SIDT) of Austin, Tex. (refer to www.sidiamond.com); Applied Nanotech Inc. of Austin, Tex.; Nanostructured & Amorphous Materials Inc. of Los Alamos N. Mex. (refer to www.nanoamor.com); Ahwahnee Technology of San Jose, Calif. (refer to www.ahwahneetech.com); NanoDevices Inc. of Santa Barbara, Calif. (refer to www.nanodevices.com); NanoScale Materials, Inc. of Manhattan, Kans. (refer to www.nanoscalematerials.com); Massachusetts Institute of Technology (MIT) of Cambridge Mass.; North Carolina Center for Nanoscale Materials UNC-Chapel Hill, N.C. (refer to www.physics.unc.edu/~zhou/muri/nccn-m.html); Ecole Polytechnique Fédérale de Lausanne in Switzerland (refer to www.epfl.ch); Université de Fribourg; Université de Montpellier II (refer to www.univ-montp2.fr); Michigan State University of East Lansing, Mich. (refer to www.msu.edu); Penn State University (refer to www.psu.edu); Delft University of Technology in the Netherlands (refer to www.tudelft.nl/matrix/home.cfm?usertype=English); University of Oklahoma (refer to www.ou.edu); University of Kentucky in Lexington, Ky. (refer to www.uky.edu); and Washington University in Saint Louis, Mo. (refer to www.wustl.edu), etc. Refer to the Royal Society of Engineering in London, England and at www.nanotec.org.uk and to their publication online at www.nanotec.org.uk/finalReport.htm entitled, "Nanoscience and nanotechnologies: opportunities and uncertainties" July 2004. Refer also to these and other websites: www.nanotech-now.com, www.nanoword.net, www.nanoelectronicsplanet.com, www.smalltimes.com, www.nanoveritas.com, www.sciam.com/nanotech, www.nano.org.uk, www.nanotechplanet.com, www.foresight.org, www.azonano.com, and www.nanoapex.com. The journals cited in references herein have other articles that might be useful resources for making inventive images. Examples are other articles in the journals: Advanced Materials, Applied Physics Letters and Nano Letters. Also refer to the Nanotechnology Conference & Trade Show (www.nsti.org), e.g., the lectures and exhibitors at their conferences, and their publications are sources for materials and technology for making inventive images.

The materials listed below as (a) through (g) may be used in inventive images:

(a) nanomaterials which may be metal or which may be nanoparticles of gold, silver and/or copper, that are in ceramic or pottery glazes, that are in ceramic or pottery iridescent or metallic glazes, and/or that are in ceramic or pottery lustre glazes;

(b) metal or metallic nanoparticles in glass; gold colloidal nanoparticles in glass or silver colloidal nanoparticles in glass; or gold, silver, chromium, cobalt and/or molybdenum nanoparticles in glass; any of these used to produce or effect coloration in glass; any of these used to produce red or yellow coloration in glass;

(c) metal nanoparticles used in paint, or paint that has gold, silver, chromium, cobalt and/or molybdenum nanoparticles.

(d) carbon black nanoparticles, carbon black nanoparticle composites; carbon black nanoparticle polymer composites; or carbon black nanoparticle rubber composites.

(e) zeolite catalysts, zeolites in catalysts, catalysts with nanomaterials, or catalysts with nanomaterials of a type that were used in catalysts prior to May 1, 2003 or prior to May 1, 2004, that do not have other, different nanomaterials.

(f) glass nanofibers.

(g) silicate nanoparticles, montmorillonite or either of these in the form of clay; silica nanomaterials in poly(dimethylsiloxane) or PDMS, or silicone rubber.

However, in embodiments, it may be desirable that one or more of the materials listed above in (a) through (g) not be the basis for designating the images they are part of as inventive images, it may be desirable that one or more of them are not classified as nanomaterials, as smart materials, and/or as stabilizers herein, unless the inventive images they are in can also be described by (h), (i) and/or (j) as follows:

(h) The structural properties of the nanomaterials and/or nanoparticles have been controlled, designed, manipulated or engineered using nanotechnology that these materials enhance or impart the desired properties to inventive images (e.g., the nanomaterials' shape, size, local environment, and/or degree of aggregation have been designed or engineered to create the desired properties such as optical properties, and/or light properties).

(i) The nanomaterials and/or nanoparticles have been functionalized or their surfaces have been chemically controlled, designed, engineered, added to, coated, modified, or changed using nanotechology.

(j) The nanomaterials and/or nanoparticles enhance or provide one or more of these properties or formal elements to formed inventive images: i). conductivity, semi conductivity, electrical conductivity, or super conductivity; ii). emitted light; iii). strength, tensile strength, increased toughness, reduced sagging, increased rigidity, and/or structure; iv). CNTs, nanowires, nanofibers, nanocrystals, nanoyarn, and/or smart dust; v). machines, devices and/or systems or part thereof which may or may not be nanoscale or visible to the unaided naked human eye (such as computers, integrated circuits, power cells, solar energy devices, displays, sensors, light emitters, other electric and/or mechanical devices, part of any of these, etc.); vi). visual effects, optical effects and/or light effects which are reversible; vii). one or more formal elements that change and/or modulate; viii). aesthetic effects that can be changed and/or modified by electricity; ix). sound and/or movement; x). the ability to be interactive with and/or responsive to a viewer, to the environment or both; xi). the ability to detect, respond to and/or correct problems or other matters within the inventive image; xii). at least one property that would have been considered extraordinary, novel, unusual or remarkable at a date after May 1, 2003 or after May 1, 2004.

In embodiments, it may be desirable that the use of one or more of the materials described in (a) through (g) above not be the basis for the designation of their images as inventive images. It may be desirable that one or more of these materials described above not to be classified as nanomaterials, as smart materials and/or as stabilizers herein.

In embodiments, if the use of nanomaterials that may or may not be nanoscale and/or visible to the unaided human eye that are photosensitive, photosensors, light filters, silver and/or silver nanoparticles, and/or other nanomaterials in photographic and/or silver halide emulsions, films, coatings and layers in images is the basis by which these images are designated inventive images, (a), (b) and/or (c) might be preferable.

(a) These emulsions, films, coatings or layers are used on image supports or other inventive image surfaces that fit one or more of the following descriptions. They are: i). not papers, ii). stiff or rigid, iii). at least about 0.2 cm thick, preferably at least about 0.3 cm thick, more preferably at least about 0.45 cm thick, desirably at least about 0.6 cm thick, most preferably at least about 0.8 cm thick, and most desirably at least about 1.0 cm thick, iv). not in the shape, not with the form and/or not with the structure of a conventional image support or paper used for this same purpose prior to May 1, 2003 or prior to May 1, 2004, v). not in a shape or a form that is paper-like, rectilinear, regular, uniform, consistent, even, untextured, symmetrical, balanced, smooth, standardized, homogeneous, and/or other such characteristics, and/or vi). in a shape or form that is non-rectilinear, nonplanar, irregular, nonuniform, inconsistent or varied, uneven, textured, asymmetrical, unsymmetrical or nonsymmetrical, unbalanced or off balance, rough or unsmooth, non-standardized, inhomogeneous, or with other such characteristics.

(b) Nanomaterials in these emulsions, films, coatings or layers enhance or provide one or more of these properties or formal elements to formed inventive images: i). conductivity, semi conductivity, electrical conductivity, or super conductivity; ii). emitted light; iii). strength, tensile strength, increased toughness, reduced sagging, increased rigidity, and/or structure; iv). CNTs, nanowires, nanofibers, nanocrystals, nanoyarn, and/or smart dust; v). machines, devices and/or systems or part thereof which may or may not be responsive to light, nanoscale, or visible to the unaided human eye (such as computers, integrated circuits, power cells, solar energy devices, displays, sensors, light emitters, other electric and mechanical devices, part of any of these, etc.); vi). visual effects, optical effects, light effects and/or effects of color that are reversible; vii). one or more formal elements that change and/or modulate; viii). aesthetic effects that can be changed and/or modified by electricity; ix). sound and/or movement; x). the ability to be interactive with and/or responsive to a viewer, to the environment or both; xi). the ability to detect, respond to and/or correct problems or other matters within the inventive image; xii). some or all changes in such emulsions, films, coatings and layers due to exposure to light are reversible, xiii). at least one property that would have been considered extraordinary, novel, unusual or remarkable on or after May 1, 2003 or on or after May 1, 2004.

(c) There are nanomaterials in these emulsions, films, coatings or layers that may or may not be nanoscale and/or visible to the unaided human eye, that were not used in versions of such emulsions, films, coatings or layers that were conventional prior to May 1, 2003 or prior to May 1, 2004.

In embodiments, it may be desirable that the use of one or more nanomaterials that are photosensitive, photosensors, light filters, silver and/or silver nanoparticles, and/or other nanomaterials in photographic and/or silver halide emulsions, films, coatings and layers in images, not be the basis for the designation of their images as inventive images. It may be desirable that one or more of these nanomaterials not be classified as nanomaterials, as smart materials and/or as stabilizers herein.

In embodiments, if nanomaterials (such as nanoparticles) that may or may not be nanoscale and/or invisible to the unaided naked human eye, in inks, in printer inks, or in ink jet printer inks in images are the basis for designating these images as inventive images, and/or if nanomaterials (such as nanoparticles) that function as pigment(s), other colorant(s) and/or mordant(s), in inks, in printer inks, or in ink jet printer inks in images are the basis for designating these images as inventive images, (a), (b), and/or (c) might be preferable.

(a) These inks, printer inks, or ink jet printed inks are used on image supports or other inventive image surfaces that are: i). not paper and not paper-like, ii). stiff or rigid, iii). at least about 0.2 cm thick, preferably at least about 0.3 cm thick, more preferably at least about 0.45 cm thick, desirably at least about 0.6 cm thick, most preferably at least about 0.8 cm thick, and most desirably at least about 1.0 cm thick, iv). not in the shape, not with the form and/or not with the structure of a conventional image support or paper used for this same purpose prior to May 1, 2003 or prior to May 1, 2004, v). not in a shape or a form that is paper-like, rectilinear, regular, uniform, consistant, even, untextured, symmetrical, balanced, smooth, standardized, homogeneous, and/or other such characteristics, and/or vi). in a shape or form that is non-rectilinear, nonplanar, irregular, nonuniform, inconsistent or varied, uneven, textured, asymmetrical, unsymmetrical or nonsymmetrical, unbalanced or off balance, rough or unsmooth, non-standardized, inhomogeneous, or with other such characteristics.

(b) Nanomaterials that may or may not be nanoscale and/or visible to the unaided human eye in these inks, printer inks, or ink jet printed inks enhance or provide one or more of these properties or formal elements to formed inventive images: i). conductivity, semi conductivity, electrical conductivity, or super conductivity; ii). emitted light; iii). strength, tensile strength, increased toughness, reduced sagging, increased rigidity, and/or structure; iv). CNTs, nanowires, nanofibers, nanoyarn, and/or smart dust; v). machines, devices and/or systems or part thereof which may or may not be nanoscale or visible to the unaided human eye (such as computers, integrated circuits, power cells, solar energy devices, displays, sensors, light emitters, other electric and mechanical devices, part of any of these, etc.); vi). optical effects and/or light effects beyond those of a conventional pigment or dye, which might be reversible; vii). one or more formal elements that change and/or modulate; viii). aesthetic effects that can be changed and/or modified by electricity; ix). sound and/or movement; x). the ability to be interactive with and/or responsive to a viewer, to the environment or both; xi). the ability to detect, respond to and/or correct problems or other matters within the inventive image; xii). at least one property that would have been considered extraordinary, novel, unusual or remarkable on or after May 1, 2003 or on or after May 1, 2004.

(c) There are nanomaterials in these inks, printer inks, or ink jet printer inks (that may or may not be nanoscale and/or visible to the unaided human eye), that were not used in versions of such inks, printer inks, or ink jet printer inks that were conventional prior to May 1, 2003 or prior to May 1, 2004.

However, in embodiments it may be desirable for one or more such nanomaterials, in inks, in printer inks, or in ink jet printer inks in images not to be the basis for designating these images as inventive images. It may be preferable that one or more of such materials not be classified as nanomaterials, as smart materials and/or as stabilizers herein.

Embodiments are directed at: (i). Nanomaterials that may or may not be nanoscale and/or visible to the unaided human eye in coatings, (ii). nanoparticles in coatings, (iii). polymeric nanoparticles in coatings, and/or (iv) nanomaterials functioning as mordants or pigments in coatings. If one or more of the materials described in (i), (ii), (iii) and/or (iv) above are on printing papers, on ink jet printing papers, on photographic papers, on digital media, on other papers, and/or on film, and one or more of these are thin and even coatings, and it or they are clear and colorless or uniformly colored, and it or they are the basis by which images are designated inventive images, (a), (b) and/or (c) described below for its use in the image might be preferable.

(a) These coatings are used on image supports or other inventive image surfaces that are: i). not papers and/or not paper-like, ii). stiff or rigid, iii). at least about 0.2 cm thick, preferably at least about 0.3 cm thick, more preferably at least about 0.45 cm thick, desirably at least about 0.6 cm thick, most preferably at least about 0.8 cm thick, and most desirably at least about 1.0 cm thick, iv). not in the shape, not with the form and/or not with the structure of a conventional image support or paper used for this same purpose prior to May 1, 2003 or prior to May 1, 2004, v). not in a shape or a form that is paper-like, rectilinear, regular, uniform, consistant, even, untextured, symmetrical, balanced, smooth, standardized, homogeneous, and/or other such characteristics, and/or vi). in a shape or form that is non-rectilinear, nonplanar, irregular, nonuniform, inconsistent or varied, uneven, textured, asymmetrical, unsymmetrical or nonsymmetrical, unbalanced or off balance, rough or unsmooth, non-standardized, inhomogeneous, or with other such characteristics.

(b) Nanomaterials in these coatings enhance or provide one or more of these properties or formal elements to formed inventive images: i). conductivity, semi conductivity, electrical conductivity, or super conductivity; ii). emitted light; iii). strength, tensile strength, increased toughness, reduced sagging, increased rigidity, and/or structure; iv). CNTs, nanowires, nanofibers, nanocrystals, nanoyarn, and/or smart dust; v). machines, devices and/or systems or part thereof which may or may not be nanoscale (such as computers, integrated circuits, power cells, solar energy devices, displays, sensors, light emitters, other electric and mechanical devices, part of any of these, etc.); vi). visual effects, optical effects and/or light effects beyond those of a conventional pigment or dye, which might be reversible; vii). one or more formal elements that change and/or modulate; viii). aesthetic effects that can be changed and/or modified by electricity; ix). sound and/or movement; x). the ability to be interactive with and/or responsive to a viewer, to the environment or both; xi). the ability to detect, respond to and/or correct problems or other matters within the inventive image; xii). at least one property that would have been considered extraordinary, novel, unusual or remarkable on or after May 1, 2003 or on or after May 1, 2004.

(c) There are nanomaterials in these coatings (that may or may not be nanoscale and/or visible to the unaided human eye), that were not used in versions of such coatings that were conventional prior to May 1, 2003 or prior to May 1, 2004.

In embodiments directed at (i). Nanomaterials that may or may not be nanoscale and/or visible to the unaided human eye in coatings, (ii). nanoparticles in coatings, (iii). polymeric nanoparticles in coatings, and/or (iv). Nanomaterials that may or may not be nanoscale and/or visible to the unaided human eye that function as mordants or pigments in coatings, wherein (i), (ii), (iii), and/or (iv) are on printing papers, on ink jet printing papers, on photographic papers, on digital media, on other papers, and/or on film, and (i), (ii), (iii), and/or (iv) are also be thin and even coatings, and clear and colorless or uniformly colored, it may be desirable that one or more of (i), (ii), (iii), and/or (iv) are not the basis by which their images are designated inventive images. It may be desirable that that one or more of (i), (ii), (iii), and/or (iv) are not classified as nanomaterials, as smart materials and/or as stabilizers herein.

Though conventional computer papers, conventional ink jet printing papers, other conventional printing papers, conventional photographic papers, conventional digital media, other conventional papers, and conventional film that are nanomaterials or that are made with at least one nanomaterial (e.g., in their coatings, binders, size, and/or emulsions) may be used in inventive images in any form (e.g., conventional image making papers such as those used for drawing, papers and digital mediums by Eastman Kodak of Rochester, N.Y.), in embodiments it may be preferable that their nanomaterial(s) are not classified as nanomaterials, as smart materials, as stabilizers, and/or that they not be the basis by which an image is designated an inventive image. However, if at least one of their nanomaterial(s) is of a kind which was not conventionally used in such products prior to May 1, 2003 or prior to May 1, 2004, it is preferable that the image be considered an inventive image and that its nanomaterial(s) are considered nanomaterials, smart materials and/or stabilizers. Nanomaterials used in the ways described above might also be the basis for the designation of their image as an inventive image, they might also be considered smart materials and/or stabilizers if they enhance or provide one or more of these properties or formal elements to formed inventive images: i). conductivity, semi conductivity, electrical conductivity, or super conductivity; ii). emitted light; iii). strength, tensile strength, increased toughness, reduced sagging, increased rigidity, and/or structure; iv). CNTs, nanowires, nanofibers, nanocrystals, nanoyarn, and/or smart dust; v). machines, devices and/or systems or part thereof which may or may not be nanoscale (such as computers, integrated circuits, power cells, solar energy devices, displays, sensors, light emitters, other electric and mechanical devices, part of any of these, etc.); vi). visual effects, optical effects and/or light effects beyond those considered conventional, which might be reversible; vii). one or more formal elements that change and/or modulate; viii). aesthetic effects that can be changed and/or modified by electricity; ix). sound and/or movement; x). the ability to be interactive with and/or responsive to a viewer, to the environment or both; xi). the ability to detect, respond to and/or correct problems or other matters within the inventive image; xii). at least one property that would have been considered extraordinary, novel, unusual or remarkable on or after May 1, 2003 or on or after May 1, 2004.

In embodiments, if the use of nanomaterials or nanoparticles that may or may not be nanoscale and/or visible to the unaided human eye as or in pigments, dyes and/or paints is the basis for designating images as inventive images, it might be preferable that these nanomaterials enhance or provide one or more of these properties or formal elements to the formed inventive images: i). conductivity, semi conductivity, electrical conductivity, or super conductivity; ii). emitted light; iii). strength, tensile strength, increased toughness, reduced sagging, increased rigidity, structure; iv). CNTs, nanowires, nanofibers, nanoyarn, and/or smart dust; v). machines, devices and/or systems or part thereof which may or may not be nanoscale (such as computers, integrated circuits, power cells, solar energy devices, displays, sensors, light emitters, other electric and mechanical devices, part of any of these, etc.); vi). visual effects, optical effects and/or light effects beyond those of a conventional pigment or dye, which might be reversible; vii). one or more formal elements that change and/or modulate; viii). aesthetic effects that can be changed and/or modified by electricity; ix). sound and/or movement; x). the ability to be interactive with and/or responsive to a viewer, to the environment or both; xi). the ability to detect, respond to and/or correct problems or other matters within the inventive image; and/or xii). at least one property that would have been considered extraordinary, novel, unusual or remarkable on or after May 1, 2003 or on or after May 1, 2004.

Though pigments, dyes and/or paints which are nanomaterials or which are made with nanomaterials may be used to make inventive images, it may be desirable that the use of one or more of these nanomaterials in embodiments not be the basis by which images are determined to be inventive images. It may be desirable that one or more of these nanomaterials are not classified as nanomaterials, as smart materials, and/or as stabilizers herein. However, if the nanomaterial(s) are of a kind which was not conventionally used in pigments, dyes and/or paints prior to May 1, 2003 or prior to May 1, 2004, or if it is a nanomaterial that did not exist in art, design or architecture prior to one or both of these dates, it may be preferable that the image be considered an inventive image and that the nanomaterial be considered a smart material.

In embodiments, the use of nanomaterials may enhance or impart one or more of the following properties to building materials, walls and windows in architecture; in sealants, coatings or paints (that are preferably thin layers or applications which are uniform or relatively uniform in appearance) used in architecture. The properties are: heat reflection, heat absorption, and/or insulation; the ability to self-clean, repel dirt, resist staining, and/or repel water; enhanced weatherability, durability, hardness, UV light protection; flame retardancy; the sealing of pores (e.g., the use of nanosize ingredients in a coating or filler for their ability to fill pores when applied on a substrate due to their great surface area, such as to seal wood, concrete, stone, etc.), other properties that were enhanced or provided by nanomaterials in such uses prior to May 1, 2003 or prior to May 1, 2004, and other such properties. However, it may be preferable that this not be the basis by which architecture is designated an inventive image, and it may be preferred that the use of such nanomaterials for the properties listed above in architecture not enable the nanomaterials to be classified as stabilizers, or as smart materials. Other reasons may or may not exist that will enable the use of the same nanomaterials, the same nanotechnology and/or one or more others in architectural images to be the basis for the designation of architecture as inventive images, the basis by which the nanomaterial(s) are classified as stabilizers and/or as smart materials. For example, if the nanomaterial is of a kind which was not conventionally used for such purposes prior to May 1, 2003 or prior to May 1, 2004, if such use of the nanomaterial did not exist in architecture prior to one or both of these dates, if the nanomaterial is of a kind which would have been considered extraordinary or novel for such use prior to one or both of these dates, or if the nanomaterial enhances or provides one or more of the properties named below in i). through xi)., it may be preferable that the image be considered an inventive image and that the nanomaterial be considered a nanomaterial and a smart material of the present invention.

The nanomaterials enhance or provide one or more of these properties or formal elements to formed inventive images: i). conductivity, semi conductivity, electrical conductivity, or super conductivity; ii). emitted light; iii). strength, tensile strength, increased toughness, reduced sagging, increased rigidity, and/or structure; iv). CNTs, nanowires, nanofibers, nanocrystals, nanoyarn, and/or smart dust; v). machines, devices and/or systems or part thereof which may or may not be nanoscale (such as computers, integrated circuits, power cells, solar energy devices, displays, sensors, light emitters, other electric and mechanical devices, part of any of these, etc.); vi). visual effects, optical effects and/or light effects beyond those of a conventional pigment or dye, which might be reversible; vii). one or more formal elements that change and/or modulate; viii). aesthetic effects that can be changed and/or modified by electricity; ix). sound and/or movement; x). the ability to be interactive with and/or responsive to a viewer, to the environment or both; and/or xi). the ability to detect, respond to and/or correct problems or other matters within the inventive image.

In embodiments, the use of nanomaterials or nanotechnology may enhance or impart one or more properties to images of design; or to fabrics, textiles, fashion design, or coatings used in design. Examples of these properties are: the ability to self-clean, repel dirt, resist staining, and/or repel water; freedom from or resistance to wrinkles, flame resistance, other properties enhanced or provided by nanomaterials in such uses prior to May 1, 2003 or prior to May 1, 2004, and/or other utilitarian or principally utilitarian properties. However, it may be preferable that this not be the basis by which these images of design are designated inventive images, and it may be preferred that the use of such nanomaterials for the properties listed above in images of design not enable the nanomaterials to be classified as smart materials and/or as stabilizers. In specific images of design, the same nanomaterials, the same nanotechnology and/or one or more others, may enable the image of design to be designated an inventive image and it may enable the nanomaterial(s) to be classified as stabilizers and/or as smart materials. However, if the nanomaterial is of a kind which was not conventionally used for such purposes prior to May 1, 2003 or prior to May 1, 2004, if such use of the nanomaterial did not exist in design, or in fabrics, textiles, fashion design, or coatings used in design prior to one or both of these dates; if the nanomaterial is of a kind which would have been considered extraordinary or novel for such use prior to one or both of these dates, or if the nanomaterial enhances or provides one or more of the properties named below in i). through xi)., it may be preferable that the image be considered an inventive image and that the nanomaterial be considered a stabilizer and a smart material. The nanomaterials enhance or provide one or more of these properties or formal elements to formed inventive images: i). conductivity, semi conductivity, electrical conductivity, or super conductivity; ii). emitted light; iii). strength, tensile strength, increased toughness, reduced sagging, increased rigidity, and/or structure; iv). CNTs, nanowires, nanofibers, nanocrystals, nanoyarn, and/or smart dust; v). machines, devices and/or systems or part thereof which may or may not be nanoscale (such as computers, integrated circuits, power cells, solar energy devices, displays, sensors, light emitters, other electric and mechanical devices, part of any of these, etc.); vi). visual effects, optical effects and/or light effects beyond those of a conventional pigment or dye, which might be reversible; vii). one or more formal elements that change and/or modulate; viii). aesthetic effects that can be changed and/or modified by electricity; ix). sound and/or movement; x). the ability to be interactive with and/or responsive to a viewer, to the environment or both; and/or xi). the ability to detect, respond to and/or correct problems or other matters within the inventive image.

In embodiments, the use of nanomaterials or nanotechnology may enhance or impart one or more of the following properties to architectural images or to devices, machines or systems that are not images themselves but that might be considered part of architectural images. Among the properties are (a). properties that enable the architectural space to function effectively or more effectively with little or reduced human effort; (b) properties that enable the automation of one or more domestic, operational and/or utilitarian tasks or that make such tasks easier, e.g., using sensors, computers, monitoring devices, robots, remote devices, other forms of artificial intelligence, etc.; (c) enhanced or new ability to control or operate systems, devices, machines and/or appliances that are not images themselves within the architectural space (such as those for heat, air condition, ventilation, water, the clothes drier, lighting, security, communication, information, entertainment, etc, e.g., automatically turning down the television or stereo when the phone rings, or the use of gestures to turn on appliances); (d) to enhance or add safety or security, such as to keep an eye on a child or a disabled or elderly person, to detect intruders, to prevent slipping, etc; (e) the ability to automatically track the status of subjects which might be chosen and changed and/or communicate human needs (like keeping a list of what is in the refrigerator, automatically ordering groceries that are not in the architectural space, automatically suggesting menus or attire suitable for the weather, keeping the daily calendar, serving as an assistant to human memory, etc.); (f) to assist occupant(s) of the architectural space, for convenience or to lessen the effort needed for the architectural space to function as desired; and/or (g) for other such properties. Though such properties and other properties enhanced or enabled by nanomaterials in architecture prior to May 1, 2003 or prior to May 1, 2004 from nanomaterials or nanotechnology may be integrated into an architectural space to any extent and though such architectural space might be called smart or intelligent, it is preferable that they not be the basis by which architecture is designated an inventive image or by which architecture is designated a smart or intelligent image of the present invention. It is also preferred that the use of such nanomaterials for properties listed above in architecture and for other properties enhanced or enabled by nanomaterials in architecture prior to May 1, 2003 or prior to May 1, 2004 not enable the nanomaterials to be classified either as smart materials or as stabilizers.

Electrochromic systems may be used in inventive images that function as smart windows, smart partitions, smart skylights, smart privacy walls, mirrors or smart mirrors, and the like in architecture and/or design. However, it may be preferred that such uses of electrochromic systems not be the basis by which their images are designated inventive images. Or it may be more preferable that such uses of electrochromic systems not be the basis by which these images are designated inventive images if one or more of these conditions exist.

(a) The coloration created by their electrochromic systems in at least one of its states in which it shows color (electrochromic systems have color and/or transparency that changes) is: uniform, consistent, evenly graduated, neutral, gray, white, milky white or off white, a mirror color, monochrome or made of only two or minimal colors and possibly colors resulting from their mixtures, made with coloration that is regularly repetitious, regularly designed, and/or designed in a pattern or in a wallpaper-like design. (b) The electrochromic system is bistable. (c) The form of the electrochromic system that shows color has an even, consistant, regular, thin or very thin layer, e.g, on an image support. (d) the electrochromic system has, is on, and/or is within an image support that is a kind of window or skylight that was conventional prior to May 1, 2003 or prior to May 1, 2004, (e) the electrochromic system has, is on, and/or is within an image support with a shape, a form and/or a structure that is window-like, or that is like a kind of window or skylight that was conventional prior to May 1, 2003 or prior to May 1, 2004, (f) the image has a electrochromic system does not alter its window-like or mirror-like appearance, shape, form or structure, (g) the image has electrochromic technology of a kind that was made and used in art, design or architecture prior to May 1, 2003 or prior to May 1, 2004, and the image preferably is that same kind of art, design or architecture, and/or the image preferably meets at least one of the other criteria listed as (a)-(f) above. (h) The function of the electrochromic system and the reason for its use is primarily or entirely utilitarian, rather than aesthetic—for anti glare purposes, for anti reflection use, to block light, to block heat, for privacy, for security purposes, etc. (i) The images' electrochromic technology is one of the solution based systems, or one of the systems based on electrochromic cells which relies on the intercalation materials as described at www.ntera.com/technology/elec_displays.asp, and/or as described in paragraphs 2 and/or 3 on page 845 under "1. Introduction" of the article, "Nanomaterials-Based Electrochromics for Paper Quality Displays" by Udo Bach, David Corr, Donald Lupo, Francois Pichot and Michael Ryan, Advanced Materials, 14, No. 11, Jun. 5, 2002. (These systems are not NanoChromics or produced by Ntera of Dublin Ireland).

It might be preferable that the use of electrochromic systems in images that function as smart windows, smart partitions, smart skylights, smart privacy walls, mirrors or smart mirrors, and the like in architecture and/or design be the basis for which such images are designated inventive images if one or more of these criteria are met. (a) the image has a shape, a form, and/or a structure that is non-window-like or non-minor-like; unusual or rare for a window, skylight or minor; nonplanar, non-rectilinear, non geometric, irregular, nonuniform, inconsistent or variable, uneven, deeply or irregularly textured, asymmetrical, unsymmetrical or nonsymmetrical, unbalanced or off balance, non-standardized, inhomogeneous, and/or with other such variations; (b) the main or only use of the electrochromic system is for aesthetic purposes (as opposed to utilitarian or functional purposes). (c) the electrochromic system and/or its image are nanomaterials or it or they use at least one nanomaterial, that are or that is of a kind not conventionally used for such purposes prior to May 1, 2003 or prior to May 1, 2004; or it or they are of a kind that did not exist in electrochromic systems in art, design or architecture prior to one or both of these dates; or it or they are of a kind which would have been considered extraordinary or novel for such use prior to one or both of these dates.

Electronics, integrated circuits, processors and/or chips made using nanomaterials and/or nanotechnology may be used as desired in inventive images. However, it may be preferable that such images not be designated inventive images, and/or that they not be designated as having nanomaterials or as being nanomaterials if the electronics, the integrated circuits, the processors and/or the chips are or have one or more of: (a) an Intel processor on the chart that follows, (b) a processor, an integrated circuit or a chip made using nanomaterials all of which were used in processors, integrated circuits or chips prior to May 1, 2003 or prior to May 1, 2004; (c) a processor, an integrated circuit or a chip made using nanomaterials like or similar to those in (a) or (b); (d) a processor, an integrated circuit or a chip made using process(es) that are about 150 nm or greater but not less, more preferably about 130 nm or greater but not less, or most preferably about 90 nm or greater but not less.

TABLE 1

Chart showing examples of Intel processors made using nanomaterials prior to May 2004, and prior to May 1, 2003.

| Date of Introduction (a range of dates covers the introduction of different versions) | Processor | Manufacturing Process/Transistors (these might be considered approximations) |
|---|---|---|
| Mar. 12, 2003 through Apr. 7, 2004 | Intel Pentium M Processor | 0.13-micron/77 million |
| May 2001 through Sep. 8, 2003 | Intel Itanium 2 Processor | 0.13-micron/range from 25 million to 410 million |
| May 21, 2001 through Mar. 2, 2004 | Intel Zeon Processor family (these were for workstations and servers and may not have been used in images of art design or architecture) | 0.13-micron and 0.18 micron/from 42 million to 178 million |
| Nov. 20, 2000 through Feb. 2, 2004 | Intel Pentium 4 Processor | 0.13-micron, 0.18 micron, and 90 nm./from 42 million to 178 million |
| Feb. 26, 1999 through Jan. 14, 2003 | Intel Pentium III Processor | 0.25 micron, 0.13-micron and 0.18 micron/from 9.5 million to 55 million |
| Jun. 8, 1998 through Apr. 7, 2004 | Intel Celeron Processor | 0.25 micron, 0.13-micron and 0.18 micron/from 7.5 million to 28 million but complete information on transistors is not available |
| May 7, 1997 through Jun. 14, 1999 | Intel Pentium II Processor | 0.35 micron, 0.25 micron and 0.18 micron/7.5 million to 27.4 million |
| Nov. 1, 1995 through Jan. 1996 | Intel Pentium Pro Processor | 0.6 micron, 0.35 micron/5.5 million |
| Mar. 22, 1993 through Jan. 7, 1999 | Intel Pentium Processor and Intel Pentium Processor with MMX Technology | 0.6 micron, 0.8 micron, 0.25 micron and 0.35 micron/3.1 million to 4.5 million |
| Apr. 10, 1989 through Nov. 9, 1992 | Intel 486 Processor | 0.8 micron; and 1 micron/ 900,000 to 1.4 million |
| Apr. 4, 1988 through Sep. 30, 1991 | Intel 386 Processor | 1 micron/ 275,000 to 855,000 |
| Mar. 3, 1992 through Jun. 1993 | Intel DX2 | 0.8 micron/1.2 million |
| Mar. 7, 1994 | Intel DX4 | 0.6 micron/1.6 million |
| 1989 | 80486 | 1 micron/1.2 million |

Source: Intel's website, www.intel.com/pressroom/kits/quickreffam.htm#IIIMobile. Refer to this website for more detailed information, e.g, by use of the hotlinks provided for details about specific processors.

It is preferable that images with electronics, integrated circuits, processors and/or chips made using nanomaterials and/or nanotechnology be designated inventive images, and/or that they be designated as having nanomaterials or as being nanomaterials if their integrated circuits, processors and/or chips meet one or more of the following criteria.

(a) They are nanomaterials or they were made using at least one nanomaterial that: did not exist in processors, integrated circuits or chips used in images prior to May 1, 2003 or prior to May 1, 2004; and/or that would have been considered extraordinary or novel prior to one or both of these dates, (b) Their use is primarily or exclusively for aesthetic or non utilitarian purposes.

(c) They are made with nanowire, silicon nanowire, strained germanium nanomaterials, nanotubes, CNT, buckytubes, NRAM by Nantero, chips that do quantum computing, superconducting nanocircuits, quantum dots, quantum bits or qubits, DNA, optoelectronic memory such as those made using carbon nanotubes, ferroelectric random access memory, FRAM, or memory made with ferroelectric nanomaterials such as ferroelectric nanodisks and/or nanorods, magnetic RAM or MRAM, ovonic memory or ovonic unified memory; molecular memory that reads and writes data by adding and removing electrons off nanoscale molecules, hybrid devices that combine nanotechnology and MEMS such as IBM's Millipede, memory with three dimensional architectures, data storage made using germanium crystals or nanocrystals, nanowire memory cells, memory made using porphyrins, holographic memory; nanolithography such as liquid immersion or immersion lithographic processes, imprint lithography or nanoimprint lithography, or extreme ultraviolet lithography; and/or other novel or extraordinary nanomaterials or nanotechnology processes. While these materials are not in widespread use today, there appears to be no reason why they would not perform according to the features described herein for the present invention.

(d) They are made with a combination of these.

In light of the invention of the readymade by the artist, Marcel Duchamp and the invention of images made using found objects, the invention of collage and the invention of the assemblage by the artist, Pablo Picasso, all of which took place decades ago, images made using nonfunctioning electronic parts that are visible to viewers (such as circuits, integrated circuits or chips) for example, as readymades, as found objects, or as collaged items, are preferably not classified as inventive images or as nanomaterials herein, and their electronic parts are preferably not classified as nanomaterials or as stabilizers herein.

Smart Materials, OLEDs & Related Subjects—Further Description

In embodiments an inventive image or part thereof is an organic light emitting diode or OLED. An inventive image or part thereof may have one or more OLEDs that are the same or different. OLEDs are also called organic electroluminescent, organic EL, or OEL. In embodiments, the OLEDs in inventive images are organic semi-conductors. OLEDs offer features such as wide viewing angles, great contrast, colors that can be saturated and that can span the entire visible spectrum, low operating voltages, and a response time that can be very fast or instantaneous, thus they are well suited for showing changing displays and for showing moving or video displays to any extent desired in inventive images.

The design of the structure of OLEDs can be varied to create the results desired. For example, the ingredients used in an OLED, the composition of those ingredients, the number of layers used, the thickness of each layer, the fabrication process, the OLED's encapsulation, housing and/or mount, and other design choices can be varied to make an OLED with the characteristics desired. Such variables can be used to control the light emitted and how long it lasts, for instance, OLED emission colors can be controlled and tuned by molecular design. As an illustration, an OLED structure may have one or more layers of organic materials (typically extremely thin films), sandwiched between an anode that is typically and preferably transparent (such as indium tin oxide or ITO), and a cathode that might be transparent, translucent or opaque (such as a metallic cathode which is a low work function metal, Mg, Al, Ag, their alloys, etc.). As further examples, in small molecule OLEDs, the cathode might be a magnesium: silver alloy or a thin layer of lithium fluoride salt backed by aluminum, and in polymer OLEDs the cathode might be metals like barium, calcium/aluminum or a thin layer of lithium fluoride salt backed by calcium/aluminum. There are many variations of the layers stacked between the anode and the cathode in OLEDs. In a small molecule OLED they may, for example, be one or more hole injection layer (HIL), hole transport layer (HTL), emissive layer, electron transport layer (ETL), and electron injection layer, or a variation of this structure, e.g., which may even have fewer layers. In polymer OLEDs, there may for example, be two organic layers, one for injection and transport of holes and the other for the injection and transport of electrons as well as emission. Such layered OLED structures are typically on a substrate that is preferably transparent, such as glass or polymer, e.g., the OLED's light might be emitted through the side that has its transparent anode and its transparent substrate. Unless other measures are taken to enhance the permanence of the OLED, it is preferably sealed or encapsulated to prevent the ingress of water, moisture, air or oxygen. When voltage is applied, the OLED emits light. In embodiments, inventive images may have OLEDs that are active matrix (AMOLED) and/or passive matrix (PMOLED). Active matrix OLEDs in inventive images may have TFTs. Refer to the examples herein as well as the article, "OLED-Display Technology" by Kathleen M. Vaeth in Information Display, (published by the Society of Information Display or SID), Vol. 19, No. 6, June 2003, pages 12-17.

As an illustration, an OLED is made as an inventive image or as part thereof by placing a series of organic thin films between two conductors or electrodes. When electrical current is applied, the OLED emits light in one or more colors, designs and patterns that may stay constant or that may change over time. Inventive images can be made with OLEDs that might be flexible and/or rigid, and that may be light weight, thin, durable and power efficient.

In embodiments, OLEDs with properties such as color-switching ability might be used in inventive images. As an example, by changing the voltage in an OLED made using a semiconducting polymer combined with a phosphorescent complex, the light emitted might be switched between red and green. The active material in this OLED might for example be comprised of a derivative of PPV or other electroluminescent polymer or light-emitting polymer, doped with a metal like dinuclear ruthenium complex homogenously dispersed. Thus, pixels in such OLEDs might be made which require only one material to emit two colors of light rather than requiring a different material for each color of light emitted, and full color OLEDs can be made with pixels having two light emitting materials rather than three. This material may also enhance brightness. Refer to "Electroluminescent device with reversible switching between red and green emission" by S. Welter, K. Brunner, J. W. Hofstraat and L. De Cola, in Nature Vol. 421, 54-57 Jan. 2, 2003, and to The New York Times article, "Red Light, Green Light: A 2-Tone L.E.D. to Simplify Screens" Jan. 30, 2003.

The thickness and weight of OLEDs varies. Typically OLEDs made for uses other than for images, are extremely thin and light in weight (e.g., because they do not require any backlighting). Most of an OLED's thickness and weight might be determined by its substrate and its encapsulation, installation and/or mount. In an example, small molecule organic layers deposited by thermal evaporation in a vacuum chamber may be about 5-100 nm thick. Active layers in polymer OLEDs may for example, only be about a few hundred nm thick. The total thickness of the hole-transport layer, active and cathode layers required for a LEP (light emitting polymer) device might for instance, only be about a few micrometers. As another example, the organic layers in a LEP device may be about 5 to 200 nm thick. Examples of glass currently being used in PLEDs (polymer light emitting diode) have a thickness of about 0.7 to 1 mm., and examples of the encapsulation caps (e.g., glass or metal) currently being used in PLEDs have a thickness of about 0.1 to 1 mm. (The encapsulation of PLEDs or other OLEDs might also be comprised of polymer). OLEDs or associated technology by Cambridge Display Technology and Seiko Epson might be used in inventive images such as polymer OLEDs that may be less than about a tenth of an inch thick. An inventive image might be made with a LEP device by Cambridge Display Technology that might total (including substrate and encapsulation layers) about 2 to 3 mm. thick. Inventive images might be made with PLEDs by Covion that may have a total thickness in the range of about 0.8 to 2 mm.; they might be made with Kodak OLEDs which use small molecule technology and which may be about 2 mm in total thickness; and/or they might be made with active matrix OLED displays developed jointly by Kodak and Sanyo that may be less than about 2 mm. thick, e.g., one of these with a diagonal of 2.16 in. and a 521×218 pixel resolution may weigh about 8 grams. However as time passes and technology develops these specifications for products that are not images are likely to change.

Such specifications and others described for OLEDs herein and in U.S. Patent Application No. 20030035917-A1 are illustrations of OLEDs made for use in products that are not images. Qualities that are valued in such products that are not images (like thinness, light weight and a planar rectilinear shape) may or may not be preferred in OLEDs in inventive images, e.g., for inventive images this decision may be more aesthetic than utilitarian. Also, as the technology develops, the specifications of OLEDs are likely to continue to vary and change, for example OLEDs are likely to become thinner and lighter in weight. This is acceptable in inventive images, new and improved OLEDs are desirable in inventive images. OLEDs used in embodiments might be any thickness, weight, shape or form. In inventive images, these choices may be aesthetic choices, and any utilitarian concerns which affect them may differ from the utilitarian concerns for products that are not images. For example, in making a polymer OLED, the brushed application or applications of polymer might result in a thicker OLED, it may be curved, or irregularly in shape and/or in form.

In embodiments, an inventive image's OLED or OLEDs might or might not be further processed. Variations of further processing inventive images described herein and in U.S. Patent Application No. 20030035917-A1 offer many examples, such as by the use of additive processes (like painting, drawing, printing, collage, etc.); by subtractive processes (like incising marks); and/or by other processes (like rolling up the form, or folding it).

These are further examples of stabilizers for inventive images.

1). Ingredients, processes, layers, and/or parts in and/or on an OLED or part thereof which reduce or eliminate changes to it after it is formed as an inventive image or as part thereof are stabilizers. Such stabilizers are typically desirable because enhancing the permanence of inventive images is frequently valued. Such stabilizers might, for example, lengthen the period of time that an OLED emits light and/or that it maintains color stability. Such stabilizers might for example, prevent or reduce the ingress of moisture (e.g., water), air (e.g., oxygen), and/or other vapors or materials into the OLED which might change it undesirably. In addition or instead, such stabilizers might address problems caused by such ingress. It may be preferred for these stabilizers to contain polymer or for the OLED they are used with to contain polymer (though the polymer may for example, be conductive, non conductive, light emissive and/or non emissive of light, e.g., it may be a non emissive substrate or supportive layer).

Among examples of these stabilizers are: glass or polymer (e.g., in the form of a layer), and/or a barrier coating (e.g., applied using roll coating technology) which seals, encapsulates and/or protects an inventive image's OLED; processes for encapsulating an OLED to prevent or reduce ingress that might change it; and a material in an OLED which absorbs moisture, water, vapors, or other subjects that will or might change it (such as a desiccant). Further examples such as, the use of a buffer layer at the hole injection contact (e.g., a buffer layer made of CuPc), doping of the HTL, or using a mixed emitting layer of hole- and electron-transporting molecules are in the article, "Fighting OLED Degradation" by Gu Xu, in Information Display, (publication of the Society of Information Display or SID), Vol. 19, No. 6, June 2003, pages 18-21.

2). Another inventive image stabilizer is energy used by its OLED or OLEDs. Such energy stabilizers might, for example, be electrical current, solar energy, heat or another form of energy. It may be preferred for the OLEDs using energy stabilizers to contain polymer (though the polymer may for example, be conductive, non conductive, light emissive and/or non emissive of light, e.g., it may be a non emissive substrate, supportive or sealing layer).

3). All inventive image ingredients and parts that provide, process or carry energy (in any form) to its OLED or OLEDs are stabilizers. Examples of these stabilizers are electrodes, wires, batteries, circuits, transistors (such as TFT), other parts and devices (refer to examples herein and in U.S. Patent Application No. 20030035917-A1). It may be preferred for OLEDs using these stabilizers to contain polymer (though the polymer may for example, be conductive, non conductive, light emissive and/or non emissive of light, e.g., it may be a non emissive substrate, supportive layer or sealing layer).

4). Polymer that supports, reinforces, strengthens or enhances the support of an OLED in an inventive image is a stabilizer, an image support stabilizer, or a strengthening stabilizer. A polymer substrate or image support on a small molecule OLED in an inventive image is an example of such as stabilizer. Some inventive image OLEDs have more than one of these stabilizers, such as two or more supportive polymer films, layers or thin layers. (The polymer of these stabilizers may for example, be light emissive, non emissive of light, conductive and/or non conductive.)

5). A dopant used in making an OLED used to create an inventive image is a stabilizer, as is the process of doping. As examples, electrophosphorescent materials might be used as dopants to make OLEDs in inventive images (e.g., refer to Universal Display Corporation, www.universaldisplay.com), and fluorescent molecules might be used as dopants (e.g., refer to Kodak, www.Kodak.com). As further examples, DCJTB; MQA; Perylene and/or Coumarin 6 might be dopants in small molecule OLEDs.

In embodiments, inventive images are made of or with small-molecule OLEDs (sometimes referred to as SMOLED). Small-molecule OLEDs might illuminate an inventive image in a single color or in as many colors as desired, and if desired, these colors may change over time as desired, e.g., creating a moving display, or a display that is like video or film. Among examples of sources for small-molecule OLEDs, OLED technology and/or complimentary ingredients for inventive images are Eastman Kodak of Rochester, N.Y. (refer to www.Kodak.com); Opsys of Yarnton, Oxford and Fremont, Calif.; Universal Display Corporation in Ewing, N.J. (refer to www.universaldisplay.com); and Covion Organic Semiconductors GmbH of Frankfurt/Main, Germany (refer to www.covion.com). For example, OLEDs with fluorescent, electrophosphorescence and phosphorescent small-molecule emitters might be used in inventive images. In an inventive image, a small-molecule OLED may be on and/or under a polymer layer for support (a stabilizer).

Among the notable features of small molecule OLEDs are: light which may be as bright as desired; a wide range of colors from the specific molecules and device structures used with excellent grey scale capability and high contrast capability; wide viewing angles from all vantages; forms that can be made very thin (or thickened as desired); the capability for high resolution; the capability for static light, or light that changes at any rate even full motion video; and operating voltages and power consumption that can be low. Refer to "New White Light for a Brighter Future" by Janice K. Mahon published in E-line V8,5, page 30, Mar. 11, 2003.

In embodiments, small molecule OLEDs might be made in any processes desired. In embodiments, small molecule OLEDs are made in a process involving the evaporation and deposition of one or more layers of organic materials onto a substrate or image support, e.g., a thin layer or film such as a polymer film (a stabilizer). In making an inventive image, a small-molecule OLED might for instance, be made using a vacuum evaporation process or a process of vapor sublimation in a vacuum chamber. As an example, such an OLED might be made using conventional or custom made, high vacuum-based thermal evaporation. Vacuum thermal evaporation (VTE) involves the use of evaporation in a high vacuum to deposit very thin layers of organic materials on a substrate in making an OLED. OLEDs for inventive images might also be made using Organic Vapor Phase Deposition (OVPD). OVPD is a process for thin-film organic material deposition developed by Universal Display Corp., Princeton University of Princeton N.J., and Aixtron AG of Aachen, Germany. This OVPD system consists of a low pressure, hot walled chamber with separate, external organic sources that are thermally controlled. In this process, the organic materials are evaporated forming a carrier gas steam for transport and for downward deposition onto a substrate. Using OVPD the deposition of organic material onto the substrate can be done with precision. This may be done through an Aixtron-proprietary showerhead that is close-coupled. OVPD enables enhanced film thickness control and uniformity even over large areas; and precise doping control for sharp or graded layer interfaces, features which may or may not be desirable in OLEDs in inventive images. This OVPD system is scalable to large size substrates or image supports (e.g., stabilizers), and it is compatible with roll to roll processing. Refer to U.S. Pat. No. 6,337,102, titled "Low pressure vapor phase deposition of organic thin films" and other relevant patents. Refer also to "Polymer and small molecule multi-layer light-emitting diodes" by T. Sano, C. S. Tuan, R. E. Martin, B. S. Chuah and A. B. Holmes, *Synthetic Metals*, Vol 121, Issues 1-3, 15 Mar. 2001, pp 1701-1702.

In embodiments, an OLED in an inventive image emits light through a process of phosphorescence, e.g., using phosphorescent materials as dopants (stabilizers). In comparison, the light emission of other OLEDs might be based on the process of fluorescence. In an example, OLEDs are made using a phosphorescent small molecule material that is an iridium complex which emits light from its triplet states. In an example, one or more PHOLEDs (phosphorescent OLEDs) from Universal Display Corp. might comprise an inventive image or part thereof. According to Universal Display Corp., PHOLEDs are particularly power efficient and they may offer image makers greater brightness than other OLEDs. This may be because an OLED, operated under a forward bias injects charge carriers (holes and electrons) from the electrode into the organic layers. These charge carriers may migrate under the influence of an electronic field. Excitons are formed when the charge carriers recombine. While conventional fluorescent OLEDs only convert about 25% of their excitons into light and the other approximately 75% is lost as heat, phosphorescent OLEDs like PHOLEDs may convert about 100% of their excitons into light. Refer to U.S. Pat. No. 6,097,147 "Structure for High Efficiency Electroluminescent Device," and No. 6,303,238 "OLEDs doped with phosphorescent compounds." Refer also to U.S. Patent Applications No. 20050048312 "Phosphorescent material"; No. 20050008897 "OLEDs doped with phosphorescent compounds"; and No. 20050040755 "Transparent thin film electrode for light emitting diode and laser diode" PHOLEDs may, for example, have TFT technology such as amorphous silicon (a-Si) TFT backplanes (e.g., by AU Optronics Corp of Taiwan) or polysilicon TFT technology. In embodiments, OLEDs that use phosphorescent technology such as PHOLEDs are used in inventive images, e.g., as backlights, underlayers, or other compositional or design elements.

In embodiments, inventive images are made using OLEDs with triplet based emitting centers in polymer and/or other organic light emitting diodes (in PLED and in OLEDs). Among examples are phosphorescent PLEDs. Refer to "Electrophosphorescence from a conjugated copolymer doped with an iridium complex: high brightness and improved operational stability" by X. Gong, J. C. Ostrowski, G. C. Bann, D. Moses, A. J. Heeger, M. S. Liu and A. K.-Y. Jen, in Advanced Materials, 15, No. 1, Jan. 3, 2003.

In embodiments, the OLED or OLEDs in an inventive image are a combination of small molecule and polymer OLEDs. In embodiments, inventive images are made of or with hybrid small molecule polymer OLEDs. These might use hybrid technologies that for example, enable wet processing of small molecules, triplet emitting compounds and/or phosphorescent polymers. OLEDs may have both small molecule and polymer organic ingredients. These might also use iridium or other heavy metal complexes, where the emission can be tuned by controlling the nature and position of the organic ligand substituents such as 2-phenylbenzothiazole. Such OLEDs might illuminate an inventive image in a single color or in as many colors as desired, and if desired, these colors may be constant or they may change over time at any rate, e.g., creating a moving display, or a display that is like video or film. Such an OLED may be an inventive image, or it may be on and/or under an image support that might be made of polymer and that may be a stabilizer. Refer to the article, "Phosphorescent-Polymer OLEDs" describing POLEDs (phosphorescent OLEDs), by Shizuo Tokito, Mitsunori Suzuki and Fumio Sato in Information Display, (the official publication of the Society of Information Display or SID), Vol. 19, No. 6, June 2003, pages 22-24. Refer to "Color tunable phosphorescent light-emitting diodes based on iridium complexes with substituted 2-phenylbenzothiozoles as the cyclometalated ligands" by Wei-Chieh Chang, Andrew Teh Hu, Jiun-Pey Duan, Dinesh Kumar Rayabarapu, and Chien-Hong Cheng, in *Journal of Organometallic Chemistry*, Vol. 689, Issue 26, 20 Dec. 2004, pp 4882-4888, which reports OLEDs that exhibit different emissive colors with high brightness and efficiency. Refer also to "Electrophorescence from a doped polymer light emitting diode" by D. F. O'Brien, C. Giebeler, R. B. Fletcher, A. J. Cadby, L. C. Palilis, D. G. Lidzey, P. A. Lane, D. D. C. Bradley, and W. Blau, in *Synthetic Metals*, Volume 116, Issues 1-3, January 2001, pp 379-383. The inventive images in these embodiments may for instance be made with hybrid OLEDs or technology from Covion Organic Semiconductors GmbH (refer to www.covion.com) or from Universal Display Corp. Refer also to U.S. Patent No. 20050019607 "OLED device with mixed emissive layer".

In another example, one or more of the organic small molecule OLED ingredients might be incorporated into one or more of the polymers and/or monomers used to make polymer OLEDs. Thus, for example, the resulting organic mixture or material may be further processed using methods for making polymer OLEDs, such as those described in U.S. Patent Application No. 20030035917-A1, like solution processing, spin coating, printing, ink jet printing and/or brushed applications. More specifically for instance, aluminum tris(8-hydroxyquinoline) or Alq3 might be incorporated into polymer, cPRM, or into monomer to make an OLED. Refer to the article, "Polymer incorporates Alq3 for Organic LEDs," page 22, Photonics Spectra (a Laurin Publication) May 2003; and refer to Macromolecules, Mar. 25, 2003, pp. 1766-1768.

Printable, small molecule OLEDs are made in embodiments. Thus, for instance, the OLEDs in these embodiments might combine desirable performance features of phosphorescent small molecule materials and desirable solution-based application methods offered to OLEDs by polymers, e.g., they have printed or ink jet printed polymer. Such application methods can, for example, offer image makers greater aesthetic control, creative freedom and variability in applying the light emitting materials to an inventive image, and in creating the inventive image they desire. Specific examples are phosphorescent OLEDs or P2OLEDs by Universal Display Corp. and DuPont Display. However, the inventive images in these embodiments may for instance, be made using Universal Display Corp.'s phosphorescent technology (PHOLED technology) with polymers and solution based processing from one or more other sources.

In embodiments, OLEDs are made or partially made using solution processing. Among examples are printing processes, ink jet printing, screen printing, gravure printing, contact printing, laser-induced thermal imaging (LITI), conventional printing processes, etc. For example, an OLED might be formed by screen printing two layers of polymer between an anode and a cathode. In other examples, small molecule materials are solution processed to make OLEDs. They might for instance, be used or modified with polymer in order to be solution processed, (refer to examples herein).

In embodiments, OLEDs used to make inventive images or parts thereof are transparent or translucent. For instance, unlike other OLEDs which typically have one transparent or translucent electrode, both of the electrodes in these OLEDs may be transparent or translucent. Thus these OLEDs might emit light from one or more sides. Such transparent or translucent OLEDs might be small molecule OLEDs, polymer OLEDs, both or a hybrid. As an example, one or more TOLEDs (transparent OLEDs) from Universal Display Corp. might comprise an inventive image or part thereof. TOLEDs and other transparent or translucent OLEDs might have a transparent cathode (or contact), which may be a compound cathode (top electrode), e.g., containing indium tin oxide (rather than, for example, a reflective metallic cathode as many other OLEDs have). Thus, transparent or translucent OLEDs, such as TOLEDs are able to emit light from both sides or from one particular side (e.g., emitting from the top only or from the bottom only, for instance, using an opaque substrate such as a low reflectance absorber, black backing). Moreover, the display emitted on one side of a transparent or translucent OLED or TOLED may or may not be independent from and different from the display emitted on its reverse side. Because TOLEDs allow light to emit away from the TFT array (rather than through it), they can also improve active matrix display apertures. Refer to patents such as U.S. Pat. No. 5,703,436 "Transparent Contacts for Organic Devices"; U.S. Pat. No. 5,707,745 "Multicolor Organic Light Emitting Devices"; U.S. Pat. No. 6,548,956 "Transparent Contacts for Organic Devices"; and U.S. Pat. No. 5,986,401 "High contrast transparent organic light emitting device display". TOLEDs and other transparent or translucent OLEDs can be used in inventive images as building blocks for stacked OLEDs such as SOLEDs, or for hybrid OLEDs (both of which are described below).

In embodiments, the light emitted by OLEDs in inventive images enhances other effects in those inventive images such as effects of light and color described herein and in U.S. Patent Application No. 20030035917-A1. Examples of effects that might be enhanced are: effects created with transparent and translucent coloration, reflective effects, fluorescent effects, iridescent effects, effects that modify or distort light (such as by the use of lenses, filters, gratings, prisms, etc.), chromic effects such as photochromic or electrochromatic effects, dichroic effects, video, film, photography, holograms, effects from ingredients with different or high refractive indexes, effects from other light sources, carving, incising, negative spaces, texture, air pockets, an electrically active layer or part, effects from devices or systems, effects of light and color from nanomaterials or nanotechnology (refer to description above) and others.

As illustrations of inventive images with one or more transparent or translucent OLEDs, each of the inventive images shown in Figure 14 might be made with one or more transparent or translucent OLEDs. The graduated color in Figure 14. IV. might stay constant or it might change over time. The inventive images in Figure 14. might or might not be further processed. The inventive images in Figure 14.I.-IV. might for example, function as paintings, walls, murals, screens, and/or windows.

The inventive images shown in side views or in cross section views in Figures 18a. and b. might have one or more OLEDs in addition to other light effects. For example, the inventive image in Figure 18.a. might have hollow negative prisms within it. Some or all of the rest of the form of this inventive image which is positive form (e.g., a plane or layer), might emit light in one or more colors, and this light may stay constant or change over time. The inventive image in Figure 18.b. might have positive prisms and/or it might have pieces of crystal shown as triangular shapes on the right side of the inventive image in the illustration. The image support, layer or plane shown on the left side of the inventive image in the illustration might be an OLED which may emit light in one or more colors, and this light may stay constant or it may change over time, creating desirable light effects in combination with its prisms or its crystal parts. The inventive images in Figure 18 might be further processed if desired.

The inventive images shown in Figures 49II.-VIII. might all be variations on the inventive image structure shown in Figure 49 I., that result in different visual effects. One or both of the two parts or image supports (e.g., stabilizers) in the inventive image shown in Figure 49.I. might be made with an OLED, e.g., the OLED might be in a layer of the part or image support or it may comprise the part or image support's entire form. The light emitted by this OLED or by each of these OLEDs might or might not change over time. The variation of Figure 49.I. shown in Figures 49 II.-VIII. might also have this OLED or these OLEDs, along with other visual effects indicated visually in the illustrations and described in U.S. Patent Application No. 20030035917-A1, e.g., visual effects from other coloration, added parts, etc. Further processing of these inventive images might be done if desired.

Each of the inventive images in Figures 14, 18 and 49 may for example, have batteries, solar cells, added coloration, added polymer, mounts or another means of display, nanomaterials, etc.

In embodiments, one or more stacked OLEDs might comprise an inventive image or part thereof. SOLEDs (stacked OLEDs) from Universal Display Corp. are examples. Such stacked OLEDs like SOLEDs may have stacked red, green and blue subpixels, superimposed on top of one another (e.g., instead of next to one another). According to Universal Display Corp., this stacking of subpixels improves display resolution and enhances full-color quality. In a stacked OLED, each of these subpixels (the red, the green and the blue) may be individually controlled to tune the color visible. Brightness may be controlled by varying the total current through the stacked subpixels. Modulating the pulse width creates the value or the level of gray desired. Thus, for example, with stacked subpixels, all pixels emit light regardless of the color tuned. In comparison, if red, green and blue subpixels are side by side, and one of these colors is desired, the pixels of the other two colors are typically not emitting light. Stacked OLEDs, such as SOLEDs, enable hue or color, intensity and value or gray scale to be independently tuned to achieve the color desired or high-resolution full-color if desired (which may be effective for inventive images that employ wireless technology such as wireless world wide web technology).

Stacked OLEDs might be small molecule OLEDs, polymer OLEDs, both or a hybrid. Refer to U.S. Pat. No. 5,757,139 "Driving circuit for stacked organic light emitting devices"; U.S. Pat. No. 5,917,280 "Stacked organic light emitting devices"; and U.S. Pat. No. 5,953,587, entitled "Method for Deposition and Patterning of Organic Thin Film". In another example, stacked OLEDs might have individual elements connected through optically transparent organic semiconductor materials. Refer to examples of such stacked OLEDs or tandem OLEDs by Kodak which may be brighter and more efficient than other OLEDS.

In embodiments, OLEDs are flexible, for example, they are on flexible polymer image supports (e.g., stabilizers). Flexible OLEDs might be small molecule OLEDs, polymer OLEDs, both or a hybrid. Examples of flexible OLEDs might be transparent, translucent or opaque (e.g., with an opaque reflective electrode). In an example, one or more FOLEDs (flexible OLEDs) from Universal Display Corp. might comprise an inventive image or part thereof. According to Universal Display Corp., FOLEDs are functional, rugged, impact resistant, and robust. Other examples of flexible OLEDs have been developed by researchers at Princeton University in NJ. Inventive images may be made that take advantage of the flexibility of OLEDs like FOLEDs. For example, flexible OLEDs can form or conform to contoured, curved, undulating, or three dimensional inventive images as well as other inventive image surfaces or parts thereof (e.g., they might be installed on a nonplanar image support stabilizer). Also, as inventive images or in inventive images, flexible OLEDs might move, for instance, they can be rolled up and unrolled, they can be moved by air currents, in inventive images that function as clothing they can move as the wearer moves, and when they are used as part of other flexible inventive images they may move also (such as their use as part of textiles or fabrics in inventive images, refer to the description herein). Flexible OLEDs might for instance, be made on substrates of any of a variety of materials that range for example, from polymer films (that might be optically clear), to substrates made of metal foil (that might be reflective). Flexible OLEDs can be thin or very thin, and light weight, e.g., FOLEDs can be built on about a 0.18 mm thick barrier coated (stabilized) polymer layer (stabilizer and image support), such as PET. In another example, Universal Display Corp. has made a FOLED on a film (stabilizer and image support) of about 7 mil. PET. Flexible OLEDs or FOLEDs in inventive images may be opaque, translucent and/or transparent (these might be called T-FOLEDs). Refer to U.S. Pat. No. 5,844,363 "Vacuum Deposited Non Polymeric Flexible Organic LEDs."

In embodiments, inventive images switch from having their OLEDs emit light to being transparent, translucent or both (simultaneously or at different times). The light emitted may be colorless, white, colored, multicolored, or combination of these. As and/or after the OLED appears translucent and/or transparent, the inventive image or its OLED part may be colorless, white, colored, multicolored, or combination of these. The switching of OLEDs in these embodiments may be done in any way desired. For instance, they may emit light (to any extent) while they are transparent or translucent. Such inventive images might for example switch themselves, self actuating (e.g., due to programming, a timer, another internal or external cause, etc), they might be switched by viewers (e.g., by their sounds or voices, by movements or gestures, etc; and/or they might be switched by the presence (perhaps to different degrees) and absence of one or more triggers, stimulants and/or influences (such as light, heat, electricity, pressure, a liquid, sound, other examples described herein, etc.), etc. The inventive images in these embodiments may serve utilitarian purposes if desired. It may be desired that inventive images or colorless inventive images made in these embodiments that switch from emitting white light (preferably uniformly, e.g., without a design), to being transparent (preferably uniformly, e.g., without a design), not function as windows in images of architecture or design.

In embodiments, OLEDs are sealed or encapsulated, preferably in an inert atmosphere before exposure to ambient environmental conditions (a stabilizer). In embodiments, OLEDs are used which have barrier coating technology for encapsulation (a stabilizer) from Vitex Systems, Inc., (e.g., Barix or Flexible Glass), or OLEDs are made with a similar technology, e.g., by a different company. In an example a Barix coating is used made of thin transparent layers of ceramic and polymer, e.g., a Barix coating might be less than about 3 microns thick. Such a Barix coating might be flexible so that it maintains its properties if it is rolled up. In an example, an OLED is used in an inventive image which is a passive matrix, flexible, phosphorescent PHOLED on barrier coated polymer, packaged with a thin-film, multi-layer barrier coating such as those by Universal Display Corp. and Vitex Systems, Inc. of San Jose Calif. (refer to www.vitexsys.com) which might have about 4096 pixels (64×64), about 80 dpi resolution and about 32 levels of grayscale, and which may be less than about 0.7 mm or less in thickness, and which might be flexed or rolled to a radius of less than about an inch. Vitex's Flexible Glass (or Flexible GlassT) and similar encapsulation barriers (such as others made with Barix and similar ingredients) are desirable for use as stabilizers. Vitex's Flexible Glass is a PET film coated with Barix that is a thin-film moisture-barrier, which might be used in inventive images. It is believed to be effective enough to adequately to protect OLEDs for their use in products that are not images. In embodiments, OLED barrier layer materials, processes and/or technology are used from Pacific Northwest National Laboratory, in Richland, Wash. In embodiments, barrier layer materials and/or technology are used on OLEDs from Dow Corning of Midland, Mich., or similar materials and/or technology are used to encapsulate OLEDs for inventive images. In embodiments, OLEDs are sealed using a metal flange and glass, e.g., covered with insulating silicon dioxide. In embodiments, OLEDs are sealed using epoxy or other polymer(s), preferably with a desiccant inside the seal. In embodiments, hermetic seals are used to encapsulate OLEDs, e.g., sealing the OLED with a transparent thin-film barrier, for instance, comprised of multiple layers.

In embodiments, inventive images are made using the apparatus and/or methods (stabilizers) described in U.S. Pat. No. 6,608,283 entitled "Apparatus and method for solder-sealing an active matrix organic light emitting diode" by inventors Liu et al., Assignee: eMagin Corp. of Hopewell Junction, N.Y. In embodiments, inventive images are made using the apparatus and/or methods (stabilizers) described in U.S. Pat. No. 6,198,220 entitled "Sealing structure for organic light emitting devices" by inventors Jones et al., Assignee: eMagin Corp.

Among examples of techniques for patterning, the methods for etching OLED electrodes for use in embodiments, are methods of stamping, methods in which organic layers are deposited through shadow masks, and other non-optical lithography methods. Anodes in OLEDs might, for example, be pattered using chemical solutions and photoresists. In embodiments, OLEDs are used that are made with processes for patterning electrodes as small as about 12 microns based on cold welding, such as the processes developed by Universal Display Corp. and its research partners, Princeton University and University of Southern CA. Refer to "Micropatterning of Organic Electronic Devices by Cold-Welding" in Science, Vol. 288, pp. 831-833, 2000. As another example, a pyramid pixel design might be used, refer to Yang and Chang, Applied Physics Letters, 14, August 2000.

In embodiments, electroluminescent or light emitting polymer is processed to make inventive images as described in "Multi-colour organic light-emitting displays by solution processing" by C. David Muller, Aurelie Falcou, Nina Reckefuss, et al., Nature 421, 829-833 (Feb. 20, 2003). In such an embodiment, soluble electroluminescent polymers with oxetane sidegroups may be photochemically crosslinked to form insoluble polymer in selected areas. These polymers are patterned using methods similar to conventional photoresist practices.

In embodiments, OLEDs are made with organic TFTs, OTFTs, TFTs, or polymer TFTs, e.g. transistors made with pentacene that might be on a polymer or a polyester image support. Refer to "Organic light emitting diodes driven by pentacene-based thin film transistors" by M. Kitamura, T. Imada, and Y. Arakawa in Applied Physics Letters, Volume 83, Issue 16, pp. 3410-3412, Oct. 20, 2003. Refer to polymer or organic electronics herein.

In embodiments, OLEDs are used which have ingredients such as phosphorescent materials from Universal Display Corp., PPG Industries, Princeton University and/or University of Southern CA. In embodiments OLEDs have amorphous silicon TFT backplanes, or poly-silicon backplanes such as those by Sansung SDI of Yongin-City, Kyonggi-do, Korea; or by AU Optronics Corp. of Taiwan. In embodiments, OLEDs have a phosphorescent material integrated with amorphous silicon, TFT backplane technology, e.g., from Universal Display Corp. and AU Optronics Corporation, headquartered at Hsinchu, Science-Based Industrial Park, Taiwan. In embodiments, OLEDs have organic TFTs, e.g., these OLEDs are flexible and their organic TFTs might be made with polymer, conductive polymer and/or semi conductive polymer. In other embodiments, inventive images are made using Olight by DuPont Displays, Santa Barbara, Calif.

In embodiments, polarizers are used on OLEDs. In embodiments, OLEDs are made using oligomeric technologies. In an embodiment, LEDs, PLEDs or OLEDs are made with efficient blue chromophores. Examples are blue-light-emitting 6-(arylvinylene)-3-bromopyridine derivatives (Leclerc et al., Chem. Mater. (2005), 17 (3), 502); copolymers of 9,9'-dioctylfluorene and 2,3-bis(p-phenylene)quinoxaline [Kulkarni et al., Macromolecules (2005), 38 (5), 1553]; and a copolymer containing 5 mol. % 2,3-bis(p-phenylene)-quinoxaline. Refer to "Light-emitting polymers turn blue," Materials Today, Vol. 8, Issue 4, April 2005, p. 18.

Among the materials commonly used to make the hole injection and transport layer in current polymer OLEDs, is poly(ethylene dioxythiophene) and poly(styrene sulfonate) (PEDOT:PSS), e.g., typically in the form of a water based dispersion. Among the materials commonly used to make the second layer of current polymer OLEDs is an emissive copolymer, often based on polyfluorenes or polyphenylene vinylenes (PPV), and the layer's composition is tuned to optimize charge injection and the properties of the light emitted. These materials might be used in inventive images. PPVs like poly-para-phenylen-vinylenes, poly (para phenylen vinylenes) and poly p-phenylenevinylenes might be used to make OLEDs in inventive images. As an illustration, a printing process or an ink jet printing process might apply the red, green and blue (RGB) subpixels of a full-color polymer OLED on a pre-patterned substrate or image support.

In preferred embodiments, OLEDs are made using dendrimers. Dendrimers might be solution processed to make OLEDs, e.g., spin coated, printed, ink jet printed, brushed on, etc. Dendrimers might specially designed for use in OLEDs such as for inventive images in general or for specific inventive images, e.g., OLEDs designed for optimum light emission, quality and efficiency. For example, the core of dendrimers might be modified to change the color light emitted, the size of dendrimer spheres might be modified to control the spacing of cores within the film, and/or dendrimer surface groups might be modified to control processing properties like solubility. In another example, dendrimers might be modified to incorporate the best features of small molecule materials and still be solution processed to make OLEDs. For example, dendrimers modified with phosphorescent emitting cores might be solution processed to make OLEDs. For instance, an iridium based phosphor emitter might be placed at the heart of dendrimers used in OLEDs to increase their efficiency. The use of dendrimers in OLEDs might for example, enable OLEDs to be highly efficient, and they might enable OLEDs to be made with a single layer of organic material between the electrodes. Other variations might also be used in embodiments, such as the use of superimposed layers of organic materials that are allowed to diffuse into one another, e.g., forming a mixed layer between superimposed layers. For example, in making an OLED, a doped luminescent dendrimer layer might diffuse into an undoped dendrimer layer that is not luminescent, forming a mixture between them. Refer to OLEDs made using dendrimers from Opsis, Cambridge Display Technology, University of Oxford (all in the UK) and University of St Andrews. Dendritic technology offers the potential of high electrical/light-conversion efficiency and high color quality, with low manufacturing costs. Refer to Applied Physics Letters 80, 2645-2647, Apr. 15, 2002; Applied Physics Letters 81, 2285-2287 Sep. 16, 2002; and "A green phosphorescent dendrimer for light-emitting diodes" in Advanced Materials Jul. 4, 2002. Refer to "Green phosphorescent dendrimer for light-emitting diodes" by S.-C. Lo, N. A. H. Male, J. P. J. Markham, S. W. Magennis, P. L. Burn, O. V. Salata and I. D. W. Samuel; Advanced Materials, 14, No. 13-14, Jul. 4, 2002, p. 975-979. Refer also to "Influence of molecular structure on the properties of dendrimer light-emitting diodes" by Thomas D. Anthopoulos' Jonathan P. J. Markham, Ebinazar B. Namdas, Justin R. Lawrence, Ifor D. W. Samuel, Shih-Chun Lo and Paul L. Burn, in "Organic Electronics", Vol 4, Issues 2-3, September 2003, pp 71-76.

Among further examples of preferred organic ingredients for use in OLEDs in embodiments are the Spiro compounds. Examples of molecules from the Spiro family are Spiro-6PP and Spiro Octopus. Examples of Spiro hole transporters, emitters, and color dopants are available from Covion Organic Semiconductors in Frankfurt/Main Germany. Also available from Covion are poly-spiros for RGB applications (Polyspiro Red, Polyspiro Green and Polyspiro Blue). These are soluble, (e.g., for solution processing such as by ink jet). They are also tunable over a full color range, they have high temperature stability, geometry that prevents polymer chains from aggregation, and for additional functionality an orthogonal biphenyl unit can be used (dyes, charge transport units). Covion also offers small molecule RGB Guest Host System using temperature stabile Spiro compounds.

In an embodiment, one or more ingredients used to make an OLED are fluorescent materials from organisms or mimicking those from organisms. As an example, OLEDs are made using green fluorescent protein or GFP which makes the Pacific Ocean jelly fish *Aequorea victoria* glow green. GFP collects the energy produced in a chemical reaction and emits it as green light from a small molecular unit in its long molecular chain called a chromophore. Chromophore-like molecules can be used in an OLED, for example, added or scattered as dopants through a matrix of aluminum tris (8-hydroxyquinoline) or Alq3. Refer to "Fluorophores related to the green fluorescent protein and their use in optoelectronic devices." Advanced Materials 12, 1678-1681 (2000).

Typically in current small molecule OLEDs, hole-transport materials are based on benzidines and triarylamines. Typically the emissive, host and electron transport layers in current small molecule OLEDs are made with metal chelates, conjugated hydrocarbons, oxadiazoles, and imidazoles. As time passes and technology develops these kind of preferences for products that are not images may change. Any of these and versions of them in the future may be used in inventive images. As a further illustration, high precision shadow masking might be used to pattern the RGB subpixels of a full color small molecule OLED on a substrate. Among other examples of materials for use in small molecule OLEDs, in hybrid OLEDs and/or in other embodiments are: aluminum tris(8-hydroxyquinoline) or Alq3; [Tris-(8-hydroxyquinoline Al) (Alq3)]; 8-Hydroxyquinoline, aluminum salt, (Alq3); Aluminum quinolate (Alq3); Bu-PBD; 2-(4-Biphenylyl)-5-(4-tert-butylphenyl)-1,3,4-oxadiazole (PBD); CdSe quantum dots; Poly(9-vinylcarbazole) (PVK); Perylene; BAlq; Cu phthalocyanine or CuPc; N,N'-diphenyl-N,N'-bis(3-methylphenyl)-(1,1'-biphenyl)-4,4'-diamine or TPD; N,N'-Bis(3-methylphenyl)-N,N'-diphenylbenzidine (TPD); rare earth chelates; sulfonium salt precursor; PPV; p-xylylenebis(tetrahydrothiophenium chloride) (PPV precursor); FeCl3-doped PPV; ( )NPB, ( )NPD; 4,4'-bis(2,2'-diphenyl vinyl)-1,1'-biphenyl or DPVBi which is a distyrylarylene (DSA) derivative; Polyaniline (emeraldine base) (EB); Polyaniline (emeraldine salt) (ES); PTFE; doped polyaniline fibers; DPVB1; TPBI; NPB; DCJTB; C545T (such as from Kodak); MQA; Perylene; Coumarin 6; CBP; Aluminum; AL2O3; CsF (or Cs Acetate); pentacene; indium tin oxide or ITO; 4,4',4"-tris(N-(3-methoxyphenyl)-N-phenyl-amine-triphenylamine) (MeO-MTDATA); AlOx; MgAg; 1-methyl-1,2,3,4,5-pentaphenylsilole (NIPS); LiF—Al; Tri-p-tolylamine; Di-p-tolylamine; 3-Methyldiphenylamine; Arylamines; triarylamines; [N,N'-diphenyl-N,N'-bis(1-naphthyl)-(1,1'-biphenyl)-4,4'-diamine) (NPB)]; Kodak OLED Material BH 2 New Blue Host #860-8028; Kodak OLED Material HT 2 High temperature hole transport #136-1310; Kodak OLED Material YD 1 New yellow dopant #865-3776; Kodak OLED Material GD 2 New green dopant #101-1444; Kodak OLED material GD-3; Kodak OLED Material BD 2 New blue dopant #175-6899; Kodak's new blue dopant, Kodak OLED material BD-3; and other such materials. Such ingredients might be used in inventive images for electronic and optoelectronic purposes. These ingredients, other examples described in U.S. Patent Application No. 20030035917-A1, and herein might be obtained from any suitable supplier such as Aldrich Chemical Co. or Kodak of Rochester N.Y. Also refer to the description of OLEDs made with nanomaterials and nanotechnology above.

In an example, an OLED might illuminate part or all of an inventive image with light that appears colorless or white to the unaided human eye, or as colorless or as white as conventional indoor lighting. For instance, such an OLED made for utilitarian purposes as lighting, might be used to make an inventive image. Examples are OLEDs by General Electric or by GE Global Research in NY (refer to www.research.ge.com or www.ge.com) or OLEDs made using the same or similar technology. In another example, an OLED which illuminates a planar inventive image might emit a consistant light (e.g., a colorless light, a white light, a light in another single color, or light in a variety of shades of one or more colors such as different whites), or an OLED may emit light in a single white color that changes to other whites or to other colors over time, e.g., with the color and light changing randomly, with color and light changing according to preprogramming, or with its change dependant on the time of day, on the presence of viewers (their movements, voices, other sounds, etc.), or on intentional controls like touch controls. If desired, such an inventive image might also be colored by painting, drawing, printing, transparent or translucent applications, additional light effects, combinations of these, etc. Its light (e.g., colorless or white) may for example, be an underlayer (or backlight) for superimposed transparent painting or collage. Refer to examples of processing inventive images herein and/or in U.S. Patent Application No. 20030035917-A1. As an illustration, an image support (e.g., stabilizer) that emits a soft or relatively low light is made for further processing using traditional image making practices such as those described herein and/or in U.S. Patent Application No. 20030035917-A1, e.g., it is made to bond to superimposed applications of traditional colorants. This may for instance be a transparent or translucent image support (e.g., it might be planar or undulating, it might be in the form of a wall, a window, a panel, a partition, a canvas-like surface, a paper-like surface, a scroll form, a textile, a rigid or flexible form, etc.). If desired the light emitted by such an inventive image might stay constant or it might change over time, e.g., changing according to preprogramming, in response to touch controls, in response to sound or light, or by another trigger or stimulant.

In embodiments, inventive image OLEDs (such as inventive images made of or made with TOLEDs) might for example, be on transparent, translucent or opaque substrates or image supports (e.g., stabilizers), that are made with any material desired, such as metal, polymer, paper, foils, silicon wafers, reflective substrates, non reflective substrates, glass, crystal, stone, wood, a combination of these, etc. In an example, an inventive image is made by installing a small molecule OLED, a polymer OLED, a combination of these and/or a hybrid of these on a transparent or translucent, colorless or colored image support, such as an image support stabilizer. This image support may for example, be the same size as the OLED or OLEDs on it, or it may be larger than the OLED or OLEDs on it. The resulting form may be the inventive image or it may be further processed, for example, by the addition of polymer, colorants, incised marks, mounts or another means of displaying the image, additional ingredients that enable the image to have desired light effects, and/or another variations described herein and/or in U.S. Patent Application No. 20030035917-A1. The resulting inventive image functions as art, design or architecture. It might for example, also have a battery, a solar cell, and/or a TFT (one or more of which may be thin, transparent and/or translucent), or another variation described herein. It might for example, be a painting, a construction, a sculpture, a table top, or a wall made using real light and transparency and/or it may be a textile or a fabric.

In embodiments, OLEDs such as light emitting polymer or LEP displays are able to power themselves. They may for example be photovoltaic, e.g., converting light to electricity which they use to power themselves. Refer to photovoltaics and solar cells herein.

In embodiments, a Laser Induced Thermal Imaging (LITI) process for patterning OLEDs is used to make inventive images, e.g., for PLED by 3M.

In an example, an OLED such as the 20 inch OLED monitor with an amorphous-silicon TFT driven active matrix made in a joint operation between IDTech Japan, IBM Japan and Chi Mei Optoelectronics might be used in inventive images. In another example, nanoscale or submicrometer size OLEDs might be used in inventive images, refer to examples herein.

In embodiments, inventive images are made with organic bistable LEDs (OBLED) such as those made at University of California at Los Angeles by combining an organic bistable memory device and a polymer LED. Such OBLEDs are non-volatile memory devices that might be read electrically or optically by measuring the injection current or the light emission.

In embodiments, inventive images or part thereof are made by Litrex Corporation of Pleasanton, Calif. or they are made using technology and/or ingredients from Litrex Corp. Refer to www.litrex.com. For example, these inventive images may have OLEDs or parts of them, LCDs or parts of them, ink jet printed conductive polymer, polyethylenethioxythiophene or PEDOT printing (e.g., for the hole injection layer of LEP displays and in organic semiconductors), LEP materials (red, green and blue), polyimide (PI) coating (such as for LCDs), color filter printing (such as for LCDs), polymer transistors, ink jet printed polymers for active matrix backplanes for flat panel displays, ink jet printed nanoparticle metals, etc., that are made by Litrex, made using their technology and/or made using their ingredients. Refer to "Precision Industrial Ink Jet Printing Technology for Full Color PLED Display and TFT-LCD Manufacturing" by R. Bennett, C. Edwards, J. Lee, and K. Silz; 2003, Litrex Corp.

In embodiments, small molecule OLEDs are made using ingredients, technology, and/or processes from one or more of the companies named in the section of U.S. Patent Application No. 20030035917-A1 entitled "Conductive Polymers and Related Subjects."

In an embodiment, inventive images are made so that their OLED or their OLEDs can easily be accessed and/or removed such as for maintenance, upkeep or other care, for repair, for removal, and/or for replacement.

Examples of OLEDs for use in inventive images are LUMATION Light-Emitting Polymers (LEPs) by the Dow Chemical Co. of Midland, Mich. and OSRAM Opto Semiconductors, Inc. of Regensburg, Germany.

In embodiments, OLEDs are made using ingredients, technology, and/or processes from Princeton University of Princeton, N.J., e.g., Princeton's Advanced Technology Center for Photonics and Optoelectronic Materials (POEM); "The OLED Technology Report" and "Kodak AM550L OLED Display Characterization and Analysis Report" from DisplaySearch of Austin, Tex. (www.displaysearch.com); "Organic Light Emitting Devices from Displays to Lighting" by G. Parthasarathy, J. Liu, and A. R. Duggal published in The Electrochemical Society Interface, summer 2003 p. 42-4'7; "Fault-tolerant scalable organic light-emitting device architecture" by A. Duggal, D. F. Foust, W. Nealon, and C. M. Heller, Applied Physics Letters, Vol 82, No 16, Apr. 21, 2003; "Organic light-emitting devices for illumination quality white light" by A. Duggal, J. J. Shiang, C. M. Heller, and D. F. Foust, Applied Physics Letters, Vol 80, No 19, May 13, 2002; General Electric or General Electric Global Research (refer to www.research.ge.com); the University of Southern CA., Los Angeles, Calif., e.g., USC's Synthetic Materials Laboratory; Massachusetts Institute of Technology (MIT) in Cambridge, Mass.; RiTdisplay in Hsinchu, Taiwan; HannStar; the Chitose Institute of Science and Technology (CIST) of Japan; Motorola Inc. of Schaumburg, Ill. (refer to www.motorola.com); PPG Industries, Inc. (PPG) of Pittsburgh, Pa.; Varitronix International Ltd. of Hong Kong; Aixtron AG of Aachen, Germany; Sony Corporation of San Diego, Calif. (refer to www.sonychemicals.com); Samsung SDI of Seoul, Korea (refer to www.samsungsdi.com); Luxell Technologies Inc. of Mississauga, ON Canada (e.g, Luxell's Black Layer technology and innovations for electroluminescent displays); Nakan of Chiba, Japan; Dow Corning of Midland, Mich.; DuPont Displays of Santa Barbara, Calif. (refer to www.DuPont.com); AU Optronics Corp., at Hsinchu, Science-Based Industrial Park, Taiwan; Vitex Systems Inc., in San Jose, Calif. (refer to www.vitexsys.com); iFire Technology Inc., a subsidiary of The Westaim Corporation in Toronto, Canada (refer to www.westaim.com); Sarnoff Corporation (www.sarnoff.com), in Princeton, N.J.; Lucent Technologies, in Murray Hill, N.J. www.lucent.com; Sensics of Baltimore Md. (refer to www.sensics.com); Virtual Vision, Inc. in Redmond, Wash.; Toyota Industries of Japan (refer to www.toyota-industries.com); 3M of Saint Paul, Minn. and Methuen, Mass. (refer to www.3m.com); Alien Technology Corp. of Morgan Hill, Calif. (refer to www.alientechnology.com); Applied Films of Germany; Canon Inc. of San Jose, Calif. (refer to www.canon.com); Chi Mei Optoelectronics of Taiwan; Clare Micronix of Aliso Viejo, Calif. (refer to www.claremicronix.com) a subsidiary of IXYS Corporation (refer to www.ixys.com); X-Fab or Lubbock, Tex.; Dai Nippon Printing of Tokyo, Japan (refer to www.dnp.co.jp); Delta Optoelectronic, Inc. of Hsin-Chu, Taiwan, ROC (refer to www.delta-opto.com.tw/english/main.htm); DENSO Corp. of Japan (refer to www.denso.co.jp/index-e.html); Elam T (refer to www.elam-t.com); eMagin of Hopewell, Junction N.Y. (refer to www.emagin.com); FlexICs Inc. of Milpitas, Calif.; Fujitsu of Sunnyvale, Calif. (refer to www.fcai.fujitsu.com); Hitachi Ltd. of Tokyo, Japan; IBM of Zurich, Switzerland; Idemitsu Kosan of Tokyo, Japan (refer to www.idemitsu.co.jp/e/); LG Electronics (LGE) of Seoul Korea (refer to www.lge.com); Lightronik Technology Inc.; Lite Array Incorporated of Hong Kong and China (refer to www.litearray.com); MicroEmissive Displays of Edinburgh, UK (refer to www.microemissive.com); MicroFab Technologies of Plano, Tex.; Nagase of Japan and NY, N.Y. (refer to www.nagase.com); NEC of Santa Clara, Calif.; NESS Display Co., Ltd. of Korea (refer to www.ness.co.kr); Nippon Seiki of Japan (refer to www.nippon-seiki.co.jp/eindex.htm); Adeon Co. Ltd. of Japan; Asahi Glass Co. of Japan; Opsys of Oxford UK and Opsis U.S. Corp in Fremont, Calif. (refer to www.opsysdisplays.com or www.opsydisplays.com); Opto Tech of Hsin-Chu, Taiwan R.O.C. (refer to www.opto.com.tw); Optrex of Plymouth, Mich. (refer to optrex.com); OSRAM Opto Semiconductors of Regensburg, Germany (refer to www.osram-os.com); Royal Philips Electronics of Sunnyvale, Calif. and the Netherlands (refer to www.Philips.com); Pioneer (refer to www.pioneer.com); Tohoku Pioneer of America Inc., of Arlington Heights, Ill. (refer to www.tohoku-pioneer-usa.com); Plastic Logic of Cambridge UK (see www.plasticlogic.com); Varitronix Ltd of Hong Kong (refer to www.varitronix.com); Prodisc Technology of Taiwan (see www.prodisc.com.tw/indexl.htm); Sanyo Electric of Japan (refer to www.sanyo.co.jp/koho/index_e.html) and Tottori Sanyo of Japan (refer to www.torisan.co.jp); Seiko Epson Corp. of (refer to www.Epson.com); Sharp of Camas, Wash.; Siemens of Wendelsheim, Germany (refer to www.i-sft.com); Solomon Systech of Hong Kong (refer to www.solomon-systech.com/home); STMicroelectronics of San Diego, Calif.; Stanley Electric of Irvine, Calif. and Tokyo Japan (refer to www.stanley-electric.com); Sumitomo Chemical of Japan (refer to www.sumitomo-chem.co.jp); TDK Corporation of Mt. Prospect Ill. (refer to www.component.tdk.com); TECO Information Systems Co., Ltd. of Taiwan; Tokki of Japan (refer to www.tokki.co.jp); Toshiba Matsushita Display (TMD) of Tokyo, Japan (refer to www.tmdisplay.com or to www.tmdisplay.com/tm_dsp/press/2002/04-16a.htm); Universal Display Corp. (UDC) of Trenton, N.J. (refer to www.universaldisplay.com); Univision Technology of HsinChu, Taiwan (refer to www.univision.com.tw); Ushio of Cypress, Calif. and Japan (refer to www.ushio.com); Ulvac Japan, Ltd. of Chigasaki Japan; Wintek of Ann Arbor, Mich. (refer to www.wintek.com.tw); Windell Corp. of Taiwan, a Wintek subsidiary; Rohm Co. Ltd. of Kyoto, Japan; Xerox Corporation (refer to www.Xerox.com); and Sigma Aldrich (www.sigma-aldrich.com) refer to their online and print catalog as well as various issues of "ChemFiles," such as Vol. 4 No. 6 "Organic Semiconductors for Advanced Electronics" and Vol. 3 No. 8 "Advanced Polymers for Electronic/Optical Devices". Also refer to "Innovative advances in LED technology" by F. K. Yam and Z. Hassan in *Microelectronics Journal*, Volume 36, Issue 2, February 2005, Pages 129-137.

In embodiments, inventive images are made with one or more materials, technologies, and/or processes from one or more of the companies exhibiting at the "Society for Information Display's (SID's) International Symposium, Seminar & Exhibition" held in 2003 at the Baltimore Convention Center, in Baltimore, Md. (May 19-22, 2003, with exhibits from May 20-22); held in 2004 at the Washington State Conventional and Trade Center, in Seattle Wash. (May 23-28, 2004, with exhibits from May 25-27); and held in the future. These exhibitors and their websites are in "SID '03" and the "SID '04" "Exhibit and Product Guide" published for these conferences, and they will also be listed in subsequent versions of this publication in the coming years. Refer to the websites of these companies that exhibit and that will exhibit at SID for useful updates. Also refer to the SID website, www.sid.org, and their online and downloadable information such as lists of sources for materials and processes that may be desirable for making inventive images e.g., product.pdf and companies.pdf.

Sources listed herein might also provide materials, technology, and/or processes for use in other embodiments herein, in other embodiments, and in U.S. Patent Application No. 20030035917-A1, such as for use in other kinds of light emissive and reflective displays in inventive images, for the use of nanotechnology in inventive images, etc.

Further Description

In embodiments, inventive images are made with porphyrins, porphyrin molecules, porphyrin nanotubes, hollow porphyrin nanotubes, porphyrin nanofibers, platinum-porphine compounds, porphyrin nanomaterials (which be nanoscale or larger), or porphyrin nanocomposites or hybrid nanomaterials. These might for example, be used in OLEDs, in memory chips; for their electronic properties, their optical properties, their luminosity or their light emission; in solar cells or light-harvesting devices, in nanodevices; in electronic and photonic devices, in sensors, for producing hydrogen; because they are light absorbing, light-active or photoactive (light applied to porphyrins may excite an electron); for their photocatalytic ability; in porphyrin-polymer nanocomposites or hybrid nanomaterials, to enhance properties like efficiency, for various formal elements, etc. Refer to U.S. Pat. No. 6,413,656 (Jul. 2, 2002), "Reduced symmetry porphyrin molecules for producing enhanced luminosity from phosphorescent organic light emitting devices."

In embodiments, roll to roll or continuous manufacturing processes are used to make inventive images or part thereof such as: polymer electronics, organic electronics, polymer semi conductors, circuits, integrated circuits, backplanes, memory, OLEDs, sensors, e-materials, flat panel and flexible displays, photovoltaics or solar cells, TFTs, organic TFTs, polymer transistors, batteries, parts of these, etc. For example, such inventive image parts may be made by Rolltronics Corporation of Menlo Park, Calif. (refer to www.rolltronics.com), e.g., using processing they call roll to roll (R2R) or web processing. In an illustration, devices for inventive images are made by patterning a flexible material (such as polymer or metal in sheets, layers, film or foil), that is processed in the form of a roll or web, that runs through one or more machines guided by rollers which keep it in position and maintain the proper tension on it. Roll to roll manufacturing might be done continuously, and/or it might make layered applications on an image support (e.g., stabilizer). Among the printing process that might be used with roll to roll processing are ink jet printing and gravure printing processes. In an embodiment, inventive images are made with Rolltronics' FASwitch (flexible array switch) is a thin film micro electromechanical switch made using polymer and metal (preferably without silicon) that might function like a silicon transistor. For instance, an array or an active matrix array might be made using FASwitch and roll to roll processes and it might serve as a backplane or active matrix backplane. As examples, FASwitch might be used to make e-materials, OLEDs, sensors, circuits, etc. Refer to details at www.rolltronics.com.

In embodiments, inventive images are made using flexible microprocessors, integrated circuits and/or chips. These might be very small, nanoscale, and/or very thin. Examples of uses are herein, e.g., for e-materials, OLEDs, etc. Inventive images might for instance, be made with flexible 8-bit microprocessors by Seiko Epson Corp., such as, their ACTII chip which is a low-temperature polysilicon TFTs (LTPS-TFTs) on a polymer image support. Chips, integrated circuits and microprocessors for e-materials and OLEDs in inventive images are stabilizers.

In embodiments disclosed herein, products conventionally used as adhesives and/or products conventionally used to make adhesives are used to make inventive images or part thereof which might also have at least one nanomaterial and/or other smart material, and/or which might be nanomaterials. These adhesive products might for example, be water based, solvent based or alkyd. Examples are adhesive products by Rohm and Haas (e.g., in the Adhesives and Sealants area of the Rohm and Haas of Philadelphia, Pa. website: www.rohm-haas.com/AdhesivesSealants/index.html), adhesive products by 3M of Saint Paul, Minn. (refer to www.3m.com), by Henkel Adhesives Corp. in Elgin, Ill. (refer to www.henkel.com), by DuPont of Wilmington, Del. (www.dupont.com), by Lucite International of Cordova Tenn. (formerly ICI Acrylics) such as ELVACITE products that are used to make adhesives (refer to www.luciteinternational.com), and adhesive products used in self adhesive labels. Such an adhesive product might be comprised of a polymer, it might contain a polymer and/or it might contain a monomer. In an example, an ingredient is mixed with at least one adhesive product that creates or fortifies its bond to: a). the inventive image or part thereof upon which it is applied, and/or b). one or more superimposed materials. For instance, the ingredient added to the adhesive product might be one or more of: i). a colorant that has a binder, ii). the binder for a colorant, iii). a second adhesive product, iv). a primer, gesso, or sizing material, v). the binder for a primer, gesso, or sizing material, vi). a polymeric emulsion or solution which might, for example, be acrylic or contain acrylic, vii). an ingredient which will bond to or enhance the bond to the substrate that the mixture will be applied upon, viv). an ingredient that is compatible with one of these, viii). a nanomaterial, or viv). a combination of these.

In examples, the mixture's proportions are optimized to create the strongest bond possible, preferably without compromising other aspects of the inventive image's permanence or the aesthetic desired. In illustrations, an adhesive product, a mixture of two or more adhesive products, or a mixture containing at least one adhesive product is used: i). to connect inventive image parts, ii). as a surface preparation stabilizer (e.g., to bond to conventional art materials like paints and pastels), iii). as an inventive image surface, iv). to make bonding spots, and/or v). to make a Separating Layer. In embodiments, adhesive products and mixtures containing them which are part of inventive images might be further processed, e.g., painted, printed upon, drawn upon, collaged, attachments or photography might be added, processed using subtractive processes, etc. Refer to further description in U.S. Patent Application No. 20030035917-A1.

In a further illustration, an adhesive product is comprised of a form of acrylic or it contains a form of acrylic. Such an adhesive product or a mixture containing it (e.g., with at least one nanomaterial or other smart material) might, for example, be applied on an inventive image surface or part thereof (e.g., applied on an image support that might be a stabilizer) or it might be applied on a mold. For instance, this adhesive product or this mixture containing it might be applied on an inventive image surface or part thereof comprised of a form of acrylic or containing a form of acrylic. But regardless of the composition of its substrate or if it is applied on a mold, in embodiments, this adhesive product or this mixture containing it might be superimposed by one or more materials which bond to it, such as colorants, other adhesives, or other bonding substances (e.g., paints, drawing or printing materials like inks, colorants containing acrylic such as acrylic paints, and/or bonding glues for instance to collage, make other attachments or connect inventive image parts).

In embodiments, cPRM used to make inventive images or part thereof is in the form of a polymeric solution. It may have at least one nanomaterial and/or other smart material. It may be a nanomaterial and/or a smart material. In embodiments, a polymer solution, such as any of the examples provided herein, is applied on an inventive image as a surface preparation stabilizer, as a Separating Layer, as bonding spots, as a Clarifying Imprimatura and/or as an underlayer. The polymer solution might for example, be clear, colorless and/or subsequently superimposed, e.g., by paint applications, conventional art materials, attachments etc. For further description of these refer to U.S. Patent Application No. 20030035917-A1.

It is generally preferable that polymer solutions, adhesive products, mixtures containing these, and combinations of these used to make inventive images dry, harden or cure, e.g., so that they are not wet or tacky, for example on inventive image surfaces.

In embodiments, it is often preferable that polymeric solutions and adhesive products used to make inventive images have relatively low molecular weights. For example it may be preferable for a polymeric solution and/or an adhesive product used to make an inventive image to have a molecular weight of about 70,000 or less, of about 50,000 or less, of about 35,000, of about 25,000, or of about 15,000. In examples, surface preparation stabilizers, bonding spots, underlayers, image parts, and image support stabilizers are made using polymeric solutions and/or adhesive products with a molecular weight of about 70,000 or less, of about 50,000, of about 35,000, of about 25,000, or of about 15,000, e.g., poly (methyl methacrylate) or PMMA of these molecular weights or a copolymer of these molecular weights.

In embodiments, the surfaces of inventive images or parts thereof are made of one or more polymeric solutions and/or adhesive products that are capable of bonding to superimposed conventional art materials, paints, pastels, inks, and/or adhesives. These may or may not have nanomaterials or other smart materials, and they may or may not be nanomaterials or smart materials, e.g., nanomaterials may enhance or enable bonding, refer to further description above. For example, these surfaces might be of image supports, image support stabilizers, surface preparation stabilizers, bonding spots, underlayers, image parts, etc. Although these inventive image surfaces made of one or more polymeric solutions and/or adhesive products might bond to one or more superimpositions when they are wet or when they are tacky or sticky, it is more preferable that they bond to one or more superimpositions when they are dry, and most preferable when they are dry, not tacky and not sticky.

MSA (Mineral Spirits Acrylic) Varnish, MSA Hard Varnish, MSA Gel and MSA paints are among the many products by Golden Artist Colors of New Berlin, N.Y. (www.goldenpaints.com) that might be used in embodiments of this invention. In some embodiments, it is preferable that these MSA products or mixtures containing them also have UV light stabilizers (UVLS), and Golden offers them this way. Golden's MSA Varnish might for example, be a solution of isobutyl and n-butyl methacrylate in mineral spirits, solids: about 33%, for instance, containing a hindered amine light stabilizer and an ultraviolet absorber (which may be a substituted benzotriazole compound). A MSA varnish might for example be thinned with artists quality, distilled, rectified or refined turpentine, e.g., using a ratio of about 3 parts varnish to about 1 part turpentine for brushed applications, or using a ratio of about 1-2 parts varnish to about 1 part solvent for sprayed applications. Whether they are thinned or not, if desired, one or more MSA varnish(es) might be mixed with one another, with MSA gel, and/or with one or more: i). MSA paint(s), ii). pigment(s), dyes or other colorants, iii). oil paints, iv). alkyd paints (e.g., adding a transparent color to a MSA varnish) for making inventive images, and/or v). one or more nanomaterials and/or other smart materials.

In preferred embodiments, a solution containing at least one polymer and/or at least one monomer is used to make inventive images. Such solutions may or may not have one or more nanomaterials such as SWNT. Solutions in these embodiments might be applied on an inventive image, on an image support (that might be a stabilizer), or in a mold, e.g., using a conventional process such as brushing, spraying, spin coating, pouring, etc. For example, one such solution, a mixture of two or more of them, or a mixture containing at least one such solution (with or without a nanomaterial and/or other smart material) might be used to make an inventive image or part thereof such as an image support (e.g., stabilizer) or a part thereof. For instance, a solution from one of these embodiments might be used as a surface preparation stabilizer that might for example, bond to superimposed applications, e.g., to paint, to drawing, to photography, to printing, to attachments, to an adhesive product, to collage, etc. Examples of the solutions that might be used in these embodiments are the PARALOID products by Rohm and Haas of Philadelphia Pa., Golden Artist Colors MSA (Mineral Spirits Acrylic) products, and adhesive products.

In preferred embodiments, an ingredient is added to a polymeric solution that may have at least one nanomaterial and/or other smart material, or that may be a nanomaterial and/or smart material. This ingredient is one or more of: i). a colorant that has a binder, ii). the binder for a colorant, iii). an adhesive product, iv). a primer, gesso, or sizing material, v).

the binder for a primer, gesso, or sizing material, vi). an ingredient that is compatible with one of these, vii). nanomaterials, or viii). a combination of these. Examples of such ingredients are: an art material or its binder, such as paint, a drawing material, a printing material, a photographic emulsion, a binder for any of these (e.g., ink or the binder for ink), nanomaterials (refer to the examples provided herein. Among other examples of such ingredients are an adhesive product; a primer, gesso, or sizing material or the binder for one of these; a binder that contains acrylic, a material that is compatible with any of these, or a mixture of two or more of these. More specific examples of such ingredients are: linseed oil, poppyseed oil, safflower oil, wax, hide glue or rabbit skin glue, gum arabic, SWNT, nanoparticles, nanofibers, other nanomaterials, acrylic emulsions or vinyl resins used in paint, in gesso or in primers; acrylic emulsions compatible with those used in acrylic paints, in gesso or in primers (like GAC products by Golden Artist Colors such as GAC 100 and 200, or like RHOPLEX by Rohm and Haas, refer to the examples herein), alkyd binders, vinyl paints, vinyl binders, oil paint, acrylic paint, alkyd paint, etc. In examples, the proportions of mixtures made in these embodiments are optimized in order to create the strongest bond possible to a). the substrate each mixture will be applied upon and/or b). to one or more subsequent superimpositions. Preferably this is done without compromising other aspects of the inventive image's permanence or the aesthetic desired. In another example, in mixtures produced in these embodiments, the percentage (by volume) of the ingredient or ingredients (collectively) added into the initial polymeric solution may preferably be less than about 50%, more preferably about 40% or less, desirably it may be more than about 0.2%, preferably more than about 0.4%, preferably it may be less than about 30%, more desirably less than about 25%, more preferably less than about 18%, and most preferably less than 10%.

In a more specific example, an ingredient such as those in the description above, is added to a polymeric solution that contains a form of acrylic, e.g., a solution containing an acrylic polymer, an acrylic copolymer, isobutyl methacrylate, n-butyl methacrylate, P(BA/MMA), a MMA/BMA copolymer, butyl methacrylate, P(BA/MAA/MMA), styrene/acrylic copolymer, methyl methacrylate, ethylmethacrylate polymer, etc. (such as the examples provided herein like Golden Artist Colors MSA products described above and the PARALOID products described below). Such a mixture might for example form an inventive image or a part thereof such as an image support (e.g., stabilizer), or a surface preparation stabilizer, etc. For instance, such a mixture might be applied on an inventive image surface that is wholly or partially acrylic.

In other preferred embodiments, an inventive image or a part thereof is made using a polymeric solution in: i). mineral spirits, ii). turpentine, or in iii). another solvent that is compatible with oils (such as linseed oil, safflower oil or poppyseed oil), and/or alkyds (such as conventional alkyd art materials like LIQUIN by Winsor and Newton of Harrow, Middlesex England, refer to www.winsornewton.com). For example, this might be a solution made using one or more of these products:

a). a solution containing a form of acrylic (refer to the examples above);
b). one of Golden's MSA materials or a mixture containing two or more of them (described above);
c). PARALOID B-67 MT resin solution (described below);
d). ELVACITE products (described below);
e). another such polymeric solution, and/or
f). a mixture of two or more of these. For instance, these solutions might be used to make an inventive image or part thereof, such as an image support that might be a stabilizer, or a surface preparation stabilizer. In a variation, one or more ingredients might be added to polymeric solutions in these embodiments which may for instance, be one or more: nanomaterials, nanomaterials that enhance or enable bonding, other smart materials, oil or alkyd paints, oil or alkyd paint binders (such as linseed oil, poppyseed oil, safflower oil or LIQUIN), oil or alkyd based adhesive products, oil or alkyd based primers, gessos or sizing materials or the binder(s) for these; or a combination of these. In examples, the proportions of these mixtures might be optimized in order to create the strongest bond possible to a). the substrate each mixture will be applied upon and/or b). one or more subsequent superimpositions. However in other examples, it is preferable that the amount of the ingredient or ingredients (collectively) mixed into the polymeric solution, be a smaller percentage of the total mixture than the amount of the polymeric solution used, (e.g., examples of specific preferred percentages are provided above).

The polymer formed using the solutions in any of these or other such embodiments, the polymer formed using the adhesive products described herein or in U.S. Patent Application No. 20030035917-A1, or the polymer formed using mixtures containing one or more of these, might for instance, function as part or all of an inventive image, an image support (e.g., stabilizer), or a surface preparation stabilizer; it might function as coloration, as bonding spots, as a Separating Layer, and/or as an underlayer (e.g., as underpainting, underdrawing, an imprimatura, a ground or another kind of underlayer). These inventive images might be further processed, for instance, in additive and/or subtractive processes. (All of these aspects of inventive images are further described in U.S. Patent Application No. 20030035917-A1.) Inventive image surfaces (such as surface preparation stabilizers) of these embodiments may for instance, be superimposed, e.g., by one or more applications such as paints, conventional art materials, pastels, by attachments, etc. The superimposition(s) might for example, bond to one or more ingredients added into the surface of the inventive image superimposed. This ingredient or these ingredients (collectively) might for example, be added into the mixture used to form such inventive image surfaces at any percentage, e.g, measuring by weight the percentage might be between about 0.75%-35%, more desirably between about 1.5% and 30%, more desirably between about 3% and 25%, more preferably between about 3% and 20%, most preferably between about 3% and 16%, most preferably between about 3% and 12%, and most desirably between about 3% and 9%. These are preferred examples.

EXAMPLES

Example 1

An inventive image surface that may or may not have one or more nanomaterials or other smart materials such as any of the examples herein, (such as a surface preparation stabilizer) made with a polymeric solution and/or an adhesive product to which an oil or a bonding ingredient is added (e.g., in the form of an adhesive product, a primer, a gesso, a paint, a printing material, a binder, or a sizing material that is comprised of oil or that contains oil; or in the form of a compatible ingredient) might be superimposed by: i). the same material or materials that were added into the polymeric solution, the adhesive product, or the mixture containing one or both of these; by ii). one or more materials which contain the ingredient or which contain at least one of the ingredients added into the polymeric solution, the adhesive product, or the mixture containing one or both of these; iii) a material compatible with one of those described in i). or ii). Such inventive image surfaces might for example, be superimposed by oil paint, oil pastels or encaustics; and/or by an adhesive product, a primer, a binder, gesso, ink, or a sizing material containing oil.

Example 2

An inventive image surface that may or may not have one or more nanomaterials or other smart materials such as any of the examples herein, (such as a surface preparation stabilizer) made with a polymeric solution and/or adhesive product, to which at least one acrylic ingredient is added (e.g., such as an acrylic emulsion, an acrylic solution, another acrylic binder, and/or an adhesive product, primer, gesso, size or paint containing acrylic, etc.), might be superimposed by one or more of: i). the material that was added into the polymeric solution or adhesive product, the mixture containing one or both of these, or a compatible material, ii). a material which contains at least one of the ingredients added into the polymeric solution or adhesive product, the mixture containing one or both of these, or a compatible ingredient, iii). an oil paint, an oil pastel, encaustic or other oil based image making material, iv). a combination of these, such as superimposed acrylic paint and/or attachments made using an acrylic adhesive product (e.g., collage). Such inventive images might for example, be superimposed by an acrylic paint.

Example 3

An inventive image surface that may or may not have one or more nanomaterials or other smart materials such as any of the examples herein, (such as a surface preparation stabilizer) made with a polymeric solution and/or an adhesive product to which an alkyd is added (e.g., in the form of an adhesive product, a primer, a gesso, a paint, a binder, or a sizing material that is comprised of alkyd or that contains alkyd, or in the form of a compatible added ingredient) might be superimposed by: i). the same material or materials that were ingredients added into the polymeric solution, the adhesive product, or the mixture containing one or both of these; by ii). one or more materials which contain the ingredient or at least one of the ingredients that was added into the polymeric solution, the adhesive product or the mixture containing one or both of these, iii) a material compatible with one of those described in i). or ii). Such inventive image surfaces might for example, be superimposed by oil or alkyd paint, by oil or alkyd drawing materials; by encaustics; by an adhesive product, a primer, a binder, gesso or a sizing material containing oil or alkyd; and/or by an ink containing oil or alkyd.

Example 4

An inventive image surface that may or may not have one or more nanomaterials or other smart materials such as any of the examples herein, (such as a surface preparation stabilizer) made with a polymeric solution and/or an adhesive product to which a vinyl is added (e.g., in the form of an adhesive product, a primer, a gesso, a paint, a binder, or a sizing material that is comprised of vinyl or that contains vinyl, or in the form of a compatible added ingredient) might be superimposed by: i). the same material or materials that were ingredients added into the polymeric solution, the adhesive product or the mixture containing one or both of these; by ii). one or more materials which contain the ingredient or at least one of the ingredients that were added into the polymeric solution, the adhesive product or the mixture containing one or both of these, iii) a material compatible with one of those described in i). or ii). Such inventive image surfaces might for example, be superimposed by vinyl colorants like a paint (such as FLASHE® by Lefranc and Bourgeois of Le Mans, France); and/or by an adhesive product, a primer, a binder, gesso or a sizing material containing vinyl, such as emulsified vinyl glues like a polyvinyl acetate (PVA) glue (e.g., to make attachments, to collage, to connect parts, etc.).

Example 5

Inventive image surfaces that may or may not have one or more nanomaterials or other smart materials such as any of the examples herein, made using:
a) polymeric solutions (with or without added ingredients such as the examples of polymeric solutions provided above), which are solutions in mineral spirits, in turpentine, and/or in another solvent that is compatible with oils and/or alkyds, e.g., the solvent is compatible with oils used in art materials or compatible with alkyd art materials,
b). oil based or alkyd adhesive products (with or without added ingredients such as the examples provided above), or
c). a combination or a mixture of these,
might for example be superimposed by: i). oil or alkyd paints or inks, ii). oil based marking materials or marking materials that contain oil such as pastels, oil based pens, iii). encaustics, iv). other oil or alkyd based art materials or colorants, v). other art materials, vi). a bonding solution containing acrylic, vii). bonding adhesive products (such as adhesive products that contain oil or alkyd ingredients), viii). a solution in the same solvent or in a solvent that dissolves the inventive image surface at least a little, or, ix). a combination of these.

These examples and embodiments might for instance, be used to make new kinds of 2D or 3D canvases, walls, and sculptures (with or without utilitarian functions) that can be marked upon and colored, e.g., painted, drawn upon, collaged, that can have photographic pictures added to them, attachments, etc.

RHOPLEX (preferred), PARALOID (more preferred), LUCIDENE and/or MAINCOTE by Rohm and Haas of Philadelphia, Pa. may be used in embodiments of this invention (with or without the addition of at least one nanomaterial and/or other smart material). For example, one of these products, or a mixture of two or more of them (such as a mixture of two or more kinds of RHOPLEX), or a combination of these products might be used to make an inventive image or part thereof, such as an image support or a part thereof, e.g., it might be a surface preparation stabilizer which might for example, bond to superimposed paints. RHOPLEX is available from Brenntag of Reading, Pa. (formerly known as Textile Chemical Co., Inc.). Brenntag represents, supports and distributes RHOPLEX®. PARALOID is available from ChemCentral. As more specific examples, the following ingredients might be used to make inventive images or part thereof.

RHOPLEX 3208, e.g., comprised of about 35-36% by weight acrylic polymer, less than about 0.05% by weight residual monomers, about 8-9% by weight formaldehyde/melamine resin, a maximum of about 0.9% by weight methanol, a maximum of about 0.4% by weight formaldehyde, a maximum of about 0.4% by weight triethylamine, and about 53-55% by weight water. RHOPLEX AC-33, AC-33C and B-60, e.g., all preferred emulsions containing acrylic. RHOPLEX B-60A, preferred, e.g., comprised of about 46-48% by weight P(EA/MMA), less than about 0.05% by weight residual monomers, a maximum of about 0.2% by weight aqua ammonia, and about 52-54% by weight water. RHOPLEX AC-261 (preferred, conventionally used as a paint binder), e.g., comprised of about 49-51% by weight P(BA/MMA), less than about 0.05% by weight residual monomers, a maximum of about 0.2% by weight aqua ammonia, and about 49-51% by weight water. RHOPLEX AC-264 (preferred, conventionally used as a paint binder) (which is the new version of E1801 or Emulsion 1801 which is also preferred), e.g., comprised of about 60-61% by weight acrylic copolymer, less than about 0.05% by weight residual monomers, a maximum of about 0.2% by weight aqua ammonia, and about 39-40% by weight water. RHOPLEX AC-337N (preferred, conventionally used as a paint binder), e.g., comprised of about 45-46% by weight acrylic polymer, less than about 0.1% by weight individual residual monomers, a maximum of about 0.1% by weight aqua ammonia, and about 54-55% by weight water. RHOPLEX AC-347 (preferred, conventionally used as a paint binder), e.g., comprised of about 49-51% by weight acrylic polymer, less than about 0.05% by weight residual monomers, a maximum of about 0.2% by weight aqua ammonia, and about 49-51% by weight water. RHOPLEX AC-1034 (preferred, conventionally used as a primer or to make a primer), e.g., comprised of about 46-48% by weight acrylic polymer, less than about 0.05% by weight residual monomers, a maximum of about 0.1% by weight aqua ammonia, and about 52-54% by weight water. RHOPLEX AC-1035 (preferred, conventionally used as a primer or to make a primer), e.g., comprised of about 46-48% by weight acrylic polymer, less than about 0.05% by weight residual monomers, a maximum of about 0.1% by weight aqua ammonia, and about 52-54% by weight water. RHOPLEX AC-2235 or AC 2235C (preferred, conventionally used as a paint binder), e.g., comprised of about 46-47% by weight P(BA/MMA), less than about 0.05% by weight residual monomers, a maximum of about 0.1% by weight aqua ammonia, and about 53-54% by weight water. RHOPLEX AC-2507 (6-4993), e.g., comprised of about 45-47% by weight P(BA/MAA/MMA), less than about 0.05% by weight residual monomers, a maximum of about 0.2% by weight aqua ammonia, and about 53-55% by weight water. RHOPLEX AC-2612 (preferred), e.g., comprised of about 49-51% by weight acrylic polymer, less than about 0.05% by weight residual monomers, a maximum of about 0.2% by weight aqua ammonia, about 49-51% by weight water, and about 15-50 PPM (% by weight) Chloro-methyl-isothiazolone/Methyl-isothiazolone mixture. RHOPLEX AC-3001 (preferred, conventionally used as a paint binder), e.g., comprised of about 47-49% by weight acrylic polymer, less than about 0.05% by weight residual monomers, a maximum of about 0.1% by weight aqua ammonia, and about 51-53% by weight water. RHOPLEX NW-1715K or NW-1715, e.g., comprised of about 43-45% by weight acrylic copolymer, less than about 0.1% by weight individual residual monomers, a maximum of about 0.1% by weight ammonia, and about 55-57% by weight water. RHOPLEX NW-1845K or NW-1845, e.g., comprised of about 43-45% by weight acrylic polymer, less than about 0.05% by weight residual monomers, a maximum of about 0.1% by weight aqua ammonia, and about 55-57% by weight water. RHOPLEX HG-95P, e.g., comprised of about 46-47% by weight acrylic polymer, less than about 0.05% by weight residual monomers, a maximum of about 0.2% by weight aqua ammonia, and about 53-54% by weight water. RHOPLEX CS-4000, e.g., comprised of about 47-49% by weight acrylic polymer, less than about 0.05% by weight residual monomers, a maximum of about 0.1% by weight aqua ammonia, and about 51-53% by weight water. RHOPLEX WL-51, e.g., comprised of about 41-43% by weight acrylic polymer, less than about 0.05% by weight residual monomers, a maximum of about 0.1% by weight aqua ammonia, and about 57-59% by weight water. RHOPLEX WL-100, e.g., comprised of about 50-51% by weight styrene/acrylic copolymer, less than about 0.05% by weight residual monomers, a maximum of about 0.1% by weight aqua ammonia, and about 49-50% by weight water. RHOPLEX B-60A, e.g., with ACRYSOL G-111 added to modify it. MAINCOTE PR-71, e.g., comprised of about 50-51% by weight acrylic polymer, less than about 0.05% by weight residual monomers, a maximum of about 0.2% by weight aqua ammonia, and about 49-50% by weight water. LUCIDENE 604 emulsion, e.g., an acrylic copolymer that is compatible with alcohols and glycol ether solvents.

PARALOID A-10S (highly preferred), e.g., comprised of MMA polymer for instance in solution, or comprised of about 29-31% by weight acrylic polymer, about 69-71% by weight propylene glycol methyl ether acetate, and less than about 1.0% by weight residual monomers. PARALOID A-10S may for example have a molecular weight of about 70,000. PARALOID A-11 (preferred), e.g., comprised of MMA polymer and/or comprised of about 97-100% by weight acrylic polymer, less than about 0.1% by weight individual residual monomers, a maximum of about 1.5% by weight methyl methacrylate, and a maximum of about 1.5% by weight toluene. PARALOID A-101, e.g., comprised of about 39-41% by weight acrylic polymer, a maximum of about 1.5% by weight methyl methacrylate, and about 59-61% by weight methyl ethyl ketone. PARALOID B-48S, e.g., comprised of about 44-46% by weight acrylic polymer, a maximum of about 0.95% by weight individual residual monomers, and about 54-56% by weight toluene. PARALOID B-48N, e.g., comprised of MMA copolymer and/or comprised of about 98-100% by weight acrylic polymer, a maximum of about 0.5% residual monomers, and a maximum of about 1.0% by weight toluene. PARALOID A-646 (preferred), e.g., comprised of about 44-46% by weight acrylic polymer, a maximum of about 1.8% by weight methyl methacrylate, and about 52-54% by weight methyl ethyl ketone. PARALOID A-646 may for example have a molecular weight of about 40,000. PARALOID B-60 (preferred), e.g., is a MMA/BMA copolymer. PARALOID B-64 (preferred), e.g., is a MMA copolymer. PARALOID B-66 (preferred), e.g., is a MMA/BMA copolymer, and/or is comprised of about 98-100% by weight acrylic polymer, less than about 1.0% by weight individual residual monomers, and a maximum of about 0.7% by weight toluene. PARALOID B-66T, e.g., comprised of about 50-52% by weight acrylic polymer, a maximum of about 0.95% by weight individual residual monomers, and about 48-50% by weight toluene. PARALOID B-66X, e.g., comprised of about 51-53% by weight acrylic polymer, a maximum of about 1.5% by weight butyl methacrylate, about 40-41% by weight xylene, about 8-9% by weight ethylbenzene, and less than about 1.0% by weight individual acrylic monomers. PARALOID B-66 TBX, e.g., comprised of about 46-49% by weight acrylic polymer, about 24.5-26% by weight %-Butyl acetate, about 24.5-26% by weight Xylene, about 4-5% by weight ethylbenzene, a maximum of about 1.5% by weight Butyl methacrylate, and less than about 1.0% by weight individual residual monomers. PARALOID B-67 (preferred), e.g., comprised of IBMA polymer and/or comprised of about 98-100% by weight acrylic polymer, a maximum of about 0.95% by weight individual residual monomers, and a maximum of about 0.5% by weight toluene. PARALOID B-67 about 45% resin solution (preferred), e.g., comprised of IBMA polymer and/or comprised of about 44-46% by weight acrylic polymer, a maximum of about 2.0% by weight isobutyl methacrylate, about 48-49% by weight naphtha, about 5-6% by weight xylene, and about 1-2% by weight ethylbenzene. PARALOID B-67 MT resin solution (highly preferred), e.g., comprised of IBMA polymer and/or comprised of about 44-46% by weight acrylic polymer, a maximum of about 0.95% by weight isobutyl methacrylate, and about 54-56% by weight mineral spirits. PARALOID B-67 MT may for example have a molecular weight of about 30,000. PARALOID B-72, e.g., comprised of EMA copolymer and/or is comprised of ethylmethacrylate polymer resin and/or ethylmethacrylate copolymer, it may be UV resistant or non-yellowing, and it might, for instance, be mixed with ethyl acetate and pure alcohol, and/or it may be comprised of about 99-100% by weight acrylic polymer, a maximum of about 0.1% by weight individual residual monomers, and a maximum of about 0.8% by weight toluene. PARALOID B-82 (preferred), e.g., comprised of MMA copolymer and/or comprised of about 99-100% by weight acrylic polymer, less than about 0.2% by weight individual residual monomers, and a maximum of about 0.6% by weight toluene. In embodiments, it may be desirable to dilute PARALOID with an appropriate solvent, e.g., so that the PARALOID or the PARALOID mixture applies well onto the inventive image, the image support, or the mold. Refer to further information on PARALOID on the Rohm and Haas website provided above and more specifically to this address: http://coatings.rohmhaas.com/webrvr/Doc/0/ BTT1EPUKJ8MKB91NM9INLTUH21/BTT1EPU KJ8MKB9INM9INLTUH21.html.

In embodiments, the LIQUITEX acrylic polymer emulsion, CLEAR ACRYLIC GESSO by Liquitex Artists Materials of Piscataway, N.J. is used to make inventive images, and/or one or more of Golden Artist Colors' GAC acrylic emulsions (such as GAC 100 and/or GAC 200) are used to make inventive images. For example, one of these acrylic emulsions, a mixture of two or more of them, or a mixture containing at least one of them (e.g., any one of which may also contain one or more other acrylic emulsions, nanomaterials, other smart materials, and/or other ingredients) is applied onto an inventive image or a part thereof which may or may not have small surface irregularities, e.g., onto an image support that may be a stabilizer. In an illustration, CLEAR ACRYLIC GESSO might be mixed with an acrylic emulsion that is a). more transparent than it is, b). colorless, and/or c). that does not have any particles in it, (e.g., it is mixed with one or more kinds of RHOPLEX, and/or Golden Artists Colors' GAC acrylic emulsions). In another illustration, Golden's GAC 100, Golden's GAC 200, a mixture of GAC 100 and 200, or a mixture of one of these three choices and RHOPLEX is applied over an inventive image or part thereof which might or might not have small surface irregularities (such as an image support which may be a stabilizer), e.g., to function as a surface preparation stabilizer. In all of these examples, once it is hardened or dried, the acrylic emulsion or the mixture of acrylic emulsions might be superimposed, e.g., by art materials (such as painting materials like acrylic paints, oil paints, or encaustics; drawing materials like pastels, pencils charcoal or ink); by other inks, photographic emulsions, collage, printing, attachments, an underlayer, an adhesive, etc.

ELVACITE (highly preferred), LUCITE (preferred), DAIKON and/or PERSPEX by Lucite International of Cordova, Tenn. (formerly known as ICI Acrylics Inc.) may be used in embodiments of this invention with or without one or more nanomaterials or other smart materials such as any of the examples herein, refer to www.luciteinternational.com. For example, one of these products, or a mixture of two or more of them (such as a mixture of two or more kinds of ELVACITE) or a combination of these products might be used to make an inventive image or part thereof, such as an image support or part thereof, e.g., it might be a surface preparation stabilizer which might for example, bond to superimposed paints. These are more specific examples of ELVACITE for use in embodiments, listed by their grade numbers.

ELVACITE #2008C, #2009, #2010, #2021, #2021C, #2041, #2051, #2896, and #2914 (preferred) may all for example be comprised of methyl methacrylate. ELVACITE #2550 may all for example be comprised of methyl/n-Butyl methacrylate copolymer. ELVACITE #2014, #2669, #2895, #3001, #3003 and #3004 may all for example be comprised of methyl methacrylate copolymer. ELVACITE #2028 (preferred), e.g., comprised of methacrylate copolymer, it may have a molecular weight of about 59,000. ELVACITE #2042 and #2043 (preferred), e.g., comprised of ethyl methacrylate copolymer. ELVACITE #2044 (preferred), e.g., comprised of n-Butyl methacrylate. ELVACITE #2045 (preferred), e.g., comprised of Isobutyl methacrylate. ELVACITE #2046 (preferred), e.g., comprised of n-Butyl/Isobutyl methacrylate copolymer. ELVACITE #2552, e.g., comprised of methyl/lauryl methacrylate copolymer. ELVACITE #2697, #2823, #4018, #4021, #4028, and #4044, e.g., comprised of Methyl methacrylate/n-Butyl methacrylate copolymer. ELVACITE #4067 (preferred), e.g., comprised of n-Butyl methacrylate copolymer with Isobutyl methacrylate, and it may have a molecular weight of about 57,000. ELVACITE #1010, e.g., comprised of methyl methacrylate polymer with reactive vinyl end groups, and may have a molecular weight of about 4,000 to 10,000. ELVACITE #1020, e.g., comprised of methyl methacrylate polymer with reactive vinyl end groups, and it may have a molecular weight of about 12,000 to 15,000. ELVACITE #2008, e.g., may be comprised of methyl methacrylate or comprised of methyl methacrylate copolymer, and it may have a molecular weight of about 37,000, (this product has acid functionality that enables it to stick to things, it is used to make adhesives). ELVACITE #2013, e.g., comprised of methyl methacrylate/n-butyl methacrylate copolymer and it may have a molecular weight of about 34,000. ELVACITE #2016 (preferred), e.g., comprised of methyl/n-butyl methacrylate copolymer, and it may have a low molecular weight. ELVACITE #2614, e.g., comprised of methyl/n-butyl methacrylate copolymer, and it may have a low molecular weight. ELVACITE #2776, e.g., may be comprised of acrylic, or may be comprised of Butyl methacrylate copolymer, also it may have a molecular weight of about 16,000. ELVACITE #2927, e.g., comprised of acrylic or methyl/n-butyl methacrylate copolymer, and it may have a low molecular weight, or it may have a molecular weight of about 19,000. ELVACITE #3000 and #4026, e.g., both may be comprised of methyl methacrylate copolymer, and both may have low molecular weights.

Generic versions of the ingredients and compositions described herein in the form of brand name products (e.g., polymers and copolymers), and similar generic ingredients and compositions are often desirable or highly desirable for use in making inventive images. One or more nanomaterials and/or other smart materials might if desired, be used as desired in these inventive images too.

Among further examples of ingredients for making inventive images are these by Reichhold Inc. of Research Triangle Park and Durham, N.C. (refer to www.reichhold.com). One or more nanomaterials and/or other smart materials might if desired, be used as desired in these inventive images too. EPOTUF, e.g., epoxy resin dispersions, such as EPOTUF 37-147, e.g., comprised of Bisphenol-A epoxy resin supplied as a dispersion in water, for instance, at about 60% solids. POLYLITE, such as, POLYLITE 32032-00, e.g., acrylic modified clear casting resin containing methyl methacrylate. SPENKEL, e.g., SPENKEL F19-P-55 and F19-M-50 (product codes 14944-00/14943-00), e.g., oil modified polyurethane solutions. SPENSOL, (e.g., water dispersible polyurethane elastomer), such as SPENSOL L512 (product code 90230-00), e.g., comprised of urethane resin dispersed in a blend of: water (for instance about 75% by weight), n-methylpyrrolidone (for instance about 23% by weight) and amines (for instance about 2% by weight).

Additional ingredients for making inventive images or parts thereof (such as image supports or surface preparation stabilizers) are chlorinated polyolefins such as those by Eastman Chemical Co. of Kingsport, Tenn. (refer to www.eastman.com). One or more nanomaterials and/or other smart materials might if desired, be used as desired in these inventive images too. Examples are adhesion promoters such as: CP310W Waterborne Chlorinated Polyolefin Adhesion Promoter (e.g., water reducible, comprised of about 65-75% by weight water, about 22-25% by weight modified chlorinated polyolefin, about 5-7% by weight C12-C14 ethoxylated secondary alcohols, less than about 5% by weight chlorobenzene, and about 1-3% by weight ammonium hydroxide), and such as CP 730-1 Chlorinated Adhesion Promoter (e.g., in aromatic 100 or in xylene, for instance, comprised of modified chlorinated polyolefin, epoxidized oil, and chlorobenzene in aromatic 100 which might contain 1,2,4-trimethylbenzene, xylene, ethylbenzene and cumen). Further ingredients for making inventive images or parts thereof (such as image supports or surface preparation stabilizers) are products by NeoResins of Wilmington, Mass. (refer to www.neoresins.com). An example is NeoCryl® A-655 (e.g., comprised of about 52.4% by weight water, about 44.3% by weight acrylic polymer, about 1.2% by weight sodium lauryl sulfate, and about 0.9% by weight ammonia). In addition, ingredients for making inventive images are available from Esschem of Linwood, Pa. and Essington, Pa. (refer to www.esschem.com), from Scientific Polymer Products, Inc. of Ontario, N.Y., and from Monomer, Polymer and Dajac Lab in Feasterville, Pa.

SURFYNOL defoamers by Air Products in Allentown, Pa. might be used in embodiments to make inventive images (refer to www.airproducts.com), e.g., to control foam, soapiness, and bubbles in acrylic emulsions. Examples are SURFYNOL aacetylenic alcohol defoamers.

It is preferable the addition of one or more defoamers, UV light stabilizers, and/or other stabilizers into conventional image making materials made of acrylic emulsions (like acrylic paints, acrylic gels and acrylic gessos), are not the basis for designating the images made with them as inventive images when these added ingredients or similar defoamers, UV light stabilizers and/or other stabilizers are conventionally added into such conventional image making materials made of acrylic emulsions, e.g., it is desirable that these images have one or more other stabilizers and/or it is preferable that these conventional image making materials made of acrylic emulsions are not included into the calculation of the total polymer in these inventive images. Refer to U.S. Patent Application No. 20030035917-A1.

In embodiments, the Ciba Geigy stabilizer, TINUVIN 770 and/or 770DF is used along with TINUVIN 234 and/or TINUVIN 328 in cPRM which contains acrylic (which might for example be a solution of acrylic polymer like a PARALOID or ELVACITE, an acrylic emulsion, or polymerizing acrylic). For instance, the total amount of TINUVIN added into the cPRM might be between about 0.4% and 1.0% (measured by weight). The TINUVIN might prevent undesirable discoloration or deterioration of the polymer and/or it might block other inventive image part(s) from elements that might otherwise cause them to change undesirably, e.g., blocking UV light from reaching a part of the inventive image that is protected by the polymer image part that contains the stabilizer. As an illustration, TINUVIN 770 or 770DF might be added into the cPRM in an amount that is the same or almost the same as the amount of TINUVIN 234 or TINUVIN 328 added into the same cPRM. Even though the color stability of acrylic is known to be very good, in embodiments, it is often desirable to add such stabilizers to acrylics in inventive images.

In embodiments, the Ciba Geigy stabilizer, TINUVIN 234 is used in cPRM that contains polyester. For example, between about 0.4% and 1.0% TINUVIN 234 (measured by weight) might be added into cPRM containing polyester to prevent undesirable discoloration or deterioration of the polymer formed, as well as that of other inventive image parts it blocks.

One or more nanomaterials and/or other smart materials might if desired, be used as desired in the inventive images described in the paragraphs above and below. In embodiments it is desirable to make inventive images using one or more ACRYLITE® OP3 acrylics by Cyro Industries of Rockawy, N.J. (refer to www.cyro.com) because ACRYLITE® OP3 has enhanced light and color stability due to stabilizers that are in it, and perhaps other enhancements to permanence as well. ACRYLITE® OP3 might for example be made with about 0-0.5% by weight ethyl acrylate. For example sheets of ACRYLITE® OP3 are preferred for use as image supports that might be stabilizers. One or more nanomaterials and/or other smart materials might if desired, be used as desired in these inventive images too, e.g., on its image support. In an illustration, inventive images or parts thereof are made using one or more of the ingredients listed as (a)-(x) below, with or without other ingredients. For example, one or more of the ingredients listed below might be used to make an image support (e.g., stabilizer), a surface preparation stabilizer, bonding spots, a Clarifying Imprimatura, a Separating Layer, or another image part. Those ingredients in the list below that are mixtures might for example have their added ingredient or ingredients (collectively) mixed into them at a percentage that is between about 0.75%-35%, more desirably between about 1.5% and 30%, more desirably between about 3% and 25%, more preferably between about 3% and 20%, most preferably between about 3% and 16%, most preferably between about 3% and 12%, and most desirably between about 3% and 9%. (All measurements in this illustration are by weight.)

(a) Paraloid ATOS (highly preferred);

(b) Paraloid A-10S with a percentage of an added conventional acrylic emulsion mixed into it such as these examples: Golden's GAC 200, GAC 100, GAC 500, RHOPLEX AC-261, RHOPLEX AC-264, RHOPLEX AC-347, RHOPLEX AC-2235C, RHOPLEX AC-3001, RHOPLEX AC-337N, RHOPLEX B-60A, RHOPLEX 6038A, LUCIDENE 604, Golden's Regular Clear Gel or a mixture of two or more of these, e.g., added at about the proportions given above or at about 10%;

(c) Paraloid A-11 or Paraloid A-11 in MEK (methyl ethyl ketone) (preferred, e.g., about 30% by weight in MEK);

(d) Paraloid A-101 diluted with MEK (preferred), e.g., diluted to about 30 weight % or less such as about 15 weight percent;

(e) Paraloid A-101 diluted with chloroform, (f) Paraloid A-101 diluted with chloroform with a percentage of an added conventional acrylic emulsion mixed into it such as the examples given above, e.g., added at about the proportions given above or at about 10%;

(g) Paraloid B-60 in MEK (e.g., about 30% by weight in MEK);

(h) Paraloid B-66 in MEK (preferred, e.g., about 30% by weight in MEK);

(i) Paraloid B-66 in chloroform (e.g., about 13.33% by weight in chloroform);

(j) Paraloid B-67MT (highly preferred);

(k) Paraloid B-67MT with a percentage of an added conventional acrylic emulsion mixed into it such as the examples given above, e.g., added at about the proportions given above or at about 10%;

(l) Paraloid B-72 solution in chloroform;

(m) Paraloid B-72 with a percentage of an added conventional acrylic emulsion mixed into it such as the examples given above, e.g., added at about the proportions given above;

(n) Paraloid B-82 or Paraloid B-82 in MEK (preferred, such as about 30% by weight in MEK);

(o) Golden's Hard MSA Varnish, or Golden's MSA Varnish with UVLS (glossy, satin, matte or a mixture of these); or a mixture of any of these in any proportions (all preferred);

(p) NeoCryl A-655 in 2-butoxyethanol, e.g., adding the NeoCryl at about 50%, more preferably at about 40%, and more desirably at about 30%;

(q) Elvacite, a low molecular weight Elvacite, or an Elvacite in MEK (all of these are preferred, e.g., about 23% or about 30% or Elvacite in MEK, such as Elvacite 2028, 2044, 2045, 2046, 4067, or other Elvacites specifically named herein);

(r) Elvacite 4067 in solution with p-xylene with CP 310W, e.g., added at about the proportions given above or at about 10%;

(s) SPENSOL L512 (preferred);

(t) Golden's GAC 500, Golden's GAC 200 or a mixture of these;

(u) a low molecular weight polymer or copolymer, e.g., with molecular weight of 50,000 or less, more preferably of 35,000 or less and most preferably of 25,000 or less;

(v) generic versions of the ingredients or compositions in the brand name products listed above or similar generic ingredients or compositions;

(w) a mixture of two or more of these; and/or (x) one or more nanomaterials and/or other smart materials. For example, the ingredients in the list above might be superimposed on inventive image surfaces, on inventive image parts, or on image supports (e.g., stabilizers) that are made of: i). acrylic, ii). Acrylite® OP3, iii). a mixture containing acrylic with at least one light stabilizer, color stabilizer or UV light stabilizer, iv). another mixture containing acrylic, v). at least one nanomaterial or other smart material, vi). an inventive image or image support surface that is cleaned and/or sanded, sandblasted or abraded in another way prior to being superimposed, e.g., using one or more methods described herein and/or in U.S. Patent Application No. 20030035917-A1. On inventive image surfaces, the ingredients list above might, for example, be superimposed (e.g., as surface preparation stabilizers), by acrylic based substances (such as conventional acrylic paints and painting mediums), by conventional oil paints, or by other conventional art materials. If desired, these inventive images might be further processed, for example using any process or processes described in U.S. Patent Application No. 20030035917-A1 such as additive and/or subtractive processes.

In embodiments, inventive images or part thereof such as image supports (e.g., stabilizers) are made of at least three superimposed layers. The two outer layers are made of one or more polymers chosen for their stability, permanence, optical properties, aesthetic properties and their ability to be further processed if desired (e.g., their ability to bond to superimpositions). For example, the outer layers might be made of acrylic, preferably with added stabilizer(s) to prevent discoloration and/or deterioration such as a UV light stabilizer, a UV light absorber and/or other such stabilizers described in U.S. Patent Application No. 20030035917-A1. If desired, one or more nanomaterials might be added also, such as nanomaterials that enhance or enable bonding, desirable surface properties, permanence, strength, and/or any of the other properties described herein. The middle layer is selected to give strength and structural support to the form, e.g., a large thin sheet of acrylic will sag and flop thus a central layer of a material that gives strength and support can enable the image's form to remain thin even though it may be large. It is generally desirable for this central layer to have a stabilizer to prevent discoloration and deterioration also, e.g., a UV light stabilizer, a UV light absorber and/or other such stabilizers described in U.S. Patent Application No. 20030035917-A1.

Thus, in one example, an inventive image or an image support (e.g., stabilizer) might be made with a central layer of polycarbonate, of polycarbonate/acrylic, of nanomaterials, of a nanocomposite, of a polymer nanocomposite, of CNT or SWNT, of a polymer SWNT nanocomposite, of graphene, of buckypaper, of nanofiber, of nanowire, of nanocable, of nanofabric, of other examples provided herein, etc. For instance, it might have three layers (e.g., all thin layers), all of which preferably have one or more nanomaterials or other stabilizers to prevent discoloration, deterioration and other changes over time. The two outer layers might both be acrylic and the central layer might be any of the examples above or herein or another strong polymer. In a second example, the central strengthening and supportive layer is made using nanomaterials, such as CNTs, a nanocomposite, a polymer nanocomposite, a CNT polymer nanocomposite, a hybrid polymer nanomaterial, graphene, buckypaper, and/or any of the examples provided herein In embodiments, inventive images are made using a mixture of polyethylenenapthalate and polyester PEN/PET, which might be colorless and transparent and which might also have nanomaterials.

In embodiments, TYVEK by DuPont is used in inventive images with or without nanomaterials and/or other smart materials (refer to www.Dupont.com). In an example, a TYVEK image support is used to make an inventive image, e.g., it is superimposed by one or more applications of polymer, by a surface preparation stabilizer and/or by conventional art materials such as paints, inks, photographic emulsions, collage, drawing materials, etc. According to DuPont, TYVEK may for example be very fine polyethylene fibers bonded by heat and pressure, e.g., polyethylene fibers about seven times thinner than human hair spun in a random pattern.

In embodiments, a polymer inventive image surface that may have nanomaterials or other smart materials is corona treated. A corona treatment might also be called a corona discharge treatment. This may for example be an inventive image surface, the surface of an image support (that may be a stabilizer), or a part of one of these. In examples, such a corona treatment enhances and/or enables bonding of the polymer surface to superimpositions such as to adhesives and colorants (like inks, paints, coatings, etc.). In examples like TYVEK, such a corona treatment increases surface wettability, as measured by its improved surface tension, e.g., facilitating its use with flexo, letterpress, offset and digital presses. Moreover, the corona treatment on examples like TYVEK lasts over 20 years. Inventive image surfaces might, for instance be corona treated in a process like that used to treat TYVEK, or in a related process.

In embodiments, inventive images or parts thereof such as image supports (e.g, stabilizers) that will or might be subsequently superimposed are made in one or more of these three ways.

(a) They are made without ingredients that will or may inhibit or weaken their bond to one or more superimpositions that will or might be subsequently made upon them.

(b) They are made with a minimum of ingredients that will or may inhibit or weaken their bond to one or more superimpositions that will or might be subsequently made upon them.

(c) They are made with ingredients that will or may inhibit or weaken their bond to one or more superimpositions that will or might be subsequently made upon them located in places in which they will or they might have the least possible adverse effect on their bond to one or more superimpositions that will or might be subsequently made upon them.

Examples of ingredients that will or might inhibit or weaken the bond between inventive images and superimpositions made upon them are: plasticizers, release agents, surfactants, and/or other ingredients. These embodiments might for example, enhance the permanence of inventive images made with applications of conventional art materials (like paints, inks, photographic emulsions, and drawing materials), other colorants, other marking materials, surface preparation stabilizers, underlayers, electroactive materials or layers, polymer or applications containing polymer, adhesives, coatings, OLEDs, other light sources, and/or other examples of superimpositions for use on inventive images mentioned in U.S. Patent Application No. 20030035917-A1.

In embodiments it is desirable to clean inventive image surfaces using any method or methods prior to superimposing and/or bonding them to other ingredients or applications to enhance the permanence of these inventive images or to try to accomplish this. For example, prior to being superimposed or bonded, inventive image surfaces are preferably thoroughly and entirely cleaned or at least partially cleaned one or more times with one or more:

(a) degreasing and/or household cleaning materials, like Formula 409® by The Clorox Co. in Oakland, Calif. which might be used with a paper towel, e.g, and repeated two or three times.

(b) scrubbing using acetone, for example, with a lint-free Kimwipe® by Kimberly-Clark of Roswell, Ga., e.g, and repeated two or three times.

(c) scrubbing using methanol, for example, with a lint-free Kimwipe®, e.g, and repeated two or three times.

(d) scrubbing using isopropanol for example, with a lint-free Kimwipe® that might be soaked in isopropanol, e.g, and repeated twice to eliminate cloudiness that might for instance, have been caused by acetone.

In examples two, more than two, or all of the steps above marked (a)-(d) are done, preferably in the order in which they appear, to clean a polymer inventive image surface or part thereof prior to superimposing it or bonding it. In examples one or more of the steps above are done to inventive image surfaces or parts thereof that have SSI or abrasions on them, such as those SSI created by sanding, sandblasting, beadblasting or another processes. In examples, the cleaning treatments described above are preferable done immediately prior to superimposing or bonding the inventive image surface. In examples, if an inventive image surface that has been cleaned as described above is left unattended for more than a few minutes, it might be re-cleaned with acetone, and then with isopropanol as described above, e.g., more than one time, such as two or three times. Examples of inventive images surfaces that might be cleaned using one of these processes are those made with acrylic or acrylic ingredients, and those polymer inventive image surfaces that are the surfaces of ready made, mass produced and/or pre-fabricated polymer products such as the surfaces of extruded or cast acrylic, polycarbonate or polyester sheets or cubes. As an illustration, such a cleaning process might be done on a ready made, mass produced, pre-fabricated sheet of acrylic, ACRYLITE®, ACRYLITE® FF or ACRYLITE® OP3 prior to superimposing it with a surface preparation stabilizer and/or with colorants or other marking materials.

In embodiments, an acid and/or a microbe is used to alter a polymer inventive image surface or a part thereof. This might for example, be done to create or fortify a bond with superimposed applications such as surface preparation stabilizers, paints, and/or other colorants. Examples of acids which might be used are: Acetic acid; Phenyl acetyl chloride; Cyanuric chloride; Sulfuric acid; Perchloric acid; Phosphoric acid; Thionyl chloride; and Phenyl hydrazine. In other embodiments, a method of bonding is used that relies upon a carboxyl group in the polymer surface and/or in the superimposed material, e.g., a superimposed colorant (like a paint), a surface preparation stabilizer, a primer or a gesso. In embodiments, a polymer image support is treated with acid, basic or oxidizing reagents or it is given a high voltage electrostatic treatment, e.g., in order to bond it to superimposed application(s). In an embodiment, the surface of an inventive image or a part thereof is given a plasma treatment, or a corona treatment. Such a treatment might for example, be done on a polymeric inventive image surface to enhance bonding with one or more subsequent superimpositions, such as subsequent applications like surface preparation stabilizers, paints, and/or other colorants. These treatments may integrate polar groups into inventive image surfaces without affecting their polymer foundations. Once plasma treatment or a corona treatment is done, it is desirable to superimpose the treated inventive image surface as quickly as possible.

In embodiments, inventive images surfaces are treated with one or more solvents or they are treated with a solvent/nonsolvent mixture that is comprised of at least one solvent and at least one nonsolvent. For example, such a treatment might roughen an inventive image's surface microscopically, e.g., to create a bond with a superimposition such a conventional art material, a paint, an ink, a pastel, an adhesive, a combination of these, etc. On an inventive image, such a treatment might not be visible or significantly visible to the unaided human eye.

In embodiments, the polymer surfaces of inventive images are treated with an antistatic agent, e.g., to minimize the buildup of static electricity. The antistatic treatment on these inventive image surfaces might, for instance be like or related to that used to treat other surfaces such as papers and TYVEK. In another example, the antistatic agent used to treat these inventive image surfaces might be comprised of a polymer that is conductive or semi conductive, or the antistatic treatment might contain such a polymer.

In embodiments, a machine, instrument or device is used to test the tensile strength of bonds in inventive images or parts thereof, such as to test the strength of the bond between layers of an inventive image, or an inventive image support. For example such tests might be done using an Instron made by Instron Corporation of Canton, Mass. (refer to www.instron.com). In embodiments, inventive images or parts thereof are tested for their ability to endure humidity, temperature, and ultraviolet light. For example, such tests might be done in a QUV Accelerated Weathering machine by Q-Panel Lab Products of Cleveland, Ohio (refer to www.q-panel.com).

In embodiments, polymer is formed using pressure or compression methods. For example, refer to "Low temperature processing of 'baroplastics' by pressure-induced flow" Nature, volume 426, p. 424, 27 Nov. 2003.

Many companies named in U.S. Patent Application No. 20030035917-A1 have set up sites on the Internet. Refer to these websites for additional and updated information about their products and processes for use in making inventive images. For example, Bayer's MAKROLON polycarbonate products can be reviewed at www.sheffieldplastics.com and General Electric's LEXAN polycarbonate products can be reviewed at www.gepolymershapes.com.

Examples of the technologies, materials, nanomaterials and processes described herein and in U.S. Patent Application No. 20030035917-A1, for making inventive images will change, be modified, become more sophisticated, be made in new variations, and/or be further developed for products and uses that are not images, e.g, smart cards, various kinds of displays, etc. These changes and variations may be used in inventive images and they might be preferable. As specific example, all nanomaterials and all methods and tools of nanotechnology may be used to make inventive images, even further developments and improvements to them.

Smart inventive images may have one or more of their features from their use of nanomaterials, nanotechnology, responsive or absorbent polymers, photochromic effects, electroactive effects; e-materials, electrochromic systems, from motors, devices, machines, systems, sensors, or communication devices made with nanotechnology; and/or from other embodiments herein, in U.S. Patent Application No. 20030035917-A1, or in other examples.

Smart inventive images might be further processed, as desired, refer to examples herein and in U.S. Patent Application No. 20030035917-A1. As examples, a smart visual or optical effect might be an underlayer (e.g., as underpainting or underdrawing, or it might switch from being a ground to being an imprimatura); additions might be made to smart inventive images, such as any described herein (e.g., sensors, a device, a colorant, etc.); smart inventive images may be programmed or reprogrammed; and the aesthetic properties of smart inventive images may change.

Smart inventive images may or may not have utilitarian functions. Examples of those with utilitarian functions are smart inventive images that: (a) emit light, (b) provide information and/or enable communication, e.g., by their changing display of light and/or color, by Internet connection or via a wireless network, etc.; (c) moderate the temperature of the space or room around them; (d) by their enhanced strength (e.g., smart inventive images that are structural forms, an inventive image painting, drawing, print, sculpture or mural made with nanotubes or other nanotechnology that gives it the strength to be a structural element for instance, enabling it to function as a chair, wall, floor or ceiling, or part of these) (e) smart inventive image works of utilitarian fine art, design and architecture, etc.

These references offer examples of sources, processes, materials, compositions, information, and complimentary and related materials for use in making inventive images. Refer to: Proceedings from SPIE: The International Society for Optical Engineering on the subjects of nanotechnology and/or smart materials, structures and/or systems, published regularly in print, online (www.SPIE.org), and in other forms like CD Roms, refer to past, present and future issues, e.g., "Building Smart Materials using Carbon Nanotubes" by Jain, Kang, Yeo-Heung, He, Pammi, Muskin, Narsinhadevara, Hurd, Schulz, Chase, Subramaniam, Shanov, Boerio, Shi, Gilliland, Mast and Sloan, published in Proceedings from SPIE Vol 5389, p 167-175, Smart Structures and Materials 2004: Smart Electronics, MEMS, BioMEMS, and Nanotechnology; Vijay K. Varadan ed., July 2004. Refer to the *Encyclopedia of Smart Materials*, Volumes 1-2, edited by: Schwartz, MeI 2002 and updated versions, John Wiley & Sons. Refer to the journal "Smart Materials and Structures", from the Institute of Physics Publishing, Bristol UK and New York American Institute of Physics, refer to journal issues dating from 1992 to the present as well as future issues. Refer to *Nanoengineering Of Structural, Functional And Smart Materials* by M. J. Schulz, A. Kelkar (editor), Mannur J. Sundaresan (editor), CRC Press (Apr. 26, 2005); refer to *Smart Structures: Analysis and Design*, by A. V. Srinivasan, D. Michael McFarland Cambridge University Press; 1st edition (Jan. 15, 2000) as well as future editions; and refer to Smart Materials: Emerging Markets for Intelligent Gels, Ceramics, Alloys, and Polymers by John Wiley, published by John Wiley & Sons Inc (Nov. 30, 1999). Further examples are described in publications by companies like Hoover's, Inc. of Austin, Tex. and at www.hoovers.com or www.hoovers.com/global/corp/index.xhtml, for instance, Hoover's offers lists of nanotechnology companies which offer nanomaterials, technology and/or services that may be useful for making inventive images.

Additional Examples

In an illustration, the light emitted by one or more OLEDs in an inventive image might serve as part of its composition and/or design, e.g., as an underlayer, an imprimatura, a ground, underdrawing or underpainting made of light, to show certain subject matter or color, in selected part(s) of this inventive image, as a backlight, for linear elements, and/or as another kind of compositional element. This light might for instance, be emitted from part of the inventive image that is transparent, translucent and/or opaque, and it might be graduated, it might appear to model form, it might be monochromatic or multicolored; its color or colors might change over time at any rate or at different rates; this light might be linear, spatial or both in different areas; and/or this light might have any other variations. Also, beneath, on or over this inventive image's OLED or OLEDs, the emitted light might be altered such as by carving, incised marks, printing, painting, drawing, collage, other attachments or parts, a layer that is fully or partially colored and transparent or translucent, a layer of polymer, texture, sculpted form, photography, prisms, lenses, photochromic or electrochromic effects, dichroic effects, effects from nanomaterials, other materials or variations that create light effects, and/or other variations.

In embodiments, OLEDs which are inventive images or parts thereof may emit light from one side only, from the other side only, or from both sides (they may be transparent, translucent and/or opaque). In inventive images, OLEDs might even be made to emit light from three or more sides and/or angles, or in three or more directions, e.g., the OLED has a textured form, an undulating or curved form, a volumetric form, and/or a three dimensional form. Moreover, the light emitted by such OLEDs might give these inventive images a different pattern, design or compositional element on two or more of their sides or angles, on all of their sides or angles, or as a viewer sees their rounded or curving form. Thus for example, an inventive image might look different as the viewer sees it from different vantages, e.g., as the viewer walks around it or turns it, or as the inventive image spins or moves. Such visual effects might for example, be created in inventive images using TOLEDs (transparent OLEDs from Universal Display Corp. described above). These same visual effects might be created in inventive images using small molecule OLEDs from other companies, using polymer LEDs, using hybrid OLEDs, and/or using other light sources. Similar effects might be created in inventive images using other light sources, e-materials which are not light emitting, etc.

In an illustration, an inventive image made with one or more OLEDs, the light of which creates the form of a fish in colors and patterns that are different on different sides of the inventive image. This might for example, be a thin planar, rectangular inventive image that is partially illuminated to show the fish. It might be a planar or a volumetric inventive image in the shape of a fish that is completely illuminated with different colors or patterns on two or more sides, or all of the way around its form. Or, it might be a volumetric inventive image with some or all of its illumination, visible deep within its form (rather than on or near its surfaces). Alternately, a similar inventive image might be made using one or more other kinds of light sources, paint-on LCDs, e-materials which do not emit light, etc.

In another illustration, an inventive image made of one or more OLEDs shows fish swimming with a changing display of light and color. This inventive image may have any dimensions. It may for example, be large, it might be planar, flat, undulating, curved, and/or volumetric. The fish might be shown swimming in any configuration that covers the expanse of the inventive image's dimensions, e.g., the fish may be shown swimming from one side of the inventive image to its reverse side, around the inventive image, and/or through its width or depth, etc. The inventive image in this illustration might be a painting, mural (indoor or outdoor), sculpture, table, partition, wall, window, textile, etc. A similar inventive image might be made using one or more other kinds of light sources, e-materials that do not emit light, paint-on LCDs, etc.

In examples, the color and/or light of an inventive image or part thereof might be changed or dramatically changed in response to a trigger, stimulant or influence in such a way that its design or composition is significantly or dramatically changed. For example, an inventive image which is predominately dark blue might be changed or switched so that it is predominately light blue or red; an inventive image with a blue sky might be changed so that its sky is gray, white, pink and/or red; a brightly illuminated inventive image might dim to a low glow; the ability to see through an inventive image or part thereof might change (e.g., from transparent to opaque or the reverse; from translucent to transparent, etc.); etc. The changes in such inventive images might significantly affect their composition, subject matter, content, meaning, aesthetic, and/or other formal elements. The changes in such inventive images might also significantly affect the aesthetic of the surrounding area or room, e.g., these inventive images might be walls, large paintings, ceilings, murals, large tables, wearable images, clothing, etc. The mood of the inventive images and/or their environments may change or dramatically change, e.g., from cheerful to pensive, from a joyous mood to gloom, from a spring feeling to a winter feeling, etc.

Examples of the triggers, stimulants or influences that might be used to change or switch such inventive images are: voice command; movement recognition, touch controls; changes in the inventive images' environment (such as sensors that detect changes in light, humidity, temperature, sound, etc.); commands preprogrammed in these inventive images or that come to it via the Internet or via wireless communications; electricity (the images may be electrochromatic or have electrochromatic systems), and/or other triggers, stimulants or influences. The inventive images of this example may for instance, be made with one or more OLEDs, responsive or absorbent polymers; conductive polymers; reflective displays, paint-on LCD, e-materials, nanomaterials, PCMs, solar cells, etc.

In an illustration, a series of transparent, translucent and/or opaque, planar inventive images are made that have realistic and/or abstract subject matter pertaining to light and/or to nature, such as subject matter pertaining to natural light, landscapes with light, celestial light, light in scenes of the universe, light streaming through forms; scenes of the horizon, of dawn, sunset or the aura borealis; etc. These inventive images may have light and/or color that is emitted, that is reflected, that is constant and/or that changes over time. Light in these inventive images might change according to external elements such as according to the time of day, the sound of viewers, the use of touch controls, movement recognition, etc. These inventive images may for example be paintings, sculptures, textiles, clothes, murals (indoor or outdoor, for example, on the side of a building), ceilings, walls, screens, windows, doors, etc. Such inventive images might for example, be made with OLEDs, reflective displays, e-materials, conductive ink, conductive polymers, paint-on LCDs, other means of changing light and/or coloration, PCMs, nanomaterials (e.g., for strength, for conductivity, for light, in sensors, etc.), batteries, photovoltaics, etc.

In another example, transparent, translucent and/or opaque inventive images show realistic forms and/or scenes changing over time. However, the rate of their change may or may not be realistic, normal or ordinary, and aspects of the realistic forms in these inventive images might be tunable or modifiable as desired (such as by viewers, by touch controls, by sound activation, by preprogramming; by remote, Internet or wireless control of any kind; or activated by changes in light). For instance, such inventive images might show plants growing or flowers blooming faster than they would in reality, they might show a rain storm that lasts as long as the viewer desires, a waterfall on whatever kind of day or night desired, waves that are as high and as calm or as rough as desired that hit a beach at a rate and at the time of day desired, breezes of the kind desired moving through a forest which is as lush and as full of animals as desired, etc. Such inventive images might for example, be made with OLEDs, other light sources, reflective displays, e-materials, CLC, conductive polymers, conductive ink, paint-on LCDs, PCMs, transistors, batteries, nanomaterials (e.g., for strength, for conductivity, for light, for sensors, etc.), computers, touch or sound activated controls, sensors, sound effects, photovoltaics or solar cells, etc. They may for example be paintings, sculptures, textiles, clothes, murals (indoor or outdoor, for example, on the side of a building), ceilings, walls, screens, windows, doors, etc.

In examples, wearable inventive images or part thereof emit static or changing light, they have one or more OLEDs, reflective displays, e-materials, CLC displays, conductive polymers, and/or paint-on LCDs. (Refer to the descriptions of fibers, textiles and fabrics herein.) These inventive images typically serve utilitarian purposes, e.g., as clothing, jewelry, handbags, wearable accessories, etc. These may for example, be inventive images with OLEDs that are thin, sturdy, light weight and flexible. Such OLEDs may be different shapes and sizes, and they might have still or changing displays of color and light, as desired. In addition or instead, these inventive images might be made with nanomaterials; systems devices and/or machines made using nanotechnology; computers (nanoscale or larger), batteries, touch or voice controls, and/or other variations. As a more specific example, refer to the descriptions of Figure 38 below.

Any of the inventive images in the illustrations in the nine paragraphs above might be also have coloration and/or light effects from other ingredients, and/or they might have other variations, such as examples herein and/or in U.S. Patent Application No. 20030035917-A1.

In an illustration, inventive images are made that have sound such as music, random noise, and/or talking. For instance, such this might be programmed sound, music or other sound from a CD, a computer or a tape, they might be responsive and/or they might be interactive. Examples of such inventive images might talk in response to viewers or interactively with viewers, they might emit noise or music in response to light conditions or the activation of a device by touch or movement recognition, they might emit sound in response to sound in the environment around them, etc. For instance, a viewer might sit on an inventive image chair that plays music or speaks, an inventive image sculpture might interject comments into a conversation, an inventive image might tell a story (e.g., an inventive image book, light or mural), an inventive image might speak to viewers approaching, an inventive image might play music reflecting weather conditions, an inventive image might speak information, etc.

Further examples of such inventive images or part thereof might be shaped as or more or less shaped as human forms (such as an inventive image shaped: like a head, a head with shoulders, an entire human form, an oval, a sphere, a person in a chair, a torso with hands gesturing or knitting, shaped as a person against a scenic background like a landscape, shaped as a distorted human head, etc.). These inventive images might talk, for instance, stating something, telling a story, in a dialogue, talking to viewers, etc. Such inventive images might be made using materials and processes described herein or in U.S. Patent Application No. 20030035917-A1, such as conductive polymers, OLEDs, other light sources, e-materials, nanomaterials, CNTs, devices, machines, or systems (that are nanoscale or larger made using nanotechnology); sensors, computers, paint-on LCDs, PCMs, speakers, batteries, control devices, etc. In an example, an inventive image with one or more OLEDs and/or other light sources shows a woman's head using light and color. It shows her face with a moving or video-like image so that viewers see that she is talking which may be accompanied by the sound of her talking. On its reverse side, this inventive image might show the backside of the talking woman's head using light and color which unlike this inventive image's front side, and which may or may not change over time, e.g., it may stay constant or it might change over time at a rate that is different from the front side of the same inventive image that shows the woman's face. This inventive image of a woman's head might be planar or volumetric, and it might be two or three dimensional, e.g., it might be volumetric and shaped like a life-size woman's head with one or more OLEDs showing her head realistically all of the way around the form of the inventive image, or it may be an undulating plane distorting the head shape. This inventive image might respond to viewers, e.g., using sensors, using a computer, speakers, etc. For example, the woman in the inventive image might talk when viewers are present, she might respond to changes around her such as changes in light or temperature, she might talk when viewers push a button or activate other touch controls or other keys (e.g., on the inventive image, on a floor piece viewers inadvertently step upon, on a pad or keyboard, etc.), she might even be able to talk to viewers or respond to viewers.

In another example, inventive images made with OLEDs, with another light source, with nanomaterials, or with a combination of these may function as lighting. This lighting might not get hot, it might remain cool, and it might have any shade of white and/or any other color or colors desired. The forms and the functions of these inventive images may be completely integrated, or they may be as integrated as desired. For example, the light source in these inventive images may be totally integrated into their form and/or structure or part thereof (rather than a separate image part). Some examples of these inventive images are completely illuminated, and other examples are only partially lit, e.g., part of their form, their composition, or their design is illuminated. Such inventive images might be any size, and they might be two or three dimensional. They might for example, function as walls, ceilings, floors, table top objects, indoor or outdoor lighting, sculptures, paintings, murals (indoor or outdoor), coverings, textiles, chairs, doors, partitions and/or panels. The light emitted by these inventive images might be constant, or some or all of it might change over time at any rate of speed desired, even at a very fast video speed (like a film or television display). This light might present still and/or changing pictures or displays that might be of any resolution desired, even a very high resolution. The light emitted by these inventive images may or may not have realistic or abstract imagery, and/or text, e.g., it might be light of a single consistent color, or it might be light that presents images such as pictures of nature. Also, this light might be as bright or as dim as desired, and its brightness may or may not be the same throughout each of these inventive images, and/or over time, e.g., the inventive image might light up a darkened area or room, it might provide a glow of one or more levels of brightness, or it might have both of these kinds of light at different times and/or in different parts of the inventive image. The light emitted by these inventive images may be a smart feature. It may for example, be a display providing information (e.g., pictures and/or text such as from the Internet, from a program, or from another source), and/or responding to people and/or the environment (e.g., using sensors, a computer and/or using control devices). These inventive images may also have areas that are not illuminated which might be integrated into their design. The light emitted by these inventive images might be controlled in any way desired. It may for example be preprogrammed, and/or controlled by people viewing it.

The horizontal circular or oval plane shown in the inventive image in Figure 45 might be made with one or more transparent, translucent and/or opaque OLEDs, e-materials, nanomaterials or a combination of these. Because the OLED or OLEDs in its horizontal plane might emit all the light necessary, this inventive image might not have the light bulb marked i. The coloration shown on its horizontal plane may be OLED light, it may be other coloration, or both. This inventive image in Figure 45 might function as lighting such as for a room or area. Similarly, the inventive image shown in Figure 44 may be made with one or more transparent, translucent and/or opaque OLEDs e-materials, nanomaterials or a combination of these, without (or with) the light bulb marked i.

Light might be emitted using one or more OLEDs and/or one or more other light sources in the inventive images shown in Figures 1-4, 5.I.-5.VI., 5.IX.-5.X., 6, 7, 9-64, 66-68., 73., 77.-79., 82., and 84. The light emitted by these inventive images might for example, be of any description herein and/or in U.S. Patent Application No. 20030035917-A1, e.g., static, changing at any rate of speed, with one or more colors, from other kinds of LEDs, from EL lamps, in a form that is thin, in a form that is flexible, in any shape(s), modified by various methods and/or materials, such as a lens, reflective effects, and/or an added layer; controlled by various means such as by computer, by the viewer, by a remote or Internet control, etc. In addition, one or more of these inventive images might have a reflective display, e-materials, CLC, and/or a LCD that has been painted on. In addition or instead, one or more of these inventive images might have changing light and/or color created by other means described herein and/or in U.S. Patent Application No. 20030035917-A1. Among these inventive images, those made of layers might emit light from one or more of the layers or part thereof. In addition or instead, one or more of their layers or part thereof might have a reflective display, e-materials, CLC, and/or another means of having properties of light and/or color that change. These inventive images might also have any other variations, any other processing and/or any other effects described herein and/or in U.S. Patent Application No. 20030035917-A1. They might, for example, have nanomaterials (e.g., in machines, devices and/or systems like OLEDs, mounts, batteries, solar cells, etc.), batteries, solar cells, PCMs, photochromic effects, reflective effects; polymer that is conductive, absorbent, responsive, and/or electroactive; other effects of light or color, applications of conventional image making materials, voice activation, touch controls, etc. Those inventive images of these illustrations that emit light may or may not serve as lighting. The inventive images in these illustrations might be paintings, sculptures, murals, table tops, doors, walls, ceilings, partitions, textiles, or another form of art, design or architecture.

These are further examples. The inventive image shown from opposite sides in Figures 1.d.1. and 1.d.2. might emit light that is part of an opaque form in some areas of this inventive image and it might emit light that is part of a transparent form in other areas. Alternately, it might be an e-material that is transparent or that is opaque and double sided. The inventive image shown in Figure 5.X. might for example be any size, e.g., each of its colored dots of its form shown in the illustration, might be separate devices or forms, some or all of which might be light emitters (such as OLEDs, EL Lamps, other LEDs, etc.), and some of which might be other devices or forms that give the inventive image coloration (such as reflective displays, CLC, e-materials, absorbent polymer, light effects, a layer of polymer, a painted layer, other examples described herein and/or in U.S. Patent Application No. 20030035917-A1, etc.). The inventive image shown in Figure 6 might be a three dimensional form with a light emitter on its underside illuminating its faceted form to create light effects which might change as the illumination underneath it changes. Such an inventive image might be made of crystal and/or polymer, the strength and/or permanence of which is enhanced by nanomaterials like CNTs, such as in the form of a nanocomposite or hybrid nanomaterial.

In the illustration of the inventive image in Figure 10, one or more of the layers marked a. through e., or part of one or more of these layers might have at least one light emitter (such as an OLED) which might be transparent (e.g, a TOLED), translucent or opaque. The light emitter or the light emitters in this inventive image might emit light on one or on both of their sides. The layers of this inventive image which do not emit light might be transparent or translucent so that the light goes through them and they might have coloration and/or light effects, e.g., from iridescence, applications of conventional art materials such as paints, reflective effects, photochromic effects, e-materials, etc. Like the inventive image in Figure 10, the inventive image in Figure 12 might have one or more light emitters (such as OLEDs) in or as one or more of the layers shown in white in the illustration or part thereof. The light emitter or light emitters might be transparent (e.g, a TOLED), translucent or opaque, and they might emit light on one or both sides. The layers of this inventive image that do not emit light might be transparent, and they might have coloration and/or light effects.

The inventive images shown in Figures 16, 17 and 20 might each have an OLED or a reflective display as their central layer or central image support. In addition or instead, the inventive image Figure 17 might have OLED(s) and/or reflective display(s) in its partial outer layer shown in dark gray, and the inventive image in Figure 20 might have one or more OLEDs and/or reflective displays as its outer layer shown in white. The gray image supports shown in the three inventive images in Figures 22 and 23 might be light emitting from OLEDs and/or from any other light source described herein or in U.S. Patent Application No. 20030035917-A1. The internal layers of the inventive images in Figures 36 (which are made of multiple parts), and 43 (which have graduated color) might emit light using OLEDs.

The inventive images shown in Figures 38.k. and i. might, for example, be a bracelet and a necklace (respectively) with color and/or light effects (such as abstract or realistic imagery or text) that might be constant or that might change, e.g., changing in a progressive manner from one "bead" to the next. The cord or wire on this inventive image bracelet and this inventive image necklace might be made with nanomaterials and/or it might carry electricity, information, other transmissions, etc. (these cords or wires might be insulated such as with an external layer of non conductive polymer). The clasps on these inventive images might be connections (e.g., to turn the inventive image on when they are joined), and/or to enable these inventive images to operate in another way. Any of the inventive images in Figure 38 might be made so that their static or changing color(s) and/or light effects can be controlled and adjusted, as desired, e.g., the viewer, owner or wearer might make these inventive images blue one day and red the next.

In the inventive image in Figure 57, one or more of the layers marked a., b., c., and/or d. or part of one or more of these layers might have one or more OLEDs or other light sources. In addition or instead, the layer marked g might be an OLED or it might have an OLED on it. The curved forms of the inventive images shown in Figures 79.I., XI., XIII., and XVIII. might be or they might each have an OLED, a paint-on LED, an e-material, or one or more other light sources on them or within them. One or more layers or planes of the inventive images shown in Figures 79II.-IX. might be OLEDs (e.g., transparent or translucent OLEDs such as TOLEDs), or they might each have an OLED (e.g., a transparent or translucent OLED such as a TOLED), a paint on LED, or one or more other light sources on them or within them.

As further illustrations, the inventive images shown in Figures 2.I. and 2.II., might each be interpreted as showing a single inventive image that changes, at three different times (marked as stages a., b., and c.), from opposite sides (one side is marked 1., and the other side is marked 2.). Thus, for example, the same side of a single inventive image might be shown at different times in a.1., b.1., and c.1., in Figures 2.I. and in Figure 2.II., and the reverse side might be shown in a.2., b.2., and c.2. Figure 82 might show a single inventive image from two different sides marked I. and II. Or Figure 82 might show a single inventive image from a single side as it changes over time at two different stages marked I. and II. Figure 84 might show a single inventive image as it changes over time in three different stages marked I., II. and III. These inventive images might be made with one or more variations described herein and/or in U.S. Patent Application No. 20030035917-A1, such as these examples. Example 1). These inventive images may be made with one or more transparent, translucent, or opaque OLEDs, e.g., they may be made of a single transparent or translucent OLED. Thus, part of all of their color, shapes, lines and compositions, coloration might be created by emitted light. Example 2). These inventive images might be made with one or more reflective displays, such as e-materials, etc. Example 3). These inventive images might be made with one or more responsive polymers, polymer gels, hydrogels, absorbent polymers, EAPs, semi conductive polymers, and/or liquid crystal displays applied by painting. Example 4). Electrochromic systems. Example 5). These inventive images might be made with one or more other means for having its light and/or its color change over time. Example 6). These inventive images might have at least one other variation described herein and/or in U.S. Patent Application No. 20030035917-A1. Example 7). They might have a combination of any of these variations.

The change illustrated in these inventive images may occur at any rate and it may happen in any way, e.g., by preprogramming, initiated by an external trigger such as by a viewer, by a switch or touch control on these inventive images, by a change in light, by a transmitted signal (for example over the Internet or wireless communications), by the use of sensors, etc. The inventive images shown in these illustrations might be smart images, e.g., they change, they might be interactive or responsive, etc. These inventive images might have other processing such as color (from other pigments, dyes, light sources etc.); photovoltaics (such as solar cells which might produce electricity that they use for desirable purposes like OLEDs); thin film batteries; transistors; conductive inks; photochromic effects, etc. These inventive images might have any dimensions. They might be rigid or flexible, e.g., fabric or textile. These inventive images might or might not be made with nanomaterials and/or nanotechnology, e.g., in OLEDs, other light sources, batteries, sensors, solar cells, fibers, colorants, surfaces, in mounts or other means of display, to strengthen them, to enable them to be light in weight, less massive, slighter and/or thinner; for electrical and/or thermal conductivity, for visual and/or optical effects, in order to be interactive and/or responsive, for other purposes described herein, etc. These inventive images might be made with PCMs, for example, to enhance their stability, longevity and permanence, and/or to effect the temperature around the inventive image, refer to the description above. These inventive images might function as paintings, murals (indoor or outdoor, such as on the sides of buildings or as walls or partitions), walls, textiles, ceilings, floors, table tops, partitions, skylights, lighting, coverings, or a combination of these.

In examples, inventive images or parts thereof change from transparent and/or translucent to opaque. This might for example, be a change in inventive images from colorless and transparent and/or translucent, to colored and opaque. Such change might, for example, be programmed, and/or it might be triggered such as by the environment, using a touch control, and/or by viewers in another way. In addition to changing these inventive images aesthetically, such changes might change a utilitarian function, e.g., changing from a wall to a window, to a screen, or to a wall with a window; changing from a skylight to a ceiling or a part thereof; changing from bright light emission to a low glow of emitted light or to no emitted light, etc. Such changes can be valuable in inventive images. There is further description herein and/or in U.S. Patent Application No. 20030035917-A1, e.g., these inventive images might be made using light sources like transparent OLEDs, nanomaterials, photochromic or electroactive effects, absorbent or conductive polymer, etc.

In other examples, inventive images are made using nanomaterial-polymer composite or hybrid nanomaterials (such as the examples herein). These might be made with one or more different kinds of nanomaterials, for example, to provide these inventive images with different properties (such as one or more of the examples herein). Also, such a nanocomposite or hybrid nanomaterial might be made with one or more different polymers, e.g., for different properties. Polymer used might for instance, be a polycarbonate, another strong polymer, a semi conductive or conductive polymer, an absorbent polymer, the polymer might be chosen for its optical and/or other aesthetic properties (such as its ability to bond to superimposed applications as desired, or its color or light properties), PMMA, a Paraloid or Elvacite product or a generic polymer that is the same or similar to these, other polymer(s) mentioned herein or in U.S. Patent Application No. 20030035917-A1, or a combination of polymers. These inventive images might be transparent, translucent and/or opaque, and they may be colored and/or colorless. Examples of these inventive images have aesthetic variations, e.g., from colorants, OLEDs, EL lamps, electrochromatic or photochromatic effects, other effects of light and/or color which may be constant or changing at any rate of speed; texture; interactive or responsive features, devices, displays or systems; superimposed applications (e.g., painting, photography, drawing, printing, writing, etc.); lenses, prisms, other light effects, and/or other aesthetic variations described herein and/or in U.S. Patent Application No. 20030035917-A1. These inventive images might also have PCMs, photovoltaics (such as solar cells), batteries, etc. Inventive images of these examples might be paintings, murals, sculptures, constructions, lighting, walls, stairways, doors, tables, chairs, textiles, floors, partitions, screens, ceilings, columns, other structural forms, etc. Inventive images of these examples, particularly those that are transparent and/or translucent, might have an aesthetic of light and space, a sense of weightlessness, a sense of defying gravity, a sense of dematerializing form, an ethereal sense, or any other the other aesthetics that are associated with the aesthetic of light and space (refer to U.S. Patent Application No. 20030035917-A1). Moreover, the nanomaterial polymer composite or hybrid nanomaterial used to make them might enable these inventive images to have these aesthetic qualities to a greater extent than conventional images, e.g., because these inventive images can be very strong while being slighter in form and lighter in weight than comparable conventional images, because these inventive images might be transparent or translucent, and because the nanomaterials used to impart such properties to these inventive images can be invisible to the normal human eye as part of these inventive images. In addition, this aesthetic might also be enhanced if other variations are used, such as those described herein and/or in U.S. Patent Application No. 20030035917-A1, e.g., the use of emitted light (e.g., by OLEDs and/or other light sources), the use of other light effects, negative spaces, integrated circuits, etc.

Figures 1-86 show inventive images that might be made with and/or further processed with nanomaterials. These inventive images may have polymer nanocomposite or hybrid nanomaterials and/or they may be further processed with them. In addition or instead, these inventive images may have nanomaterials in other forms and/or they may be further processed with them. They might for example, be made or further processed with sensors made with nanomaterials, light sources (like OLEDs) made with nanomaterials, photovoltaics or solar cells made with nanomaterials, batteries made with nanomaterials, computers made with nanomaterials, other machines or devices made with nanomaterials, nanosystems, nanofibers, nanowires, colorants or surface players made with nanomaterials, mounts or other means of display made with nanomaterials, other examples of nanomaterials provided herein, and/or other nanomaterials. The nanomaterials might enhance or impart any of a wide range of desirable properties to the inventive images shown in Figures 1-86, such as: strength, rigidity, resilience (such as against shocks), other aspects of enhanced stability or permanence, electrical and/or thermal conductivity, the ability to moderate heat, light properties, bonding properties, the ability to self repair; functionality from small or nanoscale nanomaterials which do not have to be visible in these inventive images, computer functionality, an aesthetic of light and space, other properties provided in examples herein, and/or other desirable properties.

In an illustration, a staircase, crosswalk or bridge might be made of polymer of the present invention, and/or nanomaterials (refer to U.S. Patent Application No. 20030035917-A1 and to Figure 14.V.). Such an inventive image staircase, cross walk or bridge might, for example, be stronger, more durable, less fragile, more resilient, tougher, more wear resistant, and/or more permanent than comparable ones made of glass (such as the grand glass staircase in the center of the Apple Store Soho, at 103 Prince Street in NY, N.Y.; the glass cross walk which is upstairs in the same Apple Store Soho; and the glass staircase at the entrance of the Brooklyn Museum in Brooklyn, N.Y.). Moreover, the range of aesthetic variations that such an inventive image staircase, cross walk or bridge might be made with are much more extensive than the range of aesthetic variations offered by conventional practices.

Such an inventive image staircase, cross walk and bridge might, for example, be made or partially made of a strong polymer (such as polycarbonate), of multiple different kinds of strong polymer, they might be made of a polymer or of a mixture of polymers that is almost as strong, as strong or stronger than steel (refer to the descriptions above), and/or they might be made using one or more nanomaterial polymer composites or hybrid nanomaterials. Such an inventive image staircase, cross walk and bridge might have glass or crystal with nanomaterials in a composite or hybrid nanomaterial, e.g., the nanomaterials might enhance or substantially enhance the strength and permanence of the glass or crystal. For example such an inventive image staircase, cross walk and bridge might be made of nanomaterial polymer composites or hybrid nanomaterials that have nanotubes, CNTs, nanowires, nanofibers, nanofabric, SWNT, boron nitride nanotubes, nanowires, molybdenum based nanocrystals or Mo—C—O nanocrystals, buckytubes, metal nanocrystals, other nanocrystals, super tough nanoscale films of crystalline carbon, buckypaper, and/or other nanomaterials. As described above, because the strength to weight ratio and because the strength to size ratio of nanomaterial polymer composites or hybrid nanomaterials is different from that of conventional materials (like glass made without nanomaterials), inventive images made with these nanomaterials like the staircase, cross walk and bridge in this illustration, might be made with great strength, they might require less reinforcement or no reinforcement from other materials (e.g., from materials like steel or other metals), they might be slighter in form, less massive, thinner and/or lighter in weight than comparable conventional materials, and their nanomaterials may or may not be visible. Such inventive images like those in these examples might be transparent translucent and/or opaque, as desired. Part or all of them may or may not emit light that might be static or changing, that might be in one or more color(s), as text and/or as imagery that is realistic and/or abstract; in a video form, in forms from the Internet, from a computer, from a television, etc. These inventive images might for example have one or more OLEDs, e-materials, holographic displays, other effects of light or color, or other examples herein. Part or all of these inventive images may or may not be interactive and/or responsive to viewers and/or to the environment, such as changing colors, changing light effects, or making sound (e.g., music or talking) as viewers walk on them or as the ambient light changes. Such an inventive image staircase, cross walk, or bridge might use any of the vast array of other aesthetic variations offered by the present invention. Refer to examples of aesthetic variations herein and in U.S. Patent Application No. 20030035917-A1.

In examples, nanomaterials might be used to make inventive images in the forms of or in forms that are similar to conventional images made in conventional metal(s) which rely on the strength or tensile strength of the metal, e.g., for their form, for their structure, for their balance, for their ability to support other parts, for connections, joints, or bonds between parts, etc. For example, inventive images might be made using nanomaterials in the forms of or in forms similar to those made in conventional steel by the American artist, Richard Serra, which rely on the strength of steel for their forms, their structure and their balance, and perhaps for other elements. Inventive images made using nanomaterials in these forms might rely on the strength of their material in the same manner or in a similar manner, yet the medium of the present invention offers a wide range of new options.

The inventive images of this example might be made using just nanomaterials. They might be made using nanomaterial metal composites or hybrid nanomaterials. They might look like Serra's steel images and/or they might be made with steel. They might be made using nanomaterial polymer composites or hybrid nanomaterials, or, another kind of nanomaterial composite or hybrid nanomaterial, such as the others described herein. Nanomaterials might enable inventive images of this example to be stronger or substantially stronger than conventional steel. Thus, these inventive images might be stable yet have less mass, and/or they might be thinner and/or lighter in weight than Serra's images. Although these inventive images made with nanomaterials might be opaque, in addition or alternately they might be transparent and/or translucent, and they might be colored as desired, e.g., they might have any of an array of effects of light and color. Moreover, unlike Serra's images these inventive images might have light and/or coloration (such as emitted light) that is static or changing, and/or these inventive images might be interactive, responsive, and they might change over time in a variety of different ways. Unlike Serra's images, these inventive images might have any other variation described herein and/or in U.S. Patent Application No. 20030035917-A1, and these inventive images might be smart. Thus, the inventive images of this example might have aesthetics that are the same as, similar to, different from, or opposite from those in images by Richard Serra. These inventive images might for example, have a sense of lightness, an airiness, an ethereal sense, and/or an aesthetic of light and space. In addition, the strength of nanomaterials might enable these inventive images to be larger or much larger in size than Serra's images, the strength of nanomaterials might enable these inventive images to balance securely in a manner that appears more precarious than Serra's images, the strength of nanomaterials might enable these inventive images to have curves that are tighter, more extreme, more undulating, or more numerous than those in Serra's images, etc.

In other examples, nanomaterials might be used to make inventive images in the forms of or in forms similar to those of conventional images made of conventional metal (such as steel), that are welded and/or that have linear metal forms (such as metal rods, bars, and/or wire). These conventional images often rely on the strength or the tensile strength of their conventional metal for the stability of forms that may have the appearance of defying gravity, that may be open to negative space, light and air, and/or that may be made in multiple connected parts often with part(s) supporting other part(s). Examples are conventional welded sculptures, drawings in space and mobiles, such as those by the American artists, David Smith and Alexander Calder. The inventive images of this illustration might be made using just nanomaterials, they might be made using nanomaterial metal composites or hybrid nanomaterials (which might look like conventional metal images to any extent); they might be made using nanomaterial polymer composites or hybrid materials; or they might be made using any other kind of nanomaterial composite or hybrid nanomaterial, such as the other examples described herein. Because the nanomaterials in these inventive images make them stronger or substantially stronger than conventional metals, the forms of these inventive images might or might not have the same aesthetic properties as the conventional metal images described above. For example, these inventive images or parts thereof might have less mass, they might be slighter and/or thinner, they might hold or support more weight, and/or they might be lighter in weight than the forms of comparable conventional metal images. In addition or instead, these inventive images or parts thereof might weigh the same as the conventional metal images, but they might be stronger or substantially stronger and/or they might be larger or substantially larger yet still be stabile. For example, the lower supportive part(s) of these inventive images might appear to be able to hold less weight than they can actually hold securely. Their upper part(s) might be larger than those of the conventional metal images, their upper part(s) might be heavier or appear to be heavier than those of the conventional metal images, and/or they might appear less stable and more precariously balanced than they are. These differences attributable to their nanomaterials, might enable these inventive images to have stabile forms, structures, and compositions that would not be stabile or as stabile using conventional practices. One consequence is that these inventive images may appear to defy gravity to a greater extent than the conventional metal images. Such inventive images might also be made with a much greater array of aesthetic variations than are possible using conventional practices. These inventive images or part thereof might for example, be opaque, transparent, translucent, colorless and/or colored; they might emit light that is static or changing; they might have changing coloration that is not light emissive such as reflective displays; they might be interactive, responsive, they might change over time in a variety of different ways; they might be smart inventive images; they might have any of an array of effects of light and color; and/or they might have any other variation described herein and/or in U.S. Patent Application No. 20030035917-A1. Thus, the inventive images may have a sense of lightness, they might seem airy and light, they might seem ethereal, and/or they might have an aesthetic of light and space to a greater extent than is possible using conventional metal.

Among the specific examples of such inventive images are those that might be made with nanomaterials in forms of or in forms similar to those of the conventional metal images by David Smith shown in the books: "Terminal Iron Works, The Sculpture of David Smith" by Rosalind E. Krauss, MIT Press 1971; "David Smith" by E. A. Carmean, Jr., National Gallery of Art 1982; and "David Smith, Painter Sculptor Draftsman: by Fry and McClintic, Braziller 1982; and inventive images that might be made with nanomaterials in forms of or in forms similar to those of the conventional metal images by Alexander Calder shown in the book, "Calder's Universe" by Jean Lipman, Viking, 1980. As further examples, the inventive images in Figures 3, 4 and 9.I. might be inventive images of any size made with nanomaterials as described in the paragraph above.

The use of the strength of nanomaterials opens up a vast new area for images of art, design and architecture. In further illustrations, the enhanced strength offered by nanomaterials (e.g., in polymer nanocomposites or hybrid nanomaterials) might enhance the inventive images shown in Figures 1-7, 10-37, 39, 40, 41 (these inventive images might have hollow spaces inside of them shown in white), 43, 46-64, 68, 71, 73, 77-82, and 84. The use of nanomaterials in these inventive images might for example, enable them to be stabile even if their proportions are changed such that they are thin, very thin or significantly thinner than shown, or their depth is reduced or significantly reduced, yet there is an increase or a significant increase in their height and width. These inventive images may also be enhanced by nanomaterials in other ways, e.g., their nanomaterials might enable them to be conductive, and/or they might have any of the other properties described herein. In an example, the inventive images shown in Figure 77 might be books, the pages of which might be strengthened with nanomaterials so that they may be very thin or paperlike. These books might have abstract or realistic imagery, and/or text that may stay constant or change over time, e.g., made using OLEDs, e-materials, paint on LEDs, and/or other means described herein and/or in U.S. Patent Application No. 20030035917-A1.

In an illustration, inventive images parts made partially or completely of nanomaterials might strengthen, reinforce and/or stabilize inventive images. These inventive image parts might for example, be layers, internal armatures or skeletons, they might be image supports that may be stabilizers, they might be strengthening stabilizers, and/or they might be a means of display (e.g., mounts or frames). In addition or instead, these inventive image parts may also enable their inventive images or part thereof to be more rigid, more resistant to change and/or wear, to have greater tensile strength, to sag less or to not sag, to have enhanced weatherability, scratch resistance, resistance to rust, and/or resistance to corrosion; to repel stains, dirt and/or liquids; to have increased resistance to adverse effects of UV light, to have enhanced toughness or resilience, to have reduced fragility, to be self supporting and/or to be freestanding. For example, the inventive images shown in Figure 7 might be made as described in U.S. Patent Application No. 20030035917-A1, with these additional specifications. Their strengthening or reinforcing layers (shown in gray in the illustration), might be completely or partially made with nanomaterials. These layers might for example, be made entirely of nanomaterials, or they might be nanocomposites or hybrid nanomaterials, for example, with polymer, ceramic, metal, paper, stone, other conventional image making mediums, and/or with other materials provided in examples herein. The other layers of these inventive images (the layers shown in white in the illustration), might for example, be rigid or flexible, e.g., they might be rigid or flexible polymer, paper, canvas or fabric, which might be a thin polymer film, or a textile. These layers might for example, be completely or partially made with one or more OLEDs, e-materials, EPDs, absorbent polymers, responsive polymers, conductive polymers, other coloration, other light effects, etc. The inventive images shown in Figure 7 might also have thin batteries, PCMs, TFTs, sensors, computers, responsive features, and/or interactive features made with or without nanomaterials; they might have nanomaterials that serve other purposes (such as electrical or thermal conductivity, other examples herein, etc.), they might have touch controls or other control devices, an Internet connection, remote wireless control, or the ability to communicate, changing displays of light and/or color, other features described herein, etc. For instance, the inventive images shown in Figure 7 X.-XIII. might be OLEDs or e-materials that roll up (e.g., like scrolls). Any of these inventive images shown in Figure 7 might function as lighting, for communication, for information, as computers, and/or they might function in other ways described herein and/or in U.S. Patent Application No. 20030035917-A1.

As further example, the internal layer or image support (e.g., stabilizer) shown in each of the inventive images in Figures 16, 17 and 20 might be completely or partially made with nanomaterials. These internal layers might be strengthening stabilizers. They might for example, be made of nanomaterial composite or hybrid nanomaterials, such as nanomaterial composites or hybrids made with polymer, paper, canvas and/or metal, or other examples provided herein. They might be transparent, translucent or opaque. In addition to the strength and reinforcement that the nanomaterials bring to these internal layers, their nanomaterials might also enable them to be rigid or more rigid, electrically conductive, their nanomaterials may enable these layers to conduct, modulate diffuse or resist heat, their nanomaterials might enhance visual or optical properties, and/or their nanomaterials might enhance these inventive images in other ways (such as those examples herein). In another example, the linear parts of the inventive images shown in gray in Figures 40.a., 40.b., 40.d., 40.e. and 40.f. might be partially or completely made of nanomaterials. Their nanomaterials might enhance their strength or their tensile strength to such an extent that these linear inventive image parts are able to securely support or reinforce their respective inventive images, e.g., these parts made with nanomaterials may be strengthening stabilizers, and/or a means of display or installation such as mounts. In addition or instead the nanomaterials in these linear inventive image parts may enable them to be electrically conductive, they may enhance the bonding properties of these linear parts, nanomaterials may enable these linear parts to have effects of changing coloration, they may enable light emission (e.g., these linear parts may be OLEDs or other light sources), they may enhance other visual or optical properties, they may be in other devices that contribute to these inventive images (such as batteries, solar cells, reflective displays, sensors, or transistors), and/or the nanomaterials in these linear inventive image parts may enable them to have other enhanced features such as those described herein.

In another example, nanomaterials used in and/or on stone, marble, alabaster or onyx might serve as reinforcement, they may enable such image parts to be thinner or significantly thinner and/or slighter in its form and structure than it could be otherwise without compromising its strength or stability and probably enhancing its strength and stability substantially. Some stones like alabaster and onyx can be translucent, thus the use of nanomaterials may enable this kind of light property to exist or to exist to a greater extent in the inventive image formed. Nanomaterials might also enable the stone, marble, alabaster or onyx inventive images or parts thereof to be electrically conductive, light emitting, to have enhanced weatherability, the ability to repel stains or dirt, scratch resistance, enhanced toughness, resilience, reduced fragility, reduced tendency to fracture or crack, and/or other enhanced properties described herein. In other example, nanomaterials may enable stone, marble, alabaster and onyx to become smart materials, e.g., making them interactive, responsive, programmable, etc. Thus the use of stone, marble, alabaster and onyx in images can be significantly expanded by the addition of nanomaterials. For example, thin sheets of stone, marble, alabaster and onyx can be used in inventive images or parts thereof. These forms can have different light and electrical properties that can enable them to function differently than in prior images. These nanomaterial stone, marble, alabaster and/or onyx forms might be vertical in inventive images, like walls, doors, curtains or screens. They might be strong thin horizontal forms in inventive images, like table tops or benches. They might be inventive images that are art, design or architecture or parts thereof with form and structures that are more open, incorporating more negative space than would be possible using conventional practices. In addition or instead, they might be inventive images that function as lights to a minimal extent (e.g., as dim lighting or lighting in a small area) or fully (e.g., as an illuminated wall or ceiling, as a light fixture, etc.).

Nanomaterials might enhance the ability of all of the inventive images shown in Figure 73 to be self supporting, to be freestanding, to be mounted, and/or to be installed as illustrated. Nanomaterials might also enhance these inventive images in other ways such as the examples described herein. For instance, in the inventive images shown in Figure 73, nanomaterials might enhance: weatherability, surface(s), colorant(s), layer(s), the ability to repel stains or dirt, scratch resistance, heat resistance, the ability to moderate heat, electrical or thermal conductivity, toughness, resilience, reduced fragility, reduced tendency to fracture or crack; the structure and/or the form may be less massive, slighter, thinner, less solid and/or lighter in weight without compromising strength or stability; resistance to adverse effects of UV light; devices, systems and/or machines that may be nanoscale or larger; visual and/or optical effects; light effects, light emission; the ability to detect, respond to, mitigate and/or resolve problems and/or risks within themselves; the ability of one or more formal elements of these inventive images to change over time (such as color and/or light that changes); their ability to be interactive and/or responsive (e.g., to viewers, to aspects of the environment or both); their overall aesthetic; the aesthetic of light and space, their sense of being light and/or airy, the sense of dematerializing form, their sense of being ethereal, their sense of objecthood; their utilitarian function, e.g., as a wall, a partition, or a window; bonding, etc.

In an example, the "rigid mount system," "the wire mount system" and "the design that is a combination of the rigid mount system and the wire mount system" in U.S. Patent Application No. 20030035917-A1 might be partially or entirely made with nanomaterials. For example, one or more of the parts of these mount systems might be partially or entirely made of nanomaterials, e.g., made of a nanomaterial metal composite, made of a nanomaterial polymer composite, made of a nonmaterial metal hybrid material, made of a nanomaterial polymer hybrid material, made of other nanomaterials in examples herein. The use of nanomaterials instead of conventional practices in these and other mounts might make them stronger or substantially stronger, tougher or more resilient, and/or to have forms that might be simpler, slighter, lighter in weight and/or less massive (e.g., the "O" mount parts might be "I" shaped instead) and/or it may enable them to have other qualities such as the examples described herein. The aesthetic properties of inventive images mounts might be formed by aesthetic considerations to a greater extent and by structural necessities to a lesser extent that might be possible using conventional practices. In addition, mounts made using some nanomaterials (like CNTs or SWNT) might not need shock absorbent washers like those described for mounts in U.S. Patent Application No. 20030035917-A1.

Nanomaterials might be used in Separating Layers, in Separating Layers of polymer and/or in other layers that are part of layered inventive images. These nanomaterial might enhance one or more properties in these inventive images, such as the examples described herein. Examples of such layered inventive images are shown in Figures 10, 12, 17, 25-27, and 56-62 in which at least one of the layers shown in white might be made of polymer nanocomposite or hybrid nanomaterials. The other layers in these inventive images might be of any description herein and/or in U.S. Patent Application No. 20030035917-A1. Layered inventive images such as these illustrations might also have one or more partial or complete layers made only of nanomaterials, (such as layers made of CNTs and/or of other nanomaterials described in examples herein).

In view of the foregoing, the invention also includes an aesthetic image that is a work or object for display, and in particular, a fine art image, made from or incorporating a nanomaterial therein.

In addition, all of the inventive images described herein might, if desired, be further processed using any method(s) and material(s), such as the examples provided herein and/or in U.S. Patent Application No. 20030035917-A1. The inventive image specifications described herein might be further understood when used with embodiments described in U.S. Patent Application No. 20030035917-A1, and/or when they are applied to fitting examples, illustrations and drawings from U.S. Patent Application No. 20030035917-A1. For instance, specifications for making and further processing image supports that might be stabilizers, for the use of other stabilizers in inventive images, for the use of polymer(s) in inventive images, and for the compositions of surface preparation stabilizers provided herein can be further understood by examples, illustrations and drawings (Figures) in U.S. Patent Application No. 20030035917-A1 describing and showing image supports, the use of stabilizers, the use of polymer(s), and/or surface preparation stabilizers.

The preceding description of the invention is not to be limited and is fully commensurate with the scope of the appended claims. In this regard, the claims are to be construed to be open to the addition of knowledge of the skilled artisan, image maker or artist as well as to the exclusion of materials or features that do not fall within the true spirit and scope of the invention. For example, mechanical or electrical components that form part of a device and that are not visible to the viewer or that do not create or contribute to an effect that the viewer perceives (such as sound, projected light, shadows, an effect or a change in a visible part of the image, etc) are not considered to be aesthetic images or aesthetic parts of images in accordance with this invention, in part due to their hidden nature and in part due to their inclusion in the product due to their functional features or functionality. As another example, a mechanical or electrical component that is not visible may function for its form, rather than for its mechanical or electrical capability, e.g., it may be part of a hidden underlayer that provides the shape or texture of a painting. While the invention does contemplate some functionality in the aesthetic images disclosed herein, the functionality is clearly a secondary feature to the aesthetic characteristics of the image. Above all, an image is for visual observation and/or contemplation. This may be its only function, or it may also have a utilitarian function. For example, a work of art that includes photochromic features and that is created and exists primarily for its aesthetic features would fall within the claims despite that the work includes sufficient illumination for use, for example, as a lamp. In contrast, a building material, a computer component, a computer or a device that primarily functions as a utilitarian or operational component of a device or structure, or as a utilitarian device would not be encompassed by the claims despite it's aesthetic features, such as a change in color or light emission.

What is claimed is:

1. A method for making a mural with, upon or from an image-making support medium that is a new reinvented version of the conventional utilitarian fine artist's canvas or mural support, wherein the reinvented image support medium facilitates artistic expression and the creation and display of art, design or architecture made therewith, thereupon or therefrom, which method comprises:

preparing the work with at least one ingredient or part so that it has the form of a mural, making the macroscopic work of, from or incorporating at least one nanomaterial, and making the work with distinct edges or boundaries;

preparing the work with means for creating and showing a two or three-dimensional aesthetic, picture or design that can be seen from one or more sides or angles, making the work as or developing it into an aesthetic mural with a visible purpose for visual observation or display, integrating all of its elements visibly into the work as one whole, and creating the aesthetic mural as or developing it into macroscopic two or three-dimensional art that is: pictorial; fine art free of utilitarian function; a design; showing: a figure, an animal, a still life, landscape, nature, the sky, a part or aspect of any of these, subject matter that is not physically present, drawing, collage, a pattern or a depiction or representation of a recognizable subject; or art that is a combination of these, and making the aesthetic mural so that it is free of being purely commercial or informational, and making the aesthetic mural free of a computer, or making the aesthetic mural with a computer that serves the purpose described in this claim and making the work other than a conventional computer.

2. A method for making an image-making support medium as a new reinvented version of the conventional utilitarian fine artist's canvas, wherein the reinvented image support medium facilitates artistic expression and the creation and display of art, design or architecture made therewith, thereupon or therefrom, which method comprises:

creating a macroscopic image-making support medium of, from or incorporating at least one nanomaterial, and creating this work with distinct edges or boundaries;

preparing the work so that it has means for creating and showing a two or three-dimensional artwork, picture or design that can be seen from one or more sides or angles;

developing the work so that it shows at least one pictorial, artwork or design element that can be seen from one or more of the work's sides or angles; preparing the work as or developing it into an aesthetic work; and preparing it according to one or more of (A)-(D):

(A) integrating the aesthetic work's utilitarian elements visibly into the work as a whole, including any wiring, batteries and utilitarian mount parts the work might have, so that most or all of it's utilitarian elements are hidden from view and/or entirely or largely unobvious or unapparent to viewers looking at the work as a whole;

(B) preparing the aesthetic work for viewing with one or more of:

a framework, a support or bracing hidden from viewer's visibility; a matt or a frame; a rigid mount system, a wire mount system, or a combination rigid and wire mount system; means of installation, mounting or display that leaves space between it and the wall, ceiling, floor or other structure from which it is installed, mounted or displayed; preparing the aesthetic work with a base, a stand or a pedestal for viewing; or preparing the aesthetic work with means by which at least part of it can scroll, roll out and/or physically unfold;

(C) preparing the aesthetic work with a fine-art stabilizer that bonds to or enhances the bond to one or more superimposed conventional artists' paints; and/or (D) making the aesthetic work so that the ratio of it's strength to it's weight, structure, form and/or mass are different from what this ratio would be if it were entirely free of nanomaterials such that the aesthetic work is either:
  (i) stronger than it would be if it were entirely free of nanomaterials while it's weight, structure, form and/or mass are about the same or less than they would be if the work were entirely free of nanomaterials; or
  (ii) about as strong as it would be if it were entirely free of nanomaterials while it's weight, structure, form and/or mass are less than they would be if the work were entirely free of nanomaterials; and making the aesthetic work prepared according to one or more of (A)-(D) above, with a visible overall aesthetic and with a visible purpose for visual observation or display, integrating all of the aesthetic work's elements visibly into the work as one whole, and creating the aesthetic work as or developing it into macroscopic, two or three-dimensional art that is: pictorial; sculpture, a mural, a kinetic work, a mobile, an openwork art form, or fine art free of utilitarian function; a design; with means of display as art; showing: a figure, an animal, a still life, landscape, nature, the sky, a part or aspect of any of these, subject matter that is not physically present, drawing, collage, a pattern, or a depiction or representation of a recognizable subject; or art that is a combination of these, and making the work so that it is free of being purely commercial or informational, making the work free of a computer, or making the work with a computer that serves the purpose described in this claim and making the work other than a conventional computer;

making the work free of a camera, or making the work with a part that is a camera that is subsidiary or that is subordinate in proportion to the visible work as a whole or hidden from view, and also making the work so that it is other than a conventional phone, personal digital assistant device or portable media player device.

3. A method for making an image-making support medium as a new reinvented version of the conventional utilitarian fine artist's canvas, wherein the reinvented image support medium facilitates artistic expression and the creation and display of art, design or architecture made therewith, thereupon or therefrom, which method comprises:

creating a macroscopic image-making support medium of, from or incorporating at least one nanomaterial, and creating this work with distinct edges or boundaries;

preparing the work so that it has means for creating and showing a two or three-dimensional artwork, picture or design that can be seen from one or more sides or angles;

developing the work so that it shows at least one pictorial, artwork or design element that can be seen from one or more of the work's sides or angles; preparing the work as or developing it into an aesthetic work; and preparing it according to one or more of (A)-(D):

(A) creating the aesthetic work as or developing it into macroscopic, two or three-dimensional art, and hanging, installing or mounting it for display as art;

(B) cleaning the surface of the image-making support medium or the aesthetic work sufficiently to render it receptive to superimposed artists' paint, so that it has enhanced bond strength and permanence;

(C) creating a two or three-dimensional, pictorial, artwork or design element by adding to the work and/or by subtracting from it so that this pictorial, artwork or design element can be seen from one or more of the work's sides or angles; and/or (D) creating a visible, two or three dimensional, pictorial, artwork or design element that employs light emitted from and/or transmitted through part or all of the aesthetic work that can be seen from one or more of it's sides or angles; and making the aesthetic work prepared according to one or more of (A)-(D) above, with a visible overall aesthetic and with a visible purpose for visual observation or display, integrating all of the aesthetic work's elements visibly into the work as one whole, and creating the aesthetic work as or developing it into macroscopic, two or three-dimensional art that is: pictorial; sculpture, a mural, a kinetic work, a mobile, an openwork art form, or fine art free of utilitarian function; a design; with means of display as art; showing: a figure, an animal, a still life, landscape, nature, the sky, a part or aspect of any of these, subject matter that is not physically present, drawing, collage, a pattern, or a depiction or representation of a recognizable subject; or art that is a combination of these, and, making the work so that it is free of being purely commercial or informational, making the work free of a computer, or making the work with a computer that serves the purpose described in this claim and making the work other than a conventional computer;

making the work free of a camera, or making the work with a part that is a camera that is subsidiary or that is subordinate in proportion to the visible work as a whole or hidden from view, and also making the work so that it is other than a conventional phone, personal digital assistant device or portable media player device.

4. The method of claim 3 in which the aesthetic work has or is: (a) an organic light emitting diode (OLED); (b) at least one small molecule which provides, enables, enhances, or contributes to light emission; (c) a light emitting device or a light emitting device made with at least one nanomaterial; (d) a light emitting transistor, an organic transistor, a transistor that is at least partially transparent or translucent, or a transistor that is a combination of these; (e) a form that is at least partially transparent or translucent, or such a form that is made with at least one nanomaterial;

(f) a work made with one or a combination of these variations that has at least one light effect, is photochromic and/or electrochromic; such a work that has means of having and using energy from a source that is part of it or separate from it, such a work that has a power source, a solar cell, and/or photovoltaics;

(g) a work made with one or a combination of theses variations that is capable of changing over time or of being changed in a process in which it is active rather than entirely passive, or in a process using it's ability to be interactive, programmed, responsive or responsive to input, a trigger, a stimulant, an influence, wireless communication, the Internet or a broadcast, or any combination of these;

or (h) any combination of these.

5. A method for making an image-making support medium as a new reinvented version of the conventional utilitarian fine artist's canvas, wherein the reinvented image support medium facilitates artistic expression and the creation and display of art, design or architecture made therewith, thereupon or therefrom, which method comprises:

creating a macroscopic image-making support medium of, from or incorporating at least one nanomaterial, and creating this work with distinct edges or boundaries;

preparing the work so that it has means for creating and showing a two or three-dimensional artwork, picture or design that can be seen from one or more sides or angles;

developing the work so that it shows at least one pictorial, artwork or design element that can be seen from one or more of the work's sides or angles; preparing the work as or developing it into an aesthetic work; wherein the image-making support or the aesthetic work is prepared according to one or more of (A)-(D):

(A) preparing the work with means of having and using energy from a source that is part of it or separate from it; and creating a two or three-dimensional visual element that is observed in the work, that employs energy or that is enhanced by or reliant upon a feature of the work that employs energy;

(B) preparing the work with at least one interactive feature that enables the creation, development or change of a visible pictorial, artwork or design element on one or more viewable areas wherein the work is active, with this interactive feature more complex than or other than a conventional on/off switch or dimmer, and also developing the work so that it shows at least one pictorial, artwork or design element that can be seen from one or more of the work's sides or angles;

(C) preparing the work with means enabling the creation, development and/or change of a visible pictorial, artwork or design element on one or more viewable areas wherein the work actively responds: to movement, gesture, light, sound, temperature, the environment, a trigger or a stimulant; to a subject that is separate from the work and/or not present with it; to a process that uses sensing, detection or recognition capability, wireless communication, broadcasting, input or the Internet; or the work actively responds using a combination of these, and in addition, developing the work so that it shows at least one pictorial, artwork or design element that can be observed in the work; or (D) creating a two or three-dimensional, pictorial, artwork or design element that can change over time with the work being active, that can be seen from one or more of the work's sides or angles, and that is more complex than or other than the visual effect of a conventional on/off switch, or a conventional dimmer, and making the aesthetic work prepared according to one or more of (A)-(D) above, with a visible overall aesthetic and with a visible purpose for visual observation or display, integrating all of the aesthetic work's elements visibly into the work as one whole, and creating the aesthetic work as or developing it into macroscopic, two or three-dimensional art that is: pictorial; sculpture, a mural, a kinetic work, a mobile, an openwork art form, or fine art free of utilitarian function; a design; with means of display as art; showing: a figure, an animal, a still life, landscape, nature, the sky, a part or aspect of any of these, subject matter that is not physically present, drawing, collage, a pattern, or a depiction or representation of a recognizable subject; or art that is a combination of these, and, making the work so that it is free of being purely commercial or informational, making the work free of a computer, or making the work with a computer that serves the purpose described in this claim and making the work other than a conventional computer;

making the work free of a camera, or making the work with a part that is a camera that is subsidiary or that is subordinate in proportion to the visible work as a whole or hidden from view, and also making the work so that it is other than a conventional phone, personal digital assistant device or portable media player device.

6. A method for making an image-making support medium as a new reinvented version of the conventional utilitarian fine artist's canvas, wherein the reinvented image support medium facilitates artistic expression and the creation and display of art, design or architecture made therewith, thereupon or therefrom, which method comprises:

creating a macroscopic image-making support medium of, from or incorporating at least one nanomaterial, and creating this work with distinct edges or boundaries;

making the image-making support medium useful for creating art so that: art can be created as the image-making support medium is made or developed, art can be created on the image-making support medium, art can be created with the image-making support medium, or a combination of these;

preparing this work with means for creating and showing a two or three-dimensional artwork, picture or design that can be seen from one or more sides or angles;

making or developing the work so that it shows at least one pictorial, artwork or design element that can be seen from one or more of it's sides or angles; and when the work is made with a feature that employs energy, preparing the work with means of providing energy from a source that is part of it or separate from it; and making the work as or developing it into an aesthetic work, with a visible overall aesthetic and a visible purpose for visual observation or display, integrating all of the aesthetic work's elements visibly into the work as one whole, making the aesthetic work a whole in and of itself, and creating the aesthetic work as or developing it into macroscopic, two or three-dimensional art that is: pictorial; sculpture, a mural, a kinetic work, a mobile, an openwork art form, or fine art free of utilitarian function; a design; with means of display as art; showing: a figure, an animal, a still life, landscape, nature, the sky, a part or aspect of any of these, subject matter that is not physically present, drawing, collage, a pattern, or a depiction or representation of a recognizable subject; or art that is a combination of these, and, making the work so that it is free of being purely commercial or informational, making the work free of a computer, or making the work with a computer that serves the purpose described in this claim and making the work other than a conventional computer;

making the work free of a camera, or making the work with a part that is a camera that is subsidiary or that is subordinate in proportion to the visible work as a whole or hidden from view, and also making the work so that it is other than a conventional phone, personal digital assistant device or portable media player device.

7. A method for making an image-making support medium as a new reinvented version of the conventional utilitarian fine artist's canvas, wherein the reinvented image support medium facilitates artistic expression and the creation and display of art, design or architecture made therewith, thereupon or therefrom, which method comprises:

creating a macroscopic image-making support medium of, from or incorporating at least one nanomaterial, and creating this work with distinct edges or boundaries;

making the image-making support medium useful for creating art so that: art can be created as the image-making support medium is made or developed, art can be created on the image-making support medium, art can be created with the image-making support medium, or a combination of these;

preparing the work so that it has means for creating and showing a two or three-dimensional artwork, picture or design that can be seen from one or more sides or angles;

preparing the work as or developing it according to one or more of (A)-(E):

(A) preparing the work with or as: (i) one or more sheets, or (ii) a plurality of associated sheets arranged in a pad or book form for image making, or arranged in a pad or a book with a form of or similar to a conventional blank paper pad or blank book for image making;

(B) preparing the work so that it has: the visual appearance of or resembling a conventional artist's canvas; deckled edges; irregularities resembling handmade paper; texture resembling conventional canvas; or preparing the work so that it has an aesthetic texture made by taking one or more positive or negative impressions from one or more organic or natural materials, or an aesthetic texture resembling this;

(C) drawing or painting on the work, or applying an imprimatura, a ground, collage or a conventional artist's medium to it;

(D) accompanying the work with instructions for developing it as or into art, and/or for displaying it as art; and/or (E) preparing or developing the work with a form that is largely or entirely transparent or translucent, so that the work provides and/or enables the creation of a two or three-dimensional, pictorial, artwork or design element employing light transmitted through it that can be seen from one or more of the work's sides or angles, with the work having one or more of (i)-(iv):

(i) an external surface made with poly(methyl methacrylate), methacrylate ester or methacrylamide derivative;

(ii) an external surface of a non-conductive or poorly conductive polymer with a stabilizer present to enhance the ability of the work to remain color stable or to remain unchanged with exposure to ultraviolet light;

(iii) an external surface that has a varnish, sealant or coating that provides or contributes to permanence of the image; and/or (iv) one or more nanomaterials acting as a stabilizer; and making the work prepared according to one or more of (A)-(E) above, with a visible overall aesthetic, integrating all of the work's elements visibly into the work as one whole, and making the work so that it is free of being purely commercial or informational, making the work free of a computer, or making the work with a computer that serves the purpose described in this claim and making the work other than a conventional computer;

making the work free of a camera, or making the work with a part that is a camera that is subsidiary or that is subordinate in proportion to the visible work as a whole or hidden from view, and also making the work so that it is other than a conventional phone, personal digital assistant device or portable media player device.

8. A method for making an image-making support medium as a new reinvented version of the conventional utilitarian fine artist's canvas, wherein the reinvented image support medium facilitates artistic expression and the creation and display of art, design or architecture made therewith, thereupon or therefrom, which method comprises:

creating a macroscopic image-making support medium of, from or incorporating at least one nanomaterial, and creating this work with distinct edges or boundaries;

making the image-making support medium useful for creating art so that: art can be created as the image-making support medium is made or developed, art can be created on the image-making support medium, art can be created with the image-making support medium, or a combination of these;

preparing the work so that it has means for creating and showing a two or three-dimensional artwork, picture or design that can be seen from one or more sides or angles;

preparing the work as or developing it according to one or more of (A)-(E):

(A) preparing the work so that it has an overall aesthetic shape or form that is figurative or that depicts or represents a recognizable subject;

(B) preparing or developing the image-making support medium with a fine-art stabilizer that bonds to or enhances the bond to one or more superimposed conventional artist's paints, and this fine-art stabilizer is at least one conventional artist's paint, conventional artist's painting primer, or conventional artist's paint binder;

(C) preparing or developing the image-making support medium with a viewable surface at least part of which has an absorbent polymer, and superimposing this absorbent polymer with a paint or other colorant to modify or change it's color and/or light property;

(D) integrating the aesthetic work's utilitarian elements visibly into the work as a whole, including any wiring, batteries, control buttons, electrical parts, and utilitarian mount parts the work might have, so that most or all of it's utilitarian elements are hidden from view and/or entirely or largely unobvious or unapparent to viewers looking at the work as a whole; and/or (E) preparing the work with the visible signature or distinguishing mark identifying the artist, designer or group of artists and/or designers who created it, which is other than the mark of an industrial or commercial manufacturer or scientific organization; or preparing the work with a title as art; and making the work prepared according to one or more of (A)-(E) above, with a visible overall aesthetic, integrating all of the work's elements visibly into the work as one whole, and making the work so that it is free of being purely commercial or informational, making the work free of a computer, or making the work with a computer that serves the purpose described in this claim and making the work other than a conventional computer;

making the work free of a camera, or making the work with a part that is a camera that is subsidiary or that is subordinate in proportion to the visible work as a whole or hidden from view, and also making the work so that it is other than a conventional phone, personal digital assistant device or portable media player device.

9. A method for making an image-making support medium as a new reinvented version of the conventional utilitarian fine artist's canvas, wherein the reinvented image support medium facilitates artistic expression and the creation and display of art, design or architecture made therewith, thereupon or therefrom, which method comprises:

creating a macroscopic image-making support medium of, from or incorporating at least one nanomaterial, and creating this work with distinct edges or boundaries;

making the image-making support medium useful for creating art so that: art can be created as the image-making support medium is made or developed, art can be created on the image-making support medium, art can be created with the image-making support medium, or a combination of these;

preparing the work so that it has means for creating and showing a two or three-dimensional artwork, picture or design that can be seen from one or more sides or angles;

preparing the work as or developing it according to one or more of (A)-(E):

(A) preparing or developing the work so that it shows: a figure, an animal, a still life, landscape, nature, the sky, a part or aspect of any of these, subject matter that is not physically present, a pictorial subject, drawing, collage, a pattern, a two-dimensional depiction of three-dimensional form, or a depiction or representation of a recognizable subject; and/or preparing or developing the work as a mobile or with a matt or a frame like that used on a conventional image;

(B) preparing or developing the work with means that provides or enables interactivity enabling a visible pictorial, artwork or design element to be created, developed and/or changed, to make, develop and/or change an aesthetic image or an overall aesthetic effect in a process in which the work is active, wherein this interactive means is other than conventional computer word processing and it is more complex than or other than a conventional on/off switch or dimmer;

(C) preparing the work with means enabling the creation, development and/or change of a visible pictorial, artwork or design element to make, develop and/or change an aesthetic image or an overall aesthetic effect in a process in which the work actively responds: to movement, gesture, light, sound, temperature, the environment, a trigger or a stimulant; to a subject that is separate from the work and/or not present with it; the work actively responds in a process that uses sensing, detection and/or recognition capability, wireless communication, means of broadcast, means of input and/or the Internet; or the work actively responds using a combination of these;

(D) preparing the work so that it has a visual aesthetic element visible to viewers resembling that in an image by Rembrandt, Vermeer, Turner, Van Gogh, Monet, Seurat, an Impressionist artist, Jackson Pollack, Marc Rothko, Brancusi, Noguchi, Tiffany or I. M. Pei, or resembling that in a known work of or kind of fine art or design; and/or (E) preparing the work with the means enabling the creation and/or development of a two or three-dimensional, pictorial, artwork or design element that can change over time with the work being active, that can be seen from one or more of the work's sides or angles, and that is more complex than or other than the visual effect of a conventional on/off switch, or a conventional dimmer, to make and/or develop an aesthetic image or an overall aesthetic effect; and making the work prepared according to one or more of (A)-(E) above, with a visible overall aesthetic, integrating all of the work's elements visibly into the work as one whole, and making the work so that it is free of being purely commercial or informational, making the work free of a computer, or making the work with a computer that serves the purpose described in this claim and making the work other than a conventional computer;

making the work free of a camera, or making the work with a part that is a camera that is subsidiary or that is subordinate in proportion to the visible work as a whole or hidden from view, and also making the work so that it is other than a conventional phone, personal digital assistant device or portable media player device.

10. The method of claim 9 in which the aesthetic work has or is: (a) an organic light emitting diode (OLED); (b) at least one small molecule which provides, enables, enhances, or contributes to light emission; (c) a light emitting device or a light emitting device made with at least one nanomaterial; (d) a light emitting transistor, an organic transistor, a transistor that is at least partially transparent or translucent, or a transistor that is a combination of these; (e) a form that is at least partially transparent or translucent, or such a form made with at least one nanomaterial;

(f) a work made with one or a combination of these variations that has at least one light effect, is photochromic and/or electrochromic; such a work that has means of having and using energy from a source that is part of it or separate from it, such a work that has a power source, a solar cell, and/or photovoltaics;

(g) a work made with one or a combination of theses variations that is capable of changing over time or of being changed in a process in which it is active rather than entirely passive, or in a process using it's ability to be interactive, programmed, responsive or responsive to input, a trigger, a stimulant, an influence, wireless communication, the Internet or a broadcast, or any combination of these;

or (h) any combination of these.

11. The method of claim 9, in which the work or the image-making support medium is made with one or more of the components or properties below:

A) it is capable of being responsive, self-actuating, interactive, controlled, modulated, changed and/or programmed, or it has a part with this capability; it has this capability when stimulated, activated, influenced or triggered or when externally stimulated, activated, influenced or triggered;

B) use of the capability in A) above causes or assists in causing the image or the image-making support medium, or at least one of their aesthetic elements: to change, modulate, move or stop moving; to be visible, hidden, audible or silent; or to change it's electrical current, color, a light property, form, shape, position, volume, density, viscosity, appearance, a physical property, or a visible aesthetic property;

C) the work or the image-making support medium has means, a part, an area, a layer, an element, a device or a mechanism that can be activated, stimulated, triggered or used by: a person intentionally or unintentionally, the environment, temperature, heat, radiation, light, movement, acidity or pH, magnetism or magnetic field, a solvent, a chemical, a liquid, moisture, pressure, stress, programming, electricity, ionic energy, an electron beam, or by change in any of these, and this causes or assists in causing change, modulation or another response in the image, in the image-making support medium, in a part of one of these or in one or more of their aesthetic elements;

D) the work or the image-making support medium is prepared with one or more of: programming, means which enables it to be programmed; a computer, part of a computer or memory; an interactive part, means device or system; sound, music, light, or the presence and the absence of sound, magnetism or a magnetic force, music or light; a microphone or a speaker; a control mechanism or device; a viewer input device, a switch, a dial, a button, a touch control or touch activated device; a mechanism or device which enables control or change when pressure or stress is applied, a drawing device, a stylus or wand to control, interact with or change the image or image-making support medium; a trackball or a mouse; a computer vision system; means of responding to sound or voice command; technology or capability for: speech or voice recognition, movement or gesture recognition, capacitive sensing, human hand gesture recognition, motion recognition, human body motion recognition, sign language recognition, facial gesture recognition, pattern recognition, sensing or detecting; a fabric strain gage or a technology, sensor, device or ability that is sensitive to or that detects being bent or extended, or, such a technology, sensor, device or ability plus the ability to respond to this as a stimulant, trigger or influence; means of controlling, interacting with or changing the image or image-making support medium from a distance, using the Internet, using wireless communication or using a broadcast method; a sensor, means of sensing or detecting a viewer, movement, sound, light, the environment or an aspect of it, heat, temperature, change in any of these or other change, or such means of sensing or detecting plus means of responding or responding with a change in the image or image-making support medium, or in one of their aesthetic elements; programming or means by which a person can intentionally or unintentionally control, change or vary the electrical current, color, light, form, shape, movement, position, volume, form, density, viscosity, appearance, a physical property or an aesthetic element of the image-making support medium or image; an interactive feature or part which is hidden from view, unobvious or unapparent to viewers, or which is perceived to be visually continuous with, or visually integrated with the appearance of the rest of the image-making support medium or image; a photorefractive polymer absorbent polymer, polymer gel, hydrogel, or redox polymer; a shape memory polymer; an ionomeric polymer-metal composite; conductive polymer; or polymer capable of changing or responding to stimulation, a control, activation, a trigger or influence;

a solar cell, photovoltaics; a non-silicon solar or photovoltaic cell; a solar cell or photovoltaics applied or partially applied by painting, brushing, printing, spraying, spin casting, solution processing or a solution coating method; a power source, means of carrying power, a battery, a thin film battery, a circuit, an electrode, conductive ink, or a composition, material or technology that provides or carries power; polymer electronics, printed electronics, an integrated circuit or chip, a non-silicone integrated circuit or chip; a transistor, a thin film transistor (TFT), a backplane, a TFT backplane, an organic transistor, an active matrix backplane; a nanoscale device, machine or system; a light emitting material, light emitting silicon; an electroluminescent material, a metal coated polymer, a polymer coated metal or a semiconductor; a material or a polymeric material that is: photochromic, thermochromic, piezorochromic, piezoelectric, piezochromic, solvatechromic, carsolchromic, electroactive, gasochromic, a photonic colorant, a photonic crystal, a photonic material, a synthetic opal or a synthetic opal containing silica spheres or imbibed with liquid crystal, polymerized crystalline colloidal arrays, gel particles embedded in crystalline colloidal arrays, a photonic band gap material or structure; a phase change material; liquid crystal, liquid crystal elastomer; a smart fluid that is a particle filled, oil based suspension that changes in viscosity reversibly or that changes from liquid to solid reversibly; electro-rheological or magneto-rheostatic fluids; a polymer or conductive polymer magnet; porphyrin; a polymer that is re-mendable, self-healing or regenerative; a hologram or a hologram that appears two or three dimensional and at least partially intangible; or one or more of these or a conductive-electronic material or device that is: at least partially transparent, translucent or flexible; thin or very thin; made with polymer or conductive polymer; a nanomaterial or made with at least one nanomaterial, carbon nanotube or carbon nanomaterial; or made in a roll to roll or continuous manufacturing process, a printing process, a coating process or a non-vacuum process;

E) the work or the image-making support medium has one or more from A) or B) above that functions with, that employs, that is activated by, stimulated by, triggered by, produced by, or produced in part by one or more from C) or D) above;

F) the work or the image-making support medium has or is an OLED, a LED, a light emitting device, a field emission display, an e-material, or another device, machine or system, or alternately, it is prepared with or as at least one of these and also with one or more from A)-E) above; or G) the work or the image making support medium is prepared according to one or more from A)-F) above with polymer, with transparent or translucent polymer, or with a form that is at least partially transparent or translucent and made with polymer.

12. The method of claim 9, in which the work or the image-making support medium is made with a form that has one or more from A), B) or C):

A) a nanocomposite or hybrid nanomaterial; a polymer, a transparent or translucent polymer, a carbon nanotube, a single wall carbon nanotube, a polymer nanocomposite, a polymer carbon nanotube nanocomposite or a polymer clay nanocomposite; nanoclay, graphene, buckypaper, a nanocrystal, quantum dot, nanowire, nanoparticle, or nanofiber; molybdenum or nanomaterials made with molybdenum; at least one fine-art stabilizer; a nanocomposite or hybrid nanomaterial with at least one nanomaterial that is unseen by viewers; a polymer hybrid nanomaterial, a nanocomposite or hybrid nanomaterial in the form of a thin or very thin layer, in or on which there is graphene, buckypaper, or at least one but optimally many nanoscale nanomaterials, carbon nanotubes, single wall carbon nanotubes, nanoparticles, nanowires, nanocrystals, nanofibers or molybdenum unseen by viewers;

a monomer that is methacrylate ester, methacrylamide derivative or methyl methacrylate; a polymer that is poly(methyl methacrylate) or that is made from methacrylate ester or methacrylamide derivative; any of these that are strengthened, made stiffer or made more rigid by at least one nanomaterial, by a fine art stabilizer or by another polymer; polycarbonate; a polymer and a fine art stabilizer; a polymer and a fine art stabilizer that provides or enhances it's ability to remain unchanged with exposure to ultraviolet light; or any of these that are transparent or translucent forms;

a conventional image making medium that is improved, enhanced, changed, or made more permanent by at least one nanomaterial; a nanomaterial made with a conventional image making medium; a conventional image-making medium made with a nanomaterial that is unseen by viewers;

a nanocomposite or hybrid nanomaterial made with a conventional image making medium that is more permanent, stronger, tougher, more resilient, more durable stiffer, less flexible, less breakable, less fragile, less brittle, or less fibrous than the conventional image-making medium in it's conventional state, or that is otherwise enhanced for use in making images or for images in comparison to the conventional image-making medium in it's conventional state;

metal, glass, crystal, ceramic, clay, paper, conventional artist's canvas fabric, wood, stone, plaster, polymer, acrylic, absorbent polymer or conductive polymer in a nanocomposite or hybrid nanomaterial, or a conventional medium that is more permanent, stronger, tougher, more resilient, more durable, stiffer, less flexible, less breakable, less fragile, less brittle, less fibrous or enhanced for image making or for images due to one or more nanomaterials;

at least one nanomaterial in the image or in the image-making support medium with a material or medium that is entirely free of nanotechnological processing that is made: (i) using bulk technology; (ii) by nature or a by a natural process; or (iii) with natural rather than man-made, nanoscale, structure(s), feature(s), or physical phenomena;

a nanomaterial that is partially, largely or completely: (i) nano-pure; (ii) made, manipulated, or engineered on an atomic or molecular scale or from the bottom up; (iii) made, manipulated, or engineered using nanotechnology to control most or all atoms, or to control most atoms or every atom that serves a particular function or that is in a particular position or on a particular part of the image; or (iv) one or more of (i)-(iii) and the nanomaterial is visible to the unaided or naked eye or it is unseen by viewers;

B) preparing the form of the work or of the image-making support medium with one or more of these features:

it bonds to one or more colorants, paints, inks, dyes, markers, pencils, charcoals, pastels or conventional image making mediums; it is able to bond to a conventional artist's medium so the bond endures well through the image making process and through the use or display of the resultant image; it's bonding capability is enhanced or provided by at least one fine art stabilizer, by a nanomaterial or by a surface preparation stabilizer; the form is cleaned sufficiently to render it receptive to artist's paint, or sufficiently cleaned to provide enhanced bond strength and permanence to a superimposition or to facilitate development of the aesthetic image;

the form is strong, stabile or permanent, and one or more of: planar, slight, thin or very thin, structural or sufficient to serve as the image's structure, rigid, unreinforced, unbacked, or unbolstered; it is a form made with a strengthening stabilizer; it is a form that is an image support or an image support stabilizer; it is a form made with an image support or image support stabilizer; it is a form prepared as a mural or as a design on a wall, ceiling or other architectural structure, or it is a form that is developed as a mural;

the form is prepared that is largely or almost completely made of a conventional artist's support medium or of it's ingredient or ingredients; it is a form prepared that visually resembles or looks similar to a conventional artist's support medium, canvas, paper, acrylic sheeting or clay; preparing such a form which also functions in a manner that is like or similar to the conventional artist's support medium it resembles or looks similar to; or it is a form that is one or more sheets or pages from a book or a pad, or it is a form developed from one or more sheets or pages from a book or pad;

it is prepared as a form or a planar form with sufficient mechanical or structural properties so that it can support its own weight or be freestanding; preparing such a form which also bonds to a conventional artist's medium; or preparing such a form that is also one or more of: transparent, translucent, planar, polymeric, resembling a conventional artist's canvas, canvas board, acrylic sheeting or sheet of paper, made with a fine art stabilizer that provides or enhances it's ability to remain unchanged with exposure to ultraviolet light, or made with a fine art stabilizer that enables or enhances bonding; or the form is prepared with means of installation, mounting or display as an aesthetic image, which is: (i) means for display on a wall or vertical surface or by hanging; a hook or wire attached to enable hanging; or holes to enable hanging, (ii) a base, a stand, a pedestal, a frame, a mount, a mount part, a matt, a part or a form that enables its installation, mounting or display in a manner that resembles the manner in which conventional aesthetic images are presented; (iii) a part, parts or the means by which it can scroll, roll and unroll, or fold out and fold up for viewing; (iv) a rigid mount system, a wire mount system, or a combination rigid and wire mount system; or (v) means of installation, mounting or displaying the image-making support medium or image that leaves space between it and the wall, ceiling, floor or other structure from which it is installed, mounted or displayed;

it is prepared as a form that contributes to the image's aesthetic by being one or more of: rigid or inflexible, flexible, partially inflexible and partially flexible, representational, figurative or shaped like the human head, torso or part of the human form, openwork, hollow, discontinuous, non geometric, non-uniform, irregular, uneven, nonplanar, hollow, linear, with an open space within it's form, with an air pocket; with irregularities that make it look handmade; with at least one curve, angle or undulation; capable of folding, unfolding, rolling out or scrolling for viewing; with two or more parts that are joined or separate; with all edges deckled;

it is prepared as a form that is partially or entirely: layered, opaque, transparent, or translucent; that has one or more image supports, or that has a layer, part or other ingredient that enhances it's permanence or stability;

it is prepared as a form that is a planar or two dimensional form that is transparent or translucent and made with polymer, glass or both, and that has one or more light sources, OLEDs or other LEDs within it or attached to it; or that includes a conductive polymer;

it is prepared as a layered form that has conductive polymer in between two or more layers that are: transparent, translucent, polymeric, glass, non conductive or poorly conductive or a combination of these, or with such a layered form that has conductive polymer between it's other layers wherein this conductive polymer is capable of conducting electricity to one or more devices or light emitters that are also sandwiched in between it's other layers;

it is prepared as a strong, stabile or permanent form made of two or more parts with joints, bonds or points of contact that appear visually to be too slight, too small or too few in number for the form to be strong, stabile or permanent; or C) the work or the image-making support medium is made with a utilitarian part or it is made so that it can also serve a utilitarian function as: a door, a gate, a fence, a stage set, a partition, a screen, furniture, a table, a chair, a stool, a chest, a cabinet, a cart, a bench, a tent, an awning, a fountain, a basket, a case or container, a light fixture, candelabrum, a window, a skylight, a lunette, shades, shutters, a tile, a column, or a set, grouping or compositional arrangement of these that is a single work; a building façade, a wall, a ceiling, a floor, stairs, a crosswalk, a bridge or another architectural form or structure; craft design, a vase, a bowl, a tray, a cup or goblet, a plate, a dish, a pitcher, a soup tureen, a placemat, or a work of design for household use; an altar, a menorah or an image for spiritual or religious use; a book or pad that is a new version of the conventional image making blank book or blank paper pad capable of being developed into visual pictorial image, or a plurality of associated sheets arranged in a book or pad form capable of such image making; an image of graphic design or book design free or nearly free of visible legible text; an image of design, a wearable image, fashion design, a fashion accessory, a handbag, jewelry, a hat, a belt, a tote bag or a costume; or the image or the image-making support medium is prepared as a form that has one, more than one or all of it's utilitarian function, it's utilitarian part or parts, it's electronics, wires, cords, batteries, power sources, mounts or mount parts, or it's other means of installation or display or parts thereof, hidden from viewers.

13. The method of claim 9, in which the work or the image-making support medium is made with one or more visual effects or aesthetic properties described in A)-E):

A) the work or the image-making support medium has at least one aesthetic property from: an additive or subtractive process; a conventional image-making process; a conventional image making medium, a conventional artist's medium or a conventional artist's painting or drawing medium; at least part of a drawing, picture or design, or one of these that is figurative, realistic, representational, abstract, surrealistic, a landscape or a still life; a depiction or representation of a recognizable subject; a primer conventionally used to make images; an underlayer; at least one conductive polymer that provides or enables a visual effect, an aesthetic effect or emitted light; a colorant; a light source, light emitting display or means of emitting light; a material, a device or another means that provides or effects light properties; a filter; crystal, gem, stone, fabric, paper, clay, ceramic, wood, metal, an air pocket; a conductive, semi-conductive or holographic pigment; a photographic image, a photographic emulsion or a photographic transparency; writing, text, incising, inlay, carving or embossing; texture, irregular texture or texture deeper than a sandblasted surface or a sanded surface; a moving part or means to be capable of movement; music or sound;

B) the work or the image-making support medium has at least one visual effect or aesthetic property that is: (i) a light effect; (ii) from a form that functions as a lens, a Fresnel lens, a grating, a diffraction grating, a prism or a lenticular lens or form; (iii) a photochromic, dichroic, iridescent or reflective effect or a light effect from a hologram or crystal; (iv) an electrochromic effect whereby it responds to changes in electrical current by changing or by changing it's state of or it's level of: transparency, translucency, reflectivity, light emission, the path or color of the light passing through it, or a combination of these; (v) a change from being entirely or partially transparent or translucent, to being entirely or partially opaque; (vi) a change from being entirely or partially light emitting to being entirely or partially transparent or translucent, or such a change in an OLED; (vii) created by electricity that causes the positions of particles, of liquid crystals, or of liquid crystals in a polymer layer or matrix to change, to align, to become more aligned, to become random or to become more random; (viii) a visual or optical effect or one of these effects that is capable of changing or that changes in response to programming, stimulation, interaction, a trigger, means of activation or an influence; (ix) one or more of (i)-(viii) that serves as part or all of an image support, an image support stabilizer, an underlayer, a reinvented version of an artist's canvas or the surface of such a reinvented artist's canvas; or (x) one or more of (i)-(ix) that is one or more light sources or light emitting displays, or that is in the image-making support medium with one or more light sources or light emitting displays;

C) the work or the image-making support medium has at least one visual effect or aesthetic property that is:

(i) a visible change in the image-making support medium, the image or part thereof that occurs in relation to change in natural light, skylight or nature, or such a visible change that resembles or looks like change in natural light, skylight or nature;

(ii) a portrayal or depiction of the sky, the light of the sky, nature, a natural environment or scene, part thereof, plants, flowers or animals, that is: static, changing or that can be changed; that is: abstract, representational, realistic, surrealistic, the depiction or representation of a recognizable subject, or any of these along with figures, landscape or a still life; that is at least partially formed with light in one or more colors; or that is at least partially formed by color or light changing as the real version of it's subject matter might change or in a manner that portrays or represents the real version of it's subject matter;

(iii) one or more of the variations in (i) or (ii) that are capable of being changed by a person, by change in the environment, by another stimulant, trigger, influence, means of activation, means of being interactive or by programming; or any of the variations in (i) or (ii) accompanied by music or sound;

D) the work or the image-making support medium has at least one visual effect or aesthetic property that is a portrayal, representation or abstraction of one or more people, human forms, part thereof, human heads or human torsos that is static, that is capable of changing or of being changed, that has light or color that changes, that has another visible aesthetic element that changes, that has sound, voice or music, or that changes as a result of stimulation, activation, programming, triggering, an influence or interaction; or E) the image or the image-making support medium has any of the variations in A)-D) above or a combination of these, that is or has an OLED, an e-material, another light emissive or non-light-emissive reflective display device, or a form made with polymer or with polymer that is transparent or translucent.

14. The process of claim 9, in which the work or the image-making support medium is made with a fine art stabilizer, a conductive polymer, a technology, a structure, a material or a display with changeable, reversible, controllable, interactive, responsive, programmable or programmed coloration that is one or more of the following:

i) an e-material or electronic paper; a display, medium or system that is electro-optic, reflective, non-light-emitting, electrochromic, bistable, electrophoretic, light emitting, an OLED, a small molecule OLED, an OLED made with conductive polymer, an OLED made with both conductive polymer and at least one small molecule, a hybrid OLED, an OLED made with at least one dendrimer;

ii) a composition or form made with: cells, globes, capsules, spheres, a honeycomb structure, or enclosed parts, electrochromic molecules, conductive polymer, liquid crystal, cholesteric liquid crystal, micro-variations of any of these, or organic electronics; or made with parts that show different coloration when their position changes or when the position of their contents or parts changes;

iii) non-light-emissive colorants in one or multiple microcapsules; made with charged non-light-emissive colorants that are able to change from visible to hidden, or from hidden to visible with electrical current which causes their position to change within a fluid with respect to an electrode; or a form made with or as a visible display device that includes multiple non-light-emissive colorants capable of changing their visibility, their color or both, with energy from a source that is part of the image or the image-making support medium or with energy conducted by the image or by the image-making support medium, so that the overall visual effect is sufficient to enable at least a portion of the image or the image-making support medium to have a display that is a visible aesthetic or pictorial element;

iv) the image or the image-making support medium is capable of being controlled, modulated or changed by one or more image makers or viewers, or by one or more elements in the environment, or made with a part or other means which provides or enables this capability; or with a sensor or other part or other means which can be used, stimulated, activated, influenced, or triggered to cause the image making support medium or the image to respond, self actuate, interact, be controlled, modulate or change;

v) one or more in i)-iv) above that is: flexible, transparent or translucent, thin or very thin in part or entirely; made with a fine art stabilizer; made with at least one polymer in the form of a film, layer, thin layer or image support; made with polymer that is transparent or translucent, made with conductive polymer; partially or entirely made by printing, ink jet printing, screen printing, solution processing or in a roll to roll or continuous manufacturing process; made with a battery, solar cell, photovoltaics or a power source; made with it's power source, wires, cords or electrical parts hidden from viewers; made with or provided with means of installation or display; or accompanied by with instructions, or the work or the image-making support medium is prepared with at least one fine art stabilizer which:

i) provides or enhances permanence, stability, impact resistance, scratch resistance, hardness, bonding capability, color stability or the ability to remain stabile with exposure to ultraviolet light; provides, modifies or enhances polymer absorbency; crosslinks an absorbent polymer or is a crosslinking monomer used with an absorbent polymer;

ii) is: a surface preparation stabilizer, a processing aid, an image support stabilizer, a strengthening stabilizer; a layer; an ultraviolet light stabilizer, an ultraviolet light absorber or a hindered amine light stabilizer; radiation which cures or crosslinks a polymer; energy or electricity conducted by or used in conjunction with one or more nanomaterials, or OLEDs, or the means by which this energy is carried; the source for energy used by an OLED; polymer that supports, reinforces, strengthens or enhances the support of an OLED; a material or a process that protect photovoltaics or solar cells made using conductive polymer or nanomaterials from adverse external or environmental elements; light converted by a solar cell, by photovoltaics or by other such means made using conductive polymer or nanomaterials; energy or electricity produced by photovoltaics or a solar cell; or a microprocessor, chip or integrated circuit used for an e-material or an OLED;

iii) is a fine art stabilizer that causes or that assists in causing the image, the image-making medium or part of one of these to respond, change or modulate, or such a fine art stabilizer that is: electricity, a chemical, a liquid, a solvent, light, radiation, heat, temperature change, a sensor, an electron beam, stress, pressure, a magnetic field, ionic energy, acidity or pH, change in any of these, or another stimulant, trigger or influence;

iv) is a fine art stabilizer that partially or completely shields or blocks one or more vulnerable or potentially vulnerable parts of the image-making support medium or the image from moisture, oxygen, ultraviolet light, agents used to clean or care for it or them, or other agents that otherwise would or that otherwise have the risk of undesirably modifying, changing or damaging the shielded part or parts of, or the rest of the form of the image-making support medium or the image;

v) is an ingredient, process, layer or part in or on an OLED or part thereof which reduces or eliminates changes to the image, to the image-making support medium, or to a part of one of these; is a fine art stabilizer that is a barrier, a shield, or means of encapsulation, encasing or sealing that protects: is the image-making support medium, the image, conductive polymer, the display, the e-material, the OLED, photovoltaics or a solar cell made with conductive polymer or a nanomaterial that protects part of any of these against the ingress of moisture, water, oxygen or any agent that will or might modify, damage or destroy a property of the conductive polymer, the display, or the image-making support medium or the work; or vi) is energy, electrical current or electricity conducted by a conductive polymer; a form, device, battery, solar cell, electrode, anode, cathode, or wire that supplies, conducts or carries energy to a conductive polymer; spin casting, ink jet printing or other printing process used to apply conductive polymer; an aid used to process conductive polymer; a solvent or liquid that enables or enhances solution processing of conductive polymer; a dopant or agent used to treat polymer so that it becomes conductive or more conductive, or this doping process or treatment, or the work or the image-making support medium is prepared with at least one conductive polymer which:
  i) conducts electricity, conducts ions or emits light in one or more colors;
provides, enhances or enables an aesthetic element; provides, enhances or enables a visible, pictorial or audible aesthetic element or an interactive element; or is made with at least one nanomaterial;
  ii) is part of, enables or carries energy to at least one: LED, OLED or other light source; an e-material or a non-light-emissive display; a device, an electrical device, a system, computer, computer chip or part of a computer; an electrical wire or conduit; an electrode, energy source, solar cell, battery or source of electricity; transistor, capacitor, photovoltaic, photodiode, photoconductor or photorefractive device; sensor or means of detecting a viewer, sound, light or change in the environment; means by which the image or the image-making support medium can move visibly, emit music or emit sound; conductive adhesive, circuit, ink, paint or colorant; coating or coating that is transparent or translucent; conductive fiber, fabric, or fabric that functions like a conventional canvas surface, a conventional painting surface, or a conventional surface for collage; video, film or part thereof; means or interactive means by which the image-making support medium can display a moving or changing picture or image; electroactive layer or part; or an aesthetic effect that uses electricity that flows or is non-static; or
  iii) is applied by: a roll to roll process, a printing process, ink jet printing, screen or silk screen printing, a lithographic process, a coating process, blow molding, calendering, fiber spinning, a solution spinning process, compression molding, extrusion, brush, drawing or painting, writing, a rolling process, gel process, a spraying process, solution processing, a casting process, spin casting, blade coating, an evaporation process, conventional practices or conventional image making practices; is applied thinly, unevenly or discontinuously; is applied in pixels, or is applied in a layered composition.

15. The method of claim 1, in which the image-making support medium and/or the mural are two or three-dimensional, and also one or more of:
  (i) pictorial; kinetic; fine art; a work of design or architecture;
  (ii) showing: a figure, an animal, a still life, landscape, nature, the sky, light of a sky, a part or aspect of any of these; subject matter that is not physically present; drawing; collage; a pattern; a depiction or representation of a recognizable subject; a two-dimensional depiction of three-dimensional form; showing at least part of a drawing, picture or design, or one of these that is figurative, realistic, representational, abstract, surrealistic, a landscape or a still life;
  (iii) with at least one light effect; or capable of emitting light, capable of serving as a light fixture and/or as lighting design;
  (iv) with at least part or with the entire work capable of changing over time or self-actuating, capable of being changed, or capable of being changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input, using a wireless means, the Internet or a broadcast method;
  (v) the mural is two or three-dimensional, and with a form that is partially or entirely: transparent, translucent, opaque, rigid, inflexible, flexible; capable of rolling, scrolling and/or folding; with at least one curve, angle or undulation; made with two or more parts or layers that are joined or separate; layered; made with a layer, part or other ingredient that enhances permanence or stability; made with at least one image support, image support stabilizer, strengthening stabilizer, underlayer, frame, framework, support or bracing; or any combination of these;
  (vi) the mural has: means of installation or display; it has means of display on or in a wall or vertical surface; it has a mount, a mount part or means of mounting; it has means enabling it to roll out, roll up, scroll, fold or unfold; it has a hook, wire, holes and/or means to enable it to be hung; or it has a combination of these; and/or
  the mural has one or more parts for mounting, installation or display, one or more utilitarian parts; electronics, wiring, cords, control buttons, it's battery or power source; a framework, support or bracing; an interactive feature or part, and/or most or all of it's utilitarian elements hidden from view and/or entirely or largely unobvious or unapparent to viewers looking at the work as a whole;
  (vii) the mural is part or all of: an architectural form or structure, a wall, a work of design, a door, a ceiling, a floor, a building façade, a window, a skylight, a lunette, a stage set, a partition, a screen, furniture, a table, a cabinet, a case or container, a shade, a grouping or set of tiles, a freestanding work, craft design; a work that functions as lighting; a set, grouping or compositional arrangement of forms that is a single work of art, design or architecture; or any combination of these; or
  (viii) a combination of any of these.

16. The method of claim 2, in which the image-making support medium, the aesthetic work and/or the work or art, design or architecture are made with most or all their utilitarian elements hidden from view and/or entirely or largely unobvious or unapparent to viewers looking at it as a whole.

17. The method of claim 2, in which the image-making support medium, the aesthetic work and/or the work or art, design or architecture are made with one or more of:
  a framework, a support or bracing hidden from viewer's visibility.

18. The method of claim 2, in which the image-making support medium, the aesthetic work and/or the work or art, design or architecture are made such that at least part of it can scroll, roll out and/or physically unfold.

19. The method of claim 2, in which the image-making support medium, the aesthetic work and/or the work or art, design or architecture are made with one or more of:
- a matt or a frame; a rigid mount system, a wire mount system, or a combination rigid and wire mount system; means of installation, mounting or display that leaves space between it and the wall, ceiling, floor or other structure from which it is installed, mounted or displayed; and/or a base, a stand or a pedestal for viewing.

20. The method of claim 2, in which the image-making support medium, the aesthetic work and/or the work or art, design or architecture are made with: a fine-art stabilizer that bonds to or enhances the bond to one or more superimposed conventional artists' paints; at least one fine art stabilizer that is or has at least one nanomaterial; or at least one fine art stabilizer that is a combination of these.

21. The method of claim 2, in which the image-making support medium, the aesthetic work and/or the work or art, design or architecture are made with a ratio of strength to weight, structure, form and/or mass different from the ratio the work would have if it were made entirely free of nanomaterials such that:
- (i) the work is stronger than it would be if it were entirely free of nanomaterials while it's weight, structure, form and/or mass are about the same or less than they would be if the work were entirely free of nanomaterials; or
- (ii) the work is about as strong as it would be if it were entirely free of nanomaterials while it's weight, structure, form and/or mass are less than they would be if the work were entirely free of nanomaterials.

22. The method of claim 3, in which the work of art, design or architecture is: prepared with means of display as art; it is displayed as art; it is hung, installed or mounted for display; or a combination of these.

23. The method of claim 3, in which part or all of the surface of the image-making support medium, the aesthetic work and/or the work of art, design or architecture is cleaned sufficiently to render it receptive to superimposed artists' paint, so that it has enhanced bond strength and permanence.

24. The method of claim 3, in which part or all of the image-making support medium, the aesthetic work and/or the work of art, design or architecture have:
- a visible, two or three-dimensional, pictorial, artwork or design element made by adding to the work and/or by subtracting from it; and/or the work has at least one aesthetic property from inlay, incising or carving; and
- part or all of the work: can change over time, is unchanging, is self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or
- the work has a combination of any of these.

25. The method of claim 3, in which the image-making support medium, the aesthetic work and/or the work of art, design or architecture are made with one or more visible, two or three dimensional, pictorial, artwork or design elements that employ light emitted from part or all of the work, and
- part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

26. The method of claim 3, in which the image-making support medium, the aesthetic work and/or the work of art, design or architecture are made with one or more visible, two or three dimensional, pictorial, artwork or design elements that employ light transmitted through part or all of the work, and
- part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

27. The method of claim 5, in which the image-making support medium, the aesthetic work and/or the work of art, design or architecture are made with one or more of: means of having and using energy from a source that is part of it or separate from it; a power source, a battery, a thin film battery, a solar cell or panel; a non-silicon solar or photovoltaic cell; a photovoltaic device or cell; a circuit, conductive ink, or a composition, material or technology that provides or carries power; one or more of these made with at least one nanomaterial, carbon nanotube or carbon nanomaterial; means of conducting energy or electricity using at least one nanomaterial; or one of these that is at least partially transparent or translucent, flexible, thin or very thin; or a combination of these.

28. The method of claim 5, in which the image-making support medium, the aesthetic work and/or the work of art, design or architecture are made with or as: a visible display device that has multiple non-light-emissive colorants capable of changing their visibility, their color or both with energy, to create a visual effect sufficient to enable at least a portion of the work to have a display that can show a visible aesthetic, design or pictorial element, and this is a work of design for viewing or display apart from direct contact with the human body rather than worn on it; or this is a work of fine art or architecture.

29. The method of claim 5, in which the image-making support medium, the aesthetic work and/or the work of art, design or architecture are made with or as a technology, material or display that is one or more of: electronic paper; an e-material; electro-optic, reflective, a reflective display, a non-light-emitting display, bistable and/or electrophoretic.

30. The method of claim 5, in which the image-making support medium, the aesthetic work and/or the work of art, design or architecture are made with or as a technology, material or display prepared with:
- (i) cells, globes, capsules, spheres, a honeycomb structure, or enclosed parts, electrochromic molecules, conductive polymer, liquid crystal, cholesteric liquid crystal, microvariations of any of these, or organic electronics;
- (ii) parts that show different coloration when their position changes or when the position of their contents or parts changes;
- (iii) non-light-emissive colorants in one or multiple microcapsules; and/or (iv) charged non-light-emissive colorants that are able to change from visible to hidden, or from hidden to visible with electrical current which causes their position to change within a fluid with respect to an electrode.

31. The method of claim 5, in which the image-making support medium, the aesthetic work and/or the work of art, design or architecture are made with at least one interactive feature, it is made with at least one interactive feature in which the work is capable of being responsive, or it is made with at least one of these features that enables the creation, development or change of a visible pictorial, artwork or design element on one or more viewable areas with the work being active, and this interactive feature is more complex than or other than a conventional on/off switch or dimmer, or the work has at least one such interactive feature and: it has a control mechanism or device; it has means or a part that enables it or part of it to be controlled, modulated or changed; it is capable of using a trigger, stimulant or influence; it has sensing, detection or recognition capability; it has means of activation, input, or programming; it is capable of using a wireless connection, the Internet or a broadcast method; or the work has a combination of these.

32. The method of claim 5, in which the image-making support medium, the aesthetic work and/or the work of art, design or architecture are prepared or developed with means enabling:
(i) the work to actively respond to light or to changes in light, or enabling the creation, development and/or change of a visible pictorial, artwork or design element in a process in which the work actively responds to light or changes in light;
(ii) the work to visibly change as a whole or partially, in relation to change in natural light, skylight or nature, or such visible change that resembles or looks like change in natural light, skylight or nature;
(iii) the work or part of it to be capable of changing; self-actuating: using a control mechanism or device; using means or a part that enables it or part of it to be controlled, modulated or changed; using a trigger, stimulant or influence; using sensing, detection or recognition capability; using means of activation, input, or programming; using a wireless connection, the Internet or a broadcast method; or a combination of these;
(iv) the work to produce sound, music and/or voice, and/or respond to sound, music or voice;
(v) the work to have one or more of the variations above that is part of or throughout one or more of: an image support; an image support stabilizer; an underlayer; a light source;-a light emitting display; an OLED; an e-material or electronic paper; a non-light-emissive, reflective display; a form made with polymer or with polymer that is transparent or translucent; a work of art, design or architecture; a work that also serves as part or all of a wall, a ceiling, a window, a floor, furniture, a partition, a light, an architectural form, a wearable design, or a mural or
(vi) any combination of any of these.

33. The method of claim 5, in which the image-making support medium, the aesthetic work and/or the work of art, design or architecture are prepared or developed with means enabling it to actively respond to one or more triggers and/or stimulants, or enabling the creation, development and/or change of a visible pictorial, artwork or design element in a process in which the work actively responds to one or more triggers and/or stimulants, or the work is capable of at least one of these kinds of active responses and it includes: use of a control mechanism or device; use of means or a part that enables the work or part of it to be interactive, controlled, modulated or changed; use of sensing, detection or recognition capability; use of means of activation, input, or programming; use of a wireless connection, the Internet or a broadcast method; or a combination of these.

34. The method of claim 5, in which the image-making support medium, the aesthetic work and/or the work of art, design or architecture are prepared or developed with means enabling it to actively respond to movement and/or gesture, or enabling the creation, development and/or change of a visible pictorial, artwork or design element in a process in which the work actively responds to movement and/or gesture, or the work is capable of at least one of these kinds of active responses and it includes: use of means or a part that enables the work or part of it to be interactive, controlled, modulated or changed; use of a trigger, stimulant or influence; use of sensing, detection or recognition capability; use of means of activation, input, or programming; use of a wireless connection, the Internet or a broadcast method; or a combination of these.

35. The method of claim 5, in which the image-making support medium, the aesthetic work and/or the work of art, design or architecture are prepared or developed with means enabling it to actively respond to temperature, to heat, to the environment, to an aspect of one or more of these, or to a combination of these, or enabling the creation, development and/or change of a visible pictorial, artwork or design element in a process in which the work actively responds to temperature, to the environment, to an aspect of one or both of these, or to a combination of these, or the work is capable of at least one of these kinds of active responses and it includes: use of means or a part that enables the work or part of it to be interactive, controlled, modulated or changed; use of sensing, detection or recognition capability; use of means of activation, input, or programming; use of a wireless connection, the Internet or a broadcast method; or a combination of these.

36. The method of claim 5, in which the image-making support medium, the aesthetic work and/or the work of art, design or architecture are prepared or developed with means enabling interacting with, controlling and/or changing the work from a distance, using the Internet, using a wireless connection, or using a broadcast method, or enabling the creation, development and/or change of a visible pictorial, artwork or design element in a process in which the work actively responds to a subject that is separate from it and/or not present with it, or the work is capable of at least one of these and it uses: a trigger, stimulant or influence; sensing, detection or recognition capability; programming; a wireless connection, the Internet or a broadcast method; or a combination of these.

37. The method of claim 5, in which the image-making support medium, the aesthetic work and/or the work of art, design or architecture are prepared or developed with means enabling it to actively respond in a process that uses sensing, detection and/or recognition capability, or enabling the creation, development and/or change of a visible pictorial, artwork or design element in a process in which the work actively responds, and the process uses sensing, detection and/or recognition capability.

38. The method of claim 5, in which the image-making support medium, the aesthetic work and/or the work of art, design or architecture are prepared or developed with means enabling it to actively respond in a process that uses the Internet, or enabling the creation, development and/or change of a visible pictorial, artwork or design element in a process in which the work actively responds, and the process uses the Internet.

39. The method of claim 5, in which the image-making support medium, the aesthetic work and/or the work of art, design or architecture are prepared or developed with means enabling it to actively respond in a process that uses means of input or means of viewer input, or enabling the creation, development and/or change of a visible pictorial, artwork or design element in a process in which the work actively responds, and the process uses means of input or means of viewer input, or the work is capable of at least one of these kinds of active responses and it includes: the work changing or self-actuating: use of a control mechanism or device; use of means or a part that enables the work or part of it to be interactive, controlled, modulated or changed; use of a trigger, stimulant or influence; use of sensing, detection or recognition capability; use of means of activation or programming; use of a wireless connection, the Internet or a broadcast method; or a combination of these.

40. The method of claim 5, in which the image-making support medium, the aesthetic work and/or the work of art, design or architecture are made with a two or three-dimensional, pictorial, artwork or design element, or at least one aesthetic element that can change over time with the work being active, that can be seen from one or more of the work's sides or angles, and that is more complex than or other than the visual effect of a conventional on/off switch, or a conventional dimmer.

41. The method of claim 5, in which the image-making support medium, the aesthetic work and/or the work of art, design or architecture are prepared or developed with means enabling it to use a wireless connection, or enabling the creation, development and/or change of a visible pictorial, artwork or design element in a process that uses a wireless connection, or the work is capable of at least one of these variations and it includes: use of means or a part that enables the work or part of it to be interactive, controlled, modulated or changed; use of a trigger, stimulant or influence; use of sensing, detection or recognition capability; use of means of activation, input, or programming; use of the Internet or a broadcast method; or a combination of these.

42. The method of claim 5, in which the image-making support medium, the aesthetic work and/or the work of art, design or architecture are prepared or developed with means enabling it to actively use a broadcast, or enabling the creation, development and/or change of a visible pictorial, artwork or design element using a broadcast, or the work is capable of at least one of these variations and it includes: use of means or a part that enables the work or part of it to be interactive, controlled, modulated or changed; use of a trigger, stimulant or influence; use of sensing, detection or recognition capability; use of means of activation, input, or programming; use of a wireless connection or the Internet; or a combination of these.

43. The method of claim 5, in which the work or the image-making support medium is made with one or more of the components or properties below:

A) it is capable of being responsive, self-actuating, interactive, controlled, modulated, changed and/or programmed, or it has a part with this capability; it has this capability when stimulated, activated, influenced or triggered or when externally stimulated, activated, influenced or triggered;

B) use of the capability in A) above causes or assists in causing the image or the image-making support medium, or at least one of their aesthetic elements: to change, modulate, move or stop moving; to be visible, hidden, audible or silent; or to change it's electrical current, color, a light property, form, shape, position, volume, density, viscosity, appearance, a physical property, or a visible aesthetic property;

C) the work or the image-making support medium has means, a part, an area, a layer, an element, a device or a mechanism that can be activated, stimulated, triggered or used by: a person intentionally or unintentionally, the environment, temperature, heat, radiation, light, movement, acidity or pH, magnetism or magnetic field, a solvent, a chemical, a liquid, moisture, pressure, stress, programming, electricity, ionic energy, an electron beam, or by change in any of these, and this causes or assists in causing change, modulation or another response in the image, in the image-making support medium, in a part of one of these or in one or more of their aesthetic elements;

D) the work or the image-making support medium is prepared with one or more of: programming, means which enables it to be programmed; a computer, part of a computer or memory; an interactive part, means device or system; sound, music, light, or the presence and the absence of sound, magnetism or a magnetic force, music or light; a microphone or a speaker; a control mechanism or device; a viewer input device, a switch, a dial, a button, a touch control or touch activated device; a mechanism or device which enables control or change when pressure or stress is applied, a drawing device, a stylus or wand to control, interact with or change the image or image-making support medium; a trackball or a mouse; a computer vision system; means of responding to sound or voice command; technology or capability for: speech or voice recognition, movement or gesture recognition, capacitive sensing, human hand gesture recognition, motion recognition, human body motion recognition, sign language recognition, facial gesture recognition, pattern recognition, sensing or detecting; a fabric strain gage or a technology, sensor, device or ability that is sensitive to or that detects being bent or extended, or, such a technology, sensor, device or ability plus the ability to respond to this as a stimulant, trigger or influence; means of controlling, interacting with or changing the image or image-making support medium from a distance, using the Internet, using wireless communication or using a broadcast method; a sensor, means of sensing or detecting a viewer, movement, sound, light, the environment or an aspect of it, heat, temperature, change in any of these or other change, or such means of sensing or detecting plus means of responding or responding with a change in the image or image-making support medium, or in one of their aesthetic elements; programming or means by which a person can intentionally or unintentionally control, change or vary the electrical current, color, light, form, shape, movement, position, volume, form, density, viscosity, appearance, a physical property or an aesthetic element of the image-making support medium or image; an interactive feature or part which is hidden from view, unobvious or unapparent to viewers, or which is perceived to be visually continuous with, or visually integrated with the appearance of the rest of the image-making support medium or image; a photorefractive polymer absorbent polymer, polymer gel, hydrogel, or redox polymer; a shape memory polymer; an ionomeric polymer-metal composite; conductive polymer; or polymer capable of changing or responding to stimulation, a control, activation, a trigger or influence;

a solar cell, photovoltaics; a non-silicon solar or photovoltaic cell; a solar cell or photovoltaics applied or partially applied by painting, brushing, printing, spraying, spin casting, solution processing or a solution coating method; a power source, means of carrying power, a battery, a thin film battery, a circuit, an electrode, conductive ink, or a composition, material or technology that provides or carries power; polymer electronics, printed electronics, an integrated circuit or chip, a non-silicone integrated circuit or chip; a transistor, a thin film transistor (TFT), a backplane, a TFT backplane, an organic transistor, an active matrix backplane; a nanoscale device, machine or system; a light emitting material, light emitting silicon; an electroluminescent material, a metal coated polymer, a polymer coated metal or a semiconductor; a material or a polymeric material that is: photochromic, thermochromic, piezorochromic, piezoelectric, piezochromic, solvatechromic, carsolchromic, electroactive, gasochromic, a photonic colorant, a photonic crystal, a photonic material, a synthetic opal or a synthetic opal containing silica spheres or imbibed with liquid crystal, polymerized crystalline colloidal arrays, gel particles embedded in crystalline colloidal arrays, a photonic band gap material or structure; a phase change material; liquid crystal, liquid crystal elastomer; a smart fluid that is a particle filled, oil based suspension that changes in viscosity reversibly or that changes from liquid to solid reversibly; electro-rheological or magneto-rheostatic fluids; a polymer or conductive polymer magnet; porphyrin; a polymer that is re-mendable, self-healing or regenerative; a hologram or a hologram that appears two or three dimensional and at least partially intangible; or one or more of these or a conductive-electronic material or device that is: at least partially transparent, translucent or flexible; thin or very thin; made with polymer or conductive polymer; a nanomaterial or made with at least one nanomaterial, carbon nanotube or carbon nanomaterial; or made in a roll to roll or continuous manufacturing process, a printing process, a coating process or a non-vacuum process;

E) the work or the image-making support medium has one or more from A) or B) above that functions with, that employs, that is activated by, stimulated by, triggered by, produced by, or produced in part by one or more from C) or D) above;

F) the work or the image-making support medium has or is an OLED, a LED, a light emitting device, a field emission display, an e-material, or another device, machine or system, or alternately, it is prepared with or as at least one of these and also with one or more from A)-E) above; or G) the work or the image making support medium is prepared according to one or more from A)-F) above with polymer, with transparent or translucent polymer, or with a form that is at least partially transparent or translucent and made with polymer.

44. The method of claim 6, in which part or all of the image-making support medium, the aesthetic work and/or the work of art, design or architecture are prepared with at least one aesthetic property and:
(i) it is from: an additive or subtractive process; a conventional image-making process; a conventional image making medium, a conventional artist's medium or a conventional artist's painting or drawing medium; at least part of a drawing, picture or design, or one of these that is figurative, realistic, representational, abstract, surrealistic, a landscape or a still life; a depiction or representation of a recognizable subject; a primer conventionally used to make images; an underlayer; a colorant; a light source, light emitting display or means of emitting light; a material, a device or another means that provides or effects light properties; a filter; crystal, gem, stone, fabric, paper, clay, ceramic, wood, metal, an air pocket; a conductive, semi-conductive or holographic pigment; a photographic image, a photographic emulsion or a photographic transparency; writing, text, incising, inlay, carving or embossing; texture, irregular texture or texture deeper than a sandblasted surface or a sanded surface; or moving part or means to be capable of movement; music or sound; or a combination of these; or
(ii) the work has an aesthetic property that changes over time; that is visible discontinuously; that self-actuates; that is visible by interactivity; that is visible as a response; and/or that is visible using: a trigger, a stimulant, an influence; sensing, detection or recognition capability; a control mechanism or device; means or a part that enables the work or part of it to be interactive, responsive, controlled, modulated or changed; programming or means of activation or input; using a wireless connection, the Internet or a broadcast method; or any combination of these;
(iii) the work has an aesthetic property as part of or throughout one or more of: an image support; an image support stabilizer; an underlayer; a light source; a light emitting display; an OLED; an e-material or electronic paper; a non-light-emissive, reflective display; a form made with polymer or with polymer that is transparent or translucent; a work of art, design or architecture; a work that serves as part or all of a wall, a ceiling, a window, a floor, furniture, a partition, a light, an architectural form, a wearable design, or a mural; or
(iv) a combination of any of these.

45. The method of claim 6, in which part or all of the image-making support medium, the aesthetic work and/or the work of art, design or architecture are prepared with:
(i) a portrayal or depiction of the sky, the light of the sky, nature, a natural environment or scene, part thereof, plants, flowers or animals, that is: static, changing or that can be changed; that is: abstract, representational, realistic, surrealistic, or the depiction or representation of a recognizable subject;

any of these along with a figure, landscape or a still life; any of these that is at least partially formed with light in one or more colors; or any of these that is at least partially formed by color or light changing as the real version of it's subject matter might change or in a manner that portrays or represents the real version of it's subject matter; or (ii) one or more of the variations above, that changes over time, self-actuates, that changes discontinuously, interactively, in a responsive process, using: a trigger, a stimulant, an influence, programming or means of activation or input; using means or a part that enables the work or part of the work to be interactive, controlled, modulated or changed; using a control mechanism or device; using sensing, detection or recognition capability; and/or using a wireless method, the Internet or a broadcast method;
(iii) any of the variations above with the work capable of producing sound, music and/or voice, and/or capable of responding to sound, music or voice; or
(iv) one or more of the above as part of or throughout one or more of: an image support; an image support stabilizer; an underlayer; a light source; a light emitting display; an OLED; an e-material or electronic paper; a non-light-emissive, reflective display; a form made with polymer or with polymer that is transparent or translucent; a work of art, design or architecture; a work that also serves as part or all of a wall, a ceiling, a window, a floor, furniture, a partition, a light, an architectural form, a wearable design, or a mural; or
(v) a combination of any of these.

46. The method of claim 6, in which part or all of the image-making support medium, the aesthetic work and/or the work of art, design or architecture are prepared with at least one visual effect or aesthetic property that is:
(i) a portrayal, representation or abstraction of one or more people, human forms, part thereof, human heads or human torsos that is static, that is capable of changing or of being changed, or such a work that has light or color that changes, another visible aesthetic element that changes, the ability to produce sound, music and/or voice, and/or to respond to sound, music or voice;
(ii) one or more of the variations above or part or all of the work that changes over time, self-actuates, discontinuously, interactively, in a responsive process, using: a trigger, a stimulant, an influence, programming or means of activation or input; using means or a part that enables the work or part of the work to be interactive, controlled, modulated or changed; using a control mechanism or device; using sensing, detection or recognition capability; and/or using a wireless method, the Internet or a broadcast method;
(iii) such a visual effect or aesthetic property as part of or throughout one or more of: an image support; an image support stabilizer; an underlayer; a light source; a light emitting display; an OLED; an e-material or electronic paper; a non-light-emissive, reflective display; a form made with polymer or with polymer that is transparent or translucent; a work of art, design or architecture; a work that is also serves as part or all of a wall, a ceiling, a window, a floor, furniture, a partition, a light, an architectural form, a wearable design, or a mural; or
(iii) a combination of any of these.

47. The method of claim 6, in which the image-making support medium, the aesthetic work and/or the work of art, design or architecture are prepared as or with one or more light emitting devices; light emitting materials; light emitting silicon; electroluminescent materials; lighting; light fixtures; as a set, grouping or compositional arrangement with two or more light emitters that is a single work; and/or as lighting design, or
such a work that is at least partially flexible, thin, very thin, transparent or translucent, or made with at least one light effect; or
such a work that partially or entirely: changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

48. The method of claim 6, in which the image-making support medium, the aesthetic work and/or the work of art, design or architecture are prepared as or with one or more organic light emitting diodes (OLEDs), or
it is or it has one or more OLEDs that are at least partially flexible, thin, very thin, transparent or translucent; or
it is or it has one or more OLEDs, and part or all of the work can change over time, can be changed, can self-actuate, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or it is or it has a combination of these.

49. The method of claim 6, in which the image-making support medium, the aesthetic work and/or the work of art, design or architecture are prepared as or with at least one
(i) conductive polymer, or polymer that is capable of conducting electricity and/or emitting light; or
(ii) layered form that has conductive polymer in between two or more layers that are: transparent, translucent, polymeric, glass, non conductive or poorly conductive or a combination of these; or such a layered form with conductive polymer between it's other layers wherein this conductive polymer is capable of conducting electricity to one or more devices or light emitters that are also sandwiched in between it's other layers.

50. The method of claim 6, in which the image-making support medium, the aesthetic work and/or the work of art, design or architecture are prepared as or with one or more light-emitting diodes (LEDs), or
it is or it has one or more LEDs that are at least partially flexible, thin, very thin, transparent or translucent; or
it is or it has one or more LEDs, and part or all of the work can change over time, can be changed, can self-actuate, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or it is or it has a combination of these.

51. The method of claim 6, in which the image-making support medium, the aesthetic work and/or the work of art, design or architecture is made with a transistor, thin film transistor (TFT), a backplane, a TFT backplane, an active matrix backplane; light emitting transistor, an organic transistor, one of these that is at least partially transparent or translucent; or a combination of these.

52. The method of claim 6, in which part or all of the image-making support medium, the aesthetic work and/or the work of art, design or architecture are prepared with one or more of:
(i) at least one visible light effect; with at least one visible light effect and at least part of the work is light-emissive, transparent and/or translucent; and/or a material, a device or another means that provides or effects light properties; or (ii) a visible element, effect or part that is partially or entirely: electrochromic, reflective, photochromic; dichroic; iridescent; a hologram; crystal, a filter; an air pocket; a pigment that is conductive, semi-conductive or holographic; or a combination of these;

(iii) a form that functions as: a lens; a Fresnel lens; a grating; a diffraction grating; a prism; or a lenticular lens or form; or a combination of these; or a visual effect from one or more of these, (iv) the work has one or more of the variations above, that is visible continuously, that is visible discontinuously, the visibility of which changes over time, that self-actuates, that is visible by interactivity, that is visible as a response, and/or that is visible in using: a trigger, a stimulant, an influence, programming, means of activation or input; using means or a part that enables the work or part of the work to be interactive, controlled, modulated or changed; using a control mechanism or device; using sensing, detection or recognition capability; and/or using a wireless method, the Internet or a broadcast method; and/or (v) the work has a light effect as part or all of one or more of: an image support; an image support stabilizer; an underlayer; a light source; a light emitting display; an OLED; an e-material or electronic paper; a non-light-emissive, reflective display; a form made with polymer or with polymer that is transparent or translucent; a work of art, design or architecture; a work that is also serves as part or all of a wall, a ceiling, a window, a floor, furniture, a partition, a light, an architectural form, a wearable design, or a mural; or (vi) any combination of these.

53. The method of claim 6, in which part or all of the image-making support medium, the aesthetic work and/or the work of art, design or architecture has one or more visible elements, effects or parts that are entirely or partially reflective.

54. The method of claim 6, in which part or all of the image-making support medium, the aesthetic work and/or the work of art, design or architecture has one or more visible elements, effects or parts that are entirely or partially photochromic.

55. The method of claim 6, in which part or all of the image-making support medium, the aesthetic work and/or the work of art, design or architecture has an electrochromic technology, material, display or effect, or it is electrochromic and capable of changing color; capable of changing it's state of or level of transparency, translucency, reflectivity and/or light emission; and/or capable of changing the light passing through it; or it has an electrochromic effect and it has means of having and using energy or electricity from a source that is part of it or separate from it; or it has an electrochromic effect and it's means of having and using energy is hidden from view and/or entirely or largely unobvious or unapparent to viewers looking at the work as a whole; or any combination of these.

56. The method of claim 6, in which the image-making support medium, the aesthetic work and/or the work of art, design or architecture are prepared with: the ability to visibly change it's level of transparency; the ability to visibly change from being entirely or partially transparent or translucent, to being entirely or partially opaque; and/or the ability to visibly change from being entirely or partially light emitting to being entirely or partially transparent or translucent, or:

(i) the work is capable of such a change that is visible continuously, that is visible discontinuously, the visibility of which changes over time, that self-actuates, that is visible by interactivity, in a response process, using: a trigger, a stimulant, an influence, programming or a means of activation or input; using means or a part that enables the work or part of the work to be interactive, controlled, modulated or changed; using a control mechanism or device; using sensing, detection or recognition capability; and/or using a wireless method, the Internet or a broadcast method; and/or (ii) the work is capable of such a change that is visible on part or all of one or more of: an image support; an image support stabilizer; an underlayer; a light source; a light emitting display; an OLED; an e-material or electronic paper; a non-light-emissive, reflective display; a form made with polymer or with polymer that is transparent or translucent; a work of art, design or architecture; a work that is also serves as part or all of a wall, a ceiling, a window, a floor, furniture, a partition, a light, an architectural form, a wearable design, or a mural; or (iii) any combination of these.

57. The method of claim 6, in which the image-making support medium, the aesthetic work and/or the work of art, design or architecture are prepared with a visible effect or aesthetic property created or contributed to by the use of electricity that causes the positions of particles, of liquid crystals, or of liquid crystals in a polymer layer or matrix to change, to align, to become more aligned, to become random or to become more random; or (i) the work is capable of having this effect or aesthetic property visible continuously, that is visible discontinuously, the visibility of which changes over time, that self-actuates, that is visible by interactivity, in a response process, using: a trigger, a stimulant, an influence, programming or means of activation or input; using means or a part that enables the work or part of the work to be interactive, controlled, modulated or changed; using a control mechanism or device; using sensing, detection or recognition capability; and/or using a wireless method, the Internet or a broadcast method; and/or (ii) the work is capable of having this effect or aesthetic property visible on part or all of one or more of: an image support; an image support stabilizer; an underlayer; a light source; a light emitting display; an e-material or electronic paper; a non-light-emissive, reflective display; a form made with polymer or with polymer that is transparent or translucent; a work of art, design or architecture; a work that is also serves as part or all of a wall, a ceiling, a window, a floor, furniture, a partition, a light, an architectural form, a wearable design, or a mural; or (iii) any combination of these.

58. The method of claim 6, in which the image-making support medium, the aesthetic work and/or the work of art, design or architecture are prepared with at least one nanomaterial that is man-made and/or grown by man, or that is non-natural.

59. The method of claim 6, in which the image-making support medium, the aesthetic work and/or the work of art, design or architecture are prepared with at least one nano-composite, hybrid nanomaterial or both.

60. The method of claim 6, in which the image-making support medium, the aesthetic work and/or the work of art, design or architecture are prepared with at least one nanotube, carbon nanotube or single wall carbon nanotube.

61. The method of claim 6, in which the image-making support medium, the aesthetic work and/or the work of art, design or architecture are prepared with graphene and/or buckypaper.

62. The method of claim 6, in which the image-making support medium, the aesthetic work and/or the work of art, design or architecture are prepared with at least one nanoparticle.

63. The method of claim 6, in which the image-making support medium, the aesthetic work and/or the work of art, design or architecture are prepared with at least one nanocrystal and/or quantum dot.

64. The method of claim 6, in which the image-making support medium, the aesthetic work and/or the work of art, design or architecture are prepared with at least one nanowire, nanofiber and/or nanoclay, or with molybdenum or a nanomaterial made with molybdenum.

65. The method of claim 6, in which the image-making support medium, the aesthetic work and/or the work of art, design or architecture are prepared with a nanocomposite, a hybrid nanomaterial, a polymer nanocomposite or a polymer hybrid nanomaterial, that is in the form of a thin or very thin layer, in or on which there is: graphene, buckypaper, or at least one but optimally many nanoscale nanomaterials, carbon nanotubes, single wall carbon nanotubes, nanoparticles, nanowires, nanocrystals, nanofibers or molybdenum.

66. The method of claim 6, in which the image-making support medium, the aesthetic work and/or the work of art, design or architecture are prepared with at least one fine-art stabilizer; at least one fine art stabilizer that is or has at least one nanomaterial; at least one fine-art stabilizer that bonds to or enhances the bond to one or more superimposed conventional artists' mediums or paints; or
- a fine-art stabilizer that bonds to or enhances the bond to one or more superimposed conventional artist's paints, and this fine-art stabilizer is at least one conventional artist's paint, conventional artist's painting primer, or conventional artist's paint binder; or at least one fine-art stabilizer that is a combination of these.

67. The method of claim 6, in which the image-making support medium, the aesthetic work and/or the work of art, design or architecture are prepared with:
- (i) a monomer that is methacrylate ester, methacrylamide derivative or methyl methacrylate; (ii) a polymer that is poly(methyl methacrylate) or that is made from methacrylate ester or methacrylamide derivative; (iii) any of these that are strengthened, made stiffer or made more rigid by at least one nanomaterial, by a fine art stabilizer or by another polymer; (iv) polycarbonate; (v) a polymer and a fine art stabilizer; (vi) a polymer and a fine art stabilizer that provides or enhances it's ability to remain unchanged with exposure to ultraviolet light; or (vii) any of these that are transparent or translucent forms.

68. The method of claim 6, in which the image-making support medium, the aesthetic work and/or the work of art, design or architecture are prepared with:
- (i) a conventional image-making medium made with at least one nanomaterial, or
- (ii) a conventional image making medium that is improved, enhanced, changed or made more permanent by at least one nanomaterial, or
- (iii) a nanocomposite or hybrid nanomaterial made with a conventional image making medium that is more permanent, stronger, tougher, more resilient, more durable, stiffer, less flexible, less breakable, less fragile, less brittle, or less fibrous than the conventional image-making medium in it's conventional state, or that is enhanced for use in art, design or architecture or for use in making such works in comparison to the conventional image-making medium.

69. The method of claim 6, in which the image-making support medium, the aesthetic work and/or the work of art, design or architecture are prepared with at least one nanomaterial and also with at least one material or medium that is entirely free of nanotechnological processing that is made: (i) using bulk technology; (ii) by nature or a by a natural process; and/or (iii) with natural rather than manmade, nanoscale, structure(s), feature(s), or physical phenomena.

70. The method of claim 6, in which the image-making support medium, the aesthetic work and/or the work of art, design or architecture are prepared with a conventional medium that is more permanent, stronger, tougher, more resilient, more durable, stiffer, less flexible, less breakable, less fragile, less brittle, less fibrous or enhanced for use in art, design or architecture or for use in making such works, due to one or more nanomaterials.

71. The method of claim 6, in which the image-making support medium, the aesthetic work and/or the work of art, design or architecture are prepared with metal, glass, crystal, ceramic, clay, stone, paper, wood, conventional artist's canvas fabric, or plaster in a nanocomposite, a hybrid nanomaterial or a nanomaterial.

72. The method of claim 6, in which the image-making support medium, the aesthetic work and/or the work of art, design or architecture are prepared with: polymer, transparent or translucent polymer, acrylic, poly(methyl methacrylate), methacrylate ester or methacrylamide derivative, absorbent polymer or conductive polymer, or they are prepared with one or more of these in a nanocomposite or hybrid nanomaterial, or in a polymer carbon nanotube nanocomposite, or a polymer clay nanocomposite.

73. The method of claim 6, in which the image-making support medium, the aesthetic work and/or the work of art, design or architecture are prepared with a nanomaterial that is partially, largely or completely: (i) nano-pure; (ii) made, manipulated, or engineered on an atomic or molecular scale or from the bottom up; (iii) made, manipulated, or engineered using nanotechnology to control most or all atoms, or to control most atoms or every atom that serves a particular function or that is in a particular position or on a particular part of the image; or (iv) one or more of (i)-(iii) and the nanomaterial is visible to the unaided or naked eye or it is unseen by viewers.

74. The method of claim 6, in which the image-making support medium, the aesthetic work and/or the work of art, design or architecture are prepared with or as one or more devices, machines and/or systems that is nanoscale or larger, made with one or more nanomaterials.

75. The method of claim 6, in which the image-making support medium, the aesthetic work and/or the work of art, design or architecture are prepared with or as one or more fabrics, conventional artist's canvas fabrics, textiles, meshes and/or woven materials, that is nanoscale or larger, made with one or more nanomaterials.

76. The method of claim 6, in which the image-making support medium, the aesthetic work and/or the work of art, design or architecture are prepared with one or more nanomaterials that are conductive.

77. The method of claim 6, in which the image-making support medium, the aesthetic work and/or the work of art, design or architecture are prepared with a form that is sufficiently strong, stabile or permanent, and one or more of:

it is structural or it is sufficient to serve as the work's structure; it is rigid, planar, slight, thin or very thin; unreinforced, unbacked, or unbolstered;

it is a form made with a strengthening stabilizer; it is a form that is an image support or an image support stabilizer or it is a form made with an image support or image support stabilizer; and/or it is a form prepared as a mural or as a design on a wall, ceiling or other architectural structure.

78. The method of claim 6, in which the image-making support medium, the aesthetic work and/or the work of art, design or architecture are prepared with:
   (i) a form that is largely or almost completely made of a conventional artist's support medium or of it's ingredient or ingredients;
   (ii) a form that visually resembles or looks similar to a conventional artist's support medium, canvas, paper, acrylic sheeting or clay, or it is such a form that also functions in a manner that is like or similar to the conventional artist's support medium it looks similar to or resembles;
   (iii) the visual appearance of or resembling a conventional artist's canvas; texture resembling conventional canvas; deckled edges; irregularities resembling handmade paper, or
   (iv) any combination of these.

79. The method of claim 6, in which the image-making support medium, the aesthetic work and/or the work of art, design or architecture are prepared with a form or a planar form with sufficient mechanical or structural properties so that it can support its own weight or be freestanding.

80. The method of claim 6, in which the image-making support medium, the aesthetic work and/or the work of art, design or architecture are prepared with a form with sufficient mechanical or structural properties so that it can support its own weight or be freestanding, and this form or part of it:
   (i) bonds to a conventional artist's medium; and/or
   (ii) is one or more of: transparent, translucent, planar, polymeric, resembling a conventional artist's canvas, canvas board, acrylic sheeting or sheet of paper, made with a fine art stabilizer that provides or enhances it's ability to remain unchanged with exposure to ultraviolet light, or made with a fine art stabilizer that enables or enhances bonding.

81. The method of claim 6, in which the image-making support medium, the aesthetic work and/or the work of art, design or architecture are prepared with means of installation, mounting or display on a wall or vertical surface or by hanging; a hook or wire attached to enable hanging; or holes to enable hanging.

82. The method of claim 6, in which the image-making support medium, the aesthetic work and/or the work of art, design or architecture are made with a form that is partially or entirely: rigid, inflexible and/or flexible; capable of folding, unfolding, rolling out or scrolling; or a combination of these.

83. The method of claim 6, in which the image-making support medium, the aesthetic work and/or the work of art, design or architecture are made with a form that is linear; that is non-planar; that has at least one curve, angle or undulation; or that is a combination of these.

84. The method of claim 6, in which the image-making support medium, the aesthetic work and/or the work of art, design or architecture are made with a form that is non-geometric, non-uniform, irregular and/or uneven; made with a form that has irregularities so that it looks handmade; made with deckled edges; or a combination of these.

85. The method of claim 6, in which the image-making support medium, the aesthetic work and/or the work of art, design or architecture have forms that are:
   (i) discontinuous, (ii) made with two or more parts that are joined or that are separate; (iii) a strong, stabile or permanent form made of two or more parts with joints, bonds or points of contact that appear visually to be too slight, too small or too few in number for the form to be strong, stabile or permanent; or (iv) a combination of these.

86. The method of claim 6, in which the image-making support medium, the aesthetic work and/or the work of art, design or architecture have forms that are partially or entirely: (i) layered, (ii) transparent and/or translucent; (iii) made with one or more image supports; (iv) made with a layer, part or other ingredient that enhances it's permanence or stability; and/or (v) a combination of these.

87. The method of claim 6, in which the image-making support medium, the aesthetic work and/or the work of art, design or architecture have a planar or two dimensional form that is transparent or translucent and made with polymer, glass or both, with (i) one or more light sources, OLEDs or other LEDs within it, attached to it, or included as part of the work; (ii) a conductive polymer; and/or (iii) an electrical conductor that is not visible or not apparent to viewers.

88. The method of claim 6, in which the image-making support medium, the aesthetic work and/or the work of art, design or architecture are at least partially: hollow; with a form that has at least one open space within it; openwork; with at least one air pocket; or a combination of these.

89. The method of claim 6 wherein the work is free of a computer; the work has a display screen which is the screen of a computer and it leaves the work free from a functionality that is a separate alternative to the purpose described in claim 6; or the work has a computer that is subsidiary or subordinate to the work's visible aesthetic effect or effects.

90. The method of claim 6 wherein the work has one or more of:
   a display screen in addition a computer that functions with its own display screen;
   it has a computer that works free of a visible display screen;
   it has a computer that is a hidden part of the work;
   it has a computer that is free of word processing capability or free of an alphanumeric keyboard;
   the work's has a light emitting display screen that is:
      (1) free of visible clearly legible text and numbers,
      (2) partially free of visible clearly legible text and numbers, and:
         (i) partially continuously showing clearly legible text, numbers or both,
         (ii) temporarily showing text, numbers or both, or
         (iii) both (i) and (ii); or
      (3) the display screen shows text, numbers or both that are poetic, nonsensical, unclear in appearance, with an aesthetic purpose, or a combination of these; and/or
   the work has a computer with its display screen meeting the requirements of options (1), (2) and/or (3) above.

91. The method of claim 6 wherein the aesthetic work has a computer with a visible display screen that provides or contributes to an aesthetic element, and the utilitarian elements of this computer are mostly or entirely hidden from view, they are entirely or predominantly unobvious or unapparent to viewers looking at the whole work, or a combination of these.

92. The method of claim 6, in which the image-making support medium, the aesthetic work and/or the work of art, design or architecture are made with one or more parts for mounting, installation or display; with one or more utilitarian parts; with electronics, wiring, cords, control buttons, it's battery or power source; a framework, support or bracing; an interactive feature or part, and/or with most or all of it's utilitarian elements hidden from view and/or entirely or largely unobvious or unapparent to viewers looking at the work as a whole.

93. The method of claim 6, in which the image-making support medium, the aesthetic work and/or the work of art, design or architecture are made capable of serving as: furniture, a table, a chair, a stool, a chest, a cabinet, a cart, a bench, or as a set, grouping or compositional arrangement of these that is a single work, or such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

94. The method of claim 6, in which the image-making support medium, the aesthetic work and/or the work of art, design or architecture are made capable of serving as: a tile or a set, grouping or compositional arrangement of these that is a single work, or such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

95. The method of claim 6, in which the image-making support medium, the aesthetic work and/or the work of art, design or architecture are made capable of serving as: a door, partition, a screen, or a set, grouping or compositional arrangement of these that is a single work, or such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

96. The method of claim 6, in which the image-making support medium, the aesthetic work and/or the work of art, design or architecture are made capable of serving as: a gate, a fence, a column, a stage set, a tent, an awning, a fountain, a candelabrum, or a set, grouping or compositional arrangement of these that is a single work, or such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

97. The method of claim 6, in which the image-making support medium, the aesthetic work and/or the work of art or design are made capable of serving as: a basket, a case or container, or a set, grouping or compositional arrangement of these that is a single work, or such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

98. The method of claim 6, in which the image-making support medium, the aesthetic work and/or the work of art, design or architecture are made capable of serving as: a window, a skylight, a lunette, or as a set, grouping or compositional arrangement of these that is a single work, or such a work that has at least one light effect, is photochromic and/or capable of emitting light; such a work that is electrochromic; such a work that has means of having and using energy from a source that is part of it or separate from it, such a work that has a power source, a solar cell, and/or photovoltaics; or such a work that partially or entirely: changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or any combination of these.

99. The method of claim 6, in which the image-making support medium, the aesthetic work and/or the work of art or design are made capable of serving as: shades, shutters, or a set, grouping or compositional arrangement of these that is a single work, or such a work that has at least one light effect, is photochromic and/or capable of emitting light; such a work that is electrochromic; such a work that has means of having and using energy from a source that is part of it or separate from it, a power source, a solar cell, and/or photovoltaics; or such a work that partially or entirely: changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

100. The method of claim 6, in which the image-making support medium, the aesthetic work and/or the work of art, design or architecture are made capable of serving as: an architectural form or structure, a building façade, stairs, a crosswalk or a bridge, or
- such a work that has at least one light effect, is photochromic and/or capable of emitting light; such a work that is electrochromic; such a work that has means of having and using energy from a source that is part of it or separate from it, a power source, a solar cell, and/or photovoltaics; or
- such a work that partially or entirely: changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

101. The method of claim 6, in which the image-making support medium, the aesthetic work and/or the work of art, design or architecture are made capable of serving as a wall, or
- such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

102. The method of claim 6, in which the image-making support medium, the aesthetic work and/or the work of art, design or architecture are made capable of serving as a ceiling, or
- such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

103. The method of claim 6, in which the image-making support medium, the aesthetic work and/or the work of art, design or architecture are made capable of serving as a floor, or
- such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

104. The method of claim 6, in which the image-making support medium, the aesthetic work and/or the work of art, design or architecture are made capable of serving as craft design, or
- such a work that is capable of emitting light, made with at least one light effect or that is electrochromic; or
- such a work that partially or entirely: changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

105. The method of claim 6, in which the image-making support medium, the aesthetic work and/or the work of art, design or architecture are made capable of serving as: a work of design for household use, or as a vase, a bowl, a tray, a cup or goblet, a plate, a dish, a pitcher, a soup tureen or a placemat, or
- such a work that is capable of emitting light, made with at least one light effect or that is electrochromic; or
- such a work that partially or entirely: changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

106. The method of claim 6, in which the image-making support medium, the aesthetic work and/or the work of art, design or architecture are made capable of serving as: a work of art, design or architecture for spiritual or religious use, or as an altar, or a menorah, or
- such a work that is capable of emitting light, made with at least one light effect or that is electrochromic; or
- such a work that partially or entirely: changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

107. The method of claim 6, in which the image-making support medium, the aesthetic work and/or the work of art or design are:
- made capable of serving as: a book or pad that is a new version of the conventional image making blank book or blank paper pad capable of being developed into visual pictorial image; or
- made capable of serving as: a plurality of associated sheets arranged in a book or pad form capable of use for image making; or
- made capable of serving as book design, optimally free or nearly free of visible legible text; or made as such a work that partially or entirely: emits light, has at least one light effect, is capable of flexing, rolling, scrolling or folding; changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

108. The method of claim 6, in which the image-making support medium, the aesthetic work and/or the work of art or design are made capable of serving as: a work of graphic design, or such a work that partially or entirely: emits light, has at least one light effect, is capable of flexing, rolling, scrolling or folding; changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

109. The method of claim 6, in which the image-making support medium, the aesthetic work and/or the work of art or design are made capable of serving as a wearable work of art or design; as fashion design; and/or as a costume, or such a work that partially or entirely: emits light, has at least one light effect, is capable of flexing, rolling, scrolling or folding; changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

110. The method of claim 6, in which the image-making support medium, the aesthetic work and/or the work of art or design are made capable of serving as jewelry, or such a work that partially or entirely: emits light, has at least one light effect, is capable of flexing, rolling, scrolling or folding; changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

111. The method of claim 6, in which the image-making support medium, the aesthetic work and/or the work of art or design are made capable of serving as: a fashion accessory, a hat, a belt, a handbag, or a tote bag, or such a work that partially or entirely: emits light, has at least one light effect, is capable of flexing, rolling, scrolling or folding; changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

112. The method of claim 7 wherein the image-making support medium or the work is prepared with or as: (i) one or more sheets, or (ii) a plurality of associated sheets arranged in a pad or book form for image making, or arranged in a pad or a book with a form of or similar to a conventional blank paper pad or blank book for image making.

113. The method of claim 7 wherein the image making support medium or the work is prepared so that it has: the visual appearance of or resembling a conventional artist's canvas; deckled edges; irregularities resembling handmade paper; texture resembling conventional canvas; or the work is prepared with an aesthetic texture made by taking one or more positive or negative impressions from one or more organic or natural materials, or an aesthetic texture resembling this.

114. The method of claim 7 wherein the image making support medium or the work is prepared with: drawing, painting, a conventional artist's medium or paint, an imprimatura, a ground and/or collage.

115. The method of claim 7 wherein the image making support medium or the work is accompanied by instructions for developing it as or into art, design or architecture; and/or the work is accompanied by instructions for displaying it as art, design or architecture.

116. The method of claim 8 wherein the image making support medium or the work is prepared or developed so that it has an overall aesthetic shape or form that depicts or represents a recognizable subject or that is figurative.

117. The method of claim 8 wherein the image making support medium or the work is prepared or developed with a fine-art stabilizer that bonds to or enhances the bond to one or more superimposed conventional artist's paints, and this fine-art stabilizer is at least one conventional artist's paint, conventional artist's painting primer, or conventional artist's paint binder.

118. The method of claim 8 wherein the image making support medium or the work is prepared or developed with a viewable surface at least part of which has an absorbent polymer, and this absorbent polymer is superimposed by a paint or other colorant to modify or change it's color and/or light property.

119. The method of claim 8 wherein the image making support medium or the work is prepared or developed with most or all of it's utilitarian elements are hidden from view and/or entirely or largely unobvious or unapparent to viewers looking at the work as a whole, including any wiring, batteries, control buttons, electrical parts, and utilitarian mount parts the work might have.

120. The method of claim 8 wherein the image making support medium or the work is prepared or developed so that it has the visible signature or distinguishing mark identifying the artist, designer or group of artists and/or designers who created it, which is other than the mark of an industrial or commercial manufacturer or scientific organization.

121. The method of claim 9 wherein the image making support medium and/or the work is prepared or developed with means that provides or enables interactivity; it is prepared or developed with means that provides or enables interactivity in which the work is capable of being responsive; or it is prepared or developed with means that provides or enables interactivity enabling a visible pictorial, artwork or design element to be created, developed and/or changed in a process in which the work is active, or the work has at least one such interactive feature and: it has a control mechanism or device; it has means or a part that enables it or part of it to be controlled, modulated or changed; it is capable of using a trigger, stimulant or influence; it has sensing, detection or recognition capability; it has means of activation, input, or programming; it is capable of using a wireless connection, the Internet or a broadcast method; or the work has a combination of these.

122. The method of claim 9 wherein the image making support medium and/or the work is prepared or developed so that it has means enabling:
(i) the work to actively respond to light or to changes in light, or enabling the creation, development and/or change of a visible pictorial, artwork or design element in a process in which the work actively responds to light or changes in light;
(ii) the work to visibly change as a whole or partially in relation to change in natural light, skylight or nature, or such visible change that resembles or looks like change in natural light, skylight or nature;
(iii) the work or part of to be capable of changing; self-actuating: using a control mechanism or device; using means or a part that enables it or part of it to be controlled, modulated or changed; using a trigger, stimulant or influence; using sensing, detection or recognition capability; using means of activation, input, or programming; using a wireless connection, the Internet or a broadcast method; or a combination of these;
(iv) the work to produce sound, music and/or voice, and/or respond to sound, music or voice;
(v) the work to have one or more of the variations above that is part of or throughout one or more of: an image support; an image support stabilizer; an underlayer; a light source;-a light emitting display; an OLED; an e-material or electronic paper; a non-light-emissive, reflective display; a form made with polymer or with polymer that is transparent or translucent; a work of art, design or architecture; a work that also serves as part or all of a wall, a ceiling, a window, a floor, furniture, a partition, a light, an architectural form, a wearable design, or a mural or
(vi) any combination of any of these.

123. The method of claim 9 wherein the image making support medium and/or the work is prepared or developed so that it has means enabling it to actively respond to one or more triggers or stimulants, or enabling the creation, development and/or change of a visible pictorial, artwork or design element in a process in which the work actively responds to one or more triggers and/or stimulants, or the work is capable of at least one of these kinds of active responses and it includes: use of a control mechanism or device; use of means or a part that enables the work or part of it to be interactive, controlled, modulated or changed; use of sensing, detection or recognition capability; use of means of activation, input, or programming; use of a wireless connection, the Internet or a broadcast method; or a combination of these.

124. The method of claim 9 wherein the image making support medium and/or the work is prepared or developed so that it has means enabling it to actively respond to movement and/or gesture, or enabling the creation, development and/or change of a visible pictorial, artwork or design element in a process in which the work actively responds to movement and/or gesture, or the work is capable of at least one of these kinds of active responses and it includes: use of means or a part that enables the work or part of it to be interactive, controlled, modulated or changed; use of a trigger, stimulant or influence; use of sensing, detection or recognition capability; use of means of activation, input, or programming; use of a wireless connection, the Internet or a broadcast method; or a combination of these.

125. The method of claim 9 wherein the image making support medium and/or the work is prepared or developed so that it has means enabling it to actively respond to temperature, to heat, to the environment, to an aspect of one or more of these, or to a combination of these, or enabling the creation, development and/or change of a visible pictorial, artwork or design element in a process in which the work actively responds to temperature, to the environment, to an aspect of one or both of these, or to a combination of these, or the work is capable of at least one of these kinds of active responses and it includes: use of means or a part that enables the work or part of it to be interactive, controlled, modulated or changed; use of sensing, detection or recognition capability; use of means of activation, input, or programming; use of a wireless connection, the Internet or a broadcast method; or a combination of these.

126. The method of claim 9 wherein the image making support medium and/or the work is prepared or developed so that it has means enabling interacting with, controlling and/or changing the work from a distance, using the Internet, using a wireless connection, or using a broadcast method, or enabling the creation, development and/or change of a visible pictorial, artwork or design element in a process in which the work actively responds to a subject that is separate from it and/or not present with it, or the work is capable of at least one of these and it uses: a trigger, stimulant or influence; sensing, detection or recognition capability; programming; a wireless connection, the Internet or a broadcast method; or a combination of these.

127. The method of claim 9 wherein the image making support medium and/or the work is prepared or developed so that it has means enabling it to actively respond in a process that uses sensing, detection and/or recognition capability, or enabling the creation, development and/or change of a visible pictorial, artwork or design element in a process in which the work actively responds, and the process uses sensing, detection and/or recognition capability.

128. The method of claim 9 wherein the image making support medium and/or the work is prepared or developed so that it has means enabling it to actively respond in a process that uses the Internet, or enabling the creation, development and/or change of a visible pictorial, artwork or design element in a process in which the work actively responds, and the process uses the Internet.

129. The method of claim 9 wherein the image making support medium and/or the work is prepared or developed so that it has means enabling it to actively respond in a process that uses means of input or means of viewer input, or enabling
the creation, development and/or change of a visible pictorial, artwork or design element in a process in which the work actively responds, and the process uses means of input, or
the work is capable of at least one of these kinds of active responses and it includes: the work changing or self-actuating: use of a control mechanism or device; use of means or a part that enables the work or part of it to be interactive, controlled, modulated or changed; use of a trigger, stimulant or influence; use of sensing, detection or recognition capability; use of means of activation or programming; use of a wireless connection, the Internet or a broadcast method; or a combination of these.

130. The method of claim 9 wherein the image making support medium or the work is prepared or developed so that it has a visual aesthetic element visible to viewers resembling that in an image by Rembrandt, Vermeer, Turner, Van Gogh, Monet, Seurat, an Impressionist artist, Jackson Pollack, Marc Rothko, Brancusi, Noguchi, Tiffany or I.M. Pei, or resembling that in a known work of or kind of fine art or design.

131. The method of claim 9 wherein the image making support medium or the work is prepared or developed with the means enabling the creation and/or development of a visible, two or three-dimensional, pictorial, artwork or design element or at lest one aesthetic element that can change over time with the work being active, that is more complex than or other than the visual effect of a conventional on/off switch, or a conventional dimmer.

132. The method of claim 9, in which the image-making support medium, and/or the work are made with one or more of: means of having and using energy from a source that is part of it or separate from it; a power source, a battery, a thin film battery, a solar cell or panel a non-silicon solar or photovoltaic cell; a photovoltaic device or cell; a circuit, conductive ink, or a composition, material or technology that provides or carries power; one or more of these made with at least one nanomaterial; means of conducting energy or electricity using at least one nanomaterial; or one of these that is at least partially transparent or translucent, flexible, thin or very thin; or a combination of these.

133. The method of claim 9, in which the image-making support medium, or the work are made with or as a visible display device that has multiple non-light-emissive colorants capable of changing their visibility, their color or both with energy, to create a visual effect sufficient to enable at least a portion of the work to have a display that can show a visible aesthetic, design or pictorial element, to make a work of design for viewing or display apart from direct contact with the human body rather than worn on it; or to make a work of fine art or architecture.

134. The method of claim 9, in which the image-making support medium, or the work are made with or as a technology, material or display that is one or more of: electronic paper; an e-material; electro-optic, reflective, a reflective display, a non-light-emitting display, bistable and/or electrophoretic.

135. The method of claim 9, in which the image-making support medium, or the work are made with or as a technology, material or display prepared with:
(i) cells, globes, capsules, spheres, a honeycomb structure, or enclosed parts, electrochromic molecules, conductive polymer, liquid crystal, cholesteric liquid crystal, micro-variations of any of these, or organic electronics;
(ii) parts that show different coloration when their position changes or when the position of their contents or parts changes;
(iii) non-light-emissive colorants in one or multiple microcapsules; and/or
(iv) charged non-light-emissive colorants that are able to change from visible to hidden, or from hidden to visible with electrical current which causes their position to change within a fluid with respect to an electrode.

136. The method of claim 9, in which the image-making support medium, or the work are made with means of display as art or design; it is displayed as art or design; it is hung, installed or mounted for display; or a combination of these.

137. The method of claim 9 wherein the work is free of a computer; the work has a display screen which is the screen of a computer and it leaves the work free from a functionality that is a separate alternative to the purpose described in claim 9; or the work has a computer that is subsidiary or subordinate to the work's visible aesthetic effect or effects.

138. The method of claim 9 wherein the work has one or more of:
a display screen in addition a computer that functions with its own display screen;
it has a computer that works free of a visible display screen;
it has a computer that is a hidden part of the work;
it has a computer that is free of word processing capability or free of an alphanumeric keyboard;
the work's has a light emitting display screen that is:
(1) free of visible clearly legible text and numbers,
(2) partially free of visible clearly legible text and numbers, and:
(i) partially continuously showing clearly legible text, numbers or both,
(ii) temporarily showing text, numbers or both, or
(iii) both (i) and (ii); or
(3) the display screen shows text, numbers or both that are poetic, nonsensical, unclear in appearance, with an aesthetic purpose, or a combination of these; and/or
the work has a computer with its display screen meeting the requirements of options (1), (2) and/or (3) above.

139. The method of claim 9 wherein the aesthetic work has a computer with a visible display screen that provides or contributes to an aesthetic element, and the utilitarian elements of this computer are mostly or entirely hidden from view, they entirely or predominantly unobvious or unapparent to viewers looking at the whole work, or a combination of these.

140. The method of claim 6, in which part or all of the image-making support medium, the aesthetic work, and/or the work of art, design or architecture is prepared or developed so that it has an overall aesthetic shape or form that depicts or represents a recognizable subject, or that is figurative.

141. The method of claim 6 wherein the work has a title as art.

142. The method of claim 6, in which part or all of the image-making support medium, the aesthetic work, and/or the work of art, design or architecture is accompanied by instructions for developing it as or into art, design or architecture; and/or for displaying it as art, design or architecture.

143. The method of claim 6, in which part or all of the image-making support medium, the aesthetic work, and/or the work of art, design or architecture are prepared or developed so that they have the visible signature or distinguishing mark identifying the artist, designer or group of artists and/or designers who created it, which is other than the mark of an industrial or commercial manufacturer or scientific organization.

144. The method of claim 6, in which part or all of the image-making support medium, the aesthetic work, and/or the work of art, design or architecture is pictorial;
or it is pictorial and figurative, realistic, abstract, surrealistic, representational, a landscape or a still life; or a combination of these, and
part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

145. The method of claim 6, in which the image-making support medium, the aesthetic work, and/or the work of art, design or architecture has at least part of a drawing, picture or design, or one of these that is figurative, realistic, representational, abstract, surrealistic, a landscape or a still life; or it has a combination of these, and part or all of the work can change over time, it is unchanging, self-actuating, it can be changed, or it can be changed by interactivity, using a responsive feature, using a trigger, stimulant or influence; using a means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

146. The method of claim 6, in which the image-making support medium, the aesthetic work, and/or the work of art, design or architecture is: sculpture; it is prepared with drawing, painting, a conventional artist's medium, paint, an imprimatura, a ground and/or collage; it is kinetic, a mobile or made with at least one part capable of moving, and part or all of the work can change over time, it is unchanging, self-actuating, it can be changed, or it can be changed by interactivity, using a responsive feature, using a trigger, stimulant or influence; using a means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

147. The method of claim 6, in which the image-making support medium and/or the aesthetic work is made as or developed into fine art, and part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

148. The method of claim 6, in which part or all of the image-making support medium, the aesthetic work, and/or the work of art, design or architecture shows a portrayal, representation or abstraction of one or more people, human forms, part thereof, human heads or human torsos; one or more animals or parts of animals; or a combination of these, and part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

149. The method of claim 6, in which part or all of the image-making support medium, the aesthetic work, and/or the work of art, design or architecture shows a portrayal or depiction of the sky, the light of the sky, nature, a natural environment or scene, part thereof, plants, flowers, animals or still life that is: abstract, representational, realistic, surrealistic, or the depiction or representation of a recognizable subject; or a combination of these, and part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

150. The method of claim 6, in which the image-making support medium and/or the aesthetic work is made as or developed into a work of design, and part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

151. The method of claim 6, in which the image-making support medium and/or the aesthetic work is made as or developed into a work of architecture, and part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

152. The method of claim 6, in which part or all of the image-making support medium, the aesthetic work, and/or the work of art, design or architecture shows subject matter that is not physically present, and part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

153. The method of claim 6, in which part or all of the image-making support medium, the aesthetic work, and/or the work of art, design or architecture shows a pattern; and
   part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

154. The method of claim 6, in which part or all of the image-making support medium, the aesthetic work, and/or the work of art, design or architecture is representational; it shows a depiction or representation of a recognizable subject; it shows a two-dimensional depiction or representation of three-dimensional form; it shows a combination of these;
   or it shows one such subject and part or all of the work: changing, that is unchanging, self-actuating, that can be changed, or that can be changed by interactivity, using a responsive feature, using a trigger, stimulant or influence; using means or a part that enables the work or part of the work to be interactive, controlled, modulated or changed; using a control mechanism or device; using sensing, detecting or recognition capability; using programming or using means of activation or input; using a wireless connection, the Internet or a broadcast method; or a combination of these.

155. The method of claim 6, in which the image-making support medium, the aesthetic work, and/or the work of art, design or architecture is prepared or developed so that it has a visual aesthetic element visible to viewers resembling that in an image by Rembrandt, Vermeer, Turner, Van Gogh, Monet, Seurat, an Impressionist artist, Jackson Pollack, Marc Rothko, Brancusi, Noguchi, Tiffany or I.M. Pei, or resembling that in a known work of or kind of fine art or design, and
   part or all of the work can change over time, is unchanging, is self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

156. The method of claim 6, in which part or all of the image-making support medium, the aesthetic work, and/or the work of art, design or architecture have at least one aesthetic property from: a colorant; a conventional image making medium, a conventional artist's medium, a conventional artist's painting or drawing medium, a primer conventionally used to make images or an underlayer; from the use of a conventional image-making process, or from a combination of these; and
   part or all of the work can change over time, is unchanging, is self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

157. The method of claim 6, in which part or all of the image-making support medium, the aesthetic work, and/or the work of art, design or architecture have at least one aesthetic property from a picture that may be complete or partial or from such a picture that is figurative, realistic, representational, abstract, surrealistic, landscape or a still life, and
   part or all of the work can change over time, is unchanging, is self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

158. The method of claim 6, in which part or all of the image-making support medium, the aesthetic work, and/or the work of art, design or architecture have at least one aesthetic property from a design that may be complete or partial, or from such a design that is figurative, realistic, representational, abstract, surrealistic, landscape or a still life, and
   part or all of the work can change over time, is unchanging, is self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

159. The method of claim 6, in which part or all of the image-making support medium, the aesthetic work, and/or the work of art, design or architecture is made with at least one specification from each of (A) and (B):
   (A) the work is made with the ratio of it's strength to it's weight, structure, form and/or mass different from what this ratio would be if the work were entirely free of nanomaterials such that:
      (i) the work is stronger than it would be if it were entirely free of nanomaterials while it's weight, structure, form and/or mass are about the same or less than they would be if the work were entirely free of nanomaterials; or
      (ii) the work is about as strong as it would be if it were entirely free of nanomaterials while it's weight, structure, form and/or mass are less than they would be if the work were entirely free of nanomaterials;
   (B) the work or the image-making support medium is made with a utilitarian part, or it is made so that it can also serve a utilitarian function as: furniture; a door, a gate, a fence, a stage set, a partition, a screen, a tent, an awning, a fountain, a basket, a case or container, a light fixture, candelabrum, a window, a skylight, a lunette, shades, shutters, a tile, a column, or a set, grouping or compositional arrangement of these that is a single work; an architectural form or structure; a building façade, a wall, a ceiling, a floor; craft design; a work of design for household use; a work for spiritual or religious use; a book or pad that is a new version of the conventional image making blank book or blank paper pad capable of being developed into visual pictorial image; a plurality of associated sheets arranged in a book or pad form capable of use for image making; a work of graphic design; a work of book design optimally free or nearly free of visible legible text; a wearable work of design or art; fashion design, a fashion accessory, a handbag, jewelry, a hat, a belt, a tote bag or a costume; a mural; a work of art, design, or architecture; a combination of any of these; or one of these or a combination of any of these that is at least partially capable of light emission, changing over time, flexing, folding, rolling, transparency and/or translucency.

160. The method of claim 6, in which part or all of the image-making support medium, the aesthetic work, and/or the work of art, design or architecture have at least one aesthetic property from a photographic image, a photographic emulsion, a photographic transparency or a combination of these, and part or all of the work can change over time, is unchanging, is self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

161. The method of claim 6, in which part or all of the image-making support medium, the aesthetic work, and/or the work of art, design or architecture have texture and:
   (i) it is an aesthetic texture made by taking one or more positive or negative impressions from one or more organic or natural materials, or it is an aesthetic texture resembling this; and/or
   (ii) the texture provides at lest one aesthetic property, or the texture provides at lest one aesthetic property and it is irregular, deeper than a sandblasted surface or a sanded surface, embossing or a combination of these, and
   (iii) part or all of the work can change over time, is unchanging, is self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

162. The method of claim 6, in which part or all of the image-making support medium, the aesthetic work, and/or the work of art, design or architecture have at least one aesthetic property from writing or text, and part or all of the work can change over time, is unchanging, is self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

163. The method of claim 6, in which part or all of the image-making support medium, the aesthetic work, and/or the work of art, design or architecture have at least one aesthetic property from the use of it's ability to move or from movement of a part, and part or all of the work can change over time, is unchanging, is self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

164. The method of claim 6, in which part or all of the image-making support medium, the aesthetic work, and/or the work of art, design or architecture have at least one aesthetic property from: metal, fabric, paper, wood, clay, ceramic, a gem, a stone, or a combination of these, and part or all of the work can change over time, is unchanging, is self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

165. The method of claim 6, in which the image-making support medium, the aesthetic work, and/or the work of art, design or architecture is capable of producing sound, music and/or voice; it has at least one aesthetic property from music and/or sound; it is capable of responding to sound, music or voice; and/or it has one or more of these capabilities and part or all of the work is: self-actuating, programmed, interactive, responsive, it has means of input or activation, it can use means of broadcast, a wireless means and/or the Internet; it can use a trigger, stimulant or influence, it can use sensing, detection or recognition capability; and/or it has a microphone and/or speaker; it has technology or capability for voice or speech recognition; it has means of sensing or detecting sound; or a combination of these.

166. The method of claim 6, in which part or all of the image-making support medium, the aesthetic work, and/or the work of art, design or architecture has:
   (i) a hologram or it has a hologram that appears two or three dimensional and partially or entirely intangible;
   (ii) it has at least one such hologram and it or part or all of the work: can change over time, can self-actuate, is unchanging, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method;
   (iii) it has at least one such hologram that partially or wholly: activates, triggers, stimulates, produces, interactively, by the use of sensing, detecting or recognition capability or by sensing or detecting touch, movement or gesture, is at least part of a process by which part or all of the work or one of its aesthetic elements: changes, modulates, moves or stop moving; becomes visible, hidden, audible or silent; or changes it's electrical current, color, a light property, form, shape, position, volume, density, viscosity, appearance, a physical property or a visible aesthetic property; or
(iv) any combination of these.

167. The method of claim 6, in which part or all of the image-making support medium, the aesthetic work, and/or the work of art, design or architecture is capable of being interactive, responsive, controlled, modulated and/or changed; or
it has this capability when stimulated, activated, self-activated, influenced, triggered, and/or programmed; it has this capability with input, with the use of a control mechanism or device; with the use of sensing, detection or recognition capability; and/or with the use of a wireless method, the Internet or a broadcast method; or
the work has any combination of these.

168. The method of claim 6, in which part or all of the image-making support medium, the aesthetic work, and/or the work of art, design or architecture is made so that:
A) it is capable of being responsive, self-actuating, interactive, controlled, modulated, changed and/or programmed, or it has a part with this capability; it has this capability when stimulated, activated, influenced or triggered or when externally stimulated, activated, influenced or triggered; and/or
B) use of the capability in A) above causes or assists in causing the work, or the image-making support medium, or at least one of their aesthetic elements: to change, modulate, move or stop moving; to be visible, hidden, audible or silent; or to change it's electrical current, color, a light property, form, shape, position, volume, density, viscosity, appearance, a physical property, or a visible aesthetic property.

169. The method of claim 6, in which part or all of the image-making support medium, the aesthetic work, and/or the work of art, design or architecture have a touch control or a touch activated device.

170. The method of claim 6, in which part or all of the image-making support medium, the aesthetic work, and/or the work of art, design or architecture have one or more of: a control mechanism or device; an interactive part or device; a viewer input device; a switch, a dial, a button; a touch control or a touch activated device; a drawing device; a stylus or wand to control, interact with or change the work or image-making support medium; a trackball or a mouse; a computer vision system; a mechanism or device which enables control or change when pressure or stress is applied; or a combination of these.

171. The method of claim 6, in which part or all of the image-making support medium, the aesthetic work, and/or the work of art, design or architecture have: (i) a sensor and/or means detecting, (ii) it is capable of sensing and/or detecting: a viewer; movement, gesture, sound, light, the environment or an aspect of it, heat, temperature, change in any of these, or other change; (iii) it has means of sensing and/or detecting plus means of responding or responding with change in the work, the image-making support medium, or one of their aesthetic elements; (iv) it has a technology, sensor, device or ability that is sensitive to or that detects being bent or extended, or, such a technology, sensor, device or ability plus the ability to respond to this as a stimulant, trigger or influence, and/or it has a fabric strain gage or and/or (v) it has a combination of any of these.

172. The method of claim 6, in which part or all of the image-making support medium, the aesthetic work, and/or the work of art, design or architecture have the technology or the capability for: speech or voice recognition, movement or gesture recognition, capacitive sensing, human hand gesture recognition, motion recognition, human body motion recognition, sign language recognition, facial gesture recognition, pattern recognition, sensing or detecting any of these, or a combination of these.

173. The method of claim 6, in which part or all of the image-making support medium, the aesthetic work, and/or the work of art, design or architecture has means, a part, an area, a layer, an element, a device or a mechanism that can be activated, stimulated, triggered or used by: a person intentionally or unintentionally, the environment, temperature, heat, radiation, light, movement, gesture, acidity, pH, magnetism, a magnetic field, a magnetic force, a solvent, a chemical, a liquid, moisture, pressure, stress, programming, electricity, ionic energy, an electron beam, by change in any of these, by sound, voice, using the Internet, using broadcasting, using wireless connection, from a distance, or a combination of these; and
this causes or assists in causing change, modulation or another response in the work, in the image-making support medium, in a part of one or more of these, or in one or more of their aesthetic elements.

174. The method of claim 6, in which part or all of the image-making support medium, the aesthetic work, and/or the work of art, design or architecture has programming and/or means by which a person can intentionally or unintentionally control, change or vary: the electrical current; it's color, light, form, shape, movement, position, volume, density, viscosity or appearance; a physical property; an aesthetic element; or a combination of these.

175. The method of claim 6, in which part or all of the image-making support medium, the aesthetic work, and/or the work of art, design or architecture is capable of: (i) visible change, or visible change of at least one aesthetic element; (ii) visible change that is: a modulation; movement or stopping movement; a change from visible to unseen, or from unseen to visible; change in color, in a light property or in emitted light; to be audible, to be silent; change in form, in a physical property, in appearance, in it's electrical current, in shape, in position, in volume, in density, or in viscosity; or (iii) a combination of these.

176. The method of claim 6, in which part or all of the image-making support medium, the aesthetic work, and/or the work of art, design or architecture are made with liquid crystal, cholesteric liquid crystal, a liquid crystal display (LCD), or liquid crystal elastomer, or
it is made as such and it is at least partially transparent or translucent, flexible, thin or very thin, or
it has one or more of these and part or all of the work can change over time, can be changed, can self-actuate, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

177. The method of claim 6, in which part or all of the image-making support medium, the aesthetic work, and/or the work of art, design or architecture are made with one or more organic electronics, polymer electronics, printed electronics; one or more of these that is at least partially transparent or translucent, or a combination of these.

178. The method of claim 6, in which part or all of the image-making support medium, the aesthetic work, and/or the work of art, design or architecture are made with a conductive electronic material or device that is: made with at least one nanomaterial; at least partially transparent or translucent; flexible; made with polymer or conductive polymer; or a combination of these.

179. The method of claim 6, in which part or all of the image-making support medium, the aesthetic work, and/or the work of art, design or architecture are made with an integrated circuit or chip, or a non-silicone integrated circuit or chip.

180. The method of claim 6, in which the image making support medium, the aesthetic work, and/or the work of art, design or architecture have: a polymer that is re-mendable, self-healing and/or regenerative; a polymer that is capable of changing or responding to stimulation, a control, activation, a trigger or influence; a photorefractive polymer, a polymer gel, hydrogel, or redox polymer; a shape memory polymer; and/or an ionomeric polymer-metal composite.

181. The method of claim 6, in which the image making support medium, the aesthetic work, and/or the work of art, design or architecture has a material or a polymeric material that is: electroactive, thermochromic, piezochromic, piezorochromic, piezoelectric, solvatochromic, carsolchromic or gasochromic; and/or it has a phase change material.

182. The method of claim 6, in which the image making support medium, the aesthetic work, and/or the work of art, design or architecture has a photonic colorant, a photonic crystal, a photonic material, a photonic band gap material or structure, a synthetic opal or a synthetic opal containing silica spheres or imbibed with liquid crystal, polymerized crystalline colloidal arrays, or gel particles embedded in crystalline colloidal arrays;
the work has or is a field emission display; it has a smart fluid that is a particle filled, oil based suspension that changes in viscosity reversibly or that changes from liquid to solid reversibly; electro-rheological or magneto-rheostatic fluids; a polymer or conductive polymer magnet; or porphyrin; or
a combination of any of these.

183. The method of claim 6, in which the image making support medium, the aesthetic work, and/or the work of art, design or architecture are prepared with or as one or more threads, yarns, cords, cables, fibers, wires, and/or ropes, that is nanoscale or larger, made with one or more nanomaterials.

184. The method of claim 6 wherein the image making support medium, the aesthetic work, and/or the work of art, design or architecture has a form or a part that is substantially or entirely transparent or translucent; or it has such a form or part made with at least one nanomaterial and/or polymer.

185. The method of claim 6 wherein at least part of one external surface of the image making support medium, the aesthetic work, and/or the work of art, design or architecture is made with a polymer, and a stabilizer is present to enhance the ability of the work to remain color stable or to remain unchanged with exposure to ultraviolet light.

186. The method of claim 7 wherein wherein at least part of one external surface of the image making support medium and/or the work is made with poly(methyl methacrylate), methacrylate ester or methacrylamide derivative.

187. The method of claim 7 wherein at least part of one external surface of the image making support medium and/or the work is made with a polymer and a stabilizer is present to enhance the ability of the work to remain color stable or to remain unchanged with exposure to ultraviolet light.

188. The method of claim 7 wherein at least part of one external surface of the image making support medium and/or the work has a varnish, sealant or coating.

189. The method of claim 8 wherein the work has a title as art.

190. The method of claim 9, in which the work and/or the image-making support medium is made or developed so that it shows at least one pictorial, artwork or design element or it has at least one aesthetic element that can be seen from one or more of the work's sides or angles, and
part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

191. The method of claim 9, in which the image-making support medium and/or the work are made with one or more parts for mounting, installation or display; with one or more utilitarian parts; with electronics, wiring, cords, control buttons, it's battery or power source; a framework, support or bracing; an interactive feature or part, and/or with most or all of it's utilitarian elements hidden from view and/or entirely or largely unobvious or unapparent to viewers looking at the work as a whole.

192. The method of claim 9 wherein the work and/or the image-making support medium are made with a form that is partially or entirely: rigid, inflexible and/or capable of flexing, rolling out, rolling up, scrolling, folding, unfolding, or a combination of these.

193. The method of claim 9 wherein the work and/or the image-making support medium are made with a form that is linear; that is non-planar; that has at least one curve, angle or undulation; or that is a combination of these.

194. The method of claim 9 wherein the work and/or the image-making support medium are: made with a form that is non-geometric, non-uniform, irregular and/or uneven; made with a form that has irregularities so that it looks handmade; made with deckled edges; or a combination of these.

195. The method of claim 9 wherein the work and/or the image-making support medium have forms that are:
(i) discontinuous, (ii) made with two or more parts that are joined or that are separate; (iii) a strong, stabile or permanent form made of two or more parts with joints, bonds or points of contact that appear visually to be too slight, too small or too few in number for the form to be strong, stabile or permanent; or (iv) a combination of these.

196. The method of claim 9 wherein the work and/or the image-making support medium have forms that are partially or entirely: (i) layered, (ii) transparent and/or translucent; (iii) made with one or more image supports; (iv) made with a layer, part or other ingredient that enhances it's permanence or stability; and/or (v) a combination of these.

197. The method of claim 9 wherein the work and/or the image-making support medium have a planar or two dimensional form that is transparent or translucent and made with polymer, glass or both, with (i) one or more light sources, OLEDs or other LEDs within it, attached to it, or included as part of the work; (ii) a conductive polymer; and/or (iii) an electrical conductor that is not visible or not apparent to viewers.

198. The method of claim 9, in which the work and/or the image-making support medium are at least partially: hollow;

with a form that has at least one open space within it; openwork; with at least one air pocket; or a combination of these.

199. The method of claim 9, in which the work and/or the image-making support medium are prepared with: a form or a planar form with sufficient mechanical or structural properties so that it can support its own weight or be freestanding.

200. The method of claim 9, in which the work and/or the image-making support medium are prepared with: a form with sufficient mechanical or structural properties so that it can support its own weight or be freestanding, and this form or part of it:
  (i) bonds to a conventional artist's medium; and/or
  (ii) is one or more of: transparent, translucent, planar, polymeric, resembling a conventional artist's canvas, canvas board, acrylic sheeting or sheet of paper, made with a fine art stabilizer that provides or enhances it's ability to remain unchanged with exposure to ultraviolet light, or made with a fine art stabilizer that enables or enhances bonding.

201. The method of claim 9, in which the work and/or the image-making support medium are prepared with: means of installation, mounting or display on a wall or vertical surface, or by hanging; a hook or wire attached to enable hanging; or holes to enable hanging.

202. The method of claim 9, in which the work and/or the image-making support medium are made with one or more of:
  a matt or a frame; a rigid mount system, a wire mount system, or a combination rigid and wire mount system; means of installation, mounting or display that leaves space between it and the wall, ceiling, floor or other structure from which it is installed, mounted or displayed; and/or a base, a stand or a pedestal for viewing.

203. The method of claim 9 wherein the work and/or the image making support medium have a form or a part that is substantially or entirely transparent or translucent; or it has such a form or part made with at least one nanomaterial and/or polymer.

204. The method of claim 9, in which part or all of the work and/or the image-making support medium shows a portrayal, representation or abstraction of one or more people, human forms, part thereof, human heads or human torsos; one or more animals or parts of animals; or a combination of these, and
  part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

205. The method of claim 9, in which part or all of the work and/or the image-making support medium shows a portrayal or depiction of the sky, the light of the sky, nature, a natural environment or scene, part thereof, plants, flowers, animals or still life that is: abstract, representational, realistic, surrealistic, or the depiction or representation of a recognizable subject; or a combination of these, and
  part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

206. The method of claim 9, in which part or all of the work and/or the image-making support medium is pictorial; or it is pictorial and figurative, realistic, abstract, surrealistic, representational, a landscape or a still life; or a combination of these, and
  part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

207. The method of claim 9, in which part or all of the work and/or the image-making support medium shows subject matter that is not physically present, and
  part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

208. The method of claim 9, in which the work and/or the image-making support medium has at least part of a drawing, picture or design, or one of these that is figurative, realistic, representational, abstract, surrealistic, a landscape or a still life; or it has a combination of these and
  part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

209. The method of claim 9, in which the work and/or the image-making support medium is sculpture; it is prepared with drawing, painting, a conventional artist's medium, paint, an imprimatura, a ground and/or collage; it is kinetic, a mobile or made with at least one part capable of moving; and
  part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

210. The method of claim 9, in which the work and/or the image-making support medium is made as or developed into fine art, and
part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

211. The method of claim 9, in which the work and/or the image-making support medium is made as or developed into a work of design, and
part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

212. The method of claim 9, in which the work and/or the image-making support medium is made as or developed into a work of architecture, and
part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

213. The method of claim 9, in which part or all of the work and/or the image-making support medium shows a pattern; and
part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

214. The method of claim 9, in which part or all of the work and/or the image-making support medium are representational, or show a depiction or representation of a recognizable subject, or
show one such subject and part or all of the work: changing, that is unchanging, self- actuating, that can be changed, or that can be changed by interactivity, using a responsive feature, using a trigger, stimulant or influence; using means or a part that enables the work or part of the work to be interactive, controlled, modulated or changed; using a control mechanism or device; using sensing, detecting or recognition capability; using programming or using means of activation or input; using a wireless connection, the Internet or a broadcast method; or a combination of these.

215. The method of claim 9, in which part or all of the work and/or the image-making support medium shows a two-dimensional depiction or representation of three-dimensional form, and
part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

216. The method of claim 9, in which the work and/or the image-making support medium are made with one or more visible, two or three dimensional, pictorial, artwork or design elements that employ light emitted from part or all of the work, and
part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

217. The method of claim 9, in which the work and/or the image-making support medium are made with one or more visible, two or three dimensional, pictorial, artwork or design elements that employ light transmitted through part or all of the work, and
part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

218. The method of claim 9, in which the work and/or the image-making support medium have at least one
aesthetic property from: a colorant; a conventional image making medium, a conventional artist's medium, a conventional artist's painting or drawing medium, a primer conventionally used to make images or an underlayer; from the use of a conventional image-making process, or from a combination of these; and
part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

219. The method of claim 9 in which the work and/or the image-making support medium has: a visible, two or three-dimensional, pictorial, artwork or design element made by adding to the work and/or by subtracting from it;
   at least one aesthetic property from an additive process; at least one aesthetic property from inlay; at least one aesthetic property from a subtractive process, from incising or from carving; or at least one aesthetic property from a combination of these, and
   part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

220. The method of claim 9, in which the work and/or the image-making support medium have at least one aesthetic property from a picture that may be complete or partial or from such a picture that is figurative, realistic, representational, abstract, surrealistic, landscape or a still life, and
   part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

221. The method of claim 9, in which the work and/or the image-making support medium have at least one aesthetic property from a design that may be complete or partial, or from such a design that is figurative, realistic, representational, abstract, surrealistic, landscape or a still life, and
   part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

222. The method of claim 9, in which the work and/or the image-making support medium is made:
   with the ratio of it's strength to it's weight, structure, form and/or mass different from what this ratio would be if it were entirely free of nanomaterials such that it is stronger than it would be if it were entirely free of nanomaterials while it's weight, structure, form and/or mass are about the same or less than they would be if it were entirely free of nanomaterials, and/or
   it is made as or developed into art, design or architecture with the ratio of it's strength to it's weight, structure, form and/or mass different from what this ratio would be if it were entirely free of nanomaterials so that the work is stronger than it would be if it were entirely free of nanomaterials while it's weight, structure, form and/or mass are about the same or less than they would be if the work were entirely free of nanomaterials.

223. The method of claim 9, in which the work and/or the image-making support medium is made:
   with the ratio of it's strength to it's weight, structure, form and/or mass different from what this ratio would be if it were entirely free of nanomaterials such that it is about as strong as it would be if it were entirely free of nanomaterials while it's weight, structure, form and/or mass are less than they would be if it were entirely free of nanomaterials, and/or
   it is made as or developed into art, design or architecture with the ratio of it's strength to it's weight, structure, form and/or mass different from what this ratio would be if it were entirely free of nanomaterials so that the work is about as strong as it would be if it were entirely free of nanomaterials while it's weight, structure, form and/or mass are less than they would be if it were entirely free of nanomaterials.

224. The method of claim 9, in which the work and/or the image-making support medium is made with at least one specification from each of (A) and (B):
   (A) the work is made with the ratio of it's strength to it's weight, structure, form and/or mass different from what this ratio would be if it were entirely free of nanomaterials such that:
      (i) the work is stronger than it would be if it were entirely free of nanomaterials while it's weight, structure, form and/or mass are about the same or less than they would be if the work were entirely free of nanomaterials; or
      (ii) the work is about as strong as it would be if it were entirely free of nanomaterials while it's weight, structure, form and/or mass are less than they would be if the work were entirely free of nanomaterials;
   (B) the work or the image-making support medium is made with a utilitarian part, or it is made so that it can also serve a utilitarian function as: furniture; a door, a gate, a fence, a stage set, a partition, a screen, a tent, an awning, a fountain, a basket, a case or container, a light fixture, candelabrum, a window, a skylight, a lunette, shades, shutters, a tile, a column, or a set, grouping or compositional arrangement of these that is a single work; an architectural form or structure; a building façade, a wall, a ceiling, a floor; craft design; a work of design for household use; a work for spiritual or religious use; a book or pad that is a new version of the conventional image making blank book or blank paper pad capable of being developed into visual pictorial image; a plurality of associated sheets arranged in a book or pad form capable of use for image making; a work of graphic design; a work of book design optimally free or nearly free of visible legible text; a wearable work of design or art; fashion design, a fashion accessory, a handbag, jewelry, a hat, a belt, a tote bag or a costume; a mural; a work of art, design, or architecture; a combination of any of these; or one of these or a combination of any of these that is at least partially capable of light emission, changing over time, flexing, folding, rolling, transparency and/or translucency.

225. The method of claim 9, in which the work and/or the image-making support medium have at least one aesthetic property from a photographic image, a photographic emulsion, a photographic transparency or a combination of these, and
- part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

226. The method of claim 9, in which the work and/or the image-making support medium have at least one aesthetic property from texture, from irregular texture, from texture deeper than a sandblasted surface or a sanded surface, from embossing or from a combination of these, and
- part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

227. The method of claim 9, in which the work and/or the image-making support medium have at least one aesthetic property from writing or text, and
- part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

228. The method of claim 9, in which the work and/or the image-making support medium have at least one aesthetic property from the use of it's ability to move or from movement of a part, and
- part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

229. The method of claim 9, in which the work and/or the image-making support medium have at least one aesthetic property from: metal, fabric, paper, wood, clay, ceramic, a gem, a stone, or a combination of these, and
- part or all of the work can change over time, it is unchanging, self-actuating, it can be changed, or it can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

230. The method of claim 9, in which part or all of the work and/or the image-making support medium is capable of being interactive, responsive, controlled, modulated and/or changed; or
- it has this capability when stimulated, activated, self-activated, influenced, triggered, and/or programmed; it has this capability with input, with the use of a control mechanism or device; with the use of sensing, detection or recognition capability; and/or with the use of a wireless method, the Internet or a broadcast method; or
- the work has any combination of these.

231. The method of claim 9, in which part or all of the work and/or the image-making support medium is made so that:
- A) it is capable of being responsive, self-actuating, interactive, controlled, modulated, changed and/or programmed, or it has a part with this capability; it has this capability when stimulated, activated, influenced or triggered or when externally stimulated, activated, influenced or triggered; and/or
- B) use of the capability in A) above causes or assists in causing the work, or the image-making support medium, or at least one of their aesthetic elements: to change, modulate, move or stop moving; to be visible, hidden, audible or silent; or to change it's electrical current, color, a light property, form, shape, position, volume, density, viscosity, appearance, a physical property, or a visible aesthetic property.

232. The method of claim 9, in which the work and/or the image-making support medium are prepared or developed with means enabling it to use a wireless connection, or enabling the creation, development and/or change of a visible pictorial, artwork or design element in a process that uses a wireless connection, or
- the work is capable of at least one of these variations and it includes: use of means or a part that enables the work or part of it to be interactive, controlled, modulated or changed; use of a trigger, stimulant or influence; use of sensing, detection or recognition capability; use of means of activation, input, or programming; use of the Internet or a broadcast method; or a combination of these.

233. The method of claim 9, in which the work and/or the image-making support medium are prepared or developed with means enabling it to actively use a broadcast, or enabling the creation, development and/or change of a visible pictorial, artwork or design element using a broadcast, or
- the work is capable of at least one of these variations and it includes: use of means or a part that enables the work or part of it to be interactive, controlled, modulated or changed; use of a trigger, stimulant or influence; use of sensing, detection or recognition capability; use of means of activation, input, or programming; use of a wireless connection or the Internet; or a combination of these.

234. The method of claim 9, in which the work and/or the image-making support medium has means, a part, an area, a layer, an element, a device or a mechanism that can be activated, stimulated, triggered or used by: a person intentionally or unintentionally, the environment, temperature, heat, radiation, light, movement, gesture, acidity, pH, magnetism, a magnetic field, a magnetic force, a solvent, a chemical, a liquid, moisture, pressure, stress, programming, electricity, ionic energy, an electron beam, by change in any of these, by sound, voice, using the Internet, using broadcasting, using wireless connection, from a distance, or a combination of these; and
  this causes or assists in causing change, modulation or another response in the work, in the image-making support medium, in a part of one or more of these, or in one or more of their aesthetic elements.

235. The method of claim 9, in which the work and/or the image-making support medium has programming and/or means by which a person can intentionally or unintentionally control, change or vary: the electrical current; it's color, light, form, shape, movement, position, volume, density, viscosity or appearance; a physical property; an aesthetic element; or a combination of these.

236. The method of claim 9, in which the work and/or the image-making support medium is capable of: (i) visible change, or visible change of at least one aesthetic element; (ii) visible change that is: a modulation; movement or stopping movement; a change from visible to unseen, or from unseen to visible; change in color, in a light property or in emitted light; to be audible, to be silent; change in form, in a physical property, in appearance, in it's electrical current, in shape, in position, in volume, in density, or in viscosity; or (iii) a combination of these.

237. The method of claim 9, in which the work and/or the image-making support medium is capable of producing sound, music and/or voice; it has at least one aesthetic property from music and/or sound; it is capable of responding to sound, music or voice; and/or
  it has one or more of these capabilities and part or all of the work is: self-actuating, programmed, interactive, responsive, it has means of input or activation, it can use means of broadcast, a wireless means and/or the Internet; it can use a trigger, stimulant or influence, it can use sensing, detection or recognition capability; and/or it has a microphone and/or speaker; it has technology or capability for voice or speech recognition; it has means of sensing or detecting sound; or a combination of these.

238. The method of claim 9, in which the work and/or the image-making support medium have the technology or the capability for: speech or voice recognition, movement or gesture recognition, capacitive sensing, human hand gesture recognition, motion recognition, human body motion recognition, sign language recognition, facial gesture recognition, pattern recognition, sensing or detecting any of these, or a combination of these.

239. The method of claim 9, in which the work and/or the image-making support medium have a touch control or a touch activated device.

240. The method of claim 9, in which the work and/or the image-making support medium have one or more of: a control mechanism or device; an interactive part or device; a viewer input device; a switch, a dial, a button; a touch control or a touch activated device; a drawing device; a stylus or wand to control, interact with or change the work or image-making support medium; a trackball or a mouse; a computer vision system; a mechanism or device which enables control or change when pressure or stress is applied; or a combination of these.

241. The method of claim 9, in which the work and/or the image-making support medium have: (i) a sensor and/or means detecting, (ii) it is capable of sensing and/or detecting: a viewer; movement, gesture, sound, light, the environment or an aspect of it, heat, temperature, change in any of these, or other change; (iii) it has means of sensing and/or detecting plus means of responding or responding with change in the work, the image-making support medium, or one of their aesthetic elements; (iv) it has a technology, sensor, device or ability that is sensitive to or that detects being bent or extended, or, such a technology, sensor, device or ability plus the ability to respond to this as a stimulant, trigger or influence, and/or it has a fabric strain gage or and/or (v) it has a combination of any of these.

242. The method of claim 9, in which the work and/or the image-making support medium have:
  (i) a hologram or it has a hologram that appears two or three dimensional and partially or entirely intangible;
  (ii) it has at least one such hologram and it or part or all of the work: can change over time, can self-actuate, is unchanging, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method;
  (iii) it has at least one such hologram that partially or wholly: activates, triggers, stimulates, produces, interactively, by the use of sensing, detecting or recognition capability or by sensing or detecting touch, movement or gesture, is at least part of a process by which part or all of the work or one of its aesthetic elements: changes, modulates, moves or stop moving; becomes visible, hidden, audible or silent; or changes it's electrical current, color, a light property, form, shape, position, volume, density, viscosity, appearance, a physical property or a visible aesthetic property; or
  (iv) any combination of these.

243. The method of claim 9, in which part or all of the work and/or the image-making support medium are prepared with at least one aesthetic property and:
  (i) it is from: an additive or subtractive process; a conventional image-making process; a conventional image making medium, a conventional artist's medium or a conventional artist's painting or drawing medium; at least part of a drawing, picture or design, or one of these that is figurative, realistic, representational, abstract, surrealistic, a landscape or a still life; a depiction or representation of a recognizable subject; a primer conventionally used to make images; an underlayer; a colorant; a light source, light emitting display or means of emitting light; a material, a device or another means that provides or effects light properties; a filter; crystal, gem, stone, fabric, paper, clay, ceramic, wood, metal, an air pocket; a conductive, semi-conductive or holographic pigment; a photographic image, a photographic emulsion or a photographic transparency; writing, text, incising, inlay, carving or embossing; texture, irregular texture or texture deeper than a sandblasted surface or a sanded surface; or moving part or means to be capable of movement; music or sound; or a combination of these; or
  (ii) the work has an aesthetic property and part or all of the work: changes over time, self-actuates, changes discontinuously, interactively, in a responsive process, using: a trigger, a stimulant, an influence, sensing, detection or recognition capability; a control mechanism or device; means or a part that enables the work or part of it to be interactive, responsive, controlled, modulated or changed; programming or means of activation or input; using sensing, detection or recognition capability; and/or using a wireless connection, the Internet or a broadcast method; or any combination of these;

(iii) the work has an aesthetic property as part of or throughout one or more of: an image support; an image support stabilizer; an underlayer; a light source; a light emitting display; an OLED; an e-material or electronic paper; a non-light-emissive, reflective display; a form made with polymer or with polymer that is transparent or translucent; a work of art, design or architecture; a work that serves as part or all of a wall, a ceiling, a window, a floor, furniture, a partition, a light, an architectural form, a wearable design, a mural; or (iii) any combination of any of these.

244. The method of claim 9, in which part or all of the work and/or the image-making support medium are prepared with:

(i) a portrayal or depiction of the sky, the light of the sky, nature, a natural environment or scene, part thereof, plants, flowers or animals, that is: static, changing or that can be changed; that is: abstract, representational, realistic, surrealistic, or the depiction or representation of a recognizable subject;

any of these along with a figure, landscape or a still life; any of these that is at least partially formed with light in one or more colors; or any of these that is at least partially formed by color or light changing as the real version of it's subject matter might change or in a manner that portrays or represents the real version of it's subject matter; or (ii) one or more of the variations above, or part or all of the work that changes over time, self-actuates, that changes discontinuously, interactively, in a responsive process, using: a trigger, a stimulant, an influence, programming or means of activation or input; using means or a part that enables the work or part of the work to be interactive, controlled, modulated or changed;

using a control mechanism or device; using sensing, detection or recognition capability; and/or using a wireless method, the Internet or a broadcast method;

(iii) any of the variations above with the work capable of producing sound, music and/or voice, and/or capable of responding to sound, music or voice;

(iv) one or more of the above as part of or throughout one or more of: an image support; an image support stabilizer; an underlayer; a light source; a light emitting display; an OLED; an e-material or electronic paper; a non-light-emissive, reflective display; a form made with polymer or with polymer that is transparent or translucent; a work of art, design or architecture; a work that also serves as part or all of a wall, a ceiling, a window, a floor, furniture, a partition, a light, an architectural form, a wearable design, or a mural; or (v) any combination of any of these.

245. The method of claim 9, in which part or all of the work and/or the image-making support medium are prepared with at least one visual effect or aesthetic property that is:

(i) a portrayal, representation or abstraction of one or more people, human forms, part thereof, human heads or human torsos that is static, that is capable of changing or of being changed; or such a work that has light or color that changes, another visible aesthetic element that changes, the ability to produce sound, music and/or voice, and/or to respond to sound, music or voice;

(ii) one or more of the variations above or part or all of the work that changes over time, self-actuates, discontinuously, interactively, in a responsive process, using: a trigger, a stimulant, an influence, programming or means of activation or input; using means or a part that enables the work or part of the work to be interactive, controlled, modulated or changed; using a control mechanism or device; using sensing, detection or recognition capability; and/or using a wireless method, the Internet or a broadcast method;

(iii) such a visual effect or aesthetic property as part of or throughout one or more of: an image support; an image support stabilizer; an underlayer; a light source; a light emitting display; an OLED; an e-material or electronic paper; a non-light-emissive, reflective display; a form made with polymer or with polymer that is transparent or translucent; a work of art, design or architecture; a work that is also serves as part or all of a wall, a ceiling, a window, a floor, furniture, a partition, a light, an architectural form, a wearable design, or mural; or (iii) a combination of any of these.

246. The method of claim 9 wherein the work and/or the image making support medium are prepared with one or more of:

(i) at least one visible light effect; at least one visible light effect and at least part of the work is light-emissive, transparent and/or translucent; and/or a material, a device or another means that provides or effects light properties;

(ii) a visible element, effect or part that is partially or entirely: electrochromic, reflective, photochromic; dichroic; iridescent; a hologram; crystal, a filter; an air pocket; a pigment that is conductive, semi-conductive or holographic; or a combination of these;

(iii) a form that functions as: a lens; a Fresnel lens; a grating; a diffraction grating; a prism; or a lenticular lens or form; or a combination of these; or a visual effect from one or more of these, (iv) the work has one or more of the variations above, that is visible continuously, that is visible discontinuously, the visibility of which changes over time, that self-actuates, that is visible by interactivity, that is visible as a response, and/or that is visible in using: a trigger, a stimulant, an influence, programming, means of activation or input; using means or a part that enables the work or part of the work to be interactive, controlled, modulated or changed; using a control mechanism or device; using sensing, detection or recognition capability; and/or using a wireless method, the Internet or a broadcast method; and/or (v) the work has one or more of the variations above that is part or all of one or more of: an image support; an image support stabilizer; an underlayer; a light source; a light emitting display; an OLED; an e-material or electronic paper; a non-light-emissive, reflective display; a form made with polymer or with polymer that is transparent or translucent; a work of art, design or architecture; a work that is also serves as part or all of a wall, a ceiling, a window, a floor, furniture, a partition, a light, an architectural form, a wearable design, or a mural; or (vi) any combination of these.

247. The method of claim 9, in which part or all of the work and/or the image-making support medium have a visible element, effect or part that is entirely or partially reflective.

248. The method of claim 9, in which part or all of the work and/or the image-making support medium have one or more visible elements, effects or parts that are entirely or partially photochromic.

249. The method of claim 9, in which part or all of the work and/or the image-making support medium has an electrochromic technology, material, display or effect, or it is electrochromic and capable of changing color; capable of changing it's state of or level of transparency, translucency, reflectivity and/or light emission; and/or capable of changing the light passing through it; or it has an electrochromic effect and it has means of having and using energy or electricity from a source that is part of it or separate from it; or it has an electrochromic effect and it's means of having and using energy is hidden from view and/or entirely or largely unobvious or unapparent to viewers looking at the work as a whole; or any combination of these.

250. The method of claim 9, in which part or all of the work and/or the image-making support medium are prepared with the ability to visibly change it's level of transparency, and/or the ability to visibly change from being entirely or partially transparent or translucent, to being entirely or partially opaque; or (i) the work is capable of such a change that is visible continuously, that is visible discontinuously, the visibility of which changes over time, that self-actuates, that is visible by interactivity, in a response process, using: a trigger, a stimulant, an influence, programming or means of activation or input; using means or a part that enables the work or part of the work to be interactive, controlled, modulated or changed; using a control mechanism or device; using sensing, detection or recognition capability; and/or using a wireless method, the Internet or a broadcast method;

(ii) the work is capable of such a change that is visible on part or all of one or more of: an image support; an image support stabilizer; an underlayer; a light source; a light emitting display; an OLED; an e-material or electronic paper; a non-light-emissive, reflective display; a form made with polymer or with polymer that is transparent or translucent; a work of art, design or architecture; a work that is also serves as part or all of a wall, a ceiling, a window, a floor, furniture, a partition, a light, an architectural form, a wearable design, or a mural; or (iii) any combination of these.

251. The method of claim 9, in which part or all of the work and/or the image-making support medium are capable of visibly changing from being entirely or partially light emitting to being entirely or partially transparent or translucent, or:

(i) the work is capable of such a change that is visible continuously, that is visible discontinuously, the visibility of which changes over time, that self-actuates, that is visible by interactivity, in a response process, using: a trigger, a stimulant, an influence, programming or means of activation or input; using means or a part that enables the work or part of the work to be interactive, controlled, modulated or changed; using a control mechanism or device; using sensing, detection or recognition capability; and/or using a wireless method, the Internet or a broadcast method;

(ii) the work is capable of such a change that is visible on part or all of one or more of: an image support; an image support stabilizer; an underlayer; a light source; a light emitting display; an OLED; an e-material or electronic paper; a non-light-emissive, reflective display; a form made with polymer or with polymer that is transparent or translucent; a work of art, design or architecture; a work that is also serves as part or all of a wall, a ceiling, a window, a floor, furniture, a partition, a light, an architectural form, a wearable design, or a mural; or (iii) any combination of these.

252. The method of claim 9, in which part or all of the work and/or the image-making support medium are prepared with a visible effect or aesthetic property created or contributed to by the use of electricity that causes the positions of particles, of liquid crystals, or of liquid crystals in a polymer layer or matrix to change, to align, to become more aligned, to become random or to become more random; or (i) the work is capable of having this effect or aesthetic property visible continuously, that is visible discontinuously, the visibility of which changes over time, that self-actuates, that is visible by interactivity, in a response process, using: a trigger, a stimulant, an influence, programming or means of activation or input; using means or a part that enables the work or part of the work to be interactive, controlled, modulated or changed; using a control mechanism or device; using sensing, detection or recognition capability; and/or using a wireless method, the Internet or a broadcast method;

(ii) the work is capable of having this effect or aesthetic property visible on part or all of one or more of: an image support; an image support stabilizer; an underlayer; a light source; a light emitting display; an e-material or electronic paper; a non-light-emissive, reflective display; a form made with polymer or with polymer that is transparent or translucent; a work of art, design or architecture; a work that is also serves as part or all of a wall, a ceiling, a window, a floor, furniture, a partition, a light, an architectural form, a wearable design, or a mural; or (iii) any combination of these.

253. The method of claim 9, in which the work and/or the image-making support medium are made capable of serving as: furniture, a table, a chair, a stool, a chest, a cabinet, a cart, a bench, or as a set, grouping or compositional arrangement of these that is a single work, or such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

254. The method of claim 9, in which the work and/or the image-making support medium are made capable of serving as: a tile or a set, grouping or compositional arrangement of these that is a single work, or such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

255. The method of claim 9, in which the work and/or the image-making support medium are made capable of serving as: a door, partition, a screen, or a set, grouping or compositional arrangement of these that is a single work, or such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

256. The method of claim 9, in which the work and/or the image-making support medium are made capable of serving as: a gate, a fence, a column, a stage set, a tent, an awning, a fountain, a candelabrum, or a set, grouping or compositional arrangement of these that is a single work, or such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

257. The method of claim 9, in which the work and/or the image-making support medium are made capable of serving as: a basket, a case or container, or a set, grouping or compositional arrangement of these that is a single work, or such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

258. The method of claim 9, in which the work and/or the image-making support medium are prepared as or with one or more light emitting devices; light emitting materials; light emitting silicon; electroluminescent materials; lighting; light fixtures; as a set, grouping or compositional arrangement with two or more light fixtures that is a single work; and/or as lighting design, or such a work that is at least partially flexible, thin, very thin, transparent or translucent, or made with at least one light effect; or such a work that partially or entirely: changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

259. The method of claim 9, in which the work and/or the image-making support medium are made capable of serving as: a window, a skylight, a lunette, or as a set, grouping or compositional arrangement of these that is a single work or such a work that has at least one light effect, is photochromic and/or capable of emitting light; such a work that is electrochromic; such a work that has means of having and using energy from a source that is part of it or separate from it, such a work that has a power source, a solar cell, and/or photovoltaics; or such a work that partially or entirely: changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or any combination of these.

260. The method of claim 9, in which the work and/or the image-making support medium are made capable of serving as: shades, shutters, or a set, grouping or compositional arrangement of these that is a single work, or such a work that has at least one light effect, is photochromic and/or capable of emitting light; such a work that is electrochromic; such a work that has means of having and using energy from a source that is part of it or separate from it, a power source, a solar cell, and/or photovoltaics; or such a work that partially or entirely: changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

261. The method of claim 9, in which the work and/or the image-making support medium are made capable of serving as: an architectural form or structure, a building façade, stairs, a crosswalk or a bridge, or such a work that has at least one light effect, is photochromic and/or capable of emitting light; such a work that is electrochromic; such a work that has means of having and using energy from a source that is part of it or separate from it, a power source, a solar cell, and/or photovoltaics; or such a work that partially or entirely: changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

262. The method of claim 9, in which the work and/or the image-making support medium are made capable of serving as a wall, or such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

263. The method of claim 9, in which the work and/or the image-making support medium are made capable of serving as a ceiling, or such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

264. The method of claim 9, in which the work and/or the image-making support medium are made capable of serving as a floor, or such a work that partially or entirely: emits light, has at least one light effect, changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

265. The method of claim 9, in which the work and/or the image-making support medium are craft design, or such a work that is capable of emitting light, made with at least one light effect or that is electrochromic; or such a work that partially or entirely: changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

266. The method of claim 9, in which the work and/or the image-making support medium are made capable of serving as: a work of design for household use, or as a vase, a bowl, a tray, a cup or goblet, a plate, a dish, a pitcher, a soup tureen or a placemat, or such a work that is capable of emitting light, made with at least one light effect or that is electrochromic; or such a work that partially or entirely: changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

267. The method of claim 9, in which the work and/or the image-making support medium are made capable of serving as: a work of art, design or architecture for spiritual or religious use, or as an altar, or a menorah, or such a work that is capable of emitting light, made with at least one light effect or that is electrochromic; or such a work that partially or entirely: changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

268. The method of claim 9, in which the work and/or the image-making support medium are:

made capable of serving as book design, optimally free or nearly free of visible legible text; or made as a plurality of associated sheets arranged in a book or pad form capable of use for image making; or made capable of serving as a book or pad that is a new version of the conventional image making blank book or blank paper pad capable of being developed into a visual pictorial image; or made as such a work that partially or entirely: emits light, has at least one light effect, is capable of flexing, rolling, scrolling or folding; changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

269. The method of claim 9, in which the work and/or the image-making support medium are made capable of serving as graphic design, or such a work that partially or entirely: emits light, has at least one light effect, is capable of flexing, rolling, scrolling or folding; changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

270. The method of claim 9, in which the work and/or the image-making support medium are made capable of serving as a wearable work of design or art; as fashion design; and/or as a costume, or such a work that partially or entirely: emits light, has at least one light effect, is capable of flexing, rolling, scrolling or folding; changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

271. The method of claim 9, in which the work and/or the image-making support medium are made capable of serving as jewelry, or
such a work that partially or entirely: emits light, has at least one light effect, is capable of flexing, rolling, scrolling or folding; changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

272. The method of claim 9, in which the work and/or the image-making support medium are made capable of serving as: a fashion accessory, a hat, a belt, a handbag, or a tote bag, or
such a work that partially or entirely: emits light, has at least one light effect, is capable of flexing, rolling, scrolling or folding; changes over time, is unchanging, self-actuating, can be changed, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

273. The method of claim 9, in which the work and/or the image-making support medium are made with one or more organic electronics, polymer electronics, printed electronics; one or more of these that is at least partially transparent or translucent, or a combination of these.

274. The method of claim 9, in which the work and/or the image-making support medium have a conductive electronic material or device that is: made with at least one nanomaterial; at least partially transparent or translucent; flexible; made with polymer or conductive polymer; or a combination of these.

275. The method of claim 9, in which the work and/or the image-making support medium have an integrated circuit or chip, or a non-silicone integrated circuit or chip.

276. The method of claim 9, in which the work and/or the image-making support medium have a transistor, a thin film transistor (TFT), a backplane, a TFT backplane, an active matrix backplane; a light emitting transistor, an organic transistor, one of these that is at least partially transparent or translucent; or a combination of these.

277. The method of claim 9, in which the work and/or the image-making support medium are or have one or more organic light emitting diodes (OLEDs), or
it is or it has one or more OLEDs that are at least partially flexible, thin, very thin, transparent or translucent; or
it is or it has one or more OLEDs, and part or all of the work can change over time, can be changed, can self-actuate, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or it is or it has a combination of these.

278. The method of claim 9, in which the work and/or the image-making support medium are or have one or more light emitting diodes (LEDs), or
it is or it has one or more LEDs that are at least partially flexible, thin, very thin, transparent or translucent; or
it is or it has one or more LEDs, and part or all of the work can change over time, can be changed, can self-actuate, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or it is or it has a combination of these.

279. The method of claim 9, in which part or all of the work and/or the image-making support medium are made with liquid crystal, cholesteric liquid crystal, a liquid crystal display (LCD), or liquid crystal elastomer, or
it is made as such and it is at least partially transparent or translucent, flexible, thin or very thin, or
it has one or more of these and part or all of the work can change over time, can be changed, can self-actuate, or can be changed by interactivity, using a responsive feature, using a trigger, stimulant or influence; using means or a part that enables the work or part of the work to be interactive, controlled, modulated or changed; using a control mechanism or device; using sensing, detection or recognition capability; using programming or using means of activation or input; using a wireless method, the Internet or a broadcast method; or a combination of these.

280. The method of claim 9, in which the work and/or the image-making support medium are prepared as or with at least one:
(i) conductive polymer, or polymer that is capable of conducting electricity and/or emitting light; or
(ii) layered form that has conductive polymer in between two or more layers that are: transparent, translucent, polymeric, glass, non conductive or poorly conductive or a combination of these; or such a layered form with conductive polymer between it's other layers wherein this conductive polymer is capable of conducting electricity to one or more devices or light emitters that are also sandwiched in between it's other layers;

281. The method of claim 9, in which the work and/or the image-making support medium are prepared with: polymer, transparent or translucent polymer, acrylic, poly(methyl methacrylate), methacrylate ester or methacrylamide derivative, absorbent polymer or conductive polymer, or they are prepared with one or more of these in a nanocomposite or hybrid nanomaterial, or in a polymer carbon nanotube nanocomposite, or a polymer clay nanocomposite.

282. The method of claim 9, in which the work and/or the image-making support medium have one or a combination of these:
a polymer that is re-mendable, self-healing and/or regenerative;
a polymer that is capable of changing or responding to stimulation, a control, activation, a trigger or influence; a photorefractive polymer, a polymer gel, hydrogel, or redox polymer; a shape memory polymer; and/or an ionomeric polymer-metal composite;

a material or a polymeric material that is: electroactive, thermochromic, piezochromic, piezorochromic, piezoelectric, solvatochromic, carsolchromic or gasochromic;

a phase change material;

a photonic colorant, a photonic crystal, a photonic material, a photonic band gap material or structure, a synthetic opal or a synthetic opal containing silica spheres or imbibed with liquid crystal, polymerized crystalline colloidal arrays, or gel particles embedded in crystalline colloidal arrays;

it has or is a field emission display;

it has a smart fluid that is a particle filled, oil based suspension that changes in viscosity reversibly or that changes from liquid to solid reversibly; electro-rheological or magneto-rheostatic fluids; a polymer or conductive polymer magnet; and/or porphyrin.

283. The method of claim 9, in which the work and/or the image-making support medium is prepared with at least one or any combination of these:

it is prepared with at least one nanomaterial that is manmade and/or grown by man, or that is non-natural; and/or it is prepared with at least one nanocomposite, hybrid nanomaterial, nanotube, carbon nanotube, single wall carbon nanotube, graphene, buckypaper, nanoparticle, nanocrystal, quantum dot, nanowire, nanofiber, nanoclay, molybdenum, and/or nanomaterial made with molybdenum; and/or it is prepared with a nanocomposite, a hybrid nanomaterial, a polymer nanocomposite or a polymer hybrid nanomaterial, that is in the form of a thin or very thin layer, in or on which there is graphene, buckypaper, or at least one but optimally many nanoscale nanomaterials, carbon nanotubes, single wall carbon nanotubes, nanoparticles, nanowires, nanocrystals, nanofibers or molybdenum; and/or it is prepared with at least one nanomaterial that is partially, largely or completely: (i) nano-pure; (ii) made, manipulated, or engineered on an atomic or molecular scale or from the bottom up; (iii) made, manipulated, or engineered using nanotechnology to control most or all atoms, or to control most atoms or every atom that serves a particular function or that is in a particular position or on a particular part of the image; or (iv) one or more of (i)-(iii) and the nanomaterial is visible to the unaided or naked eye or it is unseen by viewers.

284. The method of claim 9, in which the work and/or the image-making support medium are prepared with at least one fine-art stabilizer; at least one fine art stabilizer that is or that has at least one nanomaterial; at least one fine-art stabilizer that bonds to or enhances the bond to one or more superimposed conventional artists' mediums or paints; or at least one fine-art stabilizer that is a combination of these.

285. The method of claim 9, in which the work and/or the image-making support medium are cleaned sufficiently to render it receptive to superimposed artists' paint, so that it has enhanced bond strength and permanence.

286. The method of claim 9, in which the work and/or the image-making support medium are prepared with:

(i) a monomer that is methacrylate ester, methacrylamide derivative or methyl methacrylate; (ii) a polymer that is poly(methyl methacrylate) or that is made from methacrylate ester or methacrylamide derivative; (iii) any of these that are strengthened, made stiffer or made more rigid by at least one nanomaterial, by a fine art stabilizer or by another polymer; (iv) polycarbonate; (v) a polymer and a fine art stabilizer; (vi) a polymer and a fine art stabilizer that provides or enhances it's ability to remain unchanged with exposure to ultraviolet light; or (vii) any of these that are transparent or translucent forms.

287. The method of claim 9, in which the work and/or the image-making support medium are prepared with:

(i) a conventional image-making medium made with at least one nanomaterial, (ii) a conventional image making medium that is improved, enhanced, changed or made more permanent by at least one nanomaterial, or (iii) a nanocomposite or hybrid nanomaterial made with a conventional image making medium that is more permanent, stronger, tougher, more resilient, more durable, stiffer, less flexible, less breakable, less fragile, less brittle, or less fibrous than the conventional image-making medium in it's conventional state, or that is enhanced for use in art, design or architecture or for use in making such works in comparison to the conventional image-making medium.

288. The method of claim 9, in which the work and/or the image-making support medium are prepared with at least one material or medium that is entirely free of nanotechnological processing or that is made: (i) using bulk technology; (ii) by nature or a by a natural process; and/or (iii) with natural rather than manmade, nanoscale, structure(s), feature(s), or physical phenomena.

289. The method of claim 9, in which the work and/or the image-making support medium are prepared with a conventional medium that is more permanent, stronger, tougher, more resilient, more durable, stiffer, less flexible, less breakable, less fragile, less brittle, less fibrous or enhanced for use in art, design or architecture or for use in making such works, due to one or more nanomaterials.

290. The method of claim 9, in which the work and/or the image-making support medium are prepared with metal, glass, crystal, ceramic, clay, stone, paper, wood, conventional artist's canvas fabric, and/or plaster in a nanocomposite, a hybrid nanomaterial or a nanomaterial.

291. The method of claim 9, in which the work and/or the image-making support medium are prepared with or as one or more: devices, machines and/or systems; fabrics, conventional artist's canvas fabrics, textiles, meshes, woven materials, threads, yarns, cords, cables, fibers, wires and/or ropes that is nanoscale or larger, made with one or more nanomaterials; and/or prepared with one or more nanomaterials that are conductive.

292. The method of claim 9, in which the work and/or the image-making support medium are prepared with a form that is sufficiently strong, stabile or permanent, and one or more of:

it is structural or it is sufficient to serve as the work's structure; it is rigid, planar, slight, thin or very thin; unreinforced, unbacked, or unbolstered;

it is a form made with a strengthening stabilizer; it is a form that is an image support or an image support stabilizer or it is a form made with an image support or image support stabilizer; and/or it is a form prepared as a mural or as a design on a wall, ceiling or other architectural structure.

293. The method of claim 9, in which the work and/or the image-making support medium are prepared with:

(i) a form that is largely or almost completely made of a conventional artist's support medium or of it's ingredient or ingredients;

(ii) a form that visually resembles or looks similar to a conventional artist's support medium, canvas, paper, acrylic sheeting or clay, or it is such a form that also functions in a manner that is like or similar to the conventional artist's support medium it looks similar to or resembles;

(iii) the visual appearance of or resembling a conventional artist's canvas; texture resembling conventional canvas; deckled edges; irregularities resembling handmade paper, or (iv) any combination of these.

* * * * *